(12) United States Patent
Nielsen et al.

(10) Patent No.: US 8,766,638 B2
(45) Date of Patent: Jul. 1, 2014

(54) LOCATE APPARATUS WITH LOCATION TRACKING SYSTEM FOR RECEIVING ENVIRONMENTAL INFORMATION REGARDING UNDERGROUND FACILITY MARKING OPERATIONS, AND ASSOCIATED METHODS AND SYSTEMS

(75) Inventors: Steven Nielsen, North Palm Beach, FL (US); Curtis Chambers, Palm Beach Gardens, FL (US); Jeffrey Farr, Jupiter, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 422 days.

(21) Appl. No.: 12/818,199

(22) Filed: Jun. 18, 2010

(65) Prior Publication Data
US 2010/0256912 A1 Oct. 7, 2010

Related U.S. Application Data

(63) Continuation of application No. 12/704,087, filed on Feb. 11, 2010, and a continuation-in-part of application No. 12/571,329, filed on Sep. 30, 2009, now Pat. No. 8,476,906.

(60) Provisional application No. 61/151,578, filed on Feb. 11, 2009, provisional application No. 61/232,112, filed on Aug. 7, 2009, provisional application No. 61/235,519, filed on Aug. 20, 2009, provisional application No. 61/102,122, filed on Oct. 2, 2008.

(30) Foreign Application Priority Data

Feb. 10, 2010 (CA) ...................................... 2692115

(51) Int. Cl.
*G01V 3/10* (2006.01)
(52) U.S. Cl.
USPC .......................................................... 324/329
(58) Field of Classification Search
USPC ............................................ 324/326–329, 67
See application file for complete search history.

(56) References Cited

U.S. PATENT DOCUMENTS

| 4,600,356 A | 7/1986 | Bridges |
| 4,630,054 A | 12/1986 | Martinson |

(Continued)

FOREIGN PATENT DOCUMENTS

| CA | 2423148 | 9/2004 |
| CA | 2574595 | 2/2006 |

(Continued)

OTHER PUBLICATIONS

U.S. Appl. No. 13/644,226, filed Oct. 3, 2012, Nielsen et al.

(Continued)

*Primary Examiner* — Jay Patidar

(57) ABSTRACT

In a locate operation to detect a presence or absence of at least one underground facility using a locate device, an applied signal is transmitted to the at least one underground facility, and/or a magnetic field emitted from the at least one underground facility is detected. Based on the indication of the location provided by a location tracking system, environmental information is obtained regarding at least one environmental condition of an environment in which the locate device is used, and logged into local memory of the locate device.

31 Claims, 27 Drawing Sheets

(56) References Cited

U.S. PATENT DOCUMENTS

| | | |
|---|---|---|
| 4,899,293 A | 2/1990 | Dawson et al. |
| 5,001,430 A | 3/1991 | Peterman et al. |
| 5,052,854 A | 10/1991 | Correa |
| 5,150,295 A | 9/1992 | Mattingly |
| 5,214,757 A | 5/1993 | Mauney et al. |
| 5,329,464 A | 7/1994 | Sumic et al. |
| 5,469,155 A | 11/1995 | Archambeault |
| 5,486,067 A | 1/1996 | Huynh |
| 5,517,419 A | 5/1996 | Lanckton |
| 5,529,433 A | 6/1996 | Huynh |
| 5,541,516 A | 7/1996 | Rider et al. |
| 5,553,407 A | 9/1996 | Stump |
| 5,568,162 A | 10/1996 | Samsel et al. |
| 5,576,973 A | 11/1996 | Haddy |
| 5,654,638 A | 8/1997 | Shoemaker |
| 5,659,985 A | 8/1997 | Stump |
| 5,673,050 A | 9/1997 | Moussally et al. |
| 5,681,129 A | 10/1997 | Moehring et al. |
| 5,704,142 A | 1/1998 | Stump |
| 5,819,859 A | 10/1998 | Stump et al. |
| 6,074,693 A | 6/2000 | Manning |
| 6,119,376 A | 9/2000 | Stump |
| 6,211,807 B1 | 4/2001 | Wilkison |
| 6,282,477 B1 | 8/2001 | Gudat et al. |
| 6,320,518 B2 | 11/2001 | Saeki et al. |
| 6,356,082 B1 | 3/2002 | Alkire et al. |
| 6,388,629 B1 | 5/2002 | Albats et al. |
| 6,390,336 B1 | 5/2002 | Orozco |
| 6,401,051 B1 | 6/2002 | Merriam |
| 6,411,094 B1 * | 6/2002 | Gard et al. .................... 324/326 |
| 6,437,561 B1 | 8/2002 | Bartingale |
| 6,496,137 B1 | 12/2002 | Johansson |
| 6,617,996 B2 | 9/2003 | Johansson |
| 6,700,526 B2 | 3/2004 | Witten |
| 6,710,741 B2 | 3/2004 | Tucker |
| 6,728,662 B2 | 4/2004 | Frost et al. |
| 6,748,340 B2 | 6/2004 | Otsuki |
| 6,751,553 B2 | 6/2004 | Young |
| 6,778,128 B2 | 8/2004 | Tucker et al. |
| 6,792,079 B1 | 9/2004 | Boggs |
| 6,798,379 B2 | 9/2004 | Tucker et al. |
| 6,825,793 B2 | 11/2004 | Taylor, Jr. et al. |
| 6,833,795 B1 | 12/2004 | Johnson et al. |
| 6,850,161 B1 | 2/2005 | Elliott et al. |
| 6,904,361 B1 | 6/2005 | Tallman et al. |
| 6,956,524 B2 | 10/2005 | Tucker et al. |
| 6,975,942 B2 | 12/2005 | Young et al. |
| 6,999,021 B2 | 2/2006 | Taylor, Jr. |
| 7,120,564 B2 | 10/2006 | Pacey |
| 7,225,885 B2 | 6/2007 | Mercer |
| 7,319,387 B2 | 1/2008 | Willson et al. |
| 7,345,617 B2 | 3/2008 | Friborg |
| 7,372,247 B1 | 5/2008 | Giusti et al. |
| 7,400,976 B2 | 7/2008 | Young et al. |
| 7,443,154 B1 | 10/2008 | Merewether et al. |
| 7,482,973 B2 | 1/2009 | Tucker et al. |
| 7,532,127 B2 | 5/2009 | Holman et al. |
| 7,586,433 B1 | 9/2009 | Johansson |
| 7,605,590 B2 | 10/2009 | Mulcahey |
| 7,640,105 B2 | 12/2009 | Nielsen et al. |
| 7,664,530 B2 | 2/2010 | Skelton |
| 7,733,077 B1 | 6/2010 | Merewether et al. |
| 7,741,848 B1 | 6/2010 | Olsson |
| 7,773,095 B1 | 8/2010 | Badrak et al. |
| 7,834,801 B2 | 11/2010 | Waite et al. |
| 7,834,806 B2 | 11/2010 | Tucker et al. |
| 7,889,124 B2 | 2/2011 | Islam et al. |
| 7,889,888 B2 | 2/2011 | Deardorr |
| 7,920,068 B2 | 4/2011 | Sawyer, Jr. et al. |
| 7,929,981 B2 | 4/2011 | Sangberg |
| 7,978,129 B2 | 7/2011 | Sawyer et al. |
| 8,060,304 B2 | 11/2011 | Nielsen et al. |
| 8,081,112 B2 | 12/2011 | Tucker et al. |
| 8,106,660 B1 | 1/2012 | Merewether et al. |
| 8,144,058 B2 | 3/2012 | Sawyer, Jr. et al. |
| 8,144,245 B2 | 3/2012 | Vik |
| 8,155,390 B2 | 4/2012 | Nielsen et al. |
| 8,194,932 B2 | 6/2012 | Nielsen et al. |
| 8,218,827 B2 | 7/2012 | Nielsen et al. |
| 8,249,306 B2 | 8/2012 | Nielsen et al. |
| 8,311,765 B2 | 11/2012 | Nielsen et al. |
| 8,473,148 B2 | 6/2013 | Nielsen et al. |
| 8,480,332 B2 | 7/2013 | Nielsen et al. |
| 2002/0035432 A1 | 3/2002 | Kubica et al. |
| 2002/0122000 A1 | 9/2002 | Bradley et al. |
| 2002/0130806 A1 | 9/2002 | Taylor et al. |
| 2002/0130906 A1 | 9/2002 | Miyaki |
| 2003/0012411 A1 | 1/2003 | Sjostrom |
| 2003/0100316 A1 | 5/2003 | Odamura |
| 2003/0135328 A1 | 7/2003 | Burns et al. |
| 2003/0168834 A1 | 9/2003 | Ulrich |
| 2003/0184301 A1 | 10/2003 | Bosnar |
| 2004/0070535 A1 | 4/2004 | Olsson et al. |
| 2004/0210370 A1 | 10/2004 | Gudat |
| 2004/0220731 A1 | 11/2004 | Tucker |
| 2004/0225444 A1 | 11/2004 | Young et al. |
| 2005/0038825 A1 | 2/2005 | Tarabzouni |
| 2005/0057745 A1 | 3/2005 | Bontje |
| 2005/0156600 A1 | 7/2005 | Olsson |
| 2005/0206562 A1 | 9/2005 | Willson et al. |
| 2005/0232475 A1 | 10/2005 | Floeder |
| 2006/0026020 A1 | 2/2006 | Waite et al. |
| 2006/0055584 A1 | 3/2006 | Waite et al. |
| 2006/0077095 A1 | 4/2006 | Tucker et al. |
| 2006/0085133 A1 | 4/2006 | Young |
| 2006/0091888 A1 | 5/2006 | Holman et al. |
| 2006/0132136 A1 | 6/2006 | Mizuno |
| 2006/0235741 A1 | 10/2006 | Deaton et al. |
| 2006/0282280 A1 | 12/2006 | Stotz et al. |
| 2007/0040558 A1 | 2/2007 | Overby et al. |
| 2007/0219722 A1 | 9/2007 | Sawyer, Jr. |
| 2007/0286021 A1 | 12/2007 | Hoenmans et al. |
| 2008/0010009 A1 | 1/2008 | Miyoshi |
| 2008/0025614 A1 | 1/2008 | Hintz et al. |
| 2008/0084212 A1 | 4/2008 | Wieland |
| 2008/0121684 A1 | 5/2008 | Gualandri |
| 2008/0125942 A1 | 5/2008 | Tucker et al. |
| 2008/0180322 A1 | 7/2008 | Islam |
| 2008/0208415 A1 | 8/2008 | Vik |
| 2009/0004410 A1 | 1/2009 | Thomson et al. |
| 2009/0013928 A1 | 1/2009 | Nielsen et al. |
| 2009/0089015 A1 | 4/2009 | Bell et al. |
| 2009/0121933 A1 | 5/2009 | Tucker et al. |
| 2009/0167308 A1 | 7/2009 | Lomes |
| 2009/0201178 A1 | 8/2009 | Nielsen et al. |
| 2009/0201311 A1 | 8/2009 | Nielsen et al. |
| 2009/0202101 A1 | 8/2009 | Nielsen et al. |
| 2009/0202110 A1 | 8/2009 | Nielsen et al. |
| 2009/0202111 A1 | 8/2009 | Nielsen et al. |
| 2009/0202112 A1 | 8/2009 | Nielsen et al. |
| 2009/0204238 A1 | 8/2009 | Nielsen et al. |
| 2009/0204466 A1 | 8/2009 | Nielsen et al. |
| 2009/0204614 A1 | 8/2009 | Nielsen et al. |
| 2009/0204625 A1 | 8/2009 | Nielsen et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210245 A1 | 8/2009 | Wold |
| 2009/0210284 A1 | 8/2009 | Nielsen et al. |
| 2009/0210285 A1 | 8/2009 | Nielsen et al. |
| 2009/0210298 A1 | 8/2009 | Nielsen et al. |
| 2009/0237408 A1 | 9/2009 | Nielsen et al. |
| 2009/0238415 A1 | 9/2009 | Nielsen et al. |
| 2009/0238416 A1 | 9/2009 | Nielsen et al. |
| 2009/0238417 A1 | 9/2009 | Nielsen et al. |
| 2009/0241045 A1 | 9/2009 | Nielsen et al. |
| 2009/0324815 A1 | 12/2009 | Nielsen et al. |
| 2009/0327024 A1 | 12/2009 | Nielsen et al. |
| 2010/0002365 A1 | 1/2010 | Mulcahey |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |

(56) References Cited

U.S. PATENT DOCUMENTS

| | | |
|---|---|---|
| 2010/0045517 A1 | 2/2010 | Tucker et al. |
| 2010/0070347 A1 | 3/2010 | Chen |
| 2010/0084532 A1 | 4/2010 | Nielsen et al. |
| 2010/0085054 A1 | 4/2010 | Nielsen et al. |
| 2010/0085376 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0086677 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0090858 A1 | 4/2010 | Nielsen et al. |
| 2010/0094553 A1 | 4/2010 | Nielsen et al. |
| 2010/0109670 A1 | 5/2010 | Arnaud |
| 2010/0117654 A1 | 5/2010 | Nielsen et al. |
| 2010/0131903 A1 | 5/2010 | Thomson et al. |
| 2010/0146454 A1 | 6/2010 | Sugahara |
| 2010/0161359 A1 | 6/2010 | Asher |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0201706 A1 | 8/2010 | Nielsen et al. |
| 2010/0205031 A1 | 8/2010 | Nielsen et al. |
| 2010/0205032 A1 | 8/2010 | Nielsen et al. |
| 2010/0205195 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0205555 A1 | 8/2010 | Nielsen et al. |
| 2010/0207816 A1 | 8/2010 | Islam et al. |
| 2010/0211354 A1 | 8/2010 | Park et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0272885 A1 | 10/2010 | Olsson |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0006772 A1 | 1/2011 | Olsson |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093162 A1 | 4/2011 | Nielsen et al. |
| 2011/0093304 A1 | 4/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0137769 A1 | 6/2011 | Nielsen et al. |
| 2011/0236588 A1 | 9/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0282542 A9 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0085670 A1 | 4/2013 | Nielsen et al. |
| 2013/0101180 A1 | 4/2013 | Nielsen et al. |
| 2013/0103318 A1 | 4/2013 | Nielsen et al. |
| 2013/0116855 A1 | 5/2013 | Nielsen et al. |
| 2013/0125042 A1 | 5/2013 | Nielsen et al. |
| 2013/0135343 A1 | 5/2013 | Nielsen et al. |
| 2013/0147637 A1 | 6/2013 | Nielsen et al. |
| 2013/0162431 A1 | 6/2013 | Nielsen et al. |
| 2013/0174072 A9 | 7/2013 | Nielsen et al. |

FOREIGN PATENT DOCUMENTS

| | | |
|---|---|---|
| CA | 2643844 | 9/2007 |
| CA | 2418157 | 9/2009 |
| CA | 2632267 | 5/2012 |
| EP | 0927892 | 7/1999 |
| EP | 1241488 | 9/2002 |
| EP | 0683401 B1 | 12/2003 |
| EP | 1521331 | 4/2005 |
| EP | 1754983 | 2/2007 |
| WO | WO02/33443 | 4/2002 |
| WO | WO0228541 | 4/2002 |
| WO | WO2004095076 | 11/2004 |
| WO | WO2005052627 | 6/2005 |
| WO | WO2007067898 | 6/2007 |
| WO | WO2009102431 | 8/2009 |

OTHER PUBLICATIONS

3M Dynatel, Brochure, 2006, 1-4.
3M Dynatel, Locating and Marking System, Brochure, 2007, 1-16.
ArcFM UT, "A GIS for Utilities Based on Standards," White Paper, AED SICAD, Sep. 2008, 1-28.
ArcFM, White Paper, 2006, 1-28.
ArcGIS 9, Geocoding in ArcGIS, Manual, 2004, 1-192.
ArcPad, Mobile GIS Software for Field Mapping Applications, brochure, 2006, http:/www.esri.com/library/brochures/pdfs/arcpadbro.pdf.
ArcPad: Mobile GIS, ESRI White Paper, Sep. 1-17, 2004, http://www.esri.com/library/whitepapers/pdfs/arcpad.pdf.

(56) References Cited

OTHER PUBLICATIONS

DigiTerra Explorer, brochure, v. 6, 2009, 1-2.
DigiTerra Explorer, User Manual, v. 5, 2007, 1-64.
DigiTerra GIS Solutions, Using DigiTerra Explorer with cable locator and GPS, http://www.digiterra.hu/en/solutions/cable-locator/using-digiterra-explorer-with-cable-locator-and-gps.html, printed Aug. 13, 2010 (original publication date unknown) 2 pages.
Ehm, G., Electric Light & Power, GPS Technology is Enhancing Underground Utility Locating, http://www.elp.com/index/display/article-display/9900060927/articles/utility-products/volume-7/issue-5/product-focus/overhead-_underground/gps-technology_is.html, printed on Aug. 13, 2010 (original publication date unknown), 5 pages.
GPS Technology Enhancing Underground Utility Locating, Underground Construction Magazine, Apr. 7, 2010, 4 pages, http://www.undergroundconstructionmagazine.com/print/1034?page=show.
International Search Report (Partial), Application No. PCT/US2010/000336, Jul. 5, 2011.
International Search Report and Written Opinion, Application No. PCT/US10/000333, Jan. 21, 2011.
International Search Report and Written Opinion, Application No. PCT/US11/23208, Mar. 25, 2011.
International Search Report and Written Opinion, Application No. PCT/US2008/55796, Oct. 14, 2008.
International Search Report and Written Opinion, Application No. PCT/US2008/55798, Jul. 28, 2008.
International Search Report and Written Opinion, Application No. PCT/US2010/000336, Nov. 14, 2011.
International Search Report, Application No. PCT/US2009/005415, Nov. 19, 2010.
MALA Application Note—Using MALA GPR systems with GPS equipment, Printed Matter No. 2894, 5 pages, www.malags.se, printed Apr. 9, 2010 (original publication date unknown).
MALA Application Note—Visualizing GPR data in Google Earth using MALA GPS Mapper, Printed Matter No. 2896, 3 pages, www.malags.se, printed Apr. 9, 2010 (original publication date unknown).
MALA GPS Mapper—Processing, 1 page, http://www.malags.se/Downloads/Software/processing/MALA-GPS-Mapper.aspx, printed on Apr. 9, 2010 (original publication date unknown).
MALA GPS Mapper—Product Releases, Sep. 19, 2007, 1 page, http://www.malags.se/News-and-Events/Product-Releases/MALA-GPS-Mapper.aspx, printed Apr. 9, 2010.
MALA Object Mapper™—Processing, 1 page, http://www.malags.se/Downloads/Software/Processing/Object-Mapper.aspx, printed Apr. 9, 2010 (original publication date unknown).
MobileMapper 6 vs. Juno SC in Real World Conditions, White Paper, 2009 1-16, http://www.sidwellco.com/php/gps_solutions/docs/MM6_vs_Juno_WP_en.pdf.
MobileMapper 6, brochure, 2008, 1-4.
Notice of Allowance dated Sep. 5, 2012 from U.S. Appl. No. 12/854,370.
Notice of Allowance dated Nov. 28, 2011 from Canadian Application No. 2,710,269.
Office Action dated Jan. 9, 2012 from U.S. Appl. No. 12/701,501.
Office Action dated Mar. 26, 2012 from U.S. Appl. No. 12/701,500.
Office Action dated Mar. 29, 2012 from Application No. GB1107055.4.
Office Action dated Apr. 10, 2012 from U.S. Appl. No. 12/854,370.
Office Action dated May 21, 2012 from U.S. Appl. No. 12/609,275.
Office Action dated Jun. 18, 2012 from U.S. Appl. No. 12/701,505.
Office Action dated Jul. 17, 2012 from Application No. GB1210005.3.
Office Action dated Jul. 19, 2012 from U.S. Appl. No. 12/571,329.
Office Action dated Aug. 29, 2012 from U.S. Appl. No. 12/701,501.
Office Action dated Sep. 18, 2012 from U.S. Appl. No. 12/701,500.
Office Action dated Sep. 26, 2011 from Canadian Application No. 2,739,272.
Office Action dated Oct. 12, 2012 from U.S. Appl. No. 12/701,505.
Office Action dated Oct. 15, 2010 from Canadian Application No. 2,692,115.
Office Action dated Aug. 26, 2011 from Canadian Application No. 2692115.
Office Action dated May 30, 2012 from Canadian Application No. 2692115.
Pevarski, R., Virginia Pilot Project: Technology Meets Damage Prevention, http://www.excavationsafetyonline.com/esg/guidePDFs/2009_2009_ESG_Page_9.pdf, printed on Nov. 3, 2009, 1 page.
Surface Geophysical Methods, Chapter III, Mar. 1997, 43 pages.
Trimble Comprehensive Utilities, brochure, 2010, 1-6.
Vanaartsen, S.J., GIS Automates Utility One Call Process, Proceeding ESRI, 1-15, http://proceedings.esri.com/library/useconf/proc06/papers/papers/pap_1148.pdf.
Applied Geophysics. Telford et al. Cambridge University Press. Library of Congress catalogue card No. 74-16992. First published in 1976; reprinted 1977, 1978, 1980-82. Chapter on Magnetic Methods, pp. 123-217.
Interpretation Theory in Applied Geophysics. Grant et al. Copyright 1965 by McGraw Hill. Library of Congress catalogue card No. 64/8413. Chapters 11-12 part III, pp. 306 to 464.
Notice of Allowance dated Jan. 16, 2013 from U.S. Appl. No. 12/609,275.
Office Action dated Sep. 17, 2012 from Australian Patent Application No. 2010214099.
Office Action dated Oct. 4, 2012 from Australian Application No. 2010214102.
Office Action dated Oct. 22, 2012 from U.S. Appl. No. 12/609,275.
Our World is Magnetic; Versatile Proton Magnetometer/Gradiometer; http://ww.gemsys.ca/products/versatile-proton-magnetometer-gradiometer/ [retrieved from the internet on Oct. 26, 2012].
U.S. Appl. No. 13/797,188, filed Mar. 12, 2013, Nielsen et al.
U.S. Appl. No. 13/792,686, filed Mar. 11, 2013, Nielsen et al.
U.S. Appl. No. 13/773,228, filed Feb. 21, 2013, Nielsen et al.
Office Action dated Jan. 29, 2013 from U.S. Appl. No. 12,704,087.
Office Action dated Feb. 5, 2013 from U.S. Appl. No. 12/571,329.
Office Action dated Mar. 7, 2013 from Canadian Application No. 2,692,115.
Office Action dated Mar. 20, 2013 from U.S. Appl. No. 12/818,198.
Patent Examination Report No. 1, Australian Application No. 2010214102, Mar. 14, 2013.
U.S. Appl. No. 13/943,350, filed Jul. 16, 2013, Nielsen et al.
Notice of Allowance dated Jul. 8, 2013 from U.S. Appl. No. 13/792,686.
Notice of Allowance dated May 3, 2013 from U.S. Appl. No. 12/571,329.
Notice of Allowance dated May 3, 2013 from U.S. Appl. No. 12/701,501.
Combined Search and Examination Report dated Sep. 25, 2013 from Application No. GB1314159.3.
Combined Search and Examination Report dated Sep. 25, 2013 from Application No. GB1314160.1.
Combined Search and Examination Report dated Sep. 25, 2013 from Application No. GB1314162.7.
Combined Search and Examination Report dated Sep. 25, 2013 from Application No. GB1314164.3.
Combined Search and Examination Report dated Sep. 25, 2013 from Application No. GB1314165.0.
Office Action dated Oct. 3, 2013 from Canadian Application No. 2,752,071.
Combined Search and Examination Report dated Jul. 10, 2013 from Application No. GB1310863.4.
Notice of Allowance dated Jul. 18, 2013 from U.S. Appl. No. 13/773,228.
Office Action dated Aug. 9, 2013 from U.S. Appl. No. 12/818,193.
Office Action dated Aug. 13, 2013 from U.S. Appl. No. 12/818,195.
Office Action dated Aug. 6, 2013 from U.S. Appl. No. 12/704,087.
Patent Examination Report dated Dec. 9, 2013 from Australian Application No. 2010214099.
Notice of Allowance dated Nov. 29, 2013 from U.S. Appl. No. 12/704,087.
Office Action dated Feb. 7, 2014 from U.S. Appl. No. 12/818,189.
Office Action dated Mar. 5, 2014 from Canadian Application No. 2,692,115.

* cited by examiner

LOCATE APPARATUS WITH LOCATION TRACKING SYSTEM FOR RECEIVING ENVIRONMENTAL INFORMATION REGARDING UNDERGROUND FACILITY MARKING OPERATIONS, AND ASSOCIATED METHODS AND SYSTEMS

CROSS-REFERENCES TO RELATED APPLICATIONS

This application claims the benefit, under 35 U.S.C. §120, as a continuation (CON) of U.S. Non-provisional application Ser. No. 12/704,087, entitled "Locate Apparatus Having Enhanced Features for Underground Facility Locate Operations, and Associated Methods and Systems," filed on Feb. 11, 2010.

Ser. No. 12/704,087 claims a priority benefit, under 35 U.S.C. §119(a), to Canadian application serial no. 2,692,115, entitled "Locate Apparatus Having Enhanced Features for Underground Facility Locate Operations, and Associated Methods and Systems," filed on Feb. 10, 2010.

Ser. No. 12/704,087 claims a priority benefit, under 35 U.S.C. §119(e), to U.S. Provisional Application Ser. No. 61/151,578, entitled "Locating equipment that has enhanced features for underground facility locate operations," filed on Feb. 11, 2009.

Ser. No. 12/704,087 also claims a priority benefit, under 35 U.S.C. §119(e), to U.S. Provisional Application Ser. No. 61/232,112, entitled "Methods and apparatus for detecting and monitoring use of locating equipment for out-of-tolerance conditions," filed on Aug. 7, 2009.

Ser. No. 12/704,087 also claims a priority benefit, under 35 U.S.C. §120, as a continuation-in-part (CIP) of U.S. Non-provisional application Ser. No. 12/571,329, entitled "Methods and Apparatus for Generating Electronic Records of Locate Operations," filed on Sep. 30, 2009.

Ser. No. 12/571,329 in turn claims a priority benefit, under 35 U.S.C. §119(e), of U.S. Provisional Application Ser. No. 61/102,122, entitled "Combination Locate and Marking Device with a Data Acquisition System Installed Therein, and Associated Methods," filed on Oct. 2, 2008.

Each of the above-identified applications is incorporated by reference herein in its entirety.

Ser. No. 12/704,087 also claims a priority benefit, under 35 U.S.C. §119(e), to U.S. Patent Application Ser. No. 61/235,519, entitled "Marking Device With Accelerometer and Local Data Storage," filed Aug. 20, 2009.

BACKGROUND

Field service operations may be any operation in which companies dispatch technicians and/or other staff to perform certain activities, for example, installations, services and/or repairs. Field service operations may exist in various industries, examples of which include, but are not limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site. In some instances, a locate operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

FIG. 1 illustrates an example in which a locate operation is initiated as a result of an excavator 1 providing an excavation notice to a one-call center 2. An excavation notice also is commonly referred to as a "locate request," and may be provided by the excavator to the one-call center via an electronic mail message, information entry via a website maintained by the one-call center, or a telephone conversation between the excavator and a technician at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Using the information provided in a locate request for planned excavation or design projects, the one-call center identifies certain underground facilities that may be present at the indicated work site. For this purpose, many one-call centers typically maintain a collection of "polygon maps" which indicate, within a given geographic area over which the one-call center has jurisdiction, generally where underground facilities may be found relative to some geographic reference frame or coordinate system.

Polygon maps typically are provided to the one-call centers by underground facilities owners within the jurisdiction of the one call center ("members" of the one-call center). A one-call center first provides the facility owner/member with one or more maps (e.g., street or property maps) within the jurisdiction, on which are superimposed some type of grid or coordinate system employed by the one-call center as a geographic frame of reference. Using the maps provided by the one-call center, the respective facilities owners/members draw one or more polygons on each map to indicate an area within which their facilities generally are disposed underground (without indicating the facilities themselves). These polygons themselves do not precisely indicate geographic locations of respective underground facilities; rather, the area enclosed by a given polygon generally provides an over-inclusive indication of where a given facilities owner's underground facilities are disposed. Different facilities owners/members may draw polygons of different sizes around areas including their underground facilities, and in some instances such polygons can cover appreciably large geographic regions (e.g., an entire subdivision of a residential area), which may further obfuscate the actual/precise location of respective underground facilities.

Based on the polygon maps collected from the facilities owners/members, the one-call center may in some instances create composite polygon maps to show polygons of multiple different members on a single map. Whether using single member or composite polygon maps, the one-call center examines the address or location information provided in the locate request and identifies a significant buffer zone around an identified work site so as to make an over-inclusive identification of facilities owners/members that may have underground facilities present (e.g., to err on the side of caution). In particular, based on this generally over-inclusive buffer zone around the identified work site (and in some instances significantly over-inclusive buffer zone), the one-call center consults the polygon maps to identify which member polygons intersect with all or a portion of the buffer zone so as to notify these underground facility owners/members and/or their agents of the proposed excavation or design project. Again, it should be appreciated that the buffer zones around an indicated work site utilized by one-call centers for this purpose typically embrace a geographic area that includes but goes well beyond the actual work site, and in many cases the geographic area enclosed by a buffer zone is significantly larger than the actual dig area in which excavation or other similar activities are planned. Similarly, as noted above, the area enclosed by a given member polygon generally does not provide a precise indication of where one or more underground facilities may in fact be found.

In some instances, one-call centers may also or alternatively have access to various existing maps of underground facilities in their jurisdiction, referred to as "facilities maps." Facilities maps typically are maintained by facilities owners/members within the jurisdiction and show, for respective different utility types, where underground facilities purportedly may be found relative to some geographic reference frame or coordinate system (e.g., a grid, a street or property map, GPS latitude and longitude coordinates, etc.). Facilities maps generally provide somewhat more detail than polygon maps provided by facilities owners/members; however, in some instances the information contained in facilities maps may not be accurate and/or complete. For at least this reason, whether using polygon maps or facilities maps, as noted above the one-call center utilizes a significant buffer zone around an identified work site so as to make an over-inclusive identification of facilities owners/members that may have underground facilities present.

Once facilities implicated by the locate request are identified by a one-call center (e.g., via the polygon map/buffer zone process), the one-call center generates a "locate request ticket" (also known as a "locate ticket," or simply a "ticket"). The locate request ticket essentially constitutes an instruction to inspect a work site and typically identifies the work site of the proposed excavation or design and a description of the dig area, typically lists on the ticket all of the underground facilities that may be present at the work site (e.g., by providing a member code for the facility owner whose polygon falls within a given buffer zone), and may also include various other information relevant to the proposed excavation or design (e.g., the name of the excavation company, a name of a property owner or party contracting the excavation company to perform the excavation, etc.). The one-call center sends the ticket to one or more underground facility owners 4 and/or one or more locate service providers 3 (who may be acting as contracted agents of the facility owners) so that they can conduct a locate and marking operation to verify a presence or absence of the underground facilities in the dig area. For example, in some instances, a given underground facility owner 4 may operate its own fleet of locate technicians (e.g., locate technician 6), in which case the one-call center 2 may send the ticket to the underground facility owner 4. In other instances, a given facility owner may contract with a locate service provider to receive locate request tickets and perform a locate and marking operation in response to received tickets on their behalf.

Upon receiving the locate request, a locate service provider or a facility owner (hereafter referred to as a "ticket recipient") may dispatch a locate technician 5 to the work site of planned excavation to determine a presence or absence of one or more underground facilities in the dig area to be excavated or otherwise disturbed. A typical first step for the locate technician 5 includes utilizing an underground facility "locate device," which is an instrument or set of instruments (also referred to commonly as a "locate set") for detecting facilities that are concealed in some manner, such as cables and pipes that are located underground. The locate device is employed by the technician to verify the presence or absence of underground facilities indicated in the locate request ticket as potentially present in the dig area (e.g., via the facility owner member codes listed in the ticket). This process is often referred to as a "locate operation."

In one example of a locate operation, an underground facility locate device is used to detect electromagnetic fields that are generated by an applied signal provided along a length of a target facility to be identified. In this example, a locate device may include both a signal transmitter to provide the applied signal (e.g., which is coupled by the locate technician to a tracer wire disposed along a length of a facility), and a signal receiver which is generally a hand-held apparatus carried by the locate technician as the technician walks around the dig area to search for underground facilities. FIG. 2 illustrates a conventional locate device 20 (indicated by the dashed box) that includes a transmitter 22 and a locate receiver 24. The transmitter 22 is connected, via a connection point 26, to a target object (in this example, underground facility 28) located in the ground 21. The transmitter generates the applied signal 23, which is coupled to the underground facility via the connection point (e.g., to a tracer wire along the facility), resulting in the generation of a magnetic field 25. The magnetic field in turn is detected by the locate receiver 24, which itself may include one or more detection antenna (not shown). The locate receiver 24 indicates a presence of a facility when it detects electromagnetic fields arising from the applied signal 23. Conversely, the absence of a signal detected by the locate receiver generally indicates the absence of the target facility.

In yet another example, a locate device employed for a locate operation may include a single instrument, similar in some respects to a conventional metal detector. In particular, such an instrument may include an oscillator to generate an alternating current that passes through a coil, which in turn produces a first magnetic field. If a piece of electrically conductive metal is in close proximity to the coil (e.g., if an underground facility having a metal component is below/near the coil of the instrument), eddy currents are induced in the metal and the metal produces its own magnetic field, which in turn affects the first magnetic field. The instrument may include a second coil to measure changes to the first magnetic field, thereby facilitating detection of metallic objects.

In addition to the locate operation, the locate technician also generally performs a "marking operation," in which the technician marks the presence (and in some cases the absence) of a given underground facility in the dig area based on the various signals detected (or not detected) during the locate operation. For this purpose, the locate technician conventionally utilizes a "marking device" to dispense a marking material on, for example, the ground, pavement, or other surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

FIGS. 3A and 3B illustrate a conventional marking device 50 with a mechanical actuation system to dispense paint as a marker. Generally speaking, the marking device 50 includes a handle 38 at a proximal end of an elongated shaft 36 and resembles a sort of "walking stick," such that a technician may operate the marking device while standing/walking in an upright or substantially upright position. A marking dispenser holder 40 is coupled to a distal end of the shaft 36 so as to contain and support a marking dispenser 56, e.g., an aerosol paint can having a spray nozzle 54. Typically, a marking dispenser in the form of an aerosol paint can is placed into the holder 40 upside down, such that the spray nozzle 54 is proximate to the distal end of the shaft (close to the ground, pavement or other surface on which markers are to be dispensed).

In FIGS. 3A and 3B, the mechanical actuation system of the marking device 50 includes an actuator or mechanical trigger 42 proximate to the handle 38 that is actuated/triggered by the technician (e.g., via pulling, depressing or squeezing with fingers/hand). The actuator 42 is connected to a mechanical coupler 52 (e.g., a rod) disposed inside and along a length of the elongated shaft 36. The coupler 52 is in turn connected to an actuation mechanism 58, at the distal end of the shaft 36, which mechanism extends outward from the shaft in the direction of the spray nozzle 54. Thus, the actuator 42, the mechanical coupler 52, and the actuation mechanism 58 constitute the mechanical actuation system of the marking device 50.

FIG. 3A shows the mechanical actuation system of the conventional marking device 50 in the non-actuated state, wherein the actuator 42 is "at rest" (not being pulled) and, as a result, the actuation mechanism 58 is not in contact with the spray nozzle 54. FIG. 3B shows the marking device 50 in the actuated state, wherein the actuator 42 is being actuated (pulled, depressed, squeezed) by the technician. When actuated, the actuator 42 displaces the mechanical coupler 52 and the actuation mechanism 58 such that the actuation mechanism contacts and applies pressure to the spray nozzle 54, thus causing the spray nozzle to deflect slightly and dispense paint. The mechanical actuation system is spring-loaded so that it automatically returns to the non-actuated state (FIG. 3A) when the actuator 42 is released.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process. At the same time, in some contexts a locate operation is identified separately from a marking operation, wherein the former relates more specifically to detection-related activities and the latter relates more specifically to marking-related activities.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

Previous efforts at documenting locate operations have focused primarily on locate devices that employ electromagnetic fields to determine the presence of an underground facility. For example, U.S. Pat. No. 5,576,973, naming inventor Alan Haddy and entitled "Apparatus and Method for Obtaining Geographical Positional Data for an Object Located Underground" (hereafter "Haddy"), is directed to a locate device (i.e., a "locator") that receives and stores data from a global positioning system ("GPS") to identify the position of the locate device as an underground object (e.g., a cable) is detected by the locate device. Haddy notes that by recording geographical position data relating to the detected underground object, there is no need to physically mark the location of the underground object on the ground surface, and the recorded position data may be used in the future to relocate the underground object.

Similarly, U.S. Pat. No. 7,319,387, naming inventors Willson et al. and entitled "GPS Interface for Locating Device" (hereafter "Willson"), is directed to a locate device for locating "position markers," i.e., passive antennas that reflect back RF signals and which are installed along buried utilities. In Willson, a GPS device may be communicatively coupled to the locate device, or alternatively provided as an integral part of the locate device, to store GPS coordinate data associated with position markers detected by the locate device. Electronic memory is provided in the locate device for storing a data record of the GPS coordinate data, and the data record may be uploaded to a remote computer and used to update a mapping database for utilities.

U.S. Publication No. 2006/0282280, naming inventors Stotz et al. and entitled "Ticket and Data Management" (hereafter "Stotz"), also is directed to a locate device (i.e., a "locator") including a GPS receiver. Upon detection of the presence of a utility line, Stotz' locate device can update ticket data with GPS coordinates for the detected utility line. Once the locate device has updated the ticket data, the reconfigured ticket data may be transmitted to a network.

U.S. Publication No. 2007/0219722, naming inventors Sawyer, Jr. et al. and entitled "System and Method for Collecting and Updating Geographical Data" (hereafter "Sawyer"), is directed to collecting and recording data representative of the location and characteristics of utilities and infrastructure in the field for creating a grid or map. Sawyer employs a field data collection unit including a "locating pole" that is placed on top of or next to a utility to be identified and added to the grid or map. The locating pole includes an antenna coupled to a location determination system, such as a GPS unit, to provide longitudinal and latitudinal coordinates of the utility under or next to the end of the locating pole. The data gathered by the field data collection unit is sent to a server to provide a permanent record that may be used for damage prevention and asset management operations.

SUMMARY

Applicants have recognized and appreciated that uncertainties which may be attendant to locate and marking operations may be significantly reduced by collecting comprehensive information relating to one or both of the operating conditions of equipment used to perform the locate and/or marking operations, as well as various environmental conditions present at or near the work site and/or in close proximity to the equipment being used.

More specifically, Applicants have recognized and appreciated that conventional techniques for using a locate device to detect underground facilities are sometimes tentative and typically iterative in nature, and use of locate devices with only rudimentary GPS capabilities in some instances may result in redundant, spurious and/or incomplete geographic location data collected by such devices. For example, during a typical locate operation, a technician attempting to locate an underground facility with a locate device often needs to sweep an appreciable area around a suspected underground facility, and make multiple passes with the locate device over the underground facility to obtain meaningful detection signals. Furthermore, the technician often needs to rely significantly on visual observations of the area, including relevant landmarks such as facility connections to buildings, transformer boxes, maintenance/public access points, curbs, sidewalks, roadways, etc., to effectively deduce a sensible path of an underground facility to be located. The foregoing is particularly true if at some point during the locate operation the technician loses a signal from an underground facility in the process of being detected (e.g., due to a broken transmitter circuit path from a damaged tracer wire, and loss of the transmitter test signal). Thus, collecting and logging geographic location information throughout this process may result in excessive and/or imprecise data, or in some instances incomplete relevant data (e.g., in the case of signal loss/ broken tracer wire), from which it may be difficult to cull the data that is truly complete and representative of where the underground facility ultimately was detected. Accordingly, additional information about other operating conditions of the locate device, and/or information on existing environmental conditions, may in some instances supplement, or facilitate identification of, information that is perhaps the most relevant to the operation at hand.

In view of the foregoing, various embodiments of the present invention are directed to locate devices (e.g., locate transmitters and/or locate receivers) with enhanced features, and associated methods and systems, to facilitate collection of a wide variety of information relating to a locate operation, and provide for creation of a comprehensive and robust electronic record of a locate operation. Locate information relating to use of a locate device to perform a locate operation may be acquired from one or more of a variety of input devices in any of a variety of manners, logged/stored in local memory of a locate device, formatted in various manners, processed and/or analyzed at the locate device itself, and/or transmitted to another device (e.g., a remote computer/server) for storage, processing and/or analysis.

In some exemplary embodiments described in detail herein, a locate device may include one or more environmental sensors and/or operational sensors, and the locate information may include environmental information and operational information derived from such sensors. Environmental and/or operational information may be used to control operation of the locate device, assess out-of-tolerance conditions in connection with use of the locate device, and/or provide alerts or other feedback. In yet other embodiments, additional enhancements are disclosed relating to improving the determination of a location (e.g., GPS coordinates) of a detecting tip of the locate device (e.g., a portion of the locate device close to the ground, pavement or other surface below which one or more underground facilities may be disposed) during use.

In other embodiments, a locate device may be operated in a "solo" mode or a "group" mode. In particular, in a "solo" mode, the locate device may be operated as an individual, independent device to collect, store and/or transmit data, whereas in "group" mode, a locate device may act as a "worker" device or a "leader" device to facilitate consolidation of data collected by multiple devices (e.g., and relating to a same ticket) at a single one of the devices, at a host server, or at any other suitable location.

In yet other embodiments, a locate device may be equipped with an enhanced user interface having tactile functionality; in particular, the locate device may include one or more tactile indicators (e.g., vibrating devices) disposed, for example, in a handle, joy stick, actuator or elsewhere on the device, to provide a tactile indication to a technician using the locate device (e.g., as feedback in connection with an operating mode, operating condition, environmental condition, etc.).

During and/or following collection and/or storage of information regarding the locate operation, data compiled in one or more electronic records associated with the locate operation may be accessed, processed and/or analyzed to provide further information relating to the performance of the locate operation. For example, in other embodiments disclosed herein, data from one or more electronic records of the locate operation is processed so as to electronically render (visually recreate) the locate operation (e.g., on a display device associated with the locate device or other display device). Electronic renderings may be generated statically (e.g., in which all available data in an electronic record is rendered essentially simultaneously on an available display field) or in an "animated" time-sequenced recreation of the locate operation (e.g., based on at least timing and geographic location information in the electronic record) once an electronic record is generated. In yet another exemplary implementation, various information to be logged in an electronic record may be passed/transmitted in essentially real-time to one or more display devices to facilitate an essentially real-time electronic rendering on an available display field of a locate operation in process.

One embodiment of the present invention is directed to an apparatus for detecting a presence or absence of an underground facility. The apparatus comprises at least one receiver antenna configured to detect a magnetic field from the underground facility, at least one processor communicatively coupled to the at least one receiver antenna to receive information about the magnetic field from the at least one receiver antenna, and at least one input device communicatively coupled to the at least one processor and configured to sense at least one environmental condition of an environment in which the apparatus is located. The at least one input device is configured to provide an output signal to the at least one processor indicative of the sensed at least one environmental condition.

Another embodiment of the present invention is directed to an apparatus for detecting a presence or absence of an underground facility. The apparatus comprises at least one receiver antenna configured to detect a magnetic field from the underground facility, an actuator, and at least one processor communicatively coupled to the at least one receiver antenna to receive information about the magnetic field from the at least one receiver antenna in response to actuation of the actuator. The apparatus further comprises a location tracking system communicatively coupled to the at least one processor and configured to determine a location of the apparatus, and at least one input device communicatively coupled to the at least one processor and configured to sense at least one environmental condition of an environment in which the apparatus is located. The at least one input device is configured to provide an output signal to the at least one processor indicative of the sensed at least one environmental condition. The at least one processor is programmed with processor-executable instructions which, when executed, cause the at least one processor to compare the output signal of the at least one input device to at least one target range. In response to determining that the output signal is outside the at least one target range, the at least one processor does at least one of (i) generate an alert to a technician using the apparatus and (ii) disable the actuator.

Another embodiment of the present invention is directed to a method for performing a locate operation for at least one underground facility using a locate apparatus. The method comprises A) detecting, via at least one receiver antenna of the apparatus, a magnetic field from the at least one underground facility. The method further comprises B) detecting, via at least one input device of the apparatus, at least one environmental condition of an environment in which the apparatus is located. The method further comprises C) logging into local memory of the apparatus locate information relating at least in part to A) and B).

Another embodiment of the present invention is directed to an apparatus for detecting a presence or absence of an underground facility, the apparatus comprising at least one receiver antenna configured to detect a magnetic field from the underground facility, and at least one processor communicatively coupled to the at least one receiver antenna to receive information about the magnetic field from the at least one receiver antenna. The apparatus further comprises at least one actuator communicatively coupled to the at least one processor and the at least one receiver antenna and configured to cause the at least one processor to log the information about the magnetic field into local memory upon actuation of the at least one actuator. The apparatus further comprises an input device communicatively coupled to the at least one processor to provide an input signal to the at least one processor. The at least one processor is programmed with processor-executable instructions which, when executed, cause the at least one processor to compare the input signal to a target value or range of values to assess whether an out-of-tolerance condition is indicated by the input signal. If an out-of-tolerance condition is indicated by the input signal, the at least one processor does at least one of: (a) log an out-of-tolerance indication into an electronic record; (b) generate an alert to a user of the apparatus that an out-of-tolerance condition has been detected; and (c) disable the at least one actuator.

Another embodiment of the present invention is directed to a method of using a locate receiver for performing a locate operation for detecting a presence or absence of at least one underground facility. The method comprises A) acquiring, using an environmental sensor or operational sensor of the locate receiver, information comprising: (i) environmental information representative of at least one environmental condition of an environment in which the locate receiver is located; and/or (ii) operational information representative of at least one operating condition of the locate receiver. The method further comprises B) detecting a magnetic field from the at least one underground facility using at least one receiver antenna of the locate receiver. The method further comprises C) controlling B) based at least in part on the environmental information and/or operational information acquired in A).

Another embodiment of the present invention is directed to a method for using operational data collected as part of a locate operation to detect the presence or absence of an underground facility. The method comprises receiving the operational data representative of an operating condition of a locate receiver used to perform the locate operation, and analyzing the operational data for an operating pattern of a technician using the locate receiver.

Another embodiment of the present invention is directed to at least one computer-readable storage medium storing an electronic record associated with a locate operation. The electronic record comprises at least one data set representing a technician signature with respect to a technician's operation of a locate receiver for performing the locate operation.

Another embodiment of the present invention is directed to a locate transmitter for use in a locate operation to detect the presence or absence of an underground facility. The locate transmitter comprises transmitter circuitry configured to generate an applied signal to be applied along the underground facility, at least one processor communicatively coupled to the transmitter circuitry, and at least one input device communicatively coupled to the at least one processor and configured to sense at least one environmental condition of an environment in which the locate transmitter is located. The at least one input device is configured to provide an output signal to the at least one processor indicative of the sensed at least one environmental condition.

Another embodiment of the present invention is directed to a method of using a locate transmitter in a locate operation to detect a presence or absence of an underground facility. The method comprises A) generating an applied signal to be applied along the underground facility. The method further comprises B) detecting, via at least one input device of the locate transmitter, at least one environmental condition of an environment in which the locate transmitter is located. The method further comprises C) logging into local memory of the locate transmitter locate information relating at least in part to A) and B).

Another embodiment of the present invention is directed to a locate transmitter for use in a locate operation to detect a presence or absence of an underground facility, comprising transmitter circuitry configured to generate an applied signal to be applied along the underground facility, and at least one processor communicatively coupled to the transmitter circuitry. The locate transmitter further comprises at least one input device communicatively coupled to the at least one processor and configured to sense at least one operating condition of the locate transmitter. The at least one input device is configured to provide an output signal to the at least one processor indicative of the sensed at least one operating condition.

Another embodiment of the present invention is directed to a method of using a locate transmitter in a locate operation to detect a presence or absence of an underground facility, the method comprising A) generating an applied signal to be applied along the underground facility. The method further comprises B) detecting, via at least one input device of the locate transmitter, at least one operating condition of the locate transmitter. The method further comprises C) logging into local memory of the locate transmitter locate information relating at least in part to A) and B).

Another embodiment of the present invention is directed to a locate transmitter for generating an applied signal for use in a locate operation for detecting a presence or absence of an underground facility. The locate transmitter comprises transmitter circuitry configured to generate an applied signal to be applied along the underground facility, at least one processor communicatively coupled to the transmitter circuitry, and an input device communicatively coupled to the at least one processor to provide an input signal to the at least one processor. The at least one processor is programmed with processor-executable instructions which, when executed, cause the at least one processor to compare the input signal to a target value or range of values to assess whether an out-of-tolerance condition is indicated by the input signal. If an out-of-tolerance condition is indicated by the input signal, the at least one processor does at least one of: (a) log an out-of-tolerance indication into an electronic record; (b) generate an alert to a user of the locate transmitter that an out-of-tolerance condition has been detected; and (c) disable the transmitter circuitry.

Another embodiment of the present invention is directed to a method of using a locate transmitter for performing a locate operation for detecting a presence or absence of at least one underground facility. The method comprises A) generating an applied signal, and B) providing the applied signal to the at least one underground facility. The method further comprises C) acquiring, using an environmental sensor or operational sensor of the locate transmitter, information comprising: (i) environmental information representative of at least one environmental condition of an environment in which the locate transmitter is located; and/or (ii) operational information representative of at least one operating condition of the locate transmitter. The method further comprises D) controlling A) based at least in part on the environmental information and/or operational information acquired in C).

Another embodiment of the present invention is directed to an apparatus for detecting a presence or absence of an underground facility. The apparatus comprises at least one receiver antenna configured to detect a magnetic field from the underground facility, a memory to store processor-executable instructions, at least one communication interface, and at least one processor communicatively coupled to the at least one receiver antenna, the memory, and the at least one communication interface. Upon execution of the processor-executable instructions, the at least one processor controls the at least one communication interface to receive environmental information regarding at least one environmental condition of an environment in which the apparatus is located, and stores at least some of the received environmental information in the memory.

Another embodiment of the present invention is directed to a locate apparatus for performing a locate operation to detect a presence or an absence of at least one underground facility. The apparatus comprises at least one receiver antenna to detect a magnetic field from at least one underground facility when present. The apparatus further comprises at least one input device to provide environmental information regarding the locate operation. The at least one input device is configured to sense at least one environmental condition of an environment in which the apparatus is located and provide an output signal indicative of the sensed at least one environmental condition. The apparatus further comprises at least one processor communicatively coupled to the at least one receiver antenna and the at least one input device so as to receive the output signal. In one implementation, the apparatus further comprises a memory to store processor-executable instructions. In one aspect of this implementation, upon execution of the processor-executable instructions, the processor logs into the memory at least some of the environmental information. In another aspect, the apparatus includes an actuator, and the processor logs into the memory the at least some of the environmental information based at least in part on at least one actuation of the actuator.

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" includes one or both of a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory. In the case of a locate device or other locate mechanism (e.g., to physically locate a facility or other feature), actuation may cause a detected signal strength, signal frequency, depth, or other information relating to the locate operation to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The following U.S. published applications and patents are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled, "Marker Detection Mechanisms for use in Marking Devices And Methods of Using Same;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters;" and U.S. publication no. 2010-0010883-A1, published Jan. 14, 2010, filed Aug. 7, 2009, and entitled, "Methods and Apparatus for Quality Assessment of a Field Service Operation Based on Multiple Quality Assessment Criteria."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

DETAILED DESCRIPTION

Figure 1:
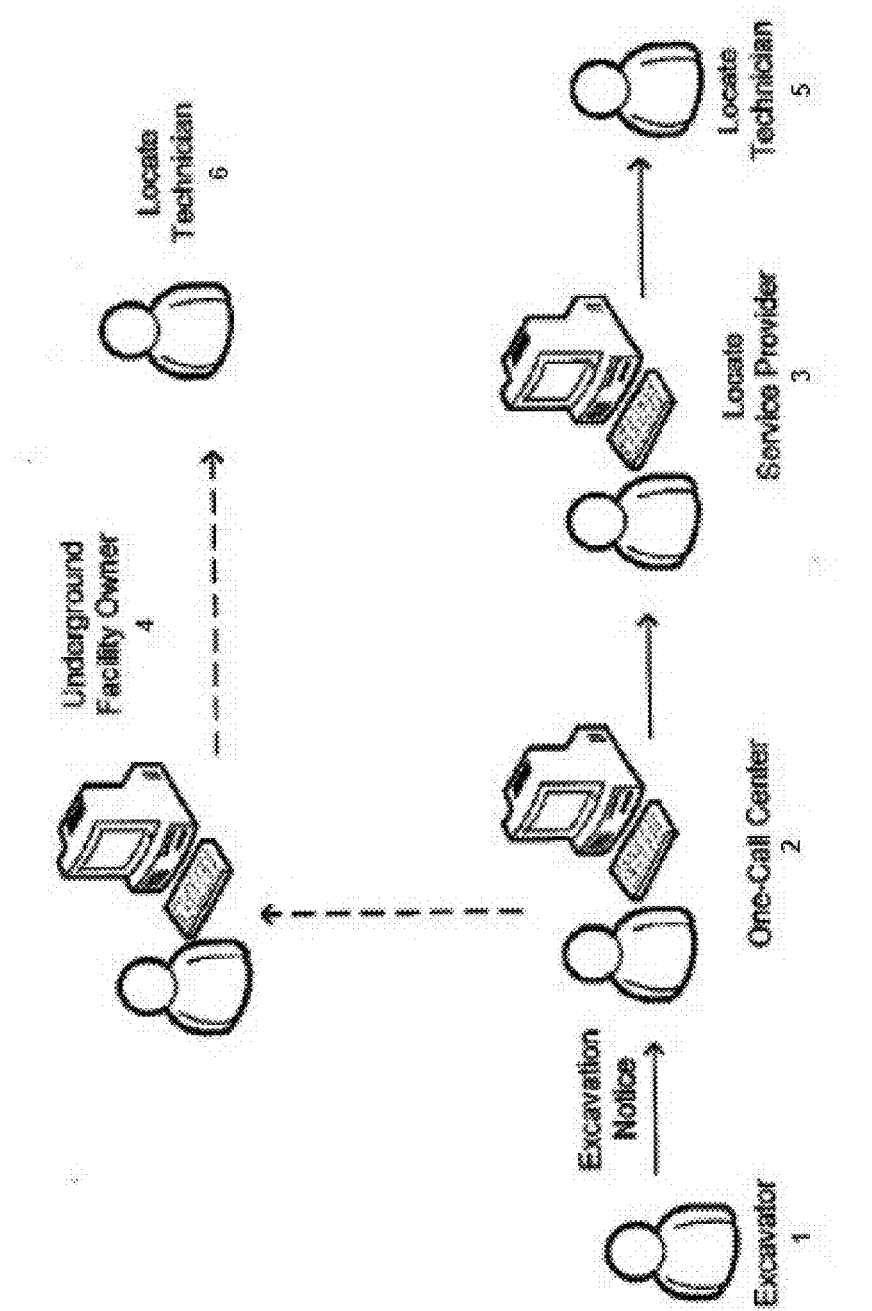
FIG. 1 shows an example in which a locate and marking operation is initiated as a result of an excavator providing an excavation notice to a one-call center.

Following below are more detailed descriptions of various concepts related to, and embodiments of, inventive locate apparatus having enhanced features for underground facility locate operations, and associated methods and systems. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

I. Overview

In some embodiments of the present invention, a locate device employed by a locate technician to detect or infer a presence or an absence of one or more underground facilities is particularly configured to acquire "locate information" relating to a locate operation, and create an electronic record of at least some of the locate information. As discussed in greater detail below, examples of locate information relating to the locate operation that may be logged into an electronic record may include, but are not limited to, any of the following types of information or any suitable combinations of such information:

- timing information (e.g., one or more time stamps) associated with one or more events occurring during a given locate operation;
- geographic information (e.g., one or more geographic coordinates) associated with one or more events of a locate operation (in some instances, the geographic information may be accompanied by timing information, such as a time stamp, for each acquisition of geographic information); and/or geographic diagnostics information (e.g., GPS diagnostics information, such as, but not limited to, the quality of a GPS signal, the number of satellites in view of the GPS receiver, etc.);
- service-related information: one or more identifiers for the locate technician performing the locate operation, the locate contractor (service provider) dispatching the locate technician, and/or the party requesting the locate operation;
- ticket information: information relating to one or more facilities to be located, location information (e.g., an address, geo-coordinates, and/or text description) relating to the work site and/or dig area in which the locate and marking operation is performed, ground type information (e.g., a description of the ground at which the locate is performed), excavator information, other text-based information, etc.
- target object information: information about the target object (e.g., facility) to be located, such as the type of object, expected depth of object, etc.;
- locate signal information: information entered, detected and/or sensed as part of performing the locate operation relating to one or more signals representing a presence or absence of one or more underground facilities, such as magnetic field strength and frequency, electric current magnitude, depth of the located object, the mode of operation of the locate receiver (e.g., peak v. null detection modes), the gain of the locate receiver, etc. With respect to locate receivers, the "gain" is typically a measure of the degree of sensitivity of a locate receiver antenna that is picking up a signal emanating from along an underground facility (alternatively, "gain" may be viewed as a degree of amplification being applied to a received signal). Gain may be expressed in terms of any scale (e.g., 0-100), as a numeric value or percentage. "Signal strength" (or "magnetic field strength") refers to the strength of a received signal at a given gain value; signal strength similarly may be expressed in terms of any scale, as a numeric value or percentage. Generally speaking, higher signal strengths at lower gains typically indicate more reliable information from a locate receiver, but this may not necessarily be the case for all locate operations;

locate receiver information: information about the locate receiver, such as identification of the locate receiver (e.g., serial number), make and model of the locate receiver, mode of operation (e.g., passive or active, and peak or null), battery level, etc.;

transmitter information: information about any transmitter and transmitter signal (also referred to herein as an applied signal) utilized for the locate operation, such as transmitter type, identification of the transmitter (e.g., serial number), make and model of the transmitter, mode of operation (e.g., inductive and conductive), battery level, connection type, electrical ground type, electrical ground position, moisture content of physical ground to which electrical ground contact is made, pH of physical ground, applied signal frequency, available signal frequencies, transmitter power, whether a continuity indication is provided for the applied signal, etc.;

tracer wire information: information about a tracer wire provided along the underground facility, such as tracer wire material (e.g., aluminum, tin/steel, copper/stainless steel, etc.), gauge of the tracer wire, condition of the tracer wire (e.g., whether intact, broken, corroded, etc.), etc.;

environmental information: information derived from one or more environmental sensors associated with the locate device, examples of which sensors include, but are not limited to, temperature sensors, humidity sensors, light sensors, altitude sensors, image capture devices and audio recorders, as well as information that may be manually entered (e.g., by a technician) relating to environmental conditions (e.g., ground type in the area of the locate operation, which could also or alternatively be indicated in ticket information);

operational information: information derived from one or more operational sensors associated with the locate device, examples of which sensors include, but are not limited to, operational temperature sensors, a compass, an inclinometer, one or more accelerometers, a yaw rate sensor, a proximity sensor, a pressure sensor, one or more device health sensors, image capture devices, and audio devices; and Device health information: information about the status of one or more components of a locate device, such as battery status, WiFi connectivity status, GPS receiver status (e.g., GPS signal strength/quality, number of satellites in view), etc.

Locate information including any or all of the foregoing types of information may be logged/stored in local memory of a locate device, formatted in various manners, processed and/or analyzed at the locate device itself, and/or transmitted to another device (e.g., a remote computer/server) for storage, processing and/or analysis. In particular, environmental and/or operational information may be used to control operation of the locate device, assess out-of-tolerance conditions in connection with use of the locate device, and/or provide alerts or other feedback. In yet other embodiments, operational information may be analyzed and processed so as to improve a determination of a location (e.g., GPS coordinates) of a detecting tip of the locate device (e.g., a portion of the locate device close to the ground, pavement or other surface below which one or more underground facilities may be disposed) during use.

In other embodiments, a locate device may be configured to operate in multiple different modes so as to collect various information relating not only to a locate operation itself, but additionally (or alternatively) various information relating to the work site/dig area in which the locate operation is performed. For example, in one implementation, the locate device may be configured to operate in a first "locate mode" as well as a second "landmark identification mode" (or more simply "landmark mode"). In a "locate mode," various functionality may be enabled relating to the detection of a presence or absence of an underground facility. Alternatively, in a "landmark mode," a technician positions the locate device proximate to an environmental landmark of interest and the locate device collects various information about the landmark (hereafter referred to as "landmark information"). As discussed in greater detail below, landmark information may include, but is not limited to, geo-location data of an environmental landmark, type of environmental landmark, and a time stamp for any acquired information relating to an environmental landmark.

In other embodiments, a locate device may be operated in a "solo" mode or a "group" mode. In particular, in a "solo" mode, the locate device may be operated as an individual, independent device to collect, store and/or transmit data, whereas in "group" mode, a locate device may act as a "worker" device or a "leader" device to facilitate consolidation of data collected by multiple devices (e.g., relating to a same ticket) to a host server.

In yet other embodiments, a locate device may be equipped with an enhanced user interface having tactile functionality; in particular, the locate device may include one or more tactile indicators (e.g., vibrating devices) disposed, for example, in a handle, joy stick, actuator or elsewhere on the device, to provide a tactile indication to a technician using the locate device (e.g., as feedback in connection with an operating mode, operating condition, environmental condition, etc.).

In various implementations of the methods and apparatus described herein, data from one or more electronic records, including one or more pieces of locate information and/or one or more pieces of landmark information, may be processed and analyzed to provide insight into the locate operation. In one embodiment, a computer-generated image or other visual representation based on the locate information and/or landmark information may be electronically rendered; for example, this visual representation may provide electronic indications ("electronic detection marks") of the relative location of detected underground facilities during a locate operation, and electronic detection marks corresponding to different types of facilities may be color-coded. Additionally, electronic identifiers (e.g., icons, shapes, symbols, patterns, etc.) of one or more environmental landmarks may be included in a visual representation, alone or together with electronic detection marks. Such a visual representation may be used, for example, to provide immediate feedback to the locate technician (e.g., via a display device associated with the locate device), provide essentially real-time feedback to a supervisor monitoring the technician's work from a remote location, provide a visual record of the locate information and/or landmark information (e.g., for archiving purposes once one or more electronic records are generated), and/or to verify the quality (e.g., accuracy and completeness) of work performed during a locate and marking operation.

II. Locate Device

As discussed above, a locate device may refer to either a locate transmitter or a locate receiver. In one embodiment of the present invention, one or both of a locate transmitter and a locate receiver may be particularly configured to acquire locate information relating to a locate operation, generate an electronic record of the acquired locate information, and store, transmit, analyze or otherwise process the acquired locate information. While a detailed illustrative embodiment is described below using the example of a locate receiver, it should be appreciated that the various inventive concepts disclosed herein in connection with enhanced features for locate receivers may be applied similarly, if not identically in some instances, to locate transmitters as well.

Various types of locate information may be generated during, or otherwise associated with, the use of a locate device (e.g., a locate receiver or a locate transmitter) or a locate set to perform a locate operation. Exemplary categories of locate information were provided above as an overview; however, it should be appreciated that these exemplary categories are provided primarily for purposes of illustration, and that locate information is not limited according to various embodiments discussed herein to the particular exemplary categories and types of information outlined above.

In general, locate information related to the use of the transmitter may include, but is not limited to, information about the applied signal power, the applied signal frequency, the possible or available signal frequencies (e.g., if the locate transmitter has more than one frequency available), the presence, magnitude, and type of noise (e.g., distortion) on the applied signal (e.g., a signal-to-noise ratio), the location of the transmitter, the mode of operation (e.g., conductive or inductive) and therefore the manner in which connection is made to the target object (e.g., direct connection or inductive clamp), an identification of the transmitter unit (e.g., serial number), make and model of the transmitter unit, information about how the transmitter unit is grounded (if at all), and an indication of whether a sufficient electrical connection has been made to the target object (e.g., some transmitters produce a "continuity signal" indicative of the quality of the connection between the transmitter and the target object). Locate information related to the use of the locate receiver may include, but is not limited to, an identification of the locate receiver (e.g., a serial number), the mode of operation of the locate receiver (e.g., peak mode v. null mode, as well as active v. passive mode), the frequency to which the locate receiver is tuned, the gain of the locate receiver, the frequency of a detected magnetic field, the amplitude/strength of a detected magnetic field, the electrical current of the detected signal, the location of the locate receiver, and a depth measurement taken by the locate receiver (which may be used, for example, as additional information regarding a target object). In addition, locate information relating to the locate operation itself may include, but is not limited to, information about the target object, the location of the locate site, the party requesting the locate, the party performing the locate, and whether any locate operations have previously been performed for this site.

Information about a tracer wire may also be included in locate information. For example, information about the material of a tracer wire may be collected (e.g., input verbally or textually by a technician), which may indicate a type of underground facility (e.g., aluminum may indicate cable, tin/steel may indicate phone, and copper/stainless steel may indicate gas, among others). The wire gauge of the tracer wire, as well as the condition of the tracer wire (e.g., intact, corroded, etc.) may also be visually determined by a locate technician and recorded verbally, textually, or in any other manner. Moreover, whether the tracer wire is broken may be visually detected and noted as part of locate information. Similarly, whether a service line is properly bonded to a main may be useful locate information. Furthermore, information about the type of sheathing for the tracer wire may be included as part of locate information. Other types of information may also be considered locate information, as these are non-limiting examples.

According to some aspects of the invention, locate information relating to a locate set, and/or locate operation more generally, may be generated, recorded, transmitted, and/or processed, for example, to enable evaluation of the performance of the locate technician, evaluation of the operation of the locate equipment, reconstruction of the actions taken by the locate technician during the locate operation, and/or to facilitate comparison of collected data to historical data.

Figure 4:
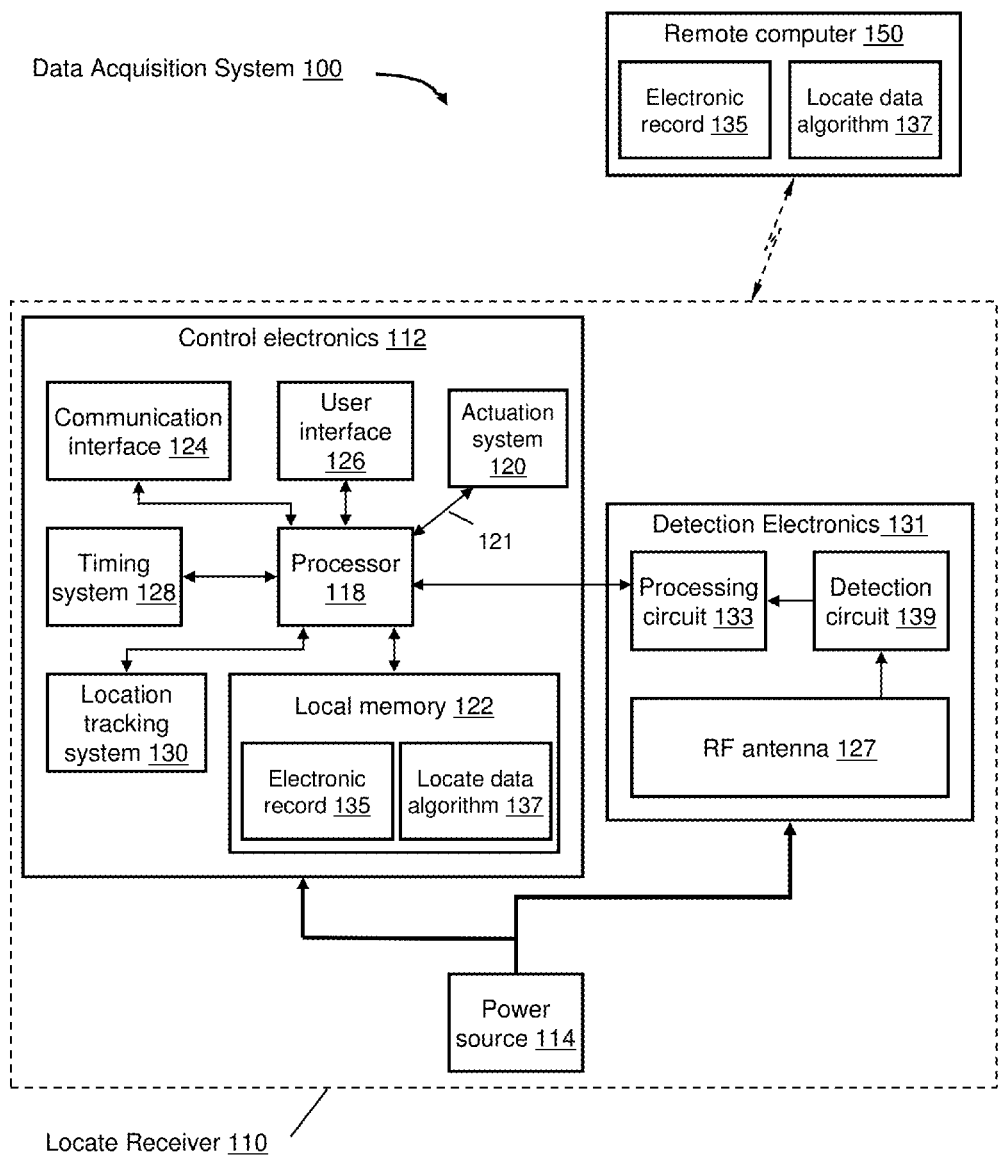
FIG. 4 is a functional block diagram of a data acquisition system including a locate device for creating electronic records of locate operations and displaying facilities map information, according to some embodiments of the present invention.
Figure 5:
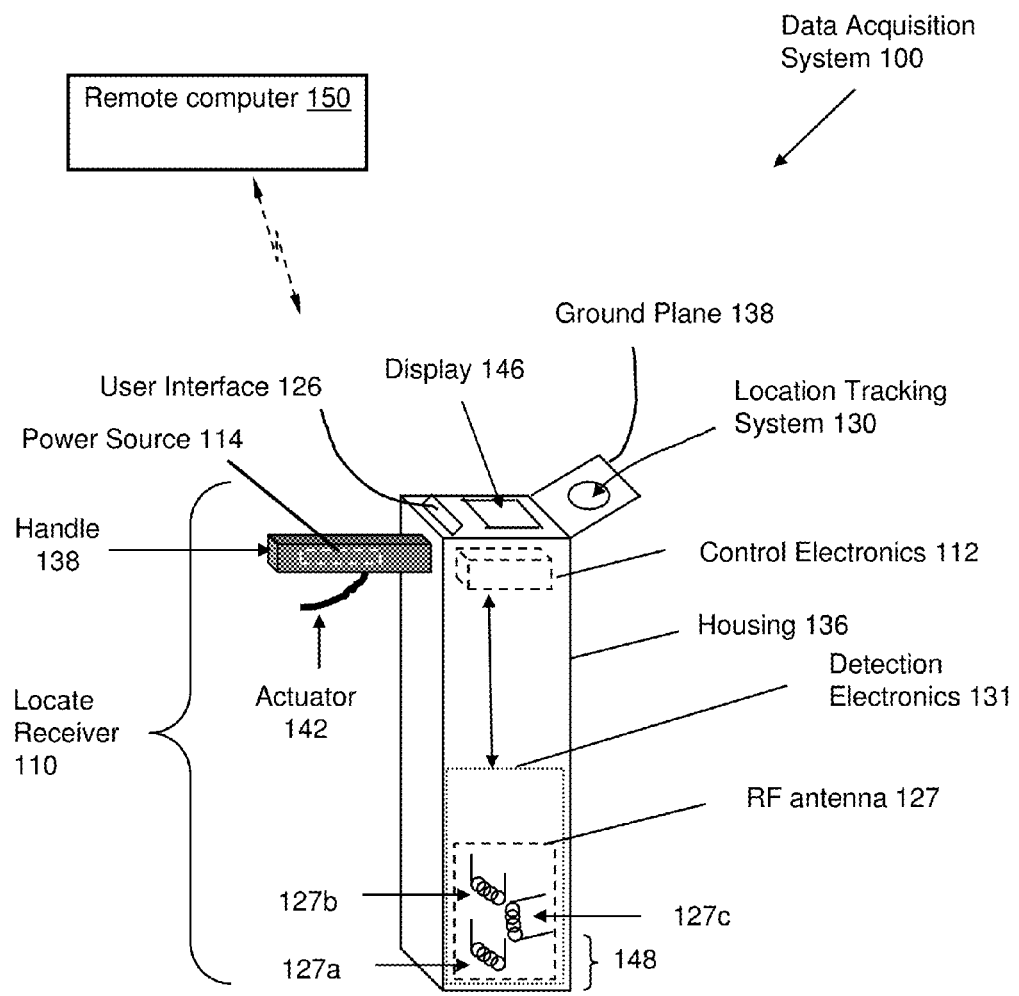
FIG. 5 is a perspective view of the data acquisition system of FIG. 4, illustrating an exemplary locate device upon which some embodiments of the invention may be implemented.

In one exemplary embodiment, a locate receiver is configured to store and/or transmit locate information relating to a locate set and/or a locate operation, and in some implementations generate an electronic record of at least some of the locate information. FIGS. 4 and 5 illustrate a functional block diagram and perspective view, respectively, of one example of a data acquisition system 100, including a locate device such as a locate receiver 110 and optionally a remote computer 150, according to one embodiment of the present invention. One or both of the locate receiver 110 and the remote computer 150 of the data acquisition system 100 may be configured to collect locate information relating to performance of a locate operation.

As shown in FIG. 4, in one embodiment locate receiver 110 includes control electronics 112, the components of which are powered by a power source 114. Power source 114 may be any power source that is suitable for use in a portable device, such as, but not limited to, one or more rechargeable batteries, one or more non-rechargeable batteries, a solar photovoltaic panel, a standard AC power plug feeding an AC-to-DC converter, and the like.

As also shown in FIG. 4, in one embodiment control electronics 112 of locate receiver 110 may include, but are not limited to, a processor 118, at least a portion of an actuation system 120 (another portion of which may include one or more mechanical elements), a local memory 122, a communication interface 124, a user interface 126, a timing system 128, and a location tracking system 130.

The processor 118 may be any general-purpose processor, controller, or microcontroller device. Local memory 122 may be any volatile or non-volatile data storage device, such as, but not limited to, a random access memory (RAM) device and a removable memory device (e.g., a universal serial bus (USB) flash drive, a multimedia card (MMC), a secure digital card (SD), a compact flash card (CF), etc.). As discussed further below, the local memory may store a locate data algorithm 137, which may be a set of processor-executable instructions that when executed by the processor 118 causes the processor to control various other components of the locate receiver 110 so as to generate an electronic record 135 of a locate operation, which record also may be stored in the local memory 122 and/or transmitted in essentially real-time (as it is being generated) or after completion of a locate operation to a remote device (e.g., remote computer 150).

In one exemplary implementation, a Linux-based processing system for embedded handheld and/or wireless devices may be employed in the locate receiver 110 to implement various components of the control electronics 112. For example, the Fingertip4™ processing system, including a Marvell PXA270 processor and available from InHand Electronics, Inc. (www.inhandelectronics.com/products/fingertip4), may be used. In addition to the PXA270 processor (e.g., serving as the processor 118), the Fingertip4™ includes flash memory and SDRAM (e.g., serving as local memory 122), multiple serial ports, a USB port, and other I/O interfaces (e.g., to facilitate interfacing with one or more input devices and other components of the locate receiver), supports a variety of wired and wireless interfaces (WiFi, Bluetooth®, GPS, Ethernet, any IEEE 802.11 interface, or any other suitable wireless interface) to facilitate implementation of the communication interface 124, and connects to a wide variety of LCD displays (to facilitate implementation of a user interface/display). In yet other exemplary implementations, the processor 118 may be realized by multiple processors that divide/share some or all of the functionality discussed herein in connection with the processor 118. For example, in one implementation, an Atom™ processor available from Intel Corporation of Santa Clara, Calif., may be used alone or in connection with one or more PIC processors to accomplish various functionality described herein.

Communication interface 124 of locate receiver 110 may be any wired and/or wireless communication interface by which information may be exchanged between locate receiver 110 and an external or remote device, such as a remote computing device that is elsewhere in the dig area (i.e., not a part of the locate receiver 110) or outside the dig area. For example, data that is provided by components of data acquisition system 100 and/or stored in local memory 122 (e.g., one or more electronic records 135) may be transmitted via communication interface 124 to a remote computer, such as remote computer 150, for processing. Examples of wired communication interfaces may include, but are not limited to, USB ports, RS232 connectors, RJ45 connectors, Ethernet, and any combination thereof. Examples of wireless communication interfaces may include, but are not limited to, an Intranet connection, Internet, Bluetooth® technology, Wi-Fi, Wi-Max, IEEE 802.11 technology (e.g., operating at a minimum bandwidth of 54 Mbps, or any other suitable bandwidth), radio frequency (RF), Infrared Data Association (IrDA) compatible protocols, Local Area Networks (LAN), Wide Area Networks (WAN), Shared Wireless Access Protocol (SWAP), any combination thereof, and other types of wireless networking protocols. The wireless interface may be capable of capturing signals that reflect a user's intent. For example, the wireless interface may include a microphone that can capture a user's intent by capturing the user's audible commands. Alternatively, the wireless interface may interact with a device that monitors a condition of the user, such as eye movement, brain activity, and/or heart rate.

User interface 126 of locate receiver 110 may be any mechanism or combination of mechanisms by which a user may operate data acquisition system 100 and by which information that is generated by data acquisition system 100 may be presented to the user. For example, user interface 126 may include, but is not limited to, a display device (including integrated displays and external displays, such as Heads-Up Displays (HUDs)), a touch screen, one or more manual pushbuttons, a microphone to provide for audible commands, one or more light-emitting diode (LED) indicators, one or more toggle switches, a keypad, an audio output (e.g., speaker, buzzer, and alarm), and any combination thereof. In one implementation, the user interface 126 includes a "menu/on" button to power up the locate receiver and provide a menu-driven graphical user interface (GUI) displayed by the display device (e.g., menu items and/or icons displayed on the display device) and navigated by the technician via a joystick or a set of four "up/down/left/right" buttons, as well as a "select/ok" button to take some action pursuant to the selection of a menu item/icon. As described below, the display may also be used in some embodiments of the invention to display various images germane to a locate and/or marking information, as well as information relating to a placement of marking material in a dig area, a location of an underground facility in a dig area, or any other suitable information that may be displayed based on information acquired to create an electronic record 135.

In various embodiments, the one or more interfaces of the locate receiver 110—including the communication interface 124 and user interface 126—may be used as input devices to receive information to be stored in the memory 122, to facilitate various functions of the locate receiver and/or to be logged as part of an electronic record of a locate operation. In some cases, locate information received via the interface(s) (e.g., via the communication interface 124) may include ticket information regarding underground facilities to be detected during a locate operation. As another example, using an interface such as the user interface 126, service-related information may be input, including an identifier for the locate receiver used by the technician, an identifier for a technician, and/or an identifier for the technician's employer. Alternatively, some or all of the service-related information similarly may be received via the communication interface 124 (and likewise some or all of the ticket information may be received via the user interface 126). As also noted above, various image information also may be received via the communication interface 124.

The actuation system 120 of locate receiver 110 shown in the block diagram of FIG. 4 may include both electrical and mechanical elements according to various embodiments, and for purposes of illustration is shown in FIG. 4 as included as part of the control electronics 112. The actuation system 120 may include a mechanical and/or electrical actuator mechanism (e.g., see the actuator 142 shown in FIG. 5) to provide one or more signals or stimuli as an input to the actuation system 120. Upon receiving one or more signals or stimuli (e.g., actuation/triggering by a locate technician or other user), the actuation system 120 may cause the logging of various data constituting locate information. To this end, the actuation system 120 may provide one or more output signals in the form of an actuation signal 121 to the processor 118 to indicate one or more actuations of the locate receiver, in response to which the processor 118 may acquire/collect various locate information and log data into the electronic record 135.

Location tracking system 130 of locate receiver 110 constitutes another type of input device that provides locate information, and may include any device that can determine its geographical location to a certain degree of accuracy. For example, location tracking system 130 may include a global positioning system (GPS) receiver or a global navigation satellite system (GNSS) receiver. A GPS receiver may provide, for example, any standard format data stream, such as a National Marine Electronics Association (NMEA) data stream, or other data formats. An error correction component may be, but is not limited to, any mechanism for improving the accuracy of the geographic information provided by location tracking system 130; for example, an error correction component may be an algorithm for correcting any offsets (e.g., due to local disturbances in the atmosphere) in the geo-location data of location tracking system 130. An error correction component may reside at the location tracking system 130 or a remote computing device, such as remote computer 150. In other embodiments, location tracking system 130 may include any device or mechanism that may determine location by any other means, such as performing triangulation by use of cellular radiotelephone towers.

In one exemplary implementation, the location tracking system 130 may include an ISM300F2-05-V0005 GPS module available from Inventek Systems, LLC of Westford, Mass. (see www.inventeksys.com/html/ism300f2-c5-v0005.html).

The Inventek GPS module includes two UARTs (universal asynchronous receiver/transmitter) for communication with the processor 118, supports both the SIRF Binary and NMEA-0183 protocols (depending on firmware selection), and has an information update rate of 5 Hz. A variety of geographic location information may be requested by the processor 118 and provided by the GPS module to the processor 118 including, but not limited to, time (coordinated universal time—UTC), date, latitude, north/south indicator, longitude, east/west indicator, number and identification of satellites used in the position solution, number and identification of GPS satellites in view and their elevation, azimuth and SNR values, and dilution of precision values. Accordingly, it should be appreciated that in some implementations the location tracking system 130 may provide a wide variety of geographic information as well as timing information (e.g., one or more time stamps) to the processor 118.

In another embodiment, location tracking system 130 may not reside locally on locate receiver 110. Instead, location tracking system 130 may reside on any on-site computer, which serves as a location reference point, to which the location of locate receiver 110 may be correlated by any other means, such as, but not limited to, by a triangulation technique between the on-site computer and locate receiver 110.

With respect to other input devices of the locate receiver 110 that may provide locate information, the control electronics 112 may also include a timing system 128 having an internal clock (not shown), such as a crystal oscillator device, for processor 118. Additionally, timing system 128 may include a mechanism for registering time with a certain degree of accuracy (e.g., accuracy to the minute, second, or millisecond) and may also include a mechanism for registering the calendar date. In various implementations, the timing system 128 may be capable of registering the time and date using its internal clock, or alternatively timing system 128 may receive its time and date information from the location tracking system 130 (e.g., a GPS system) or from an external timing system, such as a remote computer or network, via communication interface 124. In yet other implementations, a dedicated timing system for providing timing information to be logged in an electronic record 135 may be optional, and timing information for logging into an electronic record may be obtained from the location tracking system 130 (e.g., GPS latitude and longitude coordinates with a corresponding time stamp). Timing information may include, but is not limited to, a period of time, timestamp information, date, and/or elapsed time.

As shown in FIGS. 4 and 5, the locate receiver 110 further includes detection electronics 131, which provides another example of an input device that may provide location information to the processor 118. In exemplary implementations, the detection electronics 131 in turn includes an RF antenna 127, a detection circuit 139, and a processing circuit 133. Each of these components is explained in greater detail further below.

In one embodiment, information provided by one or more input devices of the locate receiver 110 (e.g., the timing system 128, the location tracking system 130, the detection electronics 131, the user interface 126, the communication interface 124) is acquired and logged (stored in memory) upon actuation of the actuation system 120 (e.g., triggering an actuator). Some embodiments of the invention may additionally or alternatively acquire/log information from one or more input devices at one or more times during or throughout an actuation, such as when a technician is holding a mechanical or electrical actuator for some period of time and moving to detect a presence of an underground facility. In various aspects of such embodiments, locate information derived from one or more input devices may be collected at a start time of an actuation, at one or more times during an actuation, and in some cases at regular intervals during an actuation (e.g., several times per second, once per second, once every few seconds). Further, some locate information may be collected at an end of an actuation, such as time information that may indicate a duration of an actuation.

Additionally, it should be appreciated that while some locate information may be received via one or more input devices at the start of each locate operation and upon successive actuations of the locate receiver, in other cases some locate information, as well as facilities maps information and/or other image information, may be collected by or provided to the locate receiver prior to a locate operation (e.g., on power-up or reset of the locate receiver, as part of an electronic instruction or dispatch by a locate company, and/or in response to a request/query from a locate technician), and stored in local memory 122 for subsequent use by the locate receiver (e.g., display of information via the user interface display 146, later incorporation into an electronic record, etc.). For example, prior to a given locate operation and one or more actuations of the locate receiver, one or more of ticket information, service-related information, and image information, may have already been received (e.g., via the communication interface 124 and/or user interface 126) and stored in local memory 122. Pursuant to a locate operation (e.g., immediately before, during and/or after a locate operation), information previously received via the interface(s) may be retrieved from the local memory (if stored there initially), and displayed and/or entered into an electronic record as appropriate, in some case together with information collected pursuant to one or more actuations of the locate receiver. In some implementations, ticket information and/or service-related information may be received via the interface(s) and stored in an entry in the electronic record 135 "directly" in response to one or more actuations of the locate receiver (e.g., without being first stored in local memory).

In sum, according to embodiments of the present invention, various locate information from one or more input devices, as well as image information, regardless of how or when it is received, may be displayed in various manners and/or stored in memory of the locate receiver (e.g., in an electronic record of a locate operation), and in some implementations at least some of the locate information may be logged pursuant to one or more actuations of the locate receiver.

In various implementations, the optional remote computer 150 of the data acquisition system 100 may be any external computer system with which the locate receiver 110 communicates (e.g., via the communications interface 124). In one embodiment, the remote computer 150 may be a centralized computer, such as a central server of an underground facility locate service provider. In another embodiment, remote computer 150 may be a computer that is at or near the work site (i.e., "on-site"), e.g., a computer that is present in a locate technician's vehicle. The remote computer may also or alternatively store one or more of the electronic record 135, the locate data algorithm 137 and one or more images.

According to one embodiment, the remote computer may form part of a docking station in which a locate device (e.g., a locate receiver or locate transmitter) may be docked, for example when not in use. The docking station may be mechanically and electrically coupled to the locate device. For example, the docking station may provide mechanical support via a clip, a clamp, a strap, or other mechanical device for holding the locate device in place. The docking station may also provide electrical interconnection to the locate device, via which the power supply of the locate device may be charged and/or data may be transferred. Suitable docking stations are described in U.S. patent application Ser. No. 12/571,411, filed Sep. 30, 2009 and entitled "Marking Device Docking Stations and Methods of Using Same", which is hereby incorporated herein by reference in its entirety. Docking stations according to the concepts described therein may also be applicable to the locate devices described herein. According to one embodiment, a locate receiver may communicate with the docking station via communication interface 124, although other configurations are possible.

Docking events (e.g., docking and de-docking of a locate receiver) may be recorded as event entries, for example similar in form to the event entries of Tables 2-5, discussed in detail below. Table 1A illustrates an example of event entry indicating a change in docking status of a locate receiver. Other entry formats are also possible.

TABLE 1A

| | |
|---|---|
| Format | INFO+DOCK: (DATE) (TIME) (GPS data) (DOCKING STATE) <CR><LF> |
| Examples | INFO+ DOCK R: DATE(2009-04-15) TIME(12:04:44) |
| | GPS($GPGGA,120443,4807.038,N,01131.000,E,1,08,0.9,545.4,M,46.9,M,,*47 ) |
| | DOCK(DOCKED)<CR><LF> |
| | INFO+ DOCK: DATE(2009-04-15) TIME(12:04:45) |
| | GPS($GPGGA,120445,4807.038,N,01131.000,E,1,08,0.9,545.4,M,46.9,M,,*47 ) |
| | DOCK(DE-DOCKED)<CR><LF> |
| | INFO+ DOCK: DATE(2009-04-15) TIME(12:04:46) |
| | GPS($GPGGA,120446,4807.038,N,01131.000,E,1,08,0.9,545.4,M,46.9,M,,*47 ) |
| | DOCK(DOCKED)<CR><LF> |

Whether resident and/or executed on either the locate device 110 or the remote computer 150, as noted above the locate data algorithm 137 includes a set of processor-executable instructions (e.g., stored in memory, such as local memory 122 of the locate device) that, when executed by processor 118 of the locate device 110 or another processor, processes information (e.g., various locate information) collected in connection with a locate operation. Locate data algorithm 137, when executed by the processor 118, may cause the processor to perform collection, logging/storage (creation of electronic records), and in some instances further processing and analysis of various locate information. For example, as discussed in further detail below, the operations of locate data algorithm 137 as effected by the processor 118 may include, but are not limited to, the following:

(1) reading in (acquiring) data that is generated by any component (e.g., one or more input devices);

(2) processing the information that is collected and, in some instances, associating the collected information with respective actuations of an actuator (e.g., if the locate device is operated in a manual or semi-automatic mode based on actuation, as discussed further below); for example, any information collected may be parsed/packaged so as to be associated with any one or more actuations of the locate device, irrespective of when the data was actually acquired;

(3) formatting the acquired information, e.g., as multiple time-stamped event entries, which in some instances may constitute actuation data sets forming an electronic record, wherein each actuation data set corresponds to a particular actuation; and (4) using respective entries of an electronic record to visually recreate the locate operation (e.g., render a computer-generated representation in a display field, wherein respective entries correspond to electronic detection marks).

It should also be appreciated that, in some embodiments, the locate data algorithm 137 may include one or more adjustable parameters that govern various aspects of the collection and logging of locate information (e.g., the rate at which various locate information is collected from one or more input devices), and that these parameters may be adjusted or set, for example, by an administrator at a remote computer, after which the locate data algorithm is downloaded to the locate device for execution by the processor 118. Alternatively, in other implementations, adjustable parameters of a locate data algorithm already resident on a locate device may in some cases be adjusted remotely via the communication interface, or locally via the user interface.

While the functionality of various components of the locate receiver 110 was discussed above in connection with FIG. 4, FIG. 5 shows some structural aspects of the locate receiver 110 according to one embodiment. For example, the locate receiver 110 may include an elongated housing 136 in which is disposed one or more elements of the actuation system 120, one or more elements of the control electronics 112 and the power source 114. Elongated housing 136 may be hollow or may contain certain cavities or molded compartments for installing any components therein, such as the various components of locate receiver 110 that are shown in FIG. 4. The elongated housing 136 and other structural elements associated with the housing, as discussed below, may be formed of any rigid, semi-rigid, strong, and lightweight material, such as, but not limited to, molded plastic and aluminum.

Incorporated at a proximal end of elongated housing 136 may be a handle 138, which provides a convenient grip by which the user (e.g., the locate technician) may carry the locate receiver 110 during use (i.e., the exemplary locate receiver depicted in FIG. 5 is intended to be a hand-held device). In one implementation, the power source 114 may be provided in the form of a removable battery pack housing one or more rechargeable batteries that are connected in series or parallel in order to provide a DC voltage to locate receiver 110, and disposed within a compartment in the handle 138. Such an arrangement facilitates use of conventional removable/rechargeable battery packs often employed in a variety of cordless power tools, in which the battery pack similarly is situated in a handle of the tool. It should be appreciated, however, that the power source 114 in the form of a battery pack may be disposed in any of a variety of locations within or coupled to the elongated housing 136.

As also shown in FIG. 5, mounted near handle 138 is user interface 126, which may include a display 146. The display 146 may be a touch screen display to facilitate interaction with a user/technician, and/or the user interface also may include one or more buttons, switches, joysticks, a keyboard, and the like to facilitate entry of information by a user/technician. One or more elements of the control electronics 112 (e.g., the processor 118, memory 122, communication interface 124, and timing system 128) also may be located in the proximal end of the elongated housing in the vicinity of the user interface 126 and display 146. As with the power source 114, it should be appreciated that one or more elements of the control electronics 112 may be disposed in any of a variety of locations within or coupled to the elongated housing 136.

In the embodiment of FIG. 5, the location tracking system 130 similarly may be positioned on the proximal end of the elongated housing 136 to facilitate substantially unobstructed exposure to the atmosphere; in particular, as illustrated in FIG. 5, the location tracking system 130 may be situated on a ground plane 138 (providing an electrical ground at least at the antenna frequency of the location tracking system, e.g., at approximately 1.5 GHz) that extends from the proximal end of the housing 136 and is approximately parallel to the ground, surface or pavement when the locate receiver is being normally operated by a technician (so as to reduce signal modulation with subtle movements of the locate receiver). As also shown in FIG. 5, incorporated at the distal end of elongated housing 136 is the detection electronics 131, including RF antenna 127.

With respect to the actuation system 120, as shown in FIG. 5, the actuation system 120 includes an actuator 142, which for example may be a mechanical mechanism provided at the handle 138 in the form of a trigger that is pulled by a finger or hand of an user/technician. In response to the signal/stimulus provided by the actuator 142, as discussed above the actuation system may provide an actuation signal 121 to the processor 118 to indicate an actuation. As discussed in further detail below, pursuant to the execution by the processor 118 of the locate data algorithm 137, the actuation signal 121 may be used to cause the logging of information that is provided by one or more components of the locate receiver 110 so as to generate an electronic record of the locate operation.

With respect to the general functionality facilitated and/or implemented by execution of the locate data algorithm 137, in some embodiments, a user may commence a locate operation with the locate receiver by inputting various information to the locate receiver, and/or selecting various operating options, via the user interface. As a non-limiting example, the user may select from various menu options (using the user interface and display as a menu-driven GUI), and or manually enter via the user interface, the type of target object/facility to be located, the address of the locate operation, the ground type (e.g., grass, pavement, etc.), whether or not a separate transmitter is being used, the mode of the locate receiver (e.g., Peak v. Null, and active v. passive), whether the locate receiver is being operated in landmark mode or not (described further below), or any other information of interest to a locate operation.

In one exemplary implementation, the user may first power on the locate receiver and log on, for example by entering a user ID. The user may then navigate through a menu on a touch screen of the user interface to select the target object to be located, for example selecting from among a list of options (e.g., including facility types such as gas, sewer, cable, and phone, etc.). Similarly, the user may then navigate through a menu to select the ground type in the area of the locate operation (e.g., selecting from a list of options including grass, pavement, dirt, etc.). The user may then similarly select or input the frequency of any applied signal provided by a transmitter (in those embodiments in which a transmitter is used), for example using a keypad of the user interface or a menu-driven GUI. It should be provided that these examples of user actions are non-limiting, and furthermore that in some embodiments one or more of the pieces of information listed may be detected automatically and not be input/selected by the user.

Figure 2:
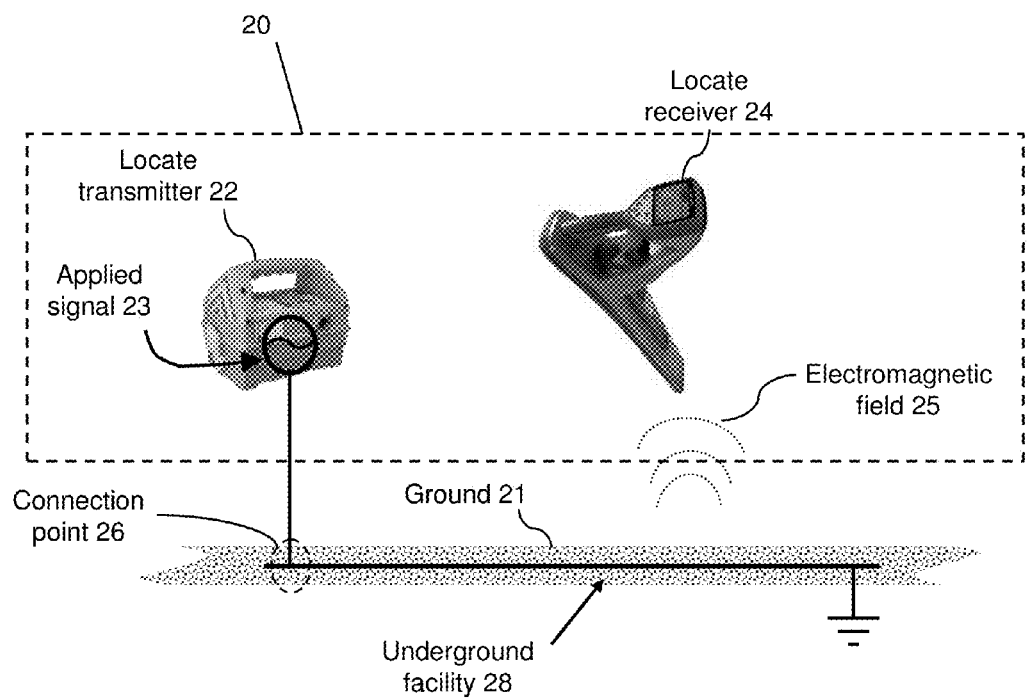
FIG. 2 illustrates one example of a conventional locate instrument set including a locate transmitter and a locate receiver.
Figures 3A, 3B:
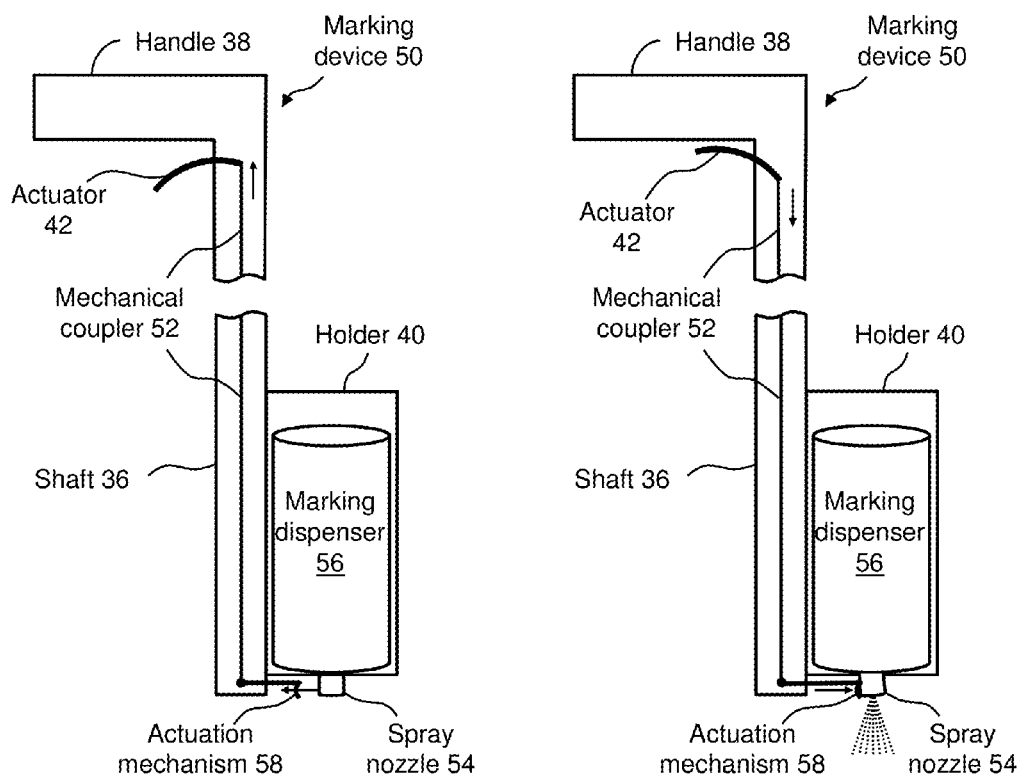
FIGS. 3A and 3B illustrate a conventional marking device in an actuated and non-actuated state, respectively.

Once the target object/facility type and any other relevant or desired information is input and/or selected by the technician, and the applied signal from the transmitter is coupled to the target object (in those embodiments in which the locate receiver is used with a locate transmitter, i.e., in active modes of operation as opposed to passive modes in which no transmitter may be used), the locate receiver may be used in a variety of manners by the technician for a locate operation, in which the technician generally positions (e.g., sweeps) the locate receiver over an area in which they expect to detect an underground facility. More specifically, the technician positions the locate receiver such that the RF antenna 127 (which may include more than one antenna, as described further below) may receive/detect a magnetic field emitted by the target object (see underground facility 28 in FIG. 2).

In some embodiments, the locate receiver 110 is capable of operating in a null mode (e.g., capable of detecting a null signal when positioned over an object (e.g., facility) emitting a magnetic field), such that RF antenna 127 may comprise a null detection antenna 127*c*. Alternatively, the locate receiver 110 is capable of operating in a peak detection mode (e.g., capable of detecting a peak signal when over an object (e.g., facility) emitting a magnetic field), and the RF antenna 127 comprises two peak detection antennae 127*a* and 127*b*, which may be positioned substantially parallel to each other but at different positions within the locate receiver (e.g., at different heights). In some embodiments, the locate receiver 110 is capable of operating in both peak detection and null detection modes, and the RF antenna 127 may comprise three antennae, e.g., one null detection antenna 127*c* and two peak detection antennae 127*a* and 127*b*, as shown in FIG. 5. However, RF antenna 127 may comprise any other number, type, and orientation of antennae, as the locate receivers described herein are not limited in these respects.

With reference again to FIG. 4, the RF antenna 127 may be coupled to the detection circuit 139 such that the signal(s) received/detected by the RF antenna 127 may be provided to the detection circuit 139 as an output signal of the RF antenna. The output signal of the RF antenna may be any frequency detectable by the antenna, and in some embodiments may be between approximately 512 Hz and 1 MHz, although these non-limiting frequencies are provided primarily for purposes of illustration. As mentioned, the output signal of the RF antenna 127, which in some embodiments is an analog signal, may be provided to detection circuit 139, which may perform various functions. For example, the detection circuit 139 may perform various "front-end" operations on the output signal of RF antenna 127, such as filtering, buffering, frequency shifting or modulation, and/or pre-amplifying the output signal. Furthermore, the detection circuit 139 may perform additional functions, such as amplifying and/or digitizing the output signal provided by RF antenna 127. It should be appreciated, however, that the types of functions described as being performed by detection circuit 139 are non-limiting examples, and that other functions may additionally or alternatively be performed.

After detection circuit 139 has operated on the signal from RF antenna 127 (e.g., by filtering, buffering, amplifying, and/or digitizing, among other possible operations), it may provide a signal to processing circuit 133. The processing circuit 133 may process the signal(s) provided by detection circuit 139 in any suitable manner to determine any information of interest. For example, according to one embodiment, the processing circuit 133 may process the signal(s) from detection circuit 139 to determine a magnetic field strength of a magnetic field detected by RF antenna 127. The processing circuit 133 may process the signal(s) from detection circuit 139 to determine an amplitude and/or direction of the electrical current creating the magnetic field(s) detected by RF antenna 127. Processing circuit 133 may perform operations to calculate, for example, the depth and location of the target facility based on the electromagnetic fields detected by RF antenna 127. Processing circuit 133 may be an analog circuit or a digital microprocessor, or any other suitable processing component for performing one or more of the operations described above, or any other operations of interest with respect to signals detected by RF antenna 127. Also, it should be appreciated that processing circuit 133 and processor 118 may be a single processor in some embodiments, as the illustration of them as distinct in FIG. 4 is only one non-limiting example.

According to various embodiments, the manner in which locate information derived from one or more exemplary input devices is logged to local memory 122 (e.g., pursuant to the locate data algorithm 137) may depend at least in part on the type of data being logged, as the operation of locate receiver 110 is not limited in this respect. Some general concepts relating to data acquisition are introduced initially below and discussed in greater detail in connection with FIG. 6.

In some exemplary implementations, various types of locate information, including data from timing system 128 and/or location tracking system 130, may be automatically logged continuously (e.g., in the form of streaming packets with flag fields, as described below, or in any other continuous form) or periodically to the local memory 122, may be logged in response to one or more types of conditions/events (e.g., may be logged automatically when a particular condition/event occurs), and/or may be logged at any suitable times. In particular, in one implementation, logging may occur at periodic intervals during performance of a locate operation, such as every second, every five seconds, every minute, or at any other suitable time interval.

According to another embodiment, various locate information, including timing information and/or geographic information from timing system 128 and location tracking system 130, respectively, may be logged in response to particular types of events, such as detecting an underground facility or detecting the absence of an underground facility. Such events may be identified by signals output by processing circuit 133 to processor 118. As a non-limiting example, timing information and/or geographic information may be logged when a characteristic (e.g., magnetic field strength) of a signal detected by RF antenna 127 is greater than a particular threshold value, which may be indicated by a signal output from processing circuit 133 to processor 118, and which occurrence may be indicative of the presence of an underground facility. Similarly, in some embodiments, timing information and/or geographic information may be logged when a signal detected by RF antenna 127 has a magnitude above a first threshold and the gain of the locate receiver 110 is above a second threshold. It should be appreciated that various combinations of detected signals detected by locate receiver 110 may be used to trigger logging of information (e.g., timing information and/or geographic information) to local memory. It should also be appreciated that any information available from the location tracking system 130 (e.g., any information available in various NMEA data messages, such as coordinated universal time, date, latitude, north/south indicator, longitude, east/west indicator, number and identification of satellites used in the position solution, number and identification of GPS satellites in view and their elevation, azimuth and SNR values, dilution of precision values) may be included in geographic information constituting all or a portion of logged locate information.

In some embodiments, various locate information may be logged in response to detection of a pattern of events, or deviation from a pattern of events. For example, a pattern of magnetic field strength magnitudes (e.g., a relatively constant magnetic field strength for a given time, an increasing magnetic field strength, a decreasing magnetic field strength, etc.) may be detected by the locate receiver, which may trigger logging of timing information and/or geographic information. Deviation from a pattern, such as a historical pattern or expected pattern may also trigger logging of information. For example, a user's historical use patterns of a locate receiver may be compared to information collected about the use of the locate receiver during a given job, and if a deviation is detected then logging of timing and/or geographic information may be triggered. The patterns or deviations from patterns may relate to patterns in magnetic field strength, magnetic field frequency, signal gain, user operation, any other information described herein, or any combination of such information.

In some embodiments, alternatively or in addition to "automatic" logging of locate information based on some condition or event, a user of the locate receiver 110 may "manually" trigger logging of timing information, geographic information, and/or any other data associated with a locate operation or locate receiver (locate information), for example by manipulating a control (e.g., button, knob, joystick) of the user interface 126 or, as discussed above, by actuating an actuator 142 integrated or otherwise associated with the locate receiver (as shown in FIG. 5), which may be part of the actuation system 120 and which may cause a signal 121 to be sent to the processor 118 to initiate logging of locate information. For example, according to some embodiments a user may initiate the locate receiver 110 taking a depth measurement by depressing a pushbutton of the user interface 126, or pulling/squeezing the actuator 142, which may also trigger the logging of timing information and/or geographic information from timing system 128 and location tracking system 130. The depth measurement data, time data, and/or location data may then be logged in an electronic record 135 in local memory 122.

It should be appreciated that while the foregoing discussion focuses on logging locate information to local memory 122, the locate information may also, or alternatively, be transmitted to remote computer 150 via communication interface 124. As with logging locate information to local memory 122, the transmission of locate information to remote computer 150 may be performed continuously, periodically in response to one or more types of events, in response to user input or actuation of an actuator, or in any other suitable manner.

In yet other embodiments, the locate receiver 110 may be configured (e.g., via particular instructions executing on the processor 118) to operate in multiple different modes to collect various information relating not only to a locate operation (locate information), but additionally or alternatively various information relating to the work site/dig areas in which the locate operation is performed. For example, in one implementation, the locate receiver may be configured to operate in a first "locate mode" which essentially follows various aspects of the operation of the locate receiver 110 described herein, and also may be configured to operate in a second "landmark identification mode." When switched into the landmark mode, the locate receiver may stop detecting a magnetic field, e.g., the RF antenna of the locate receiver may be temporarily disabled in some embodiments. In other embodiments, the locate receiver may continue to operate and the landmark mode may represent additional functionality added to the locate receiver functionality. Additional details of the landmark mode are discussed further below.

III. Format, Content and Process of Generating Electronic Records of Locate Information As noted above, locate information may be generated, logged and/or transmitted by a locate device according to a variety of manual, semi-automatic, and/or automatic techniques; for example, in some implementations, a technician may actuate an actuator (e.g., pull a trigger, push a button) in response to which certain locate information may be generated, acquired, logged and/or transmitted. In other implementations, one or more predetermined conditions may be established (e.g., one or more thresholds, patterns, etc.) that, when present, may cause generation, acquisition, logging and/or transmission of locate information.

In exemplary methods for generating an electronic record of locate operations according to some embodiments of the invention pursuant to manual actuation of an actuator (or manipulation of a user interface control mechanism), as discussed in greater detail below, for a given actuation the processor 118 may generate an "actuation data set," e.g., a set of data that is somehow organized, formatted, and/or indexed to correspond to a given actuation of the locate receiver. For example, for a given actuation data set, the processor 118 may request the location tracking system 130 to provide geographic information at one or more times during the actuation (e.g., periodically at regular intervals). Thus, an actuation data set of an electronic record for a given actuation of the locate receiver may have multiple pieces of geographic information (and associated time stamps) representing the location of the locate receiver at multiple times during a corresponding actuation. Additionally, for a given actuation, the processor 118 also may request the processing circuit 133 to provide various locate signal information (e.g., relating to one or more characteristics of the detected magnetic field) as part of the actuation data set. The processor also may include in the actuation data set ticket information and service-related information, which may be collected (e.g., via one or more of the user interface 126 and the communication interface 124) before a corresponding actuation, stored in memory 122 and retrieved from the memory for entry into the electronic record upon or during the corresponding actuation, or collected and entered into the electronic record upon or during the corresponding actuation.

While the collection and logging of locate information to generate an electronic record is discussed in some aspects, for purposes of illustration, in terms of actuation data sets (i.e., a set of data that is associated and logged with a corresponding actuation of the locate receiver), it should be appreciated that various embodiments of the present invention are not limited in this respect. More generally, an electronic record of a locate operation may be generated in any of a variety of manners, have a variety of file formats and/or data structures, and include any of a variety of locate information.

Figure 6:
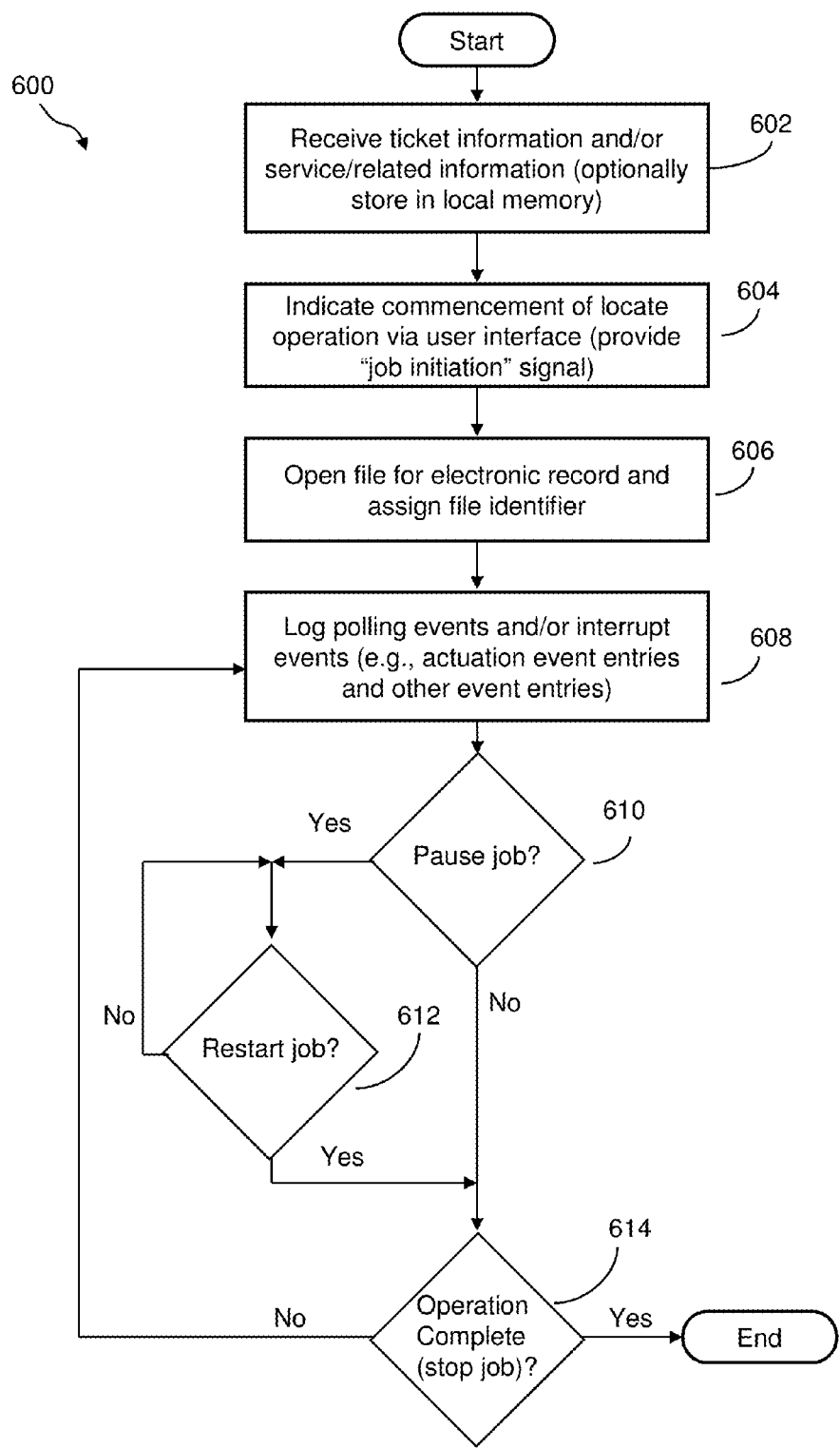
FIG. 6 is a flow diagram of an exemplary method for collecting locate information for generation of an electronic record, according to one embodiment of the present invention.

FIG. 6 is a flow diagram of an exemplary process 600 for collecting locate information during operation of a locate receiver 110 and generating an electronic record, according to one embodiment of the present invention. It should be appreciated that as various locate information is collected and logged in the process 600, such locate information also may be transmitted from the locate receiver (e.g., to remote computer 150) to facilitate essentially real-time monitoring of the locate operation, and/or remote generation of an electronic record of the locate operation.

In block 602 of the process 600 shown in FIG. 6, ticket information and/or service-related information may be received (e.g., via one or more of the user interface 126 and the communication interface 124 of locate receiver 110) and this information optionally may be stored in whole or in part in local memory 122 of the locate receiver. The ticket information and/or service-related information may be received electronically in any of a variety of formats, and the processor may be configured to appropriately parse the information for subsequent entry into an electronic record.

For example, in some embodiments, the ticket information may be received as part of an electronic locate request ticket, and individual respective pieces of ticket information (e.g., ticket number, work site address information, requesting party, etc.) may be extracted or derived from the electronic locate request ticket. In other embodiments, various aspects of ticket information may be input by a user/technician via the user interface.

For example, in block 602 the process 600 may provide for the entry of any of a variety of text information for inclusion in an electronic record and/or selection by a user/technician (e.g., via the user interface) of various information to be included in an electronic record as part of ticket information (and/or service-related information). One example of such information may relate to a ground type in and around the work site/dig area at which the locate operation is taking place. In some implementations, a text description of the ground type may be entered and stored as part of the electronic record. In another exemplary implementation, the processor 118 controls the user interface 126 (including display 146) so as to display information to the technician to facilitate such a selection. In particular, a ground type selection submenu may be displayed, including one or more categories of ground types displayed in any of a variety of manners (e.g., as a list of text entries, an arrangement of icons symbolizing respective categories, labeled symbols, etc.). Examples of ground type categories that may be displayed in such a submenu include, but are not limited to: 1) "Pavement;" 2) "Grass;" 3) "Rough/Rocky;" 4) "Dirt;" 5) "Gravel/Sand;" and 6) "Other." More generally, any number and variety of ground type categories may be presented to the technician via the user interface in alphabetically ordered lists, numerically ordered lists, or other types of ordered text-based or symbolic arrangements, for example. In yet another exemplary implementation, the user interface may include a microphone and the processor may be configured to accept and process audible commands, such that a ground type category may be accomplished via voice-activated commands by simply speaking into the microphone.

Similarly, with respect to service-related information, a user/technician may manually enter some aspects of this information via the user interface/display, while other aspects may already be available in other memory locations (e.g., the locate receiver ID or serial number, a technician ID to which the locate receiver is assigned or checked-out, etc.) and/or may be received electronically.

While block 602 is illustrated as one element of the process 600, it should be appreciated that respective pieces of information received as input in block 602 may be received at different times and via different interfaces/sources, and thus may occur at different points in the process 600. It should also be appreciated that block 602 is an optional step in the process 600, and that more generally a process for collecting locate information to generate an electronic record need not necessarily include collection of one or both of ticket information and service-related information.

In block 604, the locate technician utilizes the user interface 126 to indicate the initiation of a locate operation. For example, the technician may press a button, operate a joystick, or touch a touch screen display portion of a graphical user interface to commence a locate operation. In response, a "job initiation signal" is provided to the processor 118 (e.g., via a switch closure and a ground or DC level applied to an I/O pin of the processor, or by the user interface providing a signal to the processor) to initiate generation of an electronic record. Alternatively, a remote job initiation signal may be received by the processor via the communication interface from another device, such as the remote computer 150.

In response to the job initiation signal, in block 606 the processor opens a file in the memory 122 in which to store the electronic record 135, and assigns a file identifier to the opened file. In one example, the file identifier assigned to the opened file may be or include one or more of a job number ("job ID") or ticket number derived from the ticket information and/or the service-related information, an identifier for the locate receiver itself, and an identifier for a remote computer associated with the locate receiver (e.g., for either remote control operation of the device and/or data uploading/downloading). To this end, if ticket information and/or service-related information is not previously available (e.g., if no information is received in block 602), the technician optionally may be prompted to manually enter (e.g., via a "wizard" or sequence of dialogues germane to obtaining relevant information displayed on the display of the user interface) various elements of ticket information and/or service-related information from which a file identifier may be derived, or provide other information that may be used as a file identifier.

A file opened in block 606 for purposes of storing an electronic record may have any of a variety of formats and include any of a variety of data structures. In one embodiment, the processor initially opens up a "flat file" for collection and logging of locate information to facilitate generation of an electronic record. As known in the art, a flat file is a plain text or mixed text/binary file containing one entry (data record) per line, in which each entry may have multiple fields containing respective values, and wherein the respective values may be separated by delimiters (e.g., commas) or have a fixed length. In one exemplary implementation, the processor 118 logs data into a flat file opened for the electronic record as a succession of time stamped "event entries." Some event entries may be related specifically to actuation and/or logged in response to actuation of the locate receiver (e.g., the processor 118 receiving an actuation signal 121), while other event entries may be related to automatic logging of data as discussed above (e.g., upon meeting or exceeding a threshold condition, meeting or deviating from a pattern, etc.). Other event entries may be more generally related in some manner to overall operation of the locate receiver or the locate operation itself, but not necessarily associated with one or more particular actuations (e.g., start/pause/stop locate operation, power/battery status, communication link/network connection status, etc.), and these other event entries may be logged at virtually any time (in some cases irrespective of one or more actuations).

Accordingly, it should be appreciated that in one aspect of this embodiment a flat file for an electronic record may contain a succession of time stamped event entries on respective lines, in which one or more event entries may have multiple delimited fields/values, and wherein at least some of the event entries may relate to actuation of the locate receiver and/or automatic logging of data. In another aspect, one or more fields/values in a given event entry may specifically indicate in some manner whether or not the event is associated with an actuation of the locate receiver. In general, an "actuation event entry" constitutes an entry in a file for an electronic record that is in some manner specifically related to, and/or logged in response to or during, actuation of the locate receiver, and multiple actuation event entries for a given actuation constitute an actuation data set for that actuation. Again, it should be appreciated that a file for an electronic record may include one or more other event entries that may not be particularly associated with an actuation.

In other embodiments, the file for an electronic record may or may not be a flat file, and event entries associated with actuations (actuation event entries) may be somehow identified and differentiated from other event entries that are not associated with an actuation. For example, a file for an electronic record may include a particular data structure or format that segregates or separates in some manner event entries associated with successive actuations from those event entries that are not particularly associated with actuations (and/or may be common to multiple actuations or a group of actuations). In yet other embodiments, as discussed below, locate information may be initially collected and logged in a first file for an electronic record in a first format (e.g., a flat file including a succession of time-stamped event entries as "raw data" for the locate operation) that may be stored and/or transmitted for any of a variety of purposes, and then reformatted and/or reorganized in some manner in one or more subsequent files (e.g., a file having a particular data structure that segregates/separates actuation-related information from other information in different fields/elements of a data structure) for archiving and/or transmission to one or more other devices/processors.

Once a file for an electronic record is opened in block 606, in block 608 the processor can begin collecting and logging various locate information, i.e., logging in the electronic record (and/or transmitting via the communication interface) actuation event entries and/or other event entries. In one exemplary implementation, the processor may be programmed so as to poll one or more input devices and/or other components of the locate receiver to receive information, either once or multiple times/periodically following the job initiation signal, and log responses to these polls ("polling events") as event entries with associated time stamps. Examples of entries corresponding to polling events that may be logged into the file for the electronic record (and/or transmitted) include, but are not limited to, one or more "power status event entries" including power information associated with the power source 114, one or more "ticket information event entries" including ticket information (e.g., as received from the user interface or the communication interface, retrieved from local memory, etc.), one or more "service-related information event entries" including the service-related information (e.g., as received from the user interface or the communication interface, retrieved from local memory, etc.), and one or more "communication interface event entries" including status information regarding operation of the communication interface (e.g., network communication available/unavailable).

Additionally or alternatively, the processor may be programmed so as to respond to one or more signals designated as "interrupt events" from one or more components of the locate receiver. Such interrupt events cause logging of information in the electronic record (and/or transmission of information) upon/following the processor detecting the corresponding signal(s). For example, the "job initiation signal" itself may constitute an interrupt event, in response to which the processor 118 not only opens a file for the electronic record but, once the file is opened, the processor may request timing information from the timing system 128 and log into the electronic record a "start job event entry" including a job initiation time stamp associated with receipt of the job initiation signal.

In a similar manner, following commencement of a locate operation, the locate technician may utilize the user interface 126 (e.g., press a button, operate a joy-stick, or touch a touch screen display portion of a graphical user interface) to pause, restart, and/or indicate completion of the locate operation, and these actions may constitute interrupt events. For example, as indicated in block 610 of FIG. 6, a "pause signal" may be provided by the user interface to the processor, in response to which the processor may request timing information from the timing system and log a "pause job event entry" including a pause job time stamp associated with the at least one pause signal. When the technician is ready to continue, as shown in block 612 of FIG. 6 the technician may indicate this via the user interface and a "restart job event entry" similarly may be logged. When the locate operation is deemed by the technician to be completed, as noted in block 614 of FIG. 6 the technician may utilize the user interface so as to provide a "stop signal" to the processor, in response to which the processor may request timing information from the timing system and log a "stop job event entry" including a stop job time stamp associated with the stop signal.

Additionally, the locate technician may utilize the user interface 126 to denote the beginning and end of a locate operation for a particular facility type, and these actions may constitute interrupt events. For example, upon beginning a locate operation for a given facility type, the technician may select "line start" from the user interface, and a corresponding "line start signal" may be provided by the user interface to the processor, in response to which the processor may request timing information from the timing system and log a "line start event entry." Similarly, when the technician wishes to indicate completion of the locate operation for a given facility type, the technician may select "line stop" from the user interface, and a corresponding "line stop signal" may be provided by the user interface to the processor, in response to which the processor may request timing information from the timing system and log a "line stop even entry."

While various events are noted above as examples of "polling events" as opposed to "interrupt events," it should be appreciated that the inventive concepts discussed herein are not limited in these respects, and that the locate data algorithm 137 executed by the processor 118 may be configured in any of a variety manners to designate various functions performed by and/or information provided by various components of the locate receiver as polling events or interrupt events. For example, the power source 114 may be configured to provide a "low battery signal" to the processor, which when present is treated by the processor as an interrupt event that may be logged by the processor and/or that may cause the processor to take some particular action (e.g., provide an audible/visible alert; disable logging of further data, etc.). In one aspect, absent the "low battery signal," the processor may request status information from the power source once or occasionally as a polling event. Similarly, the communication interface 124 may be configured to provide a "no network connection available signal" to the processor, which when present is treated by the processor as an interrupt event (that is logged and/or causes the processor to take some action), and when not present, the processor may poll the communication interface to request status information as a polling event.

Another example of an interrupt event is the automatic logging of locate information, for example one or more of timing information, geographic information, and locate signal information derived from the detection electronics 131. In particular, as discussed above, automatic logging may occur at periodic intervals during performance of a locate operation, such as every second, every five seconds, every minute, or at any other suitable time interval. Alternatively, timing information, geographic information and/or locate signal information may be logged when a characteristic (e.g., magnetic field strength) of a signal detected by RF antenna 127 is greater than a particular threshold value, which may be indicated by a signal output from processing circuit 133 to processor 118, and which occurrence may be indicative of the presence of an underground facility. Similarly, in some embodiments, timing information, geographic information and/or locate signal information may be logged when a signal detected by RF antenna 127 has a magnitude above a first threshold and the gain of the locate receiver 110 is above a second threshold. Additionally, as noted above, various locate information may be logged in response to detection of a pattern of conditions/events, or deviation from a pattern of conditions/events (e.g., a pattern of magnetic field strength magnitudes may be detected by the detection electronics 131, which may cause automatic logging of timing information, geographic information, and/or locate signal information).

Yet another example of an interrupt event is given by the actuation signal 121 provided by the actuation system 120 upon actuation of the actuator 142 (i.e., a signal change-of-state indicating a transition from a non-actuated state to an actuated state), in response to which the processor logs one or more actuation event entries in the electronic record. More specifically, in one implementation, the receipt of a non-actuated to actuated transition state of the actuation signal 121 by the processor may cause an initial actuation event entry to be logged as a "start actuation event entry" having an associated time stamp (i.e., a start time for the corresponding actuation) and also cause the processor to subsequently poll one or more input devices for information during the corresponding actuation and until release of the actuator (i.e., subsequent change of state of the actuation signal 121). In this manner, an actuation data set for a given actuation may include multiple actuation event entries.

For example, during actuation of the actuator, the processor may poll the location tracking system 130 so as to receive geographic information, and in turn log one or more "geo-location data event entries" in the actuation data set for the corresponding actuation. As discussed above in connection with FIGS. 4 and 5, in one exemplary implementation the location tracking system is configured to provide geographic information at an information update rate of approximately 5 Hz, and the processor may log respective updates of geographic information provided by the location tracking system at this update rate during an actuation as multiple geo-location data event entries of the actuation data set. It should be appreciated, however, that methods and apparatus according to various embodiments of the present invention are not limited in this respect, and that other geographic information update rates may be employed in various implementations (e.g., update rates of up to approximately 100 Hz), based in part on the particular location tracking system employed. Furthermore, it should be appreciated that in some implementations the geographic information provided by the location tracking system 130 may include one or more longitude coordinates, latitude coordinates, and a corresponding geo-location data time stamp at which a given set of longitude/latitude coordinates are obtained by the location tracking system; accordingly, a given geo-location data event entry in an actuation data set may include a longitude coordinate, a latitude coordinate, and the corresponding geo-location data time stamp.

Similarly, in some implementations, pursuant to an interrupt provided by the actuation signal 121, the processor may subsequently poll one or more of the timing system 128 and the detection electronics 131 so as to receive timing information and/or locate signal information during a corresponding actuation, and in turn log one or more of a "timing event entry," and a "locate signal event entry" as part of the actuation data set. Any of a variety of locate signal information as discussed above may be collected and logged during actuation in response to processor polling of the detection electronics 131.

Additionally, in some implementations, pursuant to an interrupt provided by the actuation signal 121, the processor may subsequently poll one or more of the user interface 126, the communication interface 124, and the local memory 122 to retrieve ticket information and/or service-related information for logging into an actuation data set. As discussed above, in some implementations the receipt/retrieval of ticket information and/or service-related information may be treated as a polling event not necessarily associated with actuations, and this information need not be included in one or more actuation data sets. However, in other implementations it may be desirable to include at least some aspect of ticket information and/or service related information in each actuation data set, notwithstanding the possible redundancy of data content in respective actuation data sets.

Another example of an interrupt event is given by a change-of-state of the actuation signal 121 indicating a transition from the actuated state to the non-actuated state, i.e., release of the actuator 142. In response to this event, the processor may request information from the timing system 128 and log an "end actuation event entry" including an end time stamp.

In yet another embodiment, the processor 118, executing locate data algorithm 137, may be configured to repeatedly/regularly poll all available input devices and other components of the locate receiver (e.g., in a predetermined order, in response to receipt of the job initiation signal), as well as continually monitor for a variety of possible interrupt events, and generate an essentially continuous stream of data packets including locate information received pursuant to these polling and/or interrupt events. In one aspect of this embodiment, each data packet of locate information may include a header, one or more flag fields, and one or more information payload fields. For example, in one implementation, the header for each packet may include one or more of a job ID (e.g., ticket identifier), technician ID, device ID (e.g., serial number), packet type ID, and/or a time stamp corresponding to logging of information/generation of the packet. Each packet also may include one or more payload fields for carrying information provided by the polled device(s) or devices generating interrupts, and one or more flag fields that are set (or reset) upon occurrence of one or more predetermined interrupt events (e.g., pull/depress actuator, release actuator, automatic log due to some condition/event, low power, communication link fail, etc.). In this manner, a continuous stream of data may be provided as an output by the processor, in which certain interrupt events, such as an actuation and/or release of the actuator, or automatic logging of data, "tag" certain data packets via an interrupt flag. In yet other aspects of this embodiment, all data packets thusly generated may be stored in the file opened for the electronic record and/or transmitted from the locate receiver in essentially real time; alternatively, only certain data packets with one or more predetermined flags set may be stored and/or transmitted.

Table 1 below illustrates an example of a portion of the contents of a relatively simple flat file for an electronic record that may be generated by the process 600 of FIG. 6:

TABLE 1

| TIME | LAT | LONG | EVENT | FACILITY TYPE |
|---|---|---|---|---|
| 1:23:00.00 PM | −80.3851 | 25.5604 | Detection | ORANGE |
| 1:23:00.20 PM | −80.3851 | 25.5604 | Detection | ORANGE |
| 1:23:00.40 PM | −80.3851 | 25.5604 | Detection | ORANGE |
| 1:23:00.60 PM | −80.3851 | 25.5604 | Detection | ORANGE |
| 1:23:00.80 PM | −80.3851 | 25.5604 | Detection | ORANGE |
| 1:23:01.00 PM | −80.3851 | 25.5604 | Detection | ORANGE |
| 1:23:01.20 PM | −80.3851 | 25.5604 | Detection | ORANGE |
| 1:23:01.40 PM | −80.3851 | 25.56039 | Detection | ORANGE |
| 1:23:01.60 PM | −80.3851 | 25.56039 | Detection | ORANGE |
| 1:23:01.80 PM | −80.3851 | 25.5604 | Detection | ORANGE |
| 1:23:02.00 PM | −80.3851 | 25.5604 | Detection | ORANGE |

The portion of the file shown in Table 1 corresponds to multiple locate signal event entries indicating detection of a facility (one entry per line). Each entry has a time stamp (e.g., entries are logged at a rate of approximately five events per second) and further includes multiple fields having respective values (e.g., as comma separated values) for latitude and longitude coordinates received from the location tracking device, an event indicator indicating that the locate receiver is detecting ("Detection"), and a color code indicating the type of facility detected (e.g., as established by the American Public Works Association and shown further below in Table 7).

As noted above, it should be appreciated that the portion of the file shown in Table 1 is provided primarily for purposes of illustration, and that the format and/or content for respective event entries and the file itself for an electronic record generated by and/or based on the information collection process discussed above in connection with FIG. 6 may have any of a variety of different formats and/or content.

To this point, Tables 2 through 5 below provide examples of various events for which event entries may be logged in a file for an electronic record and/or transmitted by the locate receiver, exemplary formats for these event entries, and exemplary file formats for files having multiple such entries, according to another embodiment of the present invention.

Job Started/Paused/Restarted/Completed Events:

This event entry format provides information about when a locate operation ("job") is started and completed in addition to capturing details about if and when the job was paused and restarted.

TABLE 2

| Format | INFO+JOBS: (DATE) (TIME) (DEV_ID) (JOB_ID) (STATE) <CR><LF> |
|---|---|
| Examples | INFO+JOBS: DATE(2009-04-15) TIME(12:03:44) DEV(2334) JOB(4000) (STARTED) <CR><LF> |
| | INFO+JOBS: DATE(2009-04-15) TIME(12:11:44) DEV(2334) JOB(4000) (PAUSED) <CR><LF> |
| | INFO+JOBS: DATE(2009-04-15) TIME(12:51:44) DEV(2334) JOB(4000) (RESTARTED) <CR><LF> |
| | INFO+JOBS: DATE(2009-04-15) TIME(13:09:44) DEV(2334) JOB(4000) (END) <CR><LF> |

Actuation Events:

As has been described, according to at least one embodiment of the present invention, a locate receiver may be operated to collect and/or transmit locate information upon actuation by a user. Table 3 illustrates an example of an entry relating to the actuation event. Locate information from one or more input devices/other components of the locate device may be recorded upon actuation to provide information about the job in progress. The facility type information may be entered/selected by a user as described previously, and may be recorded in the event, for example, according to the color-coding scheme of Table 7 discussed further below.

It should be appreciated that the event types described above and the logged location information shown in the corresponding tables are provided primarily for purposes of illustration, and are not limiting. Thus, events of various other types and with various other information may be logged into an electronic record.

With respect to file formats for electronic records including the event entries outlined above in Tables 2 through 5, two exemplary file formats, namely ASCII and XML, are provided below for purposes of illustration. In various imple-

TABLE 3

| | |
|---|---|
| Format | INFO+ LCTR: (DATE) (TIME) (GPS data) (FACILITY TYPE) (GROUND TYPE) (MAGNETIC FIELD STRENGTH AS % OF FULL SCALE info) (DETECTED SIGNAL FREQUENCY) (GAIN) <CR><LF> |
| Examples | INFO+LCTR: DATE(2009-04-15) TIME(12:04:44)<br>GPS($GPGGA,120443,4807.038,N,01131.000,E,1,08,0.9,545.4,M,46.9,M,,*47 )<br>FACILITY TYPE (YELLOW) GROUND TYPE (PAVEMENT) STRENGTH(80)<br>FREQUENCY(512) GAIN (10) <CR><LF><br>INFO+LCTR: DATE(2009-04-15) TIME(12:04:45)<br>GPS($GPGGA,120445,4807.038,N,01131.000,E,1,08,0.9,545.4,M,46.9,M,,*47 )<br>FACILITY TYPE (YELLOW) GROUND TYPE (GRASS) STRENGTH(81)<br>FREQUENCY (512) GAIN (10) <CR><LF><br>INFO+LCTR: DATE(2009-04-15) TIME(12:04:46)<br>GPS($GPGGA,120446,4807.038,N,01131.000,E,1,08,0.9,545.4,M,46.9,M,,*47 )<br>FACILITY TYPE (YELLOW) GROUND TYPE (DIRT) STRENGTH(80)<br>FREQUENCY(512) GAIN (11) <CR><LF> |

Locate Device Status Events:

The status event of a locate device collects various locate-related information and/or information on operating characteristics of the locate device on a periodic basis while a job is in progress (e.g., pursuant to processor polls). An example is shown below in Table 4. In the non-limiting example, the entries include information about the mode of the locate receiver (e.g., peak v. null). It should be appreciated, however, that other information may additionally or alternatively be included in the event entry.

mentations, a given locate receiver may be particularly configured to store and/or transmit electronic records and respective entries therein in either format (or other formats). With respect to identification of files/electronic records, a standard naming scheme/format may be adopted, for example, including an identifier for the remote computer with which the locate receiver may be communicating ("ServerID"), an identifier for the locate receiver itself ("LocRecID"), and an identifier for the locate operation/job ("JobID"), and having the format "ServerID_LocRecID_Job ID."

TABLE 4

| | |
|---|---|
| Format | INFO+LCTSTAT: (DATE) (TIME) (GPS data) (MODE status) (MEMORY used in %) (BATTERY level) <CR><LF> |
| Examples | INFO+LCTSTAT: DATE(2009-04-15) TIME(12:04:00)<br>GPS($GPGGA,120400,4807.038,N,01131.000,E,1,08,0.9,545.4,M,46.9,M,,*47 )<br>MODE(PEAK) MEM(65) BAT(3)<CR><LF> |

Error Events:

Should any input device or other component of the locate device encounter a significant error condition, this may be logged as an event. In some cases, the user/technician also may be notified of the error through the user interface 126 (visible alert on display, audible alarm/alert, etc.). Similar event formats may be adopted for warning alerts/events and informational alerts/events.

ASCII Data Format:

This format allows low-level remote processing engines to quickly and easily receive, parse, and react to locate information logged and/or transmitted by the locate receiver. An example of an electronic record formatted in ASCII based on the event entries outlined in Tables 2 through 5 is as follows:

TABLE 5

| | |
|---|---|
| Format | INFO+ERR: (DATE) (TIME) (GPS data) (MEMORY used in %) (BATTERY level) <CR><LF> |
| Examples | INFO+ERR: DATE(2009-04-15) TIME(12:04:00)<br>GPS($GPGGA,120400,4807.038,N,01131.000,E,1,08,0.9,545.4,M,46.9,M,,*47 )<br>MEM(65) BAT(3)<CR><LF> |

```
INFO+JOBS: DATE(2009-04-15) TIME(12:03:44) DEV(2334) JOB(4000) (STARTED)
<CR> <LF>
INFO+LCTSTAT: DATE(2009-04-15) TIME(12:04:00)
GPS($GPGGA,120400,4807.038,N,01131.000,E,1,08,0.9,545.4,M,46.9,M,,*47 ) MODE(PEAK)
MEM(65) BAT(3)<CR><LF>
INFO+LCTR: DATE(2009-04-15) TIME(12:04:44)
GPS($GPGGA,120443,4807.038,N,01131.000,E,1,08,0.9,545.4,M,46.9, M,,*47 ) FACILITY TYPE
(YELLOW) GROUND TYPE (PAVEMENT) STRENGTH(80) FREQUENCY(512) GAIN (10)
<CR><LF>
INFO+LCTR: DATE(2009-04-15) TIME(12:04:45)
GPS($GPGGA,120445,4807.038,N,01131.000,E,1,08,0.9,545.4,M,46.9,M,,*47 ) FACILITY TYPE
(YELLOW) GROUND TYPE (GRASS) STRENGTH(81) FREQUENCY (512) GAIN (10)
<CR><LF>
INFO+LCTR: DATE(2009-04-15) TIME(12:04:46)
GPS($GPGGA.120446,4807.038,N,01131.000,E,1,08,0.9,545.4,M,46.9,M,,*47 )
FACILITY TYPE (YELLOW) GROUND TYPE (DIRT) STRENGTH(80)
FREQUENCY(512) GAIN (11) <CR><LF>
INFO+LCTSTAT: DATE(2009-04-15) TIME(12:05:00)
GPS($GPGGA,120500,4807.038,N,01131.000,E,1,08,0.9,545.4,M,46.9,M,,*47 )
MODE(PEAK) MEM(65) BAT(3)<CR><LF>
INFO+JOBS: DATE(2009-04-15) TIME(12:10:03) DEV(2334) JOB(4000)
(PAUSED)<CR> <LF>
INFO+JOBS: DATE(2009-04-15) TIME(13:01:43) DEV(2334) JOB(4000)
(RESTARTED)<CR> <LF>
INFO+JOBS: DATE(2009-04-15) TIME(13:20:30) DEV(2334) JOB(4000) (END)<CR>
<LF>
```

XML Data Format:

This format allows transmission of self-describing data elements from the locate receiver, in some instances reducing processing errors and reducing the risks and effort involved in upgrades and data changes. An example of an electronic record formatted in XML based on the event entries outlined in Tables 2 through 5 is as follows:

```
<DEV ID=2334>
    <JOB ID=4000>
        <ACTIVITY>
            <DATE>2009-04-15</DATE>
            <TIME>12:03:44</TIME>
            <STATUS>Started</STATUS>
        </ACTIVITY>
        <ACTIVITY>
            <DATE>2009-04-15</DATE>
            <TIME>12:04:00</TIME>
            <GPS>($GPGGA, 120400,4807.038,N,01131.000,E,1,08,0.9,545.4,M,46.9,M,,*47</GPS>
            <FACILITY TYPE>
                <COLOR>Yellow</COLOR>
                <VALID>True</VALID>
            </FACILITY>
            <SWITCH>Pressed</SWITCH>
        </ACTIVITY>
    </JOB>
</DEV>
```

Table 6, shown below, lists another example of the contents of an electronic record of locate information that may be generated and stored and/or transmitted relating to operation of a locate receiver, according to one non-limiting embodiment. The electronic record shown in Table 6 includes a record number (record #1001), an identification of the service provider, an identification of the user (i.e., the locate technician operating the locate receiver), and an identification of the locate receiver. The mode of operation of the locate receiver (e.g., peak, and in some scenarios an indication of active or passive operation) may also be included. Timing information (timestamp data) from a timing system of the locate receiver and geographic information from a location tracking system of the locate receiver may also be included. The signal strength and signal frequency entries of the electronic record indicate characteristics of a signal (e.g., a magnetic field) detected by the locate receiver, for example emitted from an underground facility. The signal strength is listed in the example of Table 6 as a percentage of the maximum detectable by the locate receiver, although it should be appreciated that other units of measurement may alternatively be used. The gain entry indicates the gain setting of the locate receiver. The electronic record also includes an entry for the depth of the facility targeted, as may be determined by taking a depth measurement using a locate receiver (e.g., by calculating a difference in magnetic field strength detected by two different antennae at two different locations within a locate receiver), and for the facility type (e.g., gas, electric, etc.) and ground type in the area of the locate operation. The electronic record of Table 6 also includes the address of the locate operation and the party requesting the locate operation. Lastly, Table 6 includes information about the remaining battery life of the locate receiver for those embodiments that include a battery.

TABLE 6

Example Electronic Record For Locate Receiver

| Record #1001 | Service provider ID | 0482 |
|---|---|---|
| | User ID | 4815 |
| | Receiver ID | 7362 |
| | Receiver mode | Mode=Peak |
| | Receiver mode | PASSIVE |

TABLE 6-continued

Example Electronic Record For Locate Receiver

| | |
|---|---|
| Timestamp data | 12-Jul-2008; 09:35:15 |
| Geo-location data | 2650.9348,N,08003.5057,W |
| Signal strength (% of maximum) | 85% |
| Gain | 45 |
| Signal frequency | 1 kHz |
| Facility depth | 3.4 meters |
| Facility type | Gas (yellow) |
| Ground type | Pavement |
| Battery strength data | 85% |
| Locate request data | Requestor=XYZ Construction Company, Requested service address=222 Main St, Orlando, FL |

It should be appreciated that Table 6 represents only one non-limiting example of an electronic record of locate information which may be generated in accordance with the operation of a locate receiver, according to one embodiment. In particular, a single electronic record of locate information collected in connection with operation of a locate receiver may include multiple entries of a given data type. For example, while Table 6 illustrates an electronic record including a single GPS data point, it should be appreciated that multiple GPS data points may be taken and stored within a single electronic record. The multiple GPS data points may be taken in response to a single actuation event (e.g., single actuator pull by a technician), in response to multiple actuation events (e.g., multiple actuator pulls by a technician), or in other manners. Thus, multiple pieces of data may be collected for an electronic record of a locate operation, and it should be appreciated that any single electronic record may include multiple entries.

With regard to color information that may be included in any of the event entries and electronic records discussed herein, Table 7 below shows an example of a color code used to identify facilities to be detected during a locate operation.

TABLE 7

Correlation of color to facility type

| Color Code | Facility Type |
|---|---|
| Red | Electric power lines, cables or conduits, and lighting cables |
| Yellow | Gas, oil, steam, petroleum, or other hazardous liquid or gaseous materials |
| Orange | Communications, cable television, alarm or signal lines, cables, or conduits |
| Blue | Water, irrigation, and slurry lines |
| Green | Sewers, storm sewer facilities, or other drain lines |
| White | Proposed excavation |
| Pink | Temporary survey markings |
| Purple | Reclaimed water, irrigation, and slurry lines |
| Black | Mark-out for errant lines |

Figure 7:
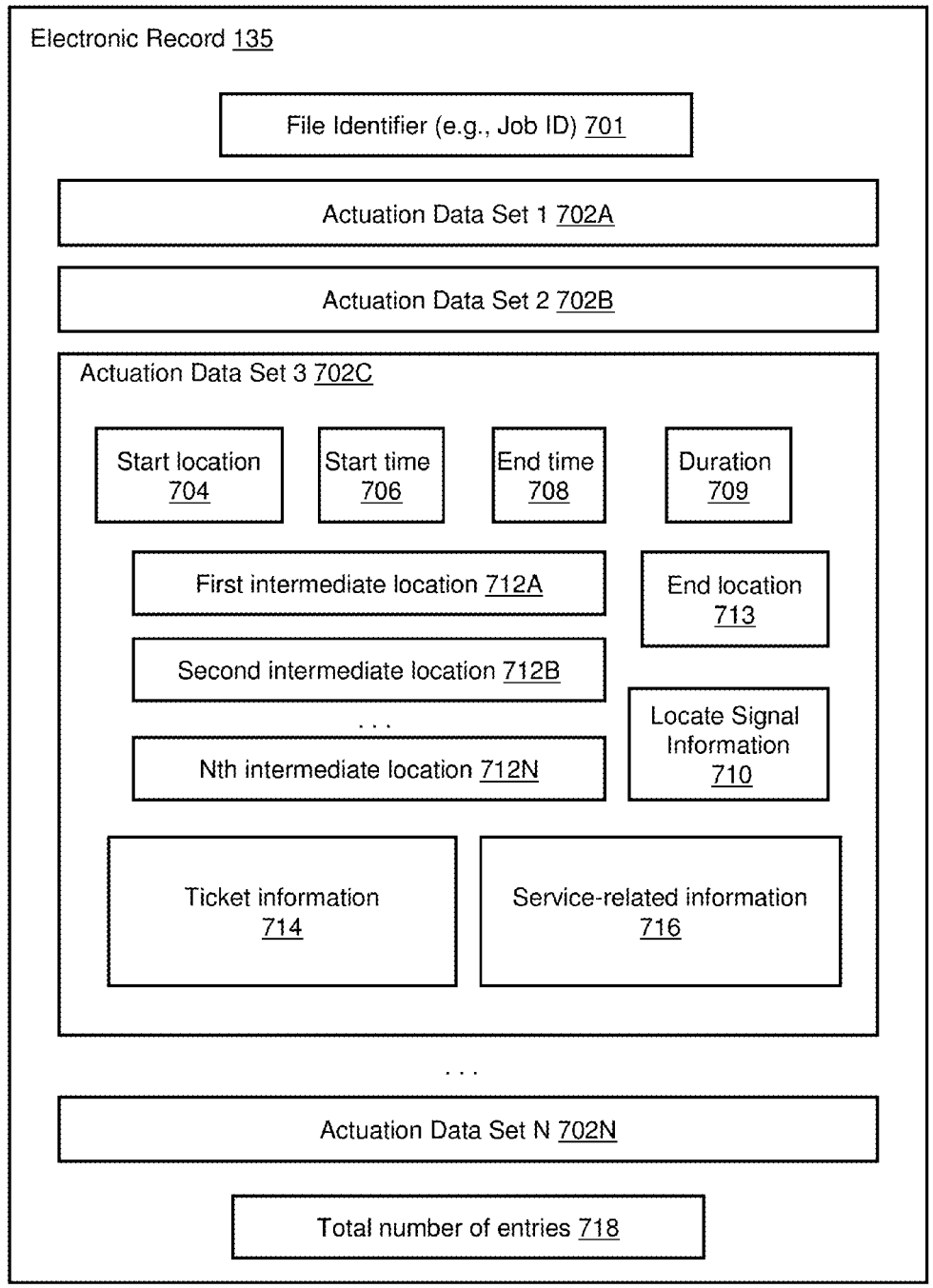
FIG. 7 is a block diagram of an exemplary data structure for an electronic record of a locate operation including information retrieved during one or more actuations of a locate receiver, according to one embodiment of the present invention.

FIG. 7 illustrates an exemplary data structure for an electronic record 135, according to another embodiment of the present invention, that may be generated by and/or based on information collected during the process 600 discussed above in connection with FIG. 6. In the exemplary data structure of FIG. 7, information is arranged in terms of actuation data sets, to illustrate the storage of data pursuant to actuations of a locate receiver. It should be appreciated however, that data structures similar to that shown in FIG. 7 may be generated and/or based, at least in part, on automatic logging of various locate information, as discussed above.

As shown in FIG. 7, the record 135 includes a file identifier 701 (e.g., one or more of Job ID, LocRecID, ServerID, etc.) and a plurality of actuation data sets 1 through N (with reference numbers 702A, 702B, 702C . . . 702N), wherein each actuation data set is associated with a corresponding actuation of a locate receiver. For purposes of the following discussion, FIG. 7 shows additional details of the data structure for actuation data set 3 702C, showing several fields in which data (e.g., actuation event entries) may be entered to constitute the actuation data set. While only the exemplary details of the data structure of actuation data set 3 are shown in the electronic record 135 of FIG. 7, it should be appreciated that multiple actuation data sets of the electronic record 135 may have the same data structure as that shown for actuation data set 3 in FIG. 7.

The data structure of the actuation data set 3 702C of the electronic record 135 shown in FIG. 7 includes a start location field 704 (corresponding to geo-location data shown in Table 2 when an actuator is pressed), an end location field 713 (corresponding to geo-location data shown in Table 2 when an actuator is released), a start time field 706 (corresponding to timestamp data shown in Table 2 when an actuator is pressed), an end time field 708 (corresponding to timestamp data shown in Table 2 when an actuator is released) and a duration field 709 (corresponding to the duration of the actuator being held). Additionally, the data structure for entry 3 702C includes one or more fields 712A, 712B, . . . 712N for intermediate location data (e.g., corresponding to $1^{st}$ interval location data, $2^{nd}$ interval location data . . . Nth interval location data which may be acquired while the actuator is being held). The actuation data set also may include a locate signal information field 710 including various data relating to one or more signals (e.g., corresponding to signal strength, gain, frequency, as shown in Table 6). Finally, the data structure for the entry 3 702C may include one or more ticket information fields 714 (e.g., corresponding to Locate request data in Table 6) and one or more service-related information fields 716 (e.g., corresponding to Service provider ID, User ID, and Receiver ID in Table 6).

In addition to one or more actuation data sets corresponding to actuations of a locate receiver, the electronic record 135 shown in FIG. 7 may include one or more additional elements. For example, FIG. 7 shows an additional element 718 of the electronic record to store the total number of entries in the record. Furthermore, according to another embodiment, various other information that may be common to multiple (or all) actuation data sets of a given electronic record may be stored in one or more additional elements of the electronic record that are not contained within one or more of the actuation data sets themselves. For example, in one alternative implementation, one or more of the ticket information field 714, the service-related information field 716, and the locate signal information field 710, which are shown as part of the data structure for a given actuation data set of the electronic record, may instead be elements of the electronic record that are not included within any one actuation data set (e.g., the information contained in one or more of the ticket information field, the service-related information field, and the locate signal information field 710 may be common to all actuation data sets of a given electronic record).

IV. Landmark Identification Mode

In yet another embodiment of the present invention, a locate device such as the locate receiver 110 shown in FIGS. 4 and 5 (as well as a locate transmitter) may be configured (e.g., via particular instructions included in the locate data algorithm 137 executing on the processor 118, and/or various hardware modifications) to operate in multiple different modes so as to collect various information relating not only to a locate operation itself (locate information), but additionally (or alternatively) various information relating to the work site/dig area in which the locate operation is performed. For example, in one implementation, the locate receiver may be configured to operate in a first "locate mode" which essentially follows various aspects of the process outlined in FIG. 6, and also operate in a second "landmark identification mode" (or more simply "landmark mode"), in which the locate receiver acquires information relating to one or more environmental landmarks that may be germane to the locate operation (e.g., in and around the work site/dig area and/or generally in the vicinity of the locate operation).

More specifically, in a "locate mode," various locate information may be collected, logged, stored and/or transmitted, as discussed above, in connection with the detection of a presence or absence of one or more underground facilities. Alternatively, in a "landmark mode," a technician positions the locate receiver proximate to an environmental landmark of interest and, upon actuation of the locate receiver (e.g., via an actuator or manipulation of a user interface control mechanism), the locate receiver collects various information about the landmark (hereafter referred to as "landmark information"), which information may include, but is not limited to, geo-location data of an environmental landmark, type of environmental landmark, and a time stamp for any acquired information relating to an environmental landmark.

With respect to mode selection, the locate receiver may be configured (e.g., via execution of the locate data algorithm) to provide for mode selection in any of a number of manners. For example, in one implementation, the locate receiver may be equipped with a simple switch, referred to as a "mode selection switch," which in some instances may form part of the user interface 126. The switch may include an open contact state and a closed contact state, wherein one contact is electrically coupled to a power signal or to ground, and another contact is electrically coupled to an input of the processor 118; in this manner, when the switch is toggled, a mode signal may be provided to the processor 118 as an interrupt event to indicate "landmark mode." In response to the mode signal indicating landmark mode, the processor 118 may request timing information from the timing system and log into an electronic record a "landmark mode event entry" including a landmark mode time stamp associated with the landmark mode signal. Additionally, or alternatively, the processor may respond to the landmark mode signal by taking one or more other actions pursuant to execution of a portion of the locate data algorithm 137 including particular instructions to implement the landmark mode, such as providing for the selection of landmark categories and/or types (via the user interface 126 and menus provided on the display 146), and logging actuation event entries in an electronic record as "landmark event entries."

Again, as noted above, such a mode selection switch may be provided by the user interface 126, for example, in the form of a button, switch, portion of the touch screen display, microphone to provide for voice-activation, etc. Apart from a hardware switch, the user interface 126 alternatively may be employed for mode selection between locate mode and landmark mode; in particular, the user interface 126 and/or display 146 may implement a menu-driven GUI to provide for mode selection.

Figure 8:
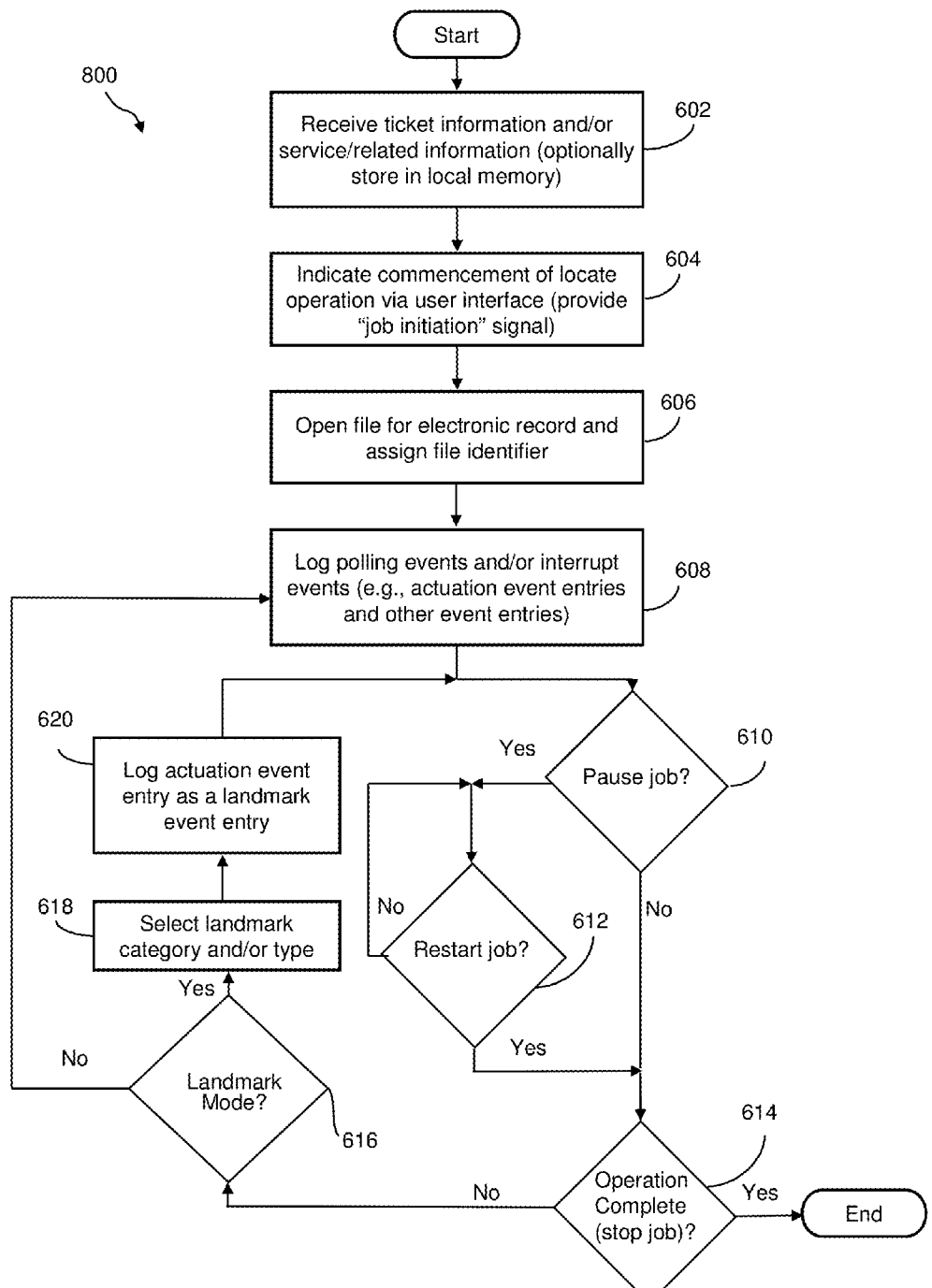
FIG. 8 is a flow diagram of an exemplary method for operating a locate device having a locate mode and a landmark mode so as to collect locate information and/or environmental landmark information, and generate an electronic record of such information, according to one embodiment of the present invention.

FIG. 8 is a flow diagram of an exemplary process 800, according to one embodiment of the present invention, for operating a locate receiver having a locate mode and a landmark mode so as to collect locate information and/or environmental landmark information during operation of the locate receiver, and generate an electronic record of such information. Several aspects of the process 800 shown in FIG. 8 are substantially similar or identical to those discussed above in connection with FIG. 6; in particular, blocks 602 through 614 are the same in both FIGS. 6 and 8, and the blocks 616, 618, and 620 in FIG. 8 are additional aspects of the process 800.

In the process 800 outlined in FIG. 8, following commencement of a locate operation the locate technician may utilize the user interface 126 (e.g., press a button, operate a joy-stick, touch a touch screen display portion of a graphical user interface, speak into a microphone to provide a voice-activated command, etc.) to not only pause, restart, and/or indicate completion of the locate operation, but further to select a landmark mode of operation for the locate receiver. As noted above in the discussion of FIG. 6, any one or more of these actions may constitute interrupt events. For example, as indicated in block 616 of FIG. 8, if a technician selects "landmark mode" via the user interface, the user interface may provide a "landmark mode signal" to the processor. In response to this signal, the processor may request timing information from the timing system and log a "landmark mode event entry" including a landmark mode time stamp associated with the landmark mode signal. Additionally, or alternatively, the processor may respond to the landmark mode signal by taking one or more other actions pursuant to execution of a portion of the locate data algorithm 137 including particular instructions to implement the landmark mode (as discussed above, the landmark mode may be entered in alternative implementations via a mode signal provided to the processor 118 by a dedicated mode selector switch.

Table 8 below provides an example of content and format for a mode select event entry that may be logged in a file for an electronic record and/or transmitted by the locate receiver. The example mode select event entry shown below in Table 8 follows a similar format to that used for the event entry examples provided in Tables 2-5 above.

TABLE 8

| Format | INFO+MODE: (DATE) (TIME) (DEV_ID) (JOB_ID) (MODE) <CR><LF> |
|---|---|
| Examples | INFO+MODE: DATE(2009-04-15) TIME(12:03:44) DEV(2334) JOB(4000) (LANDMARK) <CR> <LF> |

In the process outlined in FIG. 8, subsequent to selection of the landmark mode, as noted in block 618 the process may provide for the selection of a particular category and/or type of landmark for which information is to be collected. To this end, in one implementation the processor 118 controls the user interface 126 (including display 146) so as to display information to the technician to facilitate such a selection. In particular, a landmark selection submenu may be displayed, including one or more categories of landmarks displayed in any of a variety of manners (e.g., as a list of text entries, an arrangement of icons symbolizing respective categories, labeled symbols, etc.). Examples of landmark categories that may be displayed in such a submenu include, but are not limited to: 1) "Natural Gas;" 2) "Water/Sewer;" 3) "Power Line;" 4) "Phone Line;" 5) "CATV Line;" and 6) "Other."

Upon selection via the user interface of one of the landmark categories displayed on the submenu, the processor may control the user interface so as to display yet another submenu indicating various types of landmarks that fall within the selected category, so as to facilitate selection of a particular type of landmark for which information is to be collected. Examples of types of landmarks that may be displayed and available for selection via the user interface, for each of the above identified categories, include, but are not limited to:

Natural Gas: 1) Service Meter; 2) Manifold; 3) Test Station; 4) Regulator Station; 5) Vent/Vent stack; 6) Valve; 7) Trace Wire; 8) Anode; 9) Branch Service; 10) Capped Service; 11) Compressor Station; 12) Farm Tap; 13) Service Regulator; 14) Service Line; 15) Service Riser; 16) Shut Off Valve; 17) Tee; 18) Valve Box; 19) Transmission Pipeline; 20) Main/Distribution Main; 21) Offset; 22) Low Pressure; 23) Medium Pressure; 24) High Pressure Water/Sewer: 1) Transmission Main; 2) Water Main; 3) Manhole; 4) Valve; 5) Clean out; 6) Sewer Lateral; 7) Water Meter; 8) Storm Sewer 9) Sanitary Sewer; 10) Pump Station; 11) Tap; 12) Faucet; 13) Fire Hydrant; 14) Tracer Wire Power Line: 1) Pole; 2) Anchor; 3) Transformer; 4) Manhole; 5) Handhole; 6) Street light; 7) Electrical Riser; 8) Primary; 9) Secondary; 10) Switch; 11) Fused Switch; 12) Circuit Breaker; 13) Duct; 14) Power Plant; 15) Transmission Substation; 16) Power Substation; 17) Service Line; 18) Meter; 19) Pedestal; 20) Switch Gear; 21) Switch Cabinet; 22) Buried Transformer; 23) Riser; 24) Red Top Tracer Phone Line: 1) Pole; 2) Anchor; 3) Manhole; 4) Handhole; 5) Subscriber Line Carrier; 6) Digital Loop Carrier; 7) Remote Terminal; 8) Cross Box; 9) Continual environment Vault; 10) Fiber Optics; 11) Encapsulated Plant; 12) Building Terminal; 13) Terminal; 14) Aerial; 15) Buried; 16) Underground; 17) Duct Run; 18) Central Office; 19) Buried Joint; 20) Splice CATV Line: 1) Pole; 2) Anchor; 3) Headend; 4) Manhole; 5) Handhole; 6) Transmitter; 7) Fiber Transmitter; 8) Receiver; 9) Fiber Receiver; 10) HUB Location; 11) Power Supply/Inserter; 12) Fiber Node; 13) Amplifier; 14) Ped; 15) Dog House; 16) Subscriber Service Line; 17) Trunk Station; 18) Trunk Line Amplifier; 19) AC Power Supply Pedestal Other: various natural, architectural, or infrastructure-related landmarks, such as buildings, curbs, "tagged" curbs (intentionally marked curbs that are likely to survive excavation, to serve as points of reference to validate marking operations), streets, driveways, property boundaries, trees and other landscape elements, termination points of abandoned facilities, etc.

While the foregoing discussion of landmark categories and types provides one construct in which a wide variety of landmarks are made available for selection by the technician, it should be appreciated that in other implementations, options for landmark selection may be presented in different manners. For example, a more succinct list of landmark types may be presented to the technician to facilitate easy selection (e.g., a more limited set of about a dozen more common landmark types that might be encountered in the field, such as "telephone pole," "fire hydrant," "meter," "manhole," "curb," etc.). More generally, any number and variety of landmark types may be presented to the technician via the user interface in alphabetically ordered lists, numerically ordered lists, or other types of ordered text-based or symbolic arrangements, for example.

In another exemplary implementation, the categories and/or types of landmarks made available for selection via the user interface may be based at least in part on a type of facility being located when the locate receiver was in a locate mode prior to selection of the landmark mode. For example, consider a technician using the locate receiver in the locate mode and in the process of locating a power line. In one implementation, upon switching to landmark mode, the user is first presented with selection options for landmark category and/or type that are more closely related to a power line (e.g., a more limited subset of option types including "pole," "transformer," "pedestal," etc.). In one aspect, the technician may nonetheless still have the option to select other categories and/or types of landmarks, but as a default the technician is first presented with options related to the type of facility last being located. In another aspect, the selection options for landmark category and/or type may be specifically and intentionally limited to those options that are most germane to the type of facility last being located in the previous locate mode (i.e., immediately prior to entry into the landmark mode).

In yet another exemplary implementation, the user interface may include a microphone and the processor may be configured to accept and process audible commands, such that landmark category and/or type selection may be accomplished via voice-activated commands. For example, once landmark mode is selected, the technician may select a particular landmark category or type by simply speaking into the microphone (e.g., "telephone pole," "fire hydrant," "meter," "manhole," "curb," etc.).

In addition to, or as an alternative to, selection of landmark category and/or type, block 618 may provide for the entry of any of a variety of text information for inclusion as part of the landmark information in an electronic record. For example, in some exemplary implementations, via the user interface and/or display the technician may enter text-based information relating to an environmental landmark (e.g., as an offset to another topological, architectural, or infrastructure feature in proximity to the environmental landmark—"telephone pole 5 ft. from back of curb"). Additionally, in a manner similar to landmark type selection, the user interface/display may provide for menu-driven selection via a GUI of predetermined options for additional text-based information to be included as part of the landmark information (e.g., a set of "stock" text messages for selection to be included as part of landmark information).

Following selection of landmark category and/or type, and/or entry/section of any text-based information in block 618 of the process 800 shown in FIG. 8, in block 620 actuations of the actuator 142 in landmark mode cause the processor to collect various "landmark information" with each actuation, which information is logged in an electronic record as a "landmark event entry" (rather than an actuation event entry, as noted in Table 3 above). Essentially, in landmark mode, the technician positions the locate receiver proximate to a selected category/type of landmark and actuates the actuator (or manipulates a designated user interface control mechanism) to acquire various information relating to the landmark (e.g., geo-location data, type, time stamp).

In general, the processor may be configured to communicate with (e.g., poll) any of a variety of input devices to collect landmark information to be logged in an electronic record. As discussed above in connection with the locate mode (refer again to FIG. 4), such information may be acquired from any of a variety of input devices including, but not limited to, the location tracking system 130, the timing system 128, the communications interface 124 (e.g., a USB port or other port), the user interface 126, and the local memory 122.

In particular, any data that is available from the location tracking system (e.g., any information available in various NMEA data messages, such as coordinated universal time, date, latitude, north/south indicator, longitude, east/west indicator, number and identification of satellites used in the position solution, number and identification of GPS satellites in view and their elevation, azimuth and SNR values, dilution of precision values) may be collected as landmark information and logged in an electronic record as part of a landmark event entry. Additionally, information collected from the user interface in the form of a text entry by the technician may be included in a landmark event entry; for example, in one implementation, upon actuation of the actuator, the processor may prompt the technician via the display of the user interface to enter text notes, if desired (e.g., the technician may describe an offset of a target environmental landmark from an architectural, topographical, or infrastructure feature to compliment geographic information provided by the location tracking system), and this textual information may serve as landmark information. In view of the foregoing, it should be appreciated that "landmark information" may include a wide variety of information components including, but not limited to, one or more of geographical information (e.g., from the location tracking system), timing information (e.g., from the location tracking system and/or the timing system), landmark category and/or type information (e.g., selected or entered via the user interface), textual information (e.g., entered via the user interface), or other information (e.g., received from the local memory and/or the communications interface).

Table 9 below provides an example of content and format for a landmark event entry that may be logged in a file for an electronic record and/or transmitted by the locate receiver when in landmark mode. The example landmark event entry shown below in Table 9 also follows a similar format to that used for the event entry examples provided in Tables 2-5 above.

TABLE 9

| | |
|---|---|
| Format | INFO+LMRK: (DATE) (TIME) (GPS data) (CATEGORY, TYPE)(TEXT) <CR><LF> |
| Examples | INFO+LMRK: DATE(2009-04-15) TIME(12:04:44) GPS($GPGGA, 120443, 4807.038, N, 01131.000, E, 1, 08, 0.9, 545.4, M, 46.9, M,, *47) LMRK(3, 12)("Panel mounted rear wall of shed")<CR><LF> |

In the example landmark event entry given in Table 9, the landmark information includes a time stamp (e.g., DATE and TIME), geographical information (e.g., GPS data), category/type information, and text-based information for an environmental landmark. The notation LMRK (3,12) in the example denotes a category 3, type 12 landmark which, in the exemplary listings provided above, corresponds to "Power Line," "Circuit Breaker." It should be appreciated that the event entry shown in Table 9 is provided primarily for purposes of illustration, and that a variety of other or additional landmark information may be included in landmark event entries, as noted above.

As with the event entry examples provided in Tables 2-5 above, the exemplary format for a mode select and landmark event entry as shown in Tables 8 and 9 may be included in either an ASCII and XML file format for an electronic record that is stored and/or transmitted by the locate receiver (in which a particular naming scheme/format may be adopted to identify files/electronic records, such as "ServerID_LocRecID_Job ID"). It should also be appreciated that an electronic record generated by a multi-mode locate receiver in some instances may include a mixture of actuation event entries and landmark event entries, actuation event entries without any landmark event entries, and landmark event entries without any actuation event entries.

Yet another alternative format for storing and organizing landmark information in an electronic record, according to one embodiment of the invention, is shown in Tables 10 and 11 below. By way of example, Table 10 shows the format and content of an electronic record entry for a utility pole, which includes one geo-location data point, and Table 11 shows the format and content of an electronic record entry for a pedestal, which includes four geo-location data points (i.e., one for each corner of the pedestal). It should be appreciated that the format and content shown below in Tables 10 and 11 is provided primarily for purposes of illustration and, as noted above, a variety of format and content may be included in an electronic record entry for landmark information. The examples provided in Tables 10 and 11 may constitute an "original" electronic record generated by the processor pursuant to the process 800 shown in FIG. 8, or may be derived from raw data collected and logged pursuant to the process 800 (e.g., as a flat file, an ASCII formatted file, or an XML formatted file) and subsequently reorganized and particularly formatted. It should also be appreciated that the examples provided in Tables 10 and 11 illustrate that landmark information may be included in an electronic record together with one or both of ticket information and service-related information, as discussed above in connection with electronic records including various locate information.

TABLE 10

Example record of data acquired for a utility pole while in landmark identification mode of operation

| | | |
|---|---|---|
| Record #1 | Service provider ID | 0482 |
| | User ID | 4815 |
| | Device ID | 7362 |
| | Type of EL | Type = utility pole |
| | timestamp data | 12-Jul-2008; 09:35:17.5 |
| | geo-location data | 2650.9256, N, 08003.5234, W |
| | Other info (text entry) | "5 ft. from back of curb" |
| | Locate request data | Requestor: XYZ Construction Company, Requested service address: 222 Main St, Orlando, FL |

TABLE 11

Example record of data acquired for a pedestal while in landmark identification mode of operation

| | | |
|---|---|---|
| Record #2 | Service provider ID | 0482 |
| | User ID | 4815 |
| | Device ID | 7362 |
| | Type of EL | Type = pedestal |
| | timestamp data | 12-Jul-2008; 09:35:17.5 |
| | geo-location data | 2650.9256, N, 08003.5234, W |
| | Type of EL | Type = pedestal |
| | timestamp data | 12-Jul-2008; 09:35:21.2 |
| | geo-location data | 2650.9256, N, 08003.5226, W |
| | Type of EL | Type = pedestal |
| | timestamp data | 12-Jul-2008; 09:35:26.7 |
| | geo-location data | 2650.9288, N, 08003.5188, W |
| | Type of EL | Type = pedestal |
| | timestamp data | 12-Jul-2008; 09:35:33.5 |
| | geo-location data | 2650.9321, N, 08003.5177, W |
| | Other info (text entry) | "7 ft from pavement edge" |
| | Locate request data | Requestor: XYZ Construction Company, Requested service address: 222 Main St, Orlando, FL |

Figure 9:
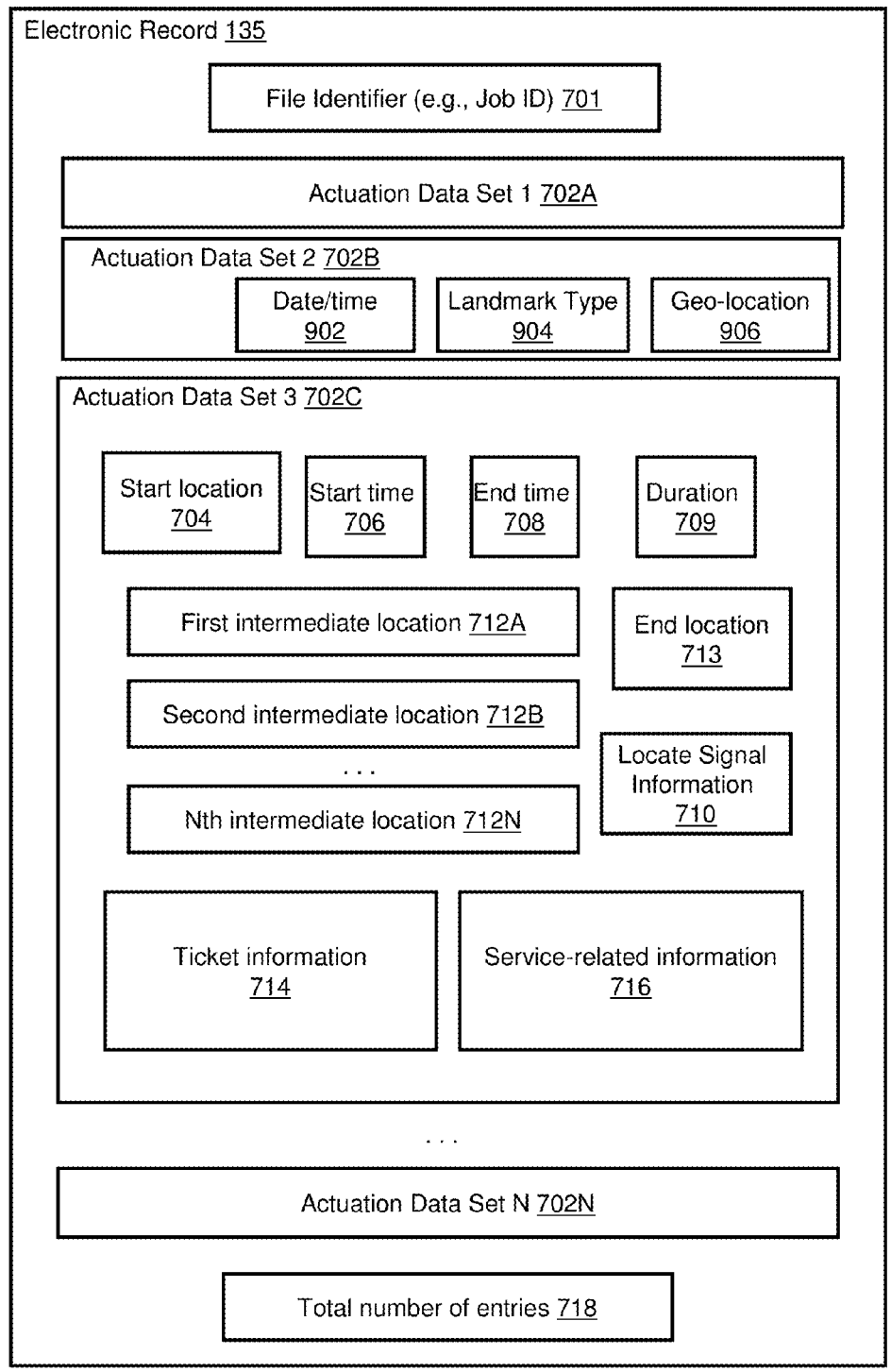
FIG. 9 is a block diagram of an exemplary data structure for an electronic record of a locate operation including both locate information and landmark information retrieved during actuations of a locate device, according to one embodiment of the present invention.

FIG. 9 is a block diagram similar to FIG. 7 and illustrates an exemplary data structure for an electronic record 135 that includes both locate information and landmark information (i.e., that may be generated by and/or based on information collected during the process 800 discussed above in connection with FIG. 8 and based on the organization of information shown in Tables 10 and 11 above). Like the exemplary electronic record shown in FIG. 7, the record 135 in FIG. 9 includes a file identifier 701 (e.g., one or more of Job ID, LocRecID, ServerID, etc.) and a plurality of actuation data sets 1 through N (with reference numbers 702A, 702B, 702C . . . 702N), wherein each actuation data set is associated with a corresponding actuation of a locate receiver. In FIG. 9, also as in FIG. 7, additional details of the data structure for actuation data set 3 702C are shown, relating to locate information collected in locate mode. However, unlike FIG. 7, FIG. 9 shows that the actuation data set 2 702B relates to landmark information acquired pursuant to an actuation in landmark mode; in particular, the actuation data set 2 702B includes a date/time field 902, a type field 904, and a geo-location field 906 corresponding to a landmark event entry.

In other respects, the data structure in FIG. 9 is similar to that shown in FIG. 7. For example, various other information that may be common to multiple (or all) actuation data sets of a given electronic record may be stored in one or more additional elements of the electronic record that are not contained within one or more of the actuation data sets themselves (e.g., one or more of the ticket information field 714, the service-related information field 716, and the locate signal information field 710, which are shown as part of the data structure for a given actuation data set of the electronic record, may instead be elements of the electronic record that are common to all actuation data sets of a given electronic record).

Once an actuation of the locate receiver in landmark mode has been logged as a landmark event entry, the process 800 shown in FIG. 8 returns to block 610. At this point, the technician is provided (via the user interface/display) with the options of pausing the job (block 610), restarting the job if previously paused (block 612), stopping the job and indicating completion (block 614) or selecting landmark mode again (block 616) for the next actuation. If the technician selects none of these options, the process returns to block 608, at which point further polling and/or interrupt events are logged, as discussed above in connection with FIG. 6. Accordingly, after an actuation in landmark mode, in one exemplary implementation the locate receiver defaults back to the locate mode, unless and until the technician selects the landmark mode again for a subsequent actuation.

In an alternative implementation not shown in FIG. 8, following actuation of the locate receiver in landmark mode, the processor may control the user interface/display to provide an option to the technician to exit landmark mode (rather than automatically presenting the options of pause job, restart job, stop job, or landmark mode). In this manner, the locate receiver remains in landmark mode for subsequent actuations until the technician makes a menu selection to exit landmark mode, at which point the process 800 returns to block 610.

In yet another embodiment, the processor 118, executing locate data algorithm 137 in landmark mode, may be configured to generate an essentially continuous stream of data packets representing various event entries logged by the locate receiver (e.g., as shown above in Tables 2-9). As discussed above in connection with the locate mode, each data packet may include a header, one or more flag fields, and one or more information payload fields. To accommodate both a locate mode and a landmark mode, one flag field may be set or reset upon selection of the landmark mode so as to identify the contents of any information payload field in the data packet as landmark information as opposed to locate information. Similarly, as discussed above, one or more other flag fields may be set (or reset) upon occurrence of one or more predetermined interrupt events (e.g., pull/depress actuator, release actuator, automatic logging of data, low power, communication link fail, etc.). In this manner, a continuous stream of data may be provided as an output by the processor, in which certain interrupt events, such as an actuation and/or release of the actuator, "tag" certain data packets via an interrupt flag, and certain data packets also may be tagged as generated in locate mode or landmark mode. In yet other aspects of this embodiment, all data packets thusly generated may be stored in the file opened for the electronic record and/or transmitted from the locate receiver in essentially real time; alternatively, only certain data packets with one or more predetermined flags set may be stored and/or transmitted.

Thus, in landmark identification mode, a locate technician may employ an appropriately configured locate receiver to capture the types and locations of environmental landmarks of interest that are present at the work site and/or in the general environs of a dig area. While in landmark mode, the locate technician may approach a certain environmental landmark, then select the type of the environmental landmark via user interface, position the locate receiver (e.g., place the tip of locate receiver) proximate to the target environmental landmark, and then actuate the locate receiver. In doing so, the locate receiver logs in an electronic record landmark information including, for example, the type of the target environmental landmark, the geo-location of the target environmental landmark, and a time stamp in an electronic record. The locate technician may move from one environmental landmark to the next until information about all environmental landmarks of interest has been captured. Additionally, one or more data points (e.g., "landmark event entries") may be captured for any given environmental landmark.

V. Computer-Generated Visual Representation of a Locate Operation Including Locate Information and Landmark Information With reference again to FIGS. 4 and 5, in yet another embodiment the processor 118, executing locate data algorithm 137, and/or one or more remote computers 150 executing locate data algorithm 137, may additionally process various locate information and/or landmark information provided in real time from a locate receiver and/or stored in an electronic record of locate operation and control a display device (e.g., display 146 of locate receiver 110 or some other display device) to render a computer-generated visual representation of one or both of the locate information and landmark information. Such a visual representation may be used, for example, to provide immediate feedback to the locate technician, provide essentially real-time feedback to a supervisor monitoring the technician from a remote location, provide a visual record of the locate information and/or the landmark information (e.g., for archiving purposes, once one or more electronic records are generated), and/or to verify the quality (e.g., accuracy and completeness) of work performed during a locate and marking operation. For purposes of the following discussion, a "locate operation" may refer to one or both of the processes of collecting locate information and landmark information. Accordingly, it should be appreciated that in various exemplary implementations of a computer-generated visual representation, only locate information may be visually rendered, only landmark information may be visually rendered, or both locate information and landmark information may be visually rendered.

In various aspects of this embodiment, a visual representation may be static in that all available locate information and/or landmark information is presented in a display field at one time after generation of an electronic record; alternatively, the visual representation may be dynamic in that locate information and/or landmark information is displayed in essentially real-time as it is collected, or may be displayed after generation of the electronic record in a time-sequenced animation that "recreates" the collection of information on the time scale in which it was originally acquired (e.g., based on the time stamps indicating when the information was acquired).

In other aspects, the relative positions of one or more detected facilities, as represented by actuation event entries and/or interrupt event entries (e.g., representing automatically logged locate information) logged and/or transmitted by the locate receiver, as well as the relative positions of all environmental landmarks represented by landmark event entries logged and/or transmitted by the locate receiver, may be displayed (e.g., based on geo-location data and some appropriate scale of an available display field of display 146) to provide a visual representation of the locate operation. A visual representation of a locate operation may also be rendered in one or more particular colors corresponding to one or more particular underground facilities detected during the locate operation (e.g., see Table 7).

In one exemplary implementation, such a visual representation may include one "electronic detection mark" displayed in a display field for each actuation of a locate receiver. Alternatively, in another exemplary implementation of such a visual representation, an essentially continuous solid line (or other line type) may be displayed in a display field to represent a given underground facility detected during a locate operation. In another aspect, the processor may process the geo-location data in respective actuation data sets of an electronic record so as to filter, average, interpolate and/or otherwise "smooth" data (e.g., so as to provide "cleaner" visual renderings and/or connect successive electronic detection marks represented by the respective actuation data sets of the electronic record); alternatively, "raw data" provided by the locate receiver may be utilized for the visual representation. In yet another aspect of this embodiment, visual representations of multiple locate operations for different underground facilities within the same work site/dig area may be generated in the same display field of a display device so as to provide a composite visual representation, in which different underground facilities may be uniquely identified in some manner (e.g., by different line types and/or different colors), and one or more environmental landmarks in and/or around the work site/dig area may be identified using a variety of displayed identifiers (e.g., icons, symbols, marks, shapes, etc.).

Figure 10:
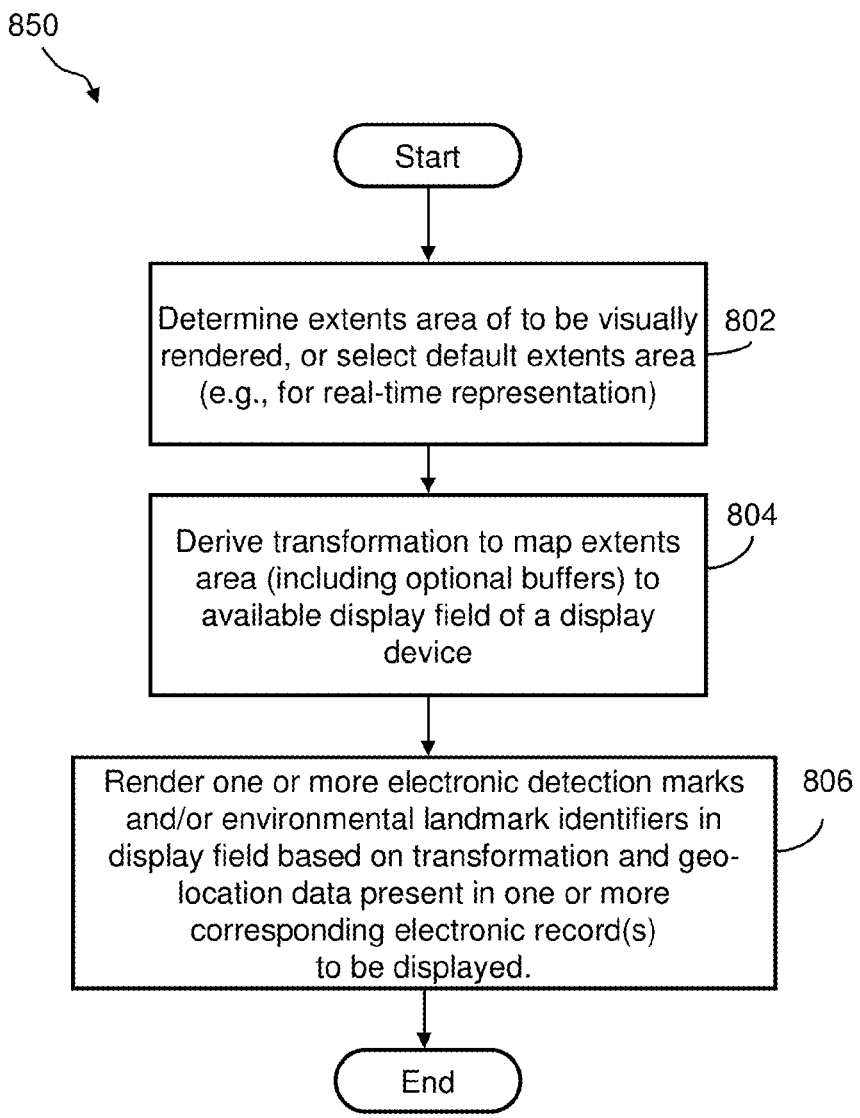
FIG. 10 is a flow diagram of an exemplary method for displaying a visual representation of a locate operation in a display field having a predetermined scale, according to one embodiment of the present invention.

FIG. 10 illustrates a flow chart for a process 850 according to one embodiment of the present invention for generating a visual representation of a locate operation based on an electronic record and/or essentially real-time information transmission from the locate receiver 110. As noted above, the process 850 may result from the execution of various embodiments of the locate data algorithm 137 on the processor 118 of the locate receiver 110 (to render the visual representation on the display 146 of the locate receiver), or by one or more other remote computers (to render the visual representation on one or more other display devices).

In block 802 of the process 850, if an electronic record has already been generated for the locate operation in which one or more underground facilities are detected and/or environmental landmark information is acquired, the record is examined to determine the geographic extents of the electronic detection marks and/or environmental landmarks to be visually rendered on a display device. In particular, the processor 118 may review the geo-location data of all elements/actuation data sets of the electronic record to determine (e.g., based on the respective latitude and longitude coordinates of the available geo-location data) the maximum extents of the locate operation to be visually rendered.

The maximum extents of the locate operation may be determined in any of a variety of manners according to different exemplary implementations. For example, in one exemplary implementation, in block 802 the processor 118 may determine the centroid of all electronic detection marks and/or environmental landmarks represented by the data of the electronic record to be displayed. The processor then determines the geographic extent of the collection of electronic detection marks and/or environmental landmarks by determining one or more latitude/longitude coordinate pairs from the available data having a greatest distance from the centroid. In one example, the processor may determine a single farthest point from the centroid, and a distance between this farthest point and the centroid serves as a radius of a circle that provides an "extents area circle." In another example, the "farthest opposing corners" of a rectangle around the centroid may be determined by assigning the centroid as the origin of a reference coordinate system, and finding the coordinate pairs in opposing quadrants of the coordinate system having a greatest distance from the centroid (e.g., the +LAT/+LONG and −LAT/−LONG coordinate pairs at a greatest distance from the origin) to provide an "extents area rectangle." Other types of polygons and closed shapes (ovals) may be employed to provide an extents area for the locate operation to be displayed.

Alternatively, if an electronic record has not been previously generated and information received in essentially real-time from the locate receiver is to be displayed in a display field, a default extents area may be selected in advance based on any of a variety of criteria. For example, address and/or site description information provided in a ticket pursuant to which the locate operation is performed may provide a basis on which an extents area for the locate operation may be estimated a priori. Similarly, as discussed further below in connection with FIG. 13, an available digital image of the work site/dig area may be employed to determine or estimate an initial extents area for the locate operation.

In block 804, the extents area of the locate operation to be visually rendered is then mapped to an available display field of a display device, using any appropriate scaling factor as necessary, to ensure that all of the geo-location data in the electronic record fits within the display field. For example, in one exemplary implementation, a transformation may be derived using information relating to the available display field (e.g., a reference coordinate system using an appropriate scale for a given display field of a display device) to map data points within the extents area to the available display field. In another aspect of this example, a buffer area around the extents area may be added to provide one or more suitable margins for the displayed visual representation, and/or to accommodate different shapes of extents areas to the available display field of the display device, and an appropriate transformation may be derived based on this optional additional buffer area.

Once a transformation is derived to map the locate operation extents area to the available display field of a display device, in block 806 one or more electronic detection marks and/or one or more identifiers (e.g., icons, symbols, marks, shapes, etc.) for environmental landmarks is/are rendered in the display field based on applying the transformation to the geo-location data present in the data set of the electronic record (which in some instances may include one or more actuation data sets). In one exemplary implementation, one electronic detection mark is rendered in the display field for each actuation data set of an electronic record. In one aspect, as discussed above, a given electronic detection mark may be rendered in a particular color and/or line type to represent a type of underground facility represented by the mark.

Figure 11:
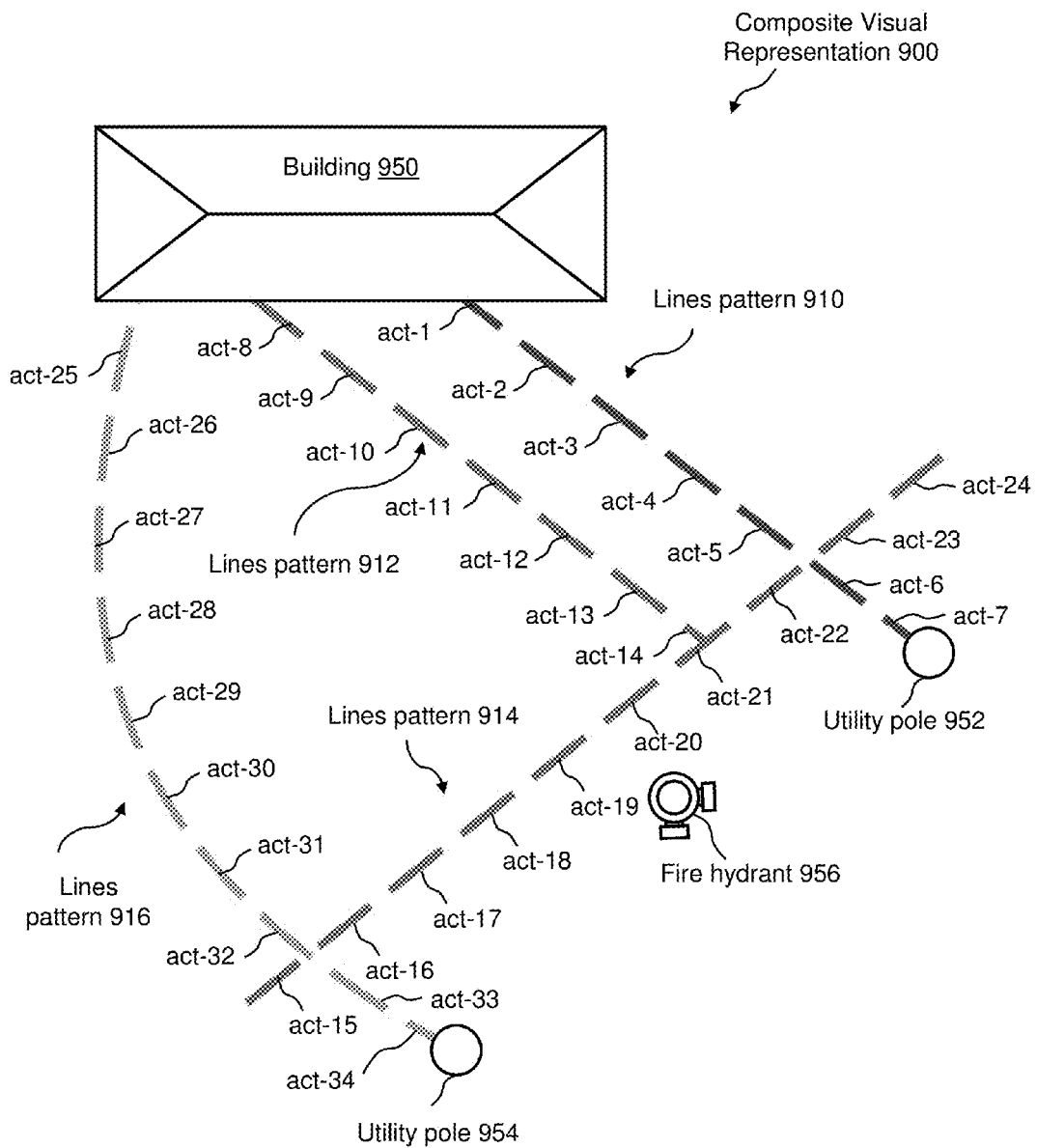
FIG. 11 is an example of a visual representation showing electronic detection marks and identifiers for environmental landmarks based on data collected by a locate receiver during a locate operation, according to one embodiment of the present invention.

FIG. 11 illustrates a plan view of an exemplary composite visual representation 900 that "electronically recreates" a locate operation for various underground facilities and environmental landmarks present in a work site/dig area, based for example on the process 800 discussed above in connection with FIG. 8. In particular, FIG. 11 illustrates a number of electronic detection marks corresponding to actuations and/or automatic logging interrupt events of a locate receiver whose relative positions in the display field are derived from the corresponding geo-location data in an electronic record, as discussed above. In the example of FIG. 11, act-1 through act-7 form a lines pattern 910 representing a first detected underground facility, act-8 through act-14 form a lines pattern 912 representing a second detected underground facility, act-15 through act-24 form a lines pattern 914 representing a third detected underground facility, and act-25 through act-34 form a lines pattern 916 representing a fourth detected underground facility. FIG. 11 also includes identifiers for various environmental landmarks disposed in proximity to the electronic detection marks; in particular, a building 950 is shown in the top portion of FIG. 11, whereas two utility poles 952 and 954, as well as a fire hydrant 956, are shown in the bottom portion of FIG. 11.

Figure 12:
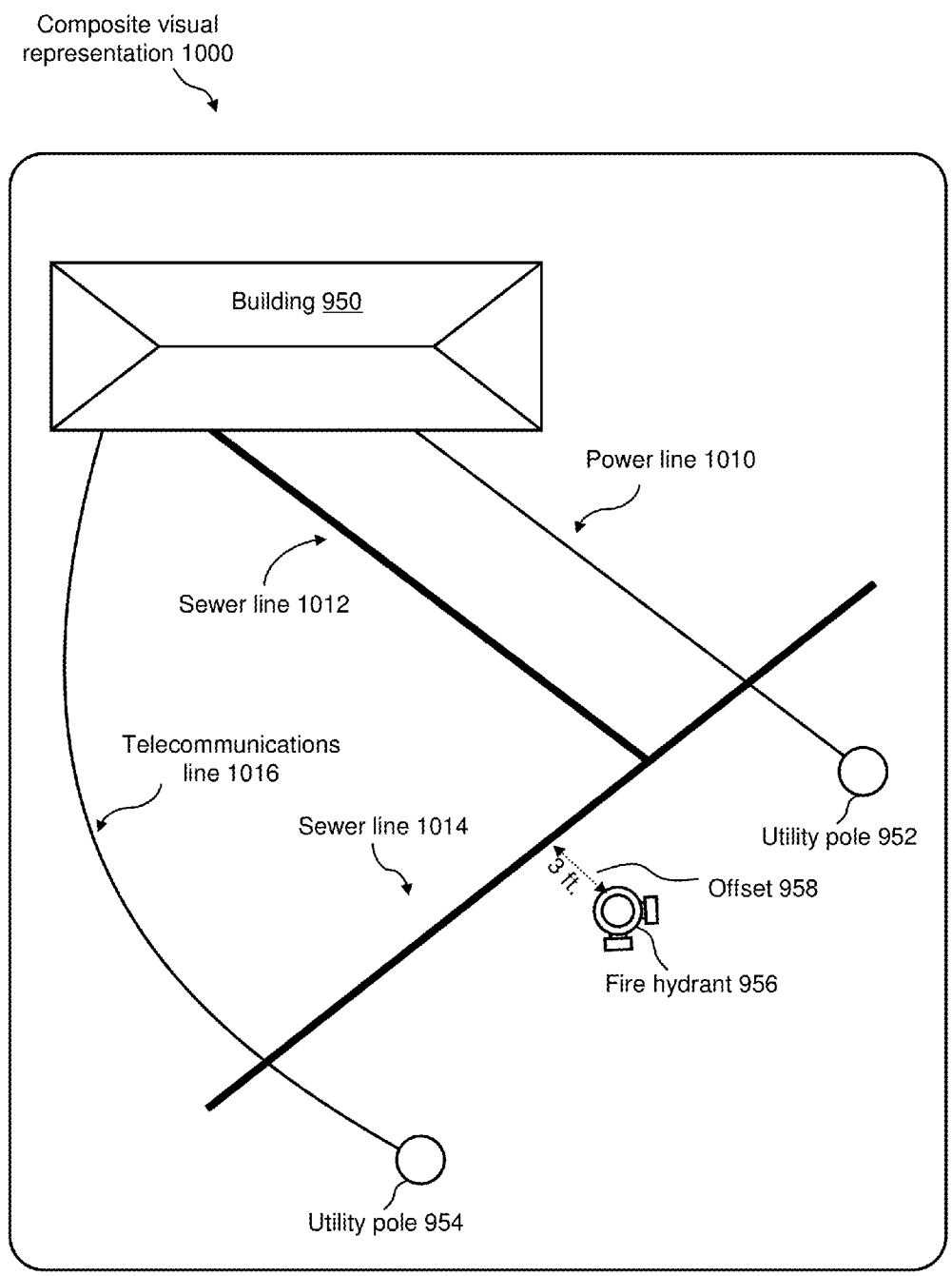
FIG. 12 is an example of another visual representation of locate operations, according to one embodiment of the present invention.

As noted above, while in one embodiment there may be a one-to-one correspondence between electronic detection marks rendered in a single or composite visual representation and actuations/automatic data logging interrupt events of a locate receiver, in yet other embodiments a single or composite visual representation may provide a variety of other indicators/digital representations of detected underground facilities in a computer-generated visual rendering. For example, FIG. 12 illustrates another example of a composite visual representation 1000 based on the same electronic record used to generate the composite visual representation 900 of FIG. 11, in which continuous lines are used to indicate the respective locate operations. To this end, in one exemplary implementation, an additional step may be included in the process 800 shown in FIG. 8, in which the processor may process the locate geo-location data in an electronic record by filtering, averaging, interpolating and/or otherwise "smoothing" the data (e.g., so as to connect successive discrete detection marks represented by respective actuation data sets/event entries of the electronic record) and thereby provide a substantially smooth continuous line for display.

Similarly, filtering, averaging, interpolating, processing and/or otherwise smoothing of data may be applied to landmark information captured in landmark event entries. For example, multiple event entries logged for a particular environmental landmark (e.g., the four corners of a pedestal) may be processed so as to provide a single point in a display field at which to display a symbol, icon or other identifier for an environmental landmark. Such processing may include, for example, selecting any one of multiple geo-location coordinates captured in multiple event entries as representative of the landmark location, calculating a centroid of all points represented by captured coordinates, "pre-filtering" a collection of coordinates to eliminate significant "outliers" and subsequently determining a centroid of the remaining coordinates, etc.

In the example of FIG. 12, as also noted above, different underground facility types may be indicated in different color lines, and the different colors/facility types may be derived from the electronic record (e.g., based on the correlations provided in Table 7). Furthermore, in other aspects, text indicators may be included in the visual representation, and/or other types of coding may be used (different line styles such as patterns, width, bold, etc.; a succession of symbols or other graphic icons, etc.) to indicate different facility types, and/or some other aspect of a given facility (e.g., the material used for a particular pipe, conduit, cable, sheathing; the diameter of a particular pipe, conduit, cable; offsets to one or more environmental landmarks, etc.). By way of example, FIG. 12 indicates that the four underground facilities in the composite visual representation correspond to a power line 1010 (which may be rendered in the color red), a first sewer line 1012 (which may be rendered in the color green), a second sewer line 1014 (which also may be rendered in the color green), and a telecommunications line 1016 (which may be rendered in the color orange). An exemplary composite visual representation may include additional textual, numeric and/or graphic elements to provide other information available in the electronic record for the locate operations (e.g., timestamp information, ID information, coordinates for location information, offset indications, etc.). For example, in FIG. 12 an offset 958 of 3 feet is indicated between the fire hydrant 956 and the sewer line 1014.

Figure 13:
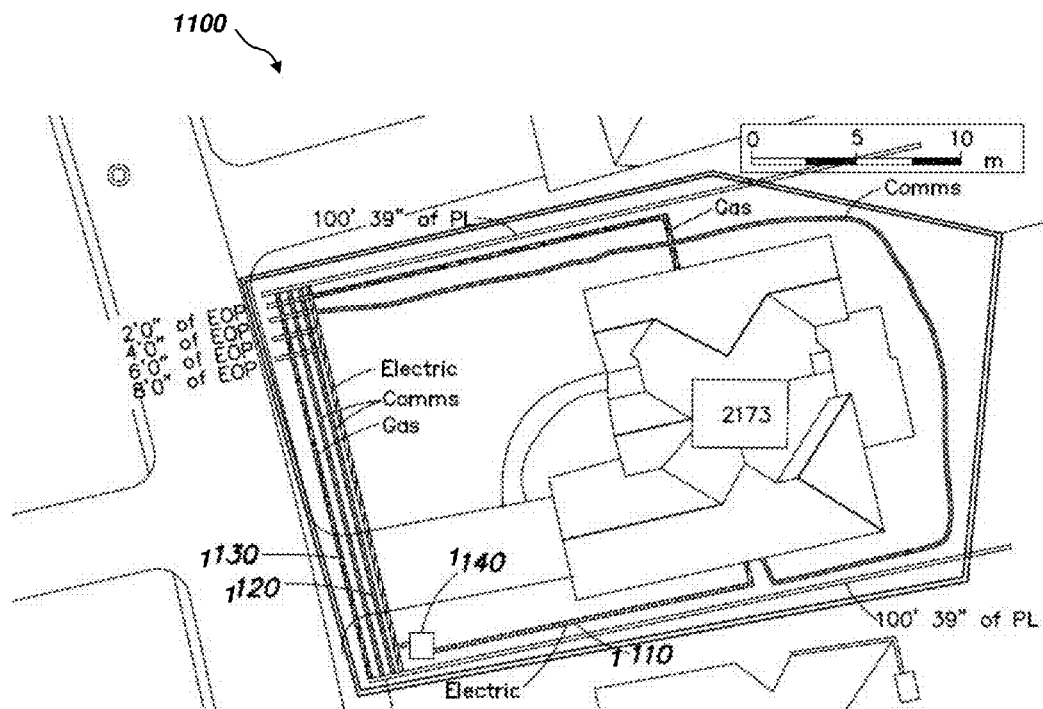
FIG. 13 is an example of another visual representation of a locate operation, according to another embodiment of the present invention, in which electronic detection marks and identifiers for environmental landmarks are overlaid on a digital image of a work site/dig area.

In yet another embodiment, a single or composite visual representation of a locate operation, including one or both of locate information and landmark information, may be rendered on a display device together with a digital image representative of at least a portion of a dig area at a work site, such that one or more electronic detection marks and/or one or more identifiers for environmental landmarks appear in appropriate relative positions overlaid on the displayed digital image. FIG. 13 illustrates yet another example of a composite visual representation 1100, albeit based on an electronic record different than that used to generate the visual representations of FIGS. 11 and 12, in which continuous lines are used to indicate the respective different underground facilities detected, and these lines are overlaid on a digital image of a dig area, together with identifiers for environmental landmarks. It should be appreciated that although continuous lines representing underground facilities are depicted on a digital image in FIG. 13, in other embodiments discrete electronic detection marks corresponding to successive actuations/automatic logging interrupt events of the locate receiver may be overlaid on a digital image of the dig area.

In the embodiment of FIG. 13, a number of different image sources and image types may be employed to provide the digital image on which a visual representation of a locate operation may be overlaid. For purposes of the present disclosure, such a digital image (also referred to herein as an "input image") may be any image represented by source data that is electronically processed (e.g., the source data is in a computer-readable format) to display the image on a display device. An input image may include any of a variety of paper/tangible image sources that are scanned (e.g., via an electronic scanner) or otherwise converted so as to create source data (e.g., in various formats such as XML, PDF, JPG, BMP, etc.) that can be processed to display the input image. An input image also may include an image that originates as source data or an electronic file without necessarily having a corresponding paper/tangible copy of the image (e.g., an image of a "real-world" scene acquired by a digital still frame or video camera or other image acquisition device, in which the source data, at least in part, represents pixel information from the image acquisition device).

In some exemplary implementations, input images according to the present disclosure may be created, provided, and/or processed by a geographic information system (GIS) that captures, stores, analyzes, manages and presents data referring to (or linked to) location, such that the source data representing the input image includes pixel information from an image acquisition device (corresponding to an acquired "real world" scene or representation thereof), and/or spatial/geographic information ("geo-encoded information").

In view of the foregoing, various examples of input images and source data representing input images according to the present disclosure, to which the inventive concepts disclosed herein may be applied, include but are not limited to:

Manual "free-hand" paper sketches of the geographic area (which may include one or more buildings, natural or man-made landmarks, property boundaries, streets/intersections, public works or facilities such as street lighting, signage, fire hydrants, mail boxes, parking meters, etc.);

Various maps indicating surface features and/or extents of geographical areas, such as street/road maps, topographical maps, military maps, parcel maps, tax maps, town and county planning maps, call-center and/or facility polygon maps, virtual maps, etc. (such maps may or may not include geo-encoded information);

Facility maps illustrating installed underground facilities, such as gas, power, telephone, cable, fiber optics, water, sewer, drainage, etc. Facility maps may also indicate street-level features (streets, buildings, public facilities, etc.) in relation to the depicted underground facilities. Examples of facility maps include CAD drawings that may be created and viewed with a GIS to include geo-encoded information (e.g., metadata) that provides location information (e.g., infrastructure vectors) for represented items on the facility map;

Architectural, construction and/or engineering drawings and virtual renditions of a space/geographic area (including "as built" or post-construction drawings);

Land surveys, i.e., plots produced at ground level using references to known points such as the center line of a street to plot the metes and bounds and related location data regarding a building, parcel, utility, roadway, or other object or installation;

A grid (a pattern of horizontal and vertical lines used as a reference) to provide representational geographic information (which may be used "as is" for an input image or as an overlay for an acquired "real world" scene, drawing, map, etc.);

"Bare" data representing geo-encoded information (geographical data points) and not necessarily derived from an acquired/captured real-world scene (e.g., not pixel information from a digital camera or other digital image acquisition device). Such "bare" data may be nonetheless used to construct a displayed input image, and may be in any of a variety of computer-readable formats, including XML);

Photographic renderings/images, including street level, topographical, satellite, and aerial photographic renderings/images, any of which may be updated periodically to capture changes in a given geographic area over time (e.g., seasonal changes such as foliage density, which may variably impact the ability to see some aspects of the image); and An image, such as any of the above image types, that includes one or more dig area indicators that provide one or more indications of or graphically delimit a dig area, as described in U.S. patent application Ser. No. 12/366, 853, published as U.S. Patent Publication No. 2009-0238417-A1, incorporated by reference herein. The virtual white lines may include lines, drawing shapes, shades, symbols, coordinates, data sets, or other indicators that are added to an image, and may assist a locate technician in the performance of a locate operation by identifying the area of interest, i.e., the dig area. In this manner, a searchable electronic record according to the concepts disclosed herein may be generated based on a previously marked-up input image on which the dig area is indicated.

It should also be appreciated that source data representing an input image may be compiled from multiple data/information sources; for example, any two or more of the examples provided above for input images and source data representing input images, or any two or more other data sources, can provide information that can be combined or integrated to form source data that is electronically processed to display an image on a display device.

As noted above, in some implementations an input image may be indexed to Global Positioning System (GPS) coordinates or another coordinate system that provides geo-spatial positioning. An input image may include geo-coding or other geographical identification metadata and may be provided in any computer-readable format. An input image may also include images of map symbols, such as roads and street names, that may be superimposed upon or displayed separately from an underlying geographic area when the input image is displayed on a display device.

Based on the foregoing, a digital image may be displayed in an available display field of a display device either before or after electronic detection marks and/or identifiers for environmental landmarks are displayed in the available display field. For example, in one implementation, after the block 806 in FIG. 10, all or a portion of the digital image may be mapped to the available display field based on any relevant geographic information accompanying the digital image (e.g., GPS coordinates to which the image is indexed). Alternatively, the digital image may be mapped first to the available display field of the display device depending on appropriate scaling and/or transformation parameters as would be readily appreciated by one of ordinary skill in the art, and thereafter one or more electronic detection marks and/or one or more identifiers for environmental landmarks similarly may be mapped to the available display field in appropriate positions relative to the underlying digital image. In the example of FIG. 13, a first visual representation of a gas line 1130 is depicted, a second visual representation of a communication line 1120 is depicted, and a third visual representation of an electric line 1110 is depicted on an aerial image of a residential dig area for purposes of illustration. As discussed above in connection with other embodiments, these visual representations may be displayed in different colors and/or line types to denote different types of underground facilities and/or various attributes of a given facility. As also illustrated in FIG. 13, other types of features may be included as part of the displayed image, including various environmental landmarks such as junction boxes or transformers 1140, streets, property boundaries, tie-downs (reference lines between detected and/or marked facilities and environmental landmarks and/or property boundaries) and their associated dimensions, and one or more text boxes 2173 (e.g., to indicate an address of the work site over the residence), and the like.

In some implementations, locate information and landmark information, if displayed together, may be differentiated in a display field in any of a variety of manners (e.g., different line types, symbols or patterns; different colors or shades of related colors; artificially offset from each other in the display field if locate information and landmark information overlap or are sufficiently close to each other in some instances, etc.) to allow for sufficient visual perception of both locate information and landmark information.

Figure 14:
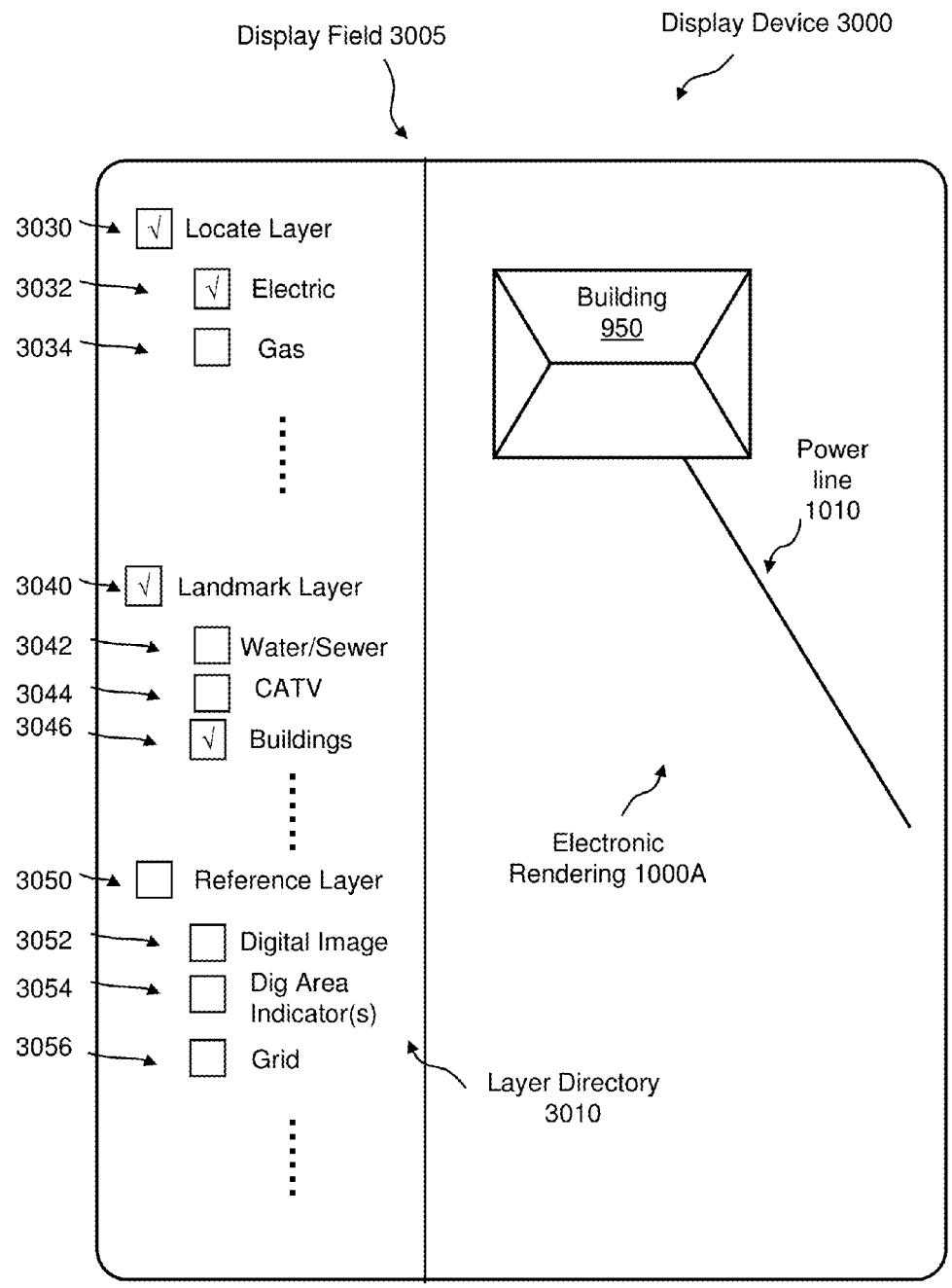
FIG. 14 shows a generic display device having a display field in which one or more display layers and/or sub-layers of locate information, landmark information and/or image/reference information may be selectively enabled or disabled for display, according to one embodiment of the present invention.

Additionally, in one embodiment, each of locate information and landmark information, if present in a computer-aided visual rendering, as well as any constituent information forming part of the locate information and landmark information, may be displayed as separate "layers" of the visual rendering, such that a viewer of the visual rendering may turn on and turn off displayed information based on a categorization of the displayed information. FIG. 14 shows a generic display device 3000 having a display field 3005 with exemplary content for purposes of explaining some concepts germane to display layers, according to one embodiment. For example, all locate information may be categorized generally under one layer designation 3030 ("locate layer") and independently enabled or disabled for display accordingly, and all landmark information may be categorized generally under yet another layer designation 3040 ("landmark layer") and independently enabled or disabled for display accordingly. Respective layers may be enabled or disabled for display in any of a variety of manners; for example, in one implementation, a "layer directory" or "layer legend" pane 3010 may be included in the display field 3005 (or as a separate window selectable from the display field of the visual rendering), showing all available layers, and allowing a viewer to select each available layer to be either displayed or hidden, thus facilitating comparative viewing of layers.

Furthermore, any of the above-mentioned general categories for layers may have sub-categories for sub-layers, such that each sub-layer may also be selectively enabled or disabled for viewing by a viewer. For example, under the general layer designation of "locate layer," different facility types that may have been detected during a locate operation (and indicated in the locate information by color, for example) may be categorized under different sub-layer designations (e.g., designation 3032 for "locate layer—electric;" designation 3034 for "locate layer—gas;" etc.); in this manner, a viewer may be able to hide only the electric locate information while viewing the gas locate information, or vice versa, in addition to having the option to view or hide all locate information. Sub-layer designations similarly may be employed for the landmark information (e.g., designation 3042 for "landmark layer—water/sewer;" designation 3044 for "landmark layer—CATV;" designation 3046 for "landmark layer—buildings"). As shown in the example of FIG. 14, both the locate and landmark layers are enabled for display; amongst the illustrated sub-layer designations, only the "electric" sub-layer of the locate layer is enabled for display, and only the "buildings" sub-layer of the landmark layer is enabled for display. Accordingly, using the exemplary composite visual representation 1000 shown in FIG. 12 as a baseline for purposes of illustration, only the power line 1010 appears in the electronic rendering 1000A shown in FIG. 14 as a constituent element of the electric sub-layer of the locate layer, together with the building 950.

Virtually any characteristic of the information available for display may serve to categorize the information for purposes of display layers or sub-layers. In particular, any of the various exemplary constituent elements of locate information discussed herein (e.g., timing information, geographic information, service-related information, ticket information, target object information, locate signal information, locate receiver information, transmitter information, environmental information, and operational information, the latter two of which are discussed in greater detail further below) may be categorized as a sub-layer, and one or more sub-layers may further be categorized into constituent elements for selective display (e.g., as sub-sub-layers). Similarly, any of the various exemplary constituent elements of landmark information discussed herein (e.g., geo-location data of an environmental landmark, type of environmental landmark, a time stamp for any acquired information relating to an environmental landmark) may be categorized as a sub-layer (and any sub-layer may be further categorized into sub-sub-layers, and so on).

It should further be appreciated that, according to various embodiments, the attributes and/or type of visual information displayed as a result of selecting one or more layers or sub-layers is not limited. In particular, visual information corresponding to a selected layer or sub-layer may be electronically rendered in the form of one or more lines or shapes (of various colors, shadings and/or line types), text, graphics (e.g., symbols or icons), and/or images, for example. Likewise, the visual information corresponding to a selected layer or sub-layer may include multiple forms of visual information (one or more of lines, shapes, text, graphics and/or images).

As a non-limiting illustrative example, a "target object" sub-layer of a "locate" layer may include respective sub-sub-layers of different facility types detected, in which respective facility types are rendered on the display as lines having different colors, line types and/or shading. A "locate signal" sub-sub-sub-layer of a facility type sub-sub-layer of a "target object" sub-layer may include respective sub-sub-sub-sub-layers of different signal characteristics (e.g., frequency, amplitude, phase, gain), in which different signal values are rendered on the display as text (e.g., in proximity to the visual rendering of the detected facility line of the corresponding type). Similarly, a "temperature" sub-layer of a "locate" layer may include ground temperatures sensed during detection of respective facility lines, in which sensed temperatures are rendered on the display as an icon/symbol in combination with text (e.g., a snowflake accompanied by a text label "15 deg. F.") in proximity to the visual rendering of the detected facility line. From the foregoing, it may be appreciated that a wide variety of information may be categorized in a nested hierarchy of layers, and information included in the layers may be visually rendered, when selected/enabled for display, in a variety of manners.

In addition to the locate information and/or the landmark information, in yet other embodiments in which a digital image is rendered in the display field (e.g., as shown in FIG. 13), the image information on which the digital image is based may be categorized as its own display layer, such that the locate information, landmark information, and image information may be selectively enabled or disabled for display as a display layer. In this manner, the displayed digital image on which one or both of locate information and landmark information may be overlaid (and in some instances constituent elements thereof) may be toggled on and off conveniently for comparative display.

In one exemplary implementation, all image information may be categorized generally under one layer designation (e.g., "Reference"—see designation 3050 in FIG. 14), and independently enabled or disabled for display (e.g., hidden) accordingly. Similarly, while not shown in FIG. 14, in some implementations all information available for overlay, including both locate information and landmark information if available, may be categorized generally under another layer designation (e.g., "Field") and independently enabled or disabled for display; accordingly, it should be appreciated that in one aspect of this alternative implementation, under the general layer designation of "Field," the locate information may be categorized as one sub-layer of the Field layer (in some cases with additional associated locate sub-sub-layers) and the landmark information may be categorized as another sub-layer of the Field layer (in some cases with additional associated landmark sub-sub-layers).

Like the "Field" layer, the "Reference" layer similarly may have one or more sub-layers for various constituent elements of the image information upon which the digital image is rendered. Virtually any number of possible sub-layers may be accordingly designated, based at least on the various examples of image information discussed above (e.g., maps, such as road maps or facilities maps; dig area indicators, either alone or forming part of a digital image; grids, either alone or forming part of a digital image; engineering or architectural drawings; photographic renderings; etc.—any of which may have constituent elements of information that respectively may be categorized as sub-sub-layers). To provide illustrative non-limiting examples of sub-layers of the "Reference" layer, FIG. 14 indicates a "digital image" sub-layer with the designation 3052, a "dig area indicator(s)" sub-layer with the designation 3054, and a "grid" sub-layer with the designation 3056.

The various examples of visual representations illustrated in FIGS. 11-14 may be used for various purposes, including, but not limited to:

(1) The display may be viewed by the locate technician for substantially immediate feedback of his/her work performed, which can be compared against the ticket information to ensure that the full scope of the current locate operation has been completed satisfactorily.

(2) The display may be viewed by a supervisor (using remote computer 150 that is receiving the data) as substantially immediate feedback of work performed by the locate technician, which again can be compared against the ticket information to ensure that the full scope of the current locate operation has been completed satisfactorily. When the supervisor is viewing the locate operation in real time, he/she may contact the locate technician in real time in the event that the locate operation is unsatisfactory;

(3) The display may be viewed by a quality control supervisor (using remote computer 150 that has received the data) as feedback of work performed by the technician, which again can be compared against the ticket information to ensure that the full scope of the current locate operation has been completed satisfactorily. By viewing the locate operation, the quality control supervisor may dispatch a quality control technician or other personnel in the event that the locate operation is unsatisfactory, and (4) The display may be viewed by a training supervisor as feedback of work performed by the locate technician, which can be used to assess employee performance and direct training activities.

VI. Environmental and Operational Sensors, and Information Derived Therefrom

According to another aspect of the present invention, a locate receiver (or other locate device, e.g., a locate transmitter) includes one or more environmental and/or operational sensors, which constitute additional examples of input devices from which locate information may be derived. In particular, one or more environmental sensors associated with a locate receiver may provide a variety of environmental information in connection with use of the locate receiver; similarly, one or more operational sensors associated with the locate receiver may provide a variety of operational information in connection with use of the locate receiver. One or both of such environmental information and operational information may constitute all or a portion of locate information and may be employed in any of the manners described above in connection with locate information. In particular, environmental information and/or operational information may be logged/stored in local memory of a locate receiver, transferred to and stored in internet accessible memory, formatted in various manners, processed and/or analyzed at the locate receiver itself, and/or transmitted to another device (e.g., a remote computer/server, an internet storage site, cellular telephone, personal digital assistant (PDA), etc.) for storage, processing and/or analysis.

As used herein, environmental sensors are those which sense some condition of the environment in which the locate receiver is present, but need not sense a condition of the locate receiver itself. Examples of environmental conditions which may be sensed include, but are not limited to, temperature, humidity, light, and altitude, among others. Environmental sensors may be included with the locate receiver for one or more of various reasons. For example, information provided by one or more of the environmental sensors may be used to assess whether a locate operation was or is being performed in suitable environmental conditions (e.g., within accepted environmental tolerances). Additionally or alternatively, information provided by one or more environmental sensors may be used to interact with the technician operating the locate receiver, for example by issuing a notification or warning signal to the technician if the sensed environmental condition is outside of an acceptable range (i.e., out of tolerance). Also, the information from the environmental sensor(s) may trigger an action or alteration of the locate receiver, such as activating, enabling or disabling a particular component of the locate receiver. Additionally or alternatively, information provided by one or more environmental sensors may augment other information collected by the locate receiver, such as any of the types of information described above as being collected by a locate receiver according to various embodiments herein. In some instances, information from two or more of the environmental sensors may be used in combination, examples of which are described in detail below.

As used herein, operational sensors are those which sense some operating condition of the locate receiver. Examples of such conditions include, but are not limited to, the angle of inclination of the locate receiver, the direction or heading of the locate receiver, a pressure applied to the locate receiver, and/or some characteristic of motion of the locate receiver (e.g., the speed at which the locate receiver is moving, the acceleration of the locate receiver, etc.), among others. Operational sensors may be included with the locate receiver for one or more of various reasons. For example, information provided by one or more of the operational sensors may be used to assess whether a locate receiver was or is operating appropriately during a marking operation or whether the locate receiver was or is being operated (e.g., both electronically and/or physically manipulated) appropriately by the technician (e.g., within accepted tolerances or according to protocols). Additionally or alternatively, information from one or more operational sensors may be used to detect patterns of operation of the technician, such as technician "signatures" in using/manipulating the locate receiver (e.g., characteristic movements unique to the technician). Additionally or alternatively, information from one or more operational sensors may be used to interact with the technician, for example by issuing a notification or warning signal to the technician in response to the detected operational characteristic falling outside of an acceptable range. Also, the information from the operational sensor(s) may trigger an action or alteration of the locate receiver, such as activating, enabling or disabling a particular component of the locate receiver. Additionally or alternatively, information provided by one or more operational sensors may augment other information collected by the locate receiver, such as any of the types of information previously described herein in connection with other embodiments. Other uses of data provided by one or more operational sensors are also possible and contemplated in the various aspects described herein. In some instances, information from two or more operational sensors may be used in combination, examples of which are described below. Furthermore, information from one or more operational sensors may be used in combination with information from one or more environmental sensors, as also described further below.

It should be appreciated that some of the sensors described herein may be considered both environmental and operational sensors, either because the sensor senses both an environmental condition and an operating condition of the locate receiver (i.e., the sensor senses more than one condition) or because a single condition sensed by the sensor may be considered both an environmental condition and an operating condition. For example, an image capture device may be considered both an environmental sensor (e.g., the image capture device may capture an image of the surrounding environment) and an operational sensor (e.g., the image capture device may capture an image of some action the technician has taken, for example, an image of the manner in which the technician is holding the locate receiver). Furthermore, the operation of a sensor may change over time. For example, a sensor may be configured at one time to measure an internal operating temperature and at a different time to measure an outside ambient temperature. Thus, it should be appreciated that while the sensors described below are categorized generally as being either environmental or operational for purposes of illustrating some exemplary implementations, the categories are not mutually exclusive, and such categorization is not limiting unless otherwise stated.

Figure 15:
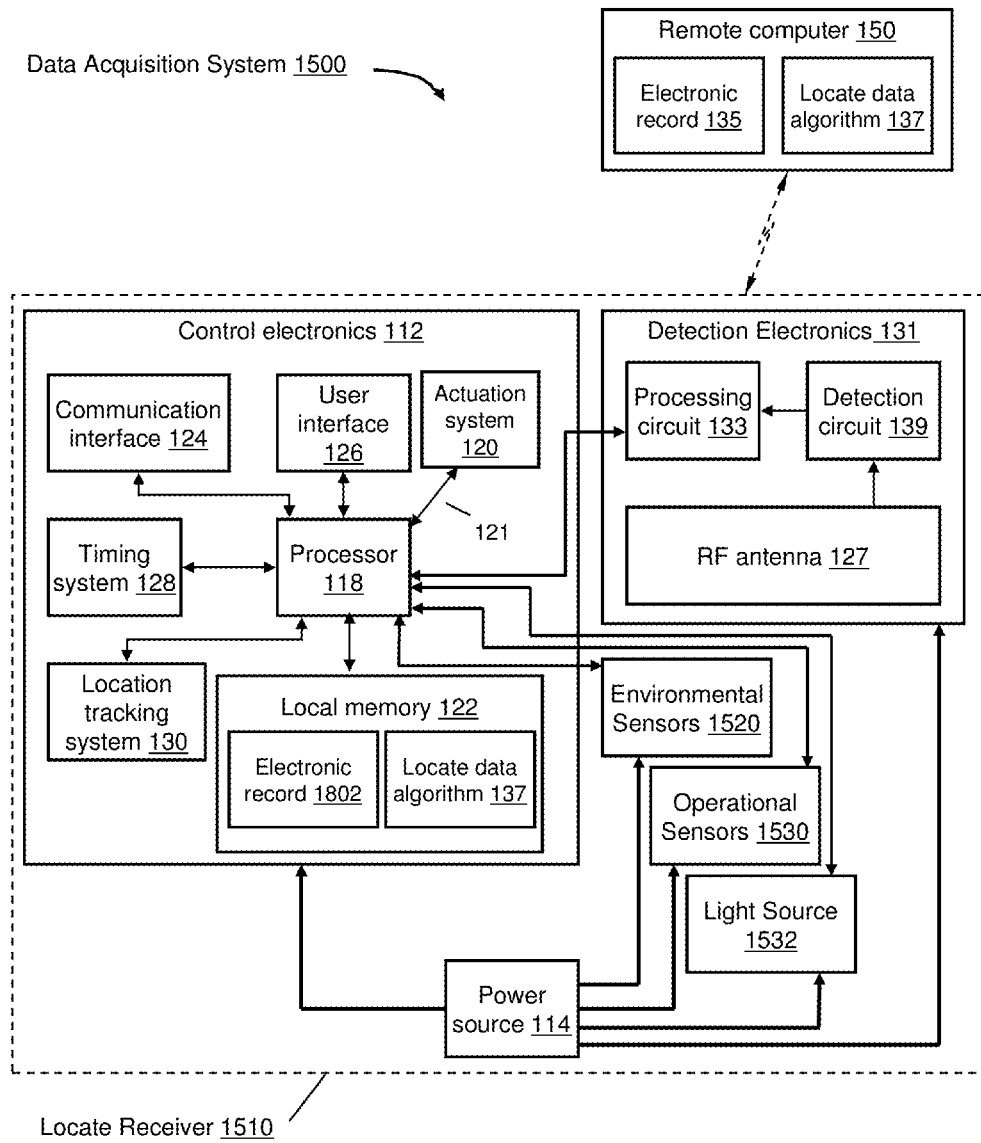
FIG. 15 is a functional block diagram of a data acquisition system including a locate receiver with both environmental sensors and operational sensors, according to one embodiment of the present invention.

FIG. 15 is a functional block diagram of a data acquisition system including a locate receiver with both environmental sensors and operational sensors, according to one embodiment of the present invention. As previously mentioned, a locate transmitter may likewise include environmental and/or operational sensors, although the following discussion focuses on locate receivers for purposes of illustration. As shown in FIG. 15, the data acquisition system 1500 includes a locate receiver 1510 and the previously described remote computer 150. The locate receiver 1510 comprises control electronics 112, power source 114, and detection electronics 131, all of which also have been described above in connection with other embodiments. The locate receiver 1510 also comprises a light source 1532, and one or both of environmental sensors 1520 and operational sensors 1530. It should be appreciated that while both environmental sensors 1520 and operational sensors 1530 are shown in the locate receiver 1510, locate receivers according to other embodiments contemplated by the present disclosure need not necessarily include both environmental sensors and operational sensors.

With respect to environmental sensors, non-limiting examples of suitable environmental sensors include a temperature sensor (e.g., one or more of an ambient temperature sensor and a surface temperature sensor (e.g., a temperature sensor for sensing a temperature of a surface toward which the locate receiver is pointed or oriented)), a humidity sensor, a light sensor, an altitude sensor, an image capture device (e.g., a camera), and an audio recorder. This list is not exhaustive, however, as other types of environmental sensors may be included as appropriate to sense various environmental conditions of interest.

Figure 16:
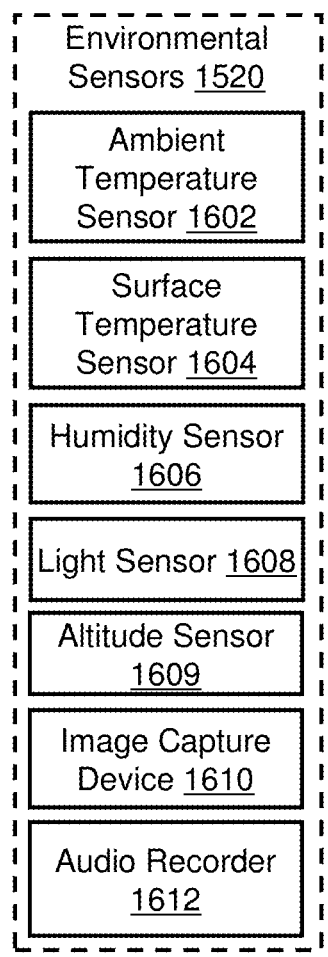
FIG. 16 is a block diagram showing details of the environmental sensors shown in FIG. 15, according to one embodiment of the present invention.

FIG. 16 is a block diagram showing details of the environmental sensors 1520 shown in FIG. 15, according to one embodiment of the present invention. In FIG. 16, the illustrated environmental sensors 1520 include an ambient temperature sensor 1602, a surface temperature sensor 1604, a humidity sensor 1606, a light sensor 1608, an altitude sensor 1609, an image capture device 1610, and an audio recorder 1612. Additional or alternative environmental sensors may be included, and one or more of the illustrated environmental sensors may be omitted, in some embodiments. The environmental sensors may be coupled to the processor 118 to receive control signals from the processor 118 and/or to provide their respective outputs (e.g., signals, data, information) to the processor 118, and, as described further below, may operate in one of various suitable manners. Information provided by any of the environmental sensors may be stored in local memory 122, for example as an electronic record 1802, described below, and/or transmitted to an external device, such as the remote computer 150, remote storage, etc.

The ambient temperature sensor 1602 may be configured to sense the ambient temperature in the vicinity of the locate receiver 1510. The ambient temperature may be a useful piece of information, for example in determining whether the temperature is adverse to performance of the locate operation, which may occur when the temperature is too hot or too cold. For example, in some embodiments, it may be preferable to operate the locate receiver only within a predetermined ambient temperature range between 20° F. and 110° F., although other ranges are possible. In addition, as described further below, the ambient temperature may be useful in combination with one or more other types of environmentally sensed inputs, such as humidity, in evaluating the conditions in which a locate operation is performed.

The ambient temperature sensor may be any suitable temperature sensor, such as an infrared sensor, and may be an analog or digital temperature sensor, as the various aspects described herein relating to a locate receiver including an ambient temperature sensor are not limited to using any particular type of temperature sensor. According to one embodiment, the temperature sensor may be part of a combined temperature and humidity sensor, such as the HS-2000V from Precon of Memphis, Tenn. In some embodiments, the ambient temperature sensor may be suitable to operate between −40° F. and 125° F., or over any other suitable range, which in some embodiments may encompass the expected temperatures to which the locate receiver may be exposed during normal operation. The data output by the ambient temperature sensor 1602 may be stored in local memory 122 and/or may be transmitted to an external device, such as remote computer 150, in those embodiments in which the locate receiver 1510 is communicatively coupled to the external device.

The surface temperature sensor 1604 may be configured to sense the temperature of the surface toward which the locate receiver is pointing or oriented (e.g., the ground under the locate receiver). The temperature of the surface may be useful information for various reasons. Thus, as a non-limiting example, information from the surface temperature sensor 1604 may be used to assess whether the locate operation was or is being performed in such recommended temperature conditions. As with the ambient temperature sensor 1602, the information provided by the surface temperature sensor 1604 may be stored in local memory 122 and/or transmitted to an external device, such as the remote computer 150.

The surface temperature sensor 1604 may be any suitable type of sensor for determining surface temperature, such as an infrared temperature sensor or any other suitable type of temperature sensor. In some embodiments, the surface temperature sensor may be configured to operate across a range of temperatures encompassing all expected surface temperatures to be encountered during normal operation of the locate receiver. For example, in one embodiment the surface temperature sensor may operate between −40° F. and 125° F., although other temperature ranges are also possible.

The humidity sensor 1606 may be configured to sense the humidity of the environment in which the locate receiver 1510 is used, and in some embodiments may provide a relative humidity measurement (e.g., 0% to 100% humidity). Such information may be useful alone or in combination with other information in determining whether, for example, the environment is too humid for performance of the locate operation. The humidity information provided by humidity sensor 1606 may be used to assess whether a locate operation was or is being performed within acceptable humidity tolerances. The humidity sensor may be any suitable type of humidity sensor, as the type is not limiting. According to one embodiment, the humidity sensor may be part of a combined temperature and humidity sensor, such as the HS-2000V from Precon of Memphis, Tenn. The information provided by the humidity sensor 1606 may be stored in local memory 122 and/or transmitted to an external device, such as the remote computer 150.

The light sensor 1608 may be configured to sense the intensity, flux, or illuminance of ambient light in the vicinity of the locate receiver 1510. Such information may be useful, for example, to assess whether a locate operation was or is being performed in suitable lighting conditions (e.g., whether there was sufficient light to allow for accurate performance of a locate operation, whether the area surrounding the locate operation is sufficiently lit to ensure worker safety, etc.). The light sensor 1608 may be any suitable type of light sensor. In one embodiment, the light sensor is a cadmium sulfide (CdS) photocell, which is a photoresistor device whose resistance decreases with increasing incident light intensity. Such a device may provide a resistance or voltage measurement as its output indicative of measured flux. However, other types of light sensors may alternatively be used. One non-limiting example of a suitable photocell is the PDV-P5001 from Advanced Photonix, Inc. of Ann Arbor, Mich.

The units output by the light sensor may depend on whether the light sensor is sensing light intensity, light flux, or illuminance. For example, the output may be in candela for light intensity, lumen for flux, or lux for illuminance. According to one embodiment, target values for illuminance for accurate performance of a marking operation may be between approximately 1,000 lux and 100,000 lux, although other ranges may be appropriate based on a particular location and type of locate operation being performed. According to one embodiment, the output may be converted to a percentage between 0% and 100%, for example in which 0% corresponds to darkness and 100% corresponds to full sunlight. Other outputs may alternatively be produced. The information provided by the light sensor 1608 may be stored in local memory 122 and/or transmitted to an external device, such as the remote computer 150.

According to one embodiment, the locate receiver further comprises a light source 1532, such as a flashlight or light emitting diode (LED) torch. The light source 1532 may be activated manually (e.g., by the technician) or may be coupled to the light sensor 1608 (e.g., directly coupled or coupled through one or more components, such as processor 118) and activated automatically in response to the light sensor sensing an unsatisfactorily low lighting condition (e.g., by receiving a signal from the processor 118 or by directly receiving an output signal of the light sensor). The threshold light level for such automatic activation may be any suitable level, non-limiting examples of which include any level at which the technician may have difficulty seeing and therefore performing the locate operation, and any predetermined level below which technician safety may be comprised. Information about such activation of the light source (e.g., the occurrence of the activation, the time of activation, the duration, etc.) may be stored in local memory 122 and/or transmitted to an external device, such as the remote computer 150.

The altitude sensor 1609 may be configured to measure the altitude of the locate receiver 1510, and may be any suitable type of altitude sensor for doing so. The altitude at which a locate operation is performed may impact the performance of the locate operation and worker safety, among other considerations. Thus, information about the altitude may be useful for a variety of reasons.

The output of the altitude sensor 1609 may be in any suitable units, and in some embodiments provides an altitude with respect to sea level. For example, the altitude sensor may provide an altitude in meters, miles, feet, or any other suitable units. The information provided by the altitude sensor 1609 may be stored in local memory 122 and/or transmitted to an external device, such as the remote computer 150.

The image capture device 1610 may be positioned on the locate receiver to capture an image of the environment surrounding the locate receiver 1510 or may be configured or configurable in any suitable manner to capture any type of image of interest. According to one embodiment, a technician may be meant to take a picture of a job site and/or of an environmental landmark at the job site. Thus, inclusion of an image capture device 1610 in the locate receiver 1510 may facilitate compliance with such protocols.

The image capture device 1610 may be capable of taking still images, video images, or both, as the various aspects described herein relating to locate receivers including an image capture device are not limited in this respect. Thus, the image capture device 1610 may be any suitable type of image capture device, and in some embodiments may be a type that is suitable for use in a portable device, such as, but not limited to, the types of digital cameras that may be installed in portable phones, wide angle digital cameras, 360 degree digital cameras, infrared (IR) cameras, and the like. In some implementations, a wide angle lens and automatic zoom may be utilized to maximize the coverage area of each image.

The output of the image capture device may include various information. The output may include all or part of a captured image. Additionally or alternatively, the output may include information about the settings and/or operation of the image capture device, such as any one or more of resolution, frame rate (for video images), flash status (i.e., flash used or not used), image size, video sequence duration, zoom setting, etc.

In those embodiments in which the image capture device is a digital device, the images may be stored in local memory 122 and/or transmitted to an external device, such as the remote computer 150. The images may be in any standard or proprietary image file format (e.g., JPEG, TIFF, BMP, etc.). Furthermore, the images may be associated with a specific job, a geographic position, and an exact time, in some embodiments, for example by flagging the image based on the time at which it was taken, the location at which it was taken, and/or the job during which it was taken. In one embodiment, each captured image may be cached and transmitted with all other captured data from one or more other sensors/input devices.

The environmental sensors 1520 may further comprise an audio recorder 1612, which may be used to capture audio input from a technician and/or from the environment (e.g., sounds in the vicinity of the locate receiver). Thus, in one embodiment, the technician may, for example, dictate notes relating to the performance of the locate operation, such as describing visible landmarks in the area of the locate operation, notes about performance of the locate receiver, or any other notes which may be relevant to performance of a locate operation. In one embodiment, the audio recorder may record sounds from the environment, such as passing cars, planes, etc. Such recordings may be useful, for example, in assessing whether a technician was at the intended location of the locate operation. For example, if a passing train is evident from the recording and the intended location is not near a train track, the recording may provide evidence that the technician was in the wrong location.

The audio recorder 1612 may be an analog or digital device or devices. For example, in one embodiment the audio recorder 1612 may be an analog recorder configured to receive an analog input signal (e.g., from a microphone) and store the analog signal. According to another embodiment, the audio recorder 1612 may be a digital audio recorder, including any suitable combination of components for receiving an analog signal (e.g., from a microphone), converting the analog signal to a digital signal, performing any suitable digital signal processing (e.g., filtering, amplifying, converting to text, etc.) and storing the digital information. According to one embodiment, the audio recorder may include a dedicated digital audio processor to perform those functions recited or any other suitable functions. It should be appreciated from the foregoing that a microphone (not shown in FIG. 15) may be associated with the audio recorder 1612 to provide the audio input to the audio recorder.

According to one embodiment, for example in which a technician may dictate notes, the audio processing of the audio input may include performing speech recognition (e.g., speech to text generation). Such functionality may be provided by suitable speech recognition software executing on a dedicated audio processor, or in any other suitable manner. Any generated text may be, for example, displayed on a display of the user interface 126, or may be stored for later display on a separate device.

The recordings provided by the audio recorder 1612 may be stored in a dedicated audio memory, in local memory 122 and/or transmitted to an external device, such as the remote computer 150. In those embodiments in which the audio recorder is a digital audio recorder, the audio files may be in any standard or proprietary audio file format (e.g., WAV, MP3, etc.).

Although not illustrated in FIG. 16, the communication interface 124 of FIG. 15 may also serve as or enable another environmental sensor. According to one embodiment, the locate receiver may be internet enabled and information may be received via the communication interface 124 over the internet. According to one embodiment, information about an environmental condition may be received via the communication interface. For example, temperature information or humidity information, among others, may be received over the internet via communication interface 124. In such instances, the received temperature or humidity information may augment any temperature and humidity information collected by a temperature and humidity sensor of the locate receiver, or may replace such information, such that in some embodiments the locate receiver may not include a physical temperature or humidity sensor. Thus, it should be appreciated that the communication interface may serve as a "virtual sensor" by receiving environmental information of interest, not being limited to temperature and humidity.

It should be appreciated from the foregoing, as well as the further discussion below, that environmental information may be collected for various purposes. According to one embodiment, the environmental information may be useful for assessing a locate device (e.g., locate receiver) or locate operation. According to another embodiment, the environmental information may be useful for assessing the conditions in which marking material is being dispensed. As previously explained, locate operations may involve the use of a locate receiver to detect a facility location and a marking device to mark the facility location, for example by dispensing a marking material. The environmental information sensed by the environmental sensors 1520 may be useful for assessing the conditions in which marking material is being dispensed in those situations in which a marking device is being used in connection with the locate receiver. Some marking materials (e.g., paint), for example, may have preferred temperature ranges and humidity levels, among other conditions, in which they may be dispensed. Thus, environmental information may facilitate determination of whether a marking material was or is being dispensed in suitable environmental conditions.

As explained above, another type of input device which may be included with a locate receiver (or locate transmitter) is an operational sensor. Thus, according to one aspect of the present invention and as shown in FIG. 15, the locate receiver 1510 may include one or more operational sensors 1530 for sensing one or more operating conditions or characteristics of the locate receiver.

Figure 17:
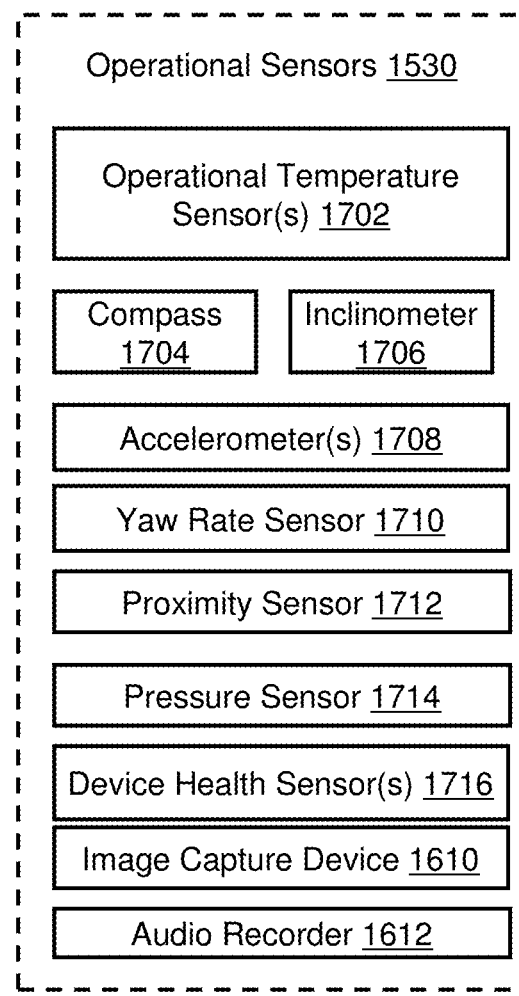
FIG. 17 is a block diagram showing details of the operational sensors shown in FIG. 15, according to one embodiment of the present invention.

FIG. 17 is a block diagram showing details of the operational sensors shown in FIG. 15, according to one embodiment of the present invention. The illustrated exemplary operational sensors 1530 include, but are not limited to, one or more temperature sensors 1702, a compass 1704, an inclinometer 1706, one or more accelerometers 1708, a yaw rate sensor 1710, a proximity sensor 1712, a pressure sensor 1714, one or more device health sensors 1716, the image capture device 1610, and the audio recorder 1612. Additional or alternative operational sensors may be included, and one or more of the illustrated operational sensors may be omitted, in some embodiments. The operational sensors may be coupled to the processor 118 to receive control signals from the processor 118 and/or to provide their respective outputs to the processor 118, and, as described further below, may operate in one of various suitable manners. Information provided by any of the operational sensors may be stored in local memory 122, for example in an electronic record 1802, described below, and/or transmitted to an external device, such as the remote computer 150, remote storage, etc.

One or more operational temperature sensors 1702 may be configured to sense any temperature of interest with respect to the locate receiver 1510. For example, it may be desirable in some embodiments to monitor the temperature of the processing circuitry of the locate receiver 1510, such as the temperature of the processor 118. Alternatively, it may be desirable in some embodiments to monitor the temperature of other components of the locate receiver 1510, for example, the temperature of one of the other operational sensors 1530. Thus, it should be appreciated that a plurality of operational temperature sensors 1702 may be included and arranged to sense any operating temperatures of interest of the locate receiver 1510. In this manner, the operating temperatures of one or more components of the locate receiver 1510 may be monitored and an alert or notification may be generated (e.g., by the control electronics) and provided to the technician if one of the operating temperatures is determined to be outside of an acceptable tolerance, for example if a component is overheating. Alternatively, the temperature from one or more operational temperature sensors 1702 may be used to calibrate or compensate data or signals provided by any one of the other sensors which may have a temperature-dependent output.

The temperature sensor(s) 1702 may be any suitable temperature sensor, such as a temperature-dependent variable resistor, or any other type of temperature sensor suitable for measuring the temperature of the components of interest of the locate receiver. The temperature sensor 1702 may be configured to operate over any suitable temperature range of interest, which in one embodiment may be from −40° F. to 125° F., although other temperature ranges may be employed in other embodiments. The data output by the temperature sensor 1702 may be stored in local memory 122 and/or may be transmitted to an external device, such as remote computer 150, in those embodiments in which the locate receiver 1510 is communicatively coupled to the external device.

The compass 1704 may be configured to determine the direction in which the locate receiver 1510 is facing, and therefore may be positioned at one of various suitable locations. For example, according to one embodiment, the compass 1704 may be positioned toward the top of the locate receiver 1510, and aligned such that the compass identifies the direction toward which the front of the locate receiver points (i.e., the direction in which the locate receiver faces when held by the technician). The heading information provided by the compass 1704 may be provided in degrees or in any other suitable units, and may be provided relative to a reference direction (e.g., relative to true North). According to one embodiment, the compass may be initially calibrated to true North, such that subsequent heading readings may be relative to true North.

The heading information provided by the compass 1704 may be useful to determine a direction in which the technician moves during a locate operation. Such information may be particularly useful in instances in which the location tracking system 130 does not provide a signal or a sufficiently accurate signal to monitor the technician's movements. The compass 1704 may be any suitable type of compass, including analog or digital, and may provide any suitable readout. According to one embodiment, the compass 1704 is a digital compass, which provides a heading of the locate receiver 1510. According to one embodiment, the compass may include one or more gyroscopes. According to one embodiment, the compass 1704 is an OS4000-T solid state tilt compensated nano compass available from OceanServer Technology, Inc. of Fall River, Mass. The information provided by the compass 1704 may be stored in local memory 122 and/or transmitted to an external device, such as the remote computer 150.

The inclinometer 1706 may be any suitable inclinometer configurable to measure an angle of inclination of the locate receiver 1510. According to one embodiment, the inclinometer may provide an angle with respect to ground. According to one embodiment, the inclinometer may be a multi-axis digital device and may sense angles with respect to horizontal and/or vertical planes. The inclinometer may provide a voltage as an output signal, indicative of the angle of inclination. According to some embodiments, the inclinometer may have an output range spanning +/−30 degrees (e.g., with respect to ground), although other ranges may alternatively be provided by some inclinometers.

The inclinometer 1706 may be positioned toward the top of the locate receiver 1510, for example, near where the technician may hold the locate receiver during use. Alternatively, according to another embodiment, the inclinometer may be positioned substantially near the tip of the locate receiver 1510 (i.e., the end of the locate receiver held proximate the ground when the locate receiver is in use) which may be substantially the same as the tip 148 of locate receiver 110 shown in FIG. 5. Other locations for the inclinometer with respect to the locate receiver are also possible.

The information provided by the inclinometer may be useful for one or more of various purposes. For example, according to one embodiment, the information about the angle of the locate receiver may be useful in determining whether the technician is appropriately using the locate receiver (e.g., for determining whether the locate receiver is being held at a suitable angle relative to the surface (e.g., the ground) under which a facility is disposed), and in some instances may therefore be used to disable part of the locate receiver (e.g., detection electronics 131) if the technician is holding the locate receiver at an inappropriate angle. According to another embodiment, as described in further detail below in connection with FIG. 22, the information about the angle of the locate receiver may be used to determine the location of one point of the locate receiver relative to a second point of the locate receiver (e.g., for use in determining the relative positioning of the tip of the locate receiver compared to the top of the locate receiver). The information provided by the inclinometer may be stored in local memory 122 and/or transmitted to an external device, such as the remote computer 150.

One or more accelerometers 1708 may be configured to sense the acceleration of the locate receiver 1510 and may provide an output in terms of g-force or in any other suitable units. Such information may be useful, for example, in assessing whether a technician is appropriately using (e.g., physically moving or manipulating) the locate receiver 1510. For example, there may be predetermined acceptable acceleration ranges associated with normal operation of the locate receiver (e.g., associated with the typical sweeping motion of the locate receiver as the technician scans for a buried facility), and therefore the accelerometer(s) 1708 may provide information which may be used to assess whether a technician is operating the locate receiver 1510 within those acceptable ranges. In addition, any acceleration data provided by the accelerometer(s) may be integrated to obtain velocity data and/or integrated twice to obtain data about distance traveled (e.g., via appropriate functionality included in the locate data algorithm 137 or other algorithm executed by the processor 118), either of which integration results may be useful for a variety of reasons. The acceleration information provided by the accelerometer(s) 1708 may be stored in local memory 122 and/or transmitted to an external device, such as the remote computer 150.

The accelerometer(s) 1708 may be any suitable accelerometer for sensing the acceleration of the locate receiver and may provide any suitable outputs. According to one embodiment, the accelerometer may be a 3-axis accelerometer, providing an indication of the acceleration of the locate receiver along three orthogonal axes. The output of each axis may be a frequency (e.g., in Hz) or may be converted to units of g. For example, in one embodiment the accelerometer may be a 3-axis accelerometer that outputs a signal ranging from 0.5 Hz-550 Hz for the z-axis, from 0.5 Hz-1600 Hz for the x-axis, and from 0.5 Hz-1600 Hz for the y-axis. Again, the accelerometer may alternatively provide an output in terms of g or any other suitable units. In one exemplary implementation, an accelerometer may be an ADXL 330KCPZ-RL accelerometer available from Analog Devices of Norwood, Mass. In some exemplary implementations, the accelerometer may output acceleration data, whereas in other implementations the accelerometer may output velocity data along each of the three axes, as well as the orientation of the accelerometer.

In addition to providing acceleration data, an accelerometer may be operated as an inclinometer according to known techniques (see, e.g., description at http://www.tilt-china.com/uploadPDF/How_to_use_an_accelerometer_as_an_inclinometer_pdf, viewed on Jan. 27, 2010 and prepared by Shanghai Vigor Technology Development Co.). Thus, according to one embodiment of the present invention, a locate receiver may include an accelerometer configured to function as an inclinometer and therefore provide a measure of inclination of the locate receiver.

Furthermore, as explained in greater detail below, the locate receiver 1510 may comprise a plurality of accelerometers located at different positions with respect to the locate receiver. Information from such accelerometers may be useful, for example, in assessing the relative motion of one portion (e.g., the tip) of the locate receiver with respect to a second portion (e.g., the top) of the locate receiver, for example using the techniques described in U.S. Patent Application Publication 2008-0255795-A1, published Oct. 16, 2008, which is hereby incorporated herein by reference in its entirety. According to one such non-limiting embodiment, one accelerometer may be positioned near the tip of the locate receiver and a second accelerometer may be positioned near the top of the locate receiver. Both may be 3-axis accelerometers. Such an arrangement may also be used to determine the location of the tip of the locate receiver relative to the location of the top of the locate receiver, as explained below in connection with FIG. 22.

Additionally, the data output by one or both accelerometers may be used to monitor for out-of-tolerance operation of the locate receiver, such as improper manipulation of the locate receiver by the technician. For example, acceleration data from either accelerometer may be indicative of whether the locate receiver is being swung, thrown, or dropped, among other things. For example, acceleration values from either accelerometer above some threshold value for a sufficient duration (e.g., for one second or greater, or any other suitable duration) may be indicative of the locate receiver being thrown or dropped. The threshold value of acceleration indicative of such behavior may be different for the two accelerometers. Similarly, detection of acceleration values deviating from an expected or target pattern may be indicative of misuse of the locate receiver. In response to detecting such manipulation of the locate receiver, various actions may be taken, such as generating an alert, logging an event, disabling the actuation system and/or detection electronics 131 of the locate receiver, or any of the actions described further below.

Moreover, a locate receiver may be provided with two accelerometers to monitor whether the locate receiver is being held in a satisfactory manner during use. For example, it may be preferable for a locate receiver to be maintained at a substantially perpendicular angle relative to ground as a technician is locating, even when the technician is moving (e.g., sweeping or swinging) the locate receiver. It should be appreciated that when operated in such a manner, the top of the locate receiver and the tip of the locate receiver may exhibit similar acceleration characteristics (e.g., peaks in acceleration at the same time (e.g., at the same points of a swinging motion), minimum values of acceleration at the same time (e.g., at the same points of a swinging motion), etc.) By positioning an accelerometer toward the tip of the locate receiver and another toward the top of the locate receiver, the resulting acceleration data may be indicative of whether the technician is holding the locate receiver perpendicular to ground or otherwise properly manipulating the locate receiver.

Other uses for multiple accelerometers on a locate receiver are also possible, and those examples listed above are non-limiting.

The operational sensors 1530 may further comprise a yaw rate sensor 1710, which may be configured to sense the yaw rate (i.e., a twisting motion) of the locate receiver. The yaw rate sensor may be any suitable yaw rate sensor and may provide its output in any suitable units, for example in degrees per second (degrees/sec). One non-limiting example of a suitable yaw rate sensor is an ADXRS610BBGZ-RL gyro sensor from Analog Devices of Norwood, Mass. According to another embodiment, a yaw rate measurement may be provided by some types of compasses, such that a combination compass and yaw rate sensor may be used. The yaw rate sensor may be positioned at any suitable location on the locate receiver to detect yaw rate. The information provided by the yaw rate sensor 1710 may be stored locally and/or transmitted to an external device such as the remote computer 150.

The proximity sensor 1712 may be configured to measure the distance from any point of interest of the locate receiver 1510 to a point of interest in its surroundings. For example, in one embodiment, the proximity sensor 1712 may be positioned at the tip of the locate receiver, and may be oriented to determine the distance between the tip of the locate receiver and any surface (e.g., a target surface) of interest, such as the ground, a landmark, a wall, etc. Alternatively, in one embodiment, the proximity sensor may be positioned toward the top of the locate receiver and oriented to determine a distance between the top of the locate receiver and the target surface (e.g., ground). Other configurations are also possible.

Information about the distance from the locate receiver to any surrounding surface may be useful for one of various reasons. For example, such information may be useful in assessing whether a technician is properly operating the locate receiver. As a non-limiting example, there may be predetermined acceptable distances between the locate receiver and the surface under which a facility is located when scanning for the facility. As an example, it may be preferable in some embodiments to hold the locate receiver between one and twelve inches from the surface. The proximity sensor may be used to determine whether the technician is maintaining the locate receiver at an acceptable distance from the surface. Alternatively, according to another embodiment, and as described in greater detail below, the distance of a portion of the locate receiver from the ground may be useful in determining the distance between two points of the locate receiver.

The proximity sensor 1712 may be any suitable type of proximity sensor (e.g., any commercially available proximity sensor), including an analog or digital device. In one embodiment, proximity sensor 1712 may be a Sharp GP2D120 short range IR distance sensor from Sharp Electronics Corporation (Mahwah, N.J.) and is able to take a substantially continuous distance reading and return a corresponding analog voltage with a range of about 1.6 inches to about 12 inches. Such a proximity sensor may be suitable, for example, when the sensor is used to sense the distance from the tip of the locate receiver to the ground, since such a distance may typically be less than about 12 inches. According to another embodiment, the proximity sensor may be a sonar device. Other types of proximity sensors may also be suitably used. The information provided by the proximity sensor 1712 (e.g., a distance value, for example, in centimeters, meters, or feet) may be stored locally and/or transmitted to an external device such as the remote computer 150.

The pressure sensor 1714 may be configured to sense any pressure of interest with respect to the locate receiver. For example, according to one embodiment it may be desirable to detect the pressure applied to a handle of the locate receiver (e.g., handle 138 in FIG. 5), for instance to determine whether a technician is holding the locate receiver and, if so, whether it is being held appropriately. Accordingly, a pressure sensor may be positioned in the handle of the locate receiver in one non-limiting embodiment and configured to detect the pressure applied to the handle. According to another embodiment, it may be desirable to determine the pressure applied to an actuation system of the locate receiver, for example if the actuation system is a trigger (e.g., actuator 142 in FIG. 5). Accordingly, a pressure sensor may be configured to determine the pressure applied to the trigger or other actuation mechanism in those embodiments in which the locate receiver includes such a trigger or actuation mechanism. According to one embodiment, the locate receiver may include multiple pressure sensors, for example one for determining the pressure applied to a handle of the locate receiver and one for determining a pressure applied to an actuation system of the locate receiver. However, any number of pressure sensors may be included, and they may be configured to sense any pressure of interest with respect to the locate receiver.

The pressure sensor 1714 may be any suitable type of pressure sensor for detecting the pressure of interest. The information provided by the pressure sensor 1714, which may be in any suitable units, may be stored locally and/or transmitted to an external device such as the remote computer 150.

The locate receiver may further include device health monitoring capability. Characteristics of the health of the locate receiver which may be the subject of monitoring include, but are not limited to, battery life, battery drain level, battery charging capacity, wireless signal strength (in those embodiments in which the locate receiver has wireless capabilities), network connectivity, operating temperature, available memory, and the status of any one or more input devices of the locate receiver, such as an accelerometer, location tracking system (e.g., GPS receiver), image capture device, light sensor, etc. To this end, the locate receiver may include hardware and/or software configured to serve the health monitoring purpose.

According to one embodiment, the locate receiver may include a processor (e.g., processor 118) configured to run a device health software program or application to process the inputs from one or more operational sensors, such as operational temperature sensor 1702, to assess whether those inputs indicate the locate receiver is operating appropriately. According to another embodiment, the locate receiver may include dedicated device health hardware, such as device health sensor 1716, which may provide data that is processed by a device health software program (for example, executing on processor 118) to assess the health of the locate receiver. Non-limiting examples of device health sensor 1716 include a voltmeter and an ammeter, among others.

In one embodiment, data provided by the device health sensor 1716 may indicate that a low battery condition is present during the locate operation and, thus, it may be determined that the operations of the locate receiver are not reliable. Other device conditions, such as wireless signal strength (e.g., in those embodiments in which the locate receiver 1510 is wirelessly coupled to an external device, such as remote computer 150), available memory, temperature of one or more components of the locate receiver, power connection of one or more components of the locate receiver, or other conditions of the locate receiver may be monitored by a device health sensor. Thus, it should be appreciated that a locate receiver according to the embodiments described herein may include any suitable number of device health sensors for monitoring a desired number of device conditions.

According to one embodiment, a record or message may be created based on operation of the device health sensor. For example, a record or message may be created including a device ID (e.g., of the locate receiver) and the current state of certain device components, such as input devices (e.g., environmental and operational sensors). The record or message may also or alternatively include an identification of any resource utilization that is nearing a specified threshold (e.g., memory nearing capacity). Thus, it should be appreciated that various conditions may be monitored under the rubric of monitoring the health of the locate receiver, and various actions taken in response to such monitoring.

The operational sensors 1530 may further comprise the image capture device 1610. As previously mentioned, the image capture device 1610 may be considered an operational sensor, for example, if and when configured to capture an image relating to the operation of the locate receiver 1510.

Furthermore, the operational sensors 1530 may comprise an audio recorder, similar to or the same as audio recorder 1612, and therefore shown as audio recorder 1612 in FIG. 17. For example, the locate receiver may include multiple audio recorders, with one or more operating as an environmental sensor (e.g., recording acoustic input from the environment) and one or more operating as operational sensors (e.g., recording acoustic input relating to operation of one or more components of the locate receiver. According to one embodiment, a microphone associated with the audio recorder is positioned to detect sound emitted by a component of interest of the locate receiver. The audio input may also be stored by the audio recorder and processed in any suitable manner.

As previously described, the audio recorder may be any suitable audio recorder, including a digital audio recorder or analog audio recorder, for example of any of the types previously described. In one embodiment, the audio recorder may comprise a dedicated PIC processor. In those embodiments in which the locate receiver includes two or more audio recorders (e.g., one operating an as environmental sensor and another operating as an operational sensor), the audio recorders may share any suitable combination of circuitry. For example, multiple audio recorders may share a same digital signal processor (e.g., a dedicated audio signal processor). A separate microphone may be associated with each audio recorder, or a microphone may be shared between two or more audio recorders. Thus, it should be appreciated that the exact configuration and components of audio recorders according to the various embodiments described herein are not limiting.

The audio files produced by an audio recorder operating as an operational sensor may be stored locally in dedicated audio memory, in local memory 122 and/or transmitted to an external device, such as the remote computer 150.

In any of the embodiments illustrated in FIG. 15, any one or more of the environmental sensors 1520 illustrated in FIG. 16 and/or operational sensors 1530 illustrated in FIG. 17 may be operated in any suitable manner, including continuously, periodically, and/or in response to an event or trigger (e.g., one or more actuations of the locate receiver), or in any other suitable manner. For example, one or more of the environmental sensors 1520 and/or operational sensors 1530 may operate continuously during performance of a locate operation. In particular, the ambient temperature sensor may output a substantially continuous data stream indicative of the sensed ambient temperature. Similarly, the surface temperature sensor, humidity sensor, and light sensor may output substantially continuous data streams indicative of the respective sensed conditions. The inclinometer, compass, accelerometer, yaw rate sensor, proximity sensor, pressure sensor, and device health sensor may also output substantially continuous data streams indicative of the sensed operation. The image capture device 1610 may record a video sequence continuously during the locate operation, and the audio recorder 1612 may continuously record any audio input during performance of the locate operation.

Alternatively, one or more of the environmental sensors 1520 and/or operational sensors 1530 may be operated and/or polled periodically, with the resulting output data being logged and/or transmitted periodically. For example, the ambient temperature sensor may provide an output signal indicative of the sensed ambient temperature every second, every five seconds, every ten seconds, every minute, every ten minutes, or at any other suitable time interval. Similarly, the surface temperature sensor, humidity sensor, light sensor, operational temperature sensor(s), inclinometer, compass, accelerometer(s), yaw rate sensor, proximity sensor, pressure sensor, and device health sensor(s) may output data at periodic intervals. The image capture device may capture a still image or a video sequence of any desired duration at periodic intervals. The audio recorder may capture audio of any desired duration at periodic intervals. It should be appreciated that in some embodiments one or more of the environmental sensors 1520 and/or operational sensors 1530 may themselves operate so as to provide output information in an essentially continuous fashion, but only be read or polled (e.g., by processor 118) on some discrete or periodic basis. Accordingly, output signals or data provided by one or more sensors may be acquired, logged into local memory, and/or transmitted to an external device in any of a variety of manners.

According to another embodiment, one or more of the environmental sensors 1520 and/or operational sensors 1530 may operate, be read discretely, and/or be polled, and therefore the corresponding data may be logged and/or transmitted, in response to actuation of the actuation system 120 of the locate receiver. For example, actuation of the actuation system 120 may trigger collection of magnetic field data and simultaneously may trigger recording of a sensed ambient temperature from ambient temperature sensor 1602 in the local memory 122. The remaining environmental sensors 1520 and/or operational sensors 1530 may be operated, read and/or polled in a similar manner.

In one embodiment, one or more of the environmental sensors 1520 and/or operational sensors 1530 may be activated, read discretely, and/or polled by the technician irrespective of whether the actuation system 120 is actuated. For example, the technician may activate, read, and/or poll one or more of the environmental sensors by depressing a selection button corresponding to the environmental sensor(s), by choosing a selection button or menu option from a user interface of the locate receiver (in those embodiments in which the locate receiver includes a user interface), or in any other suitable manner. The operational sensors may operate similarly.

Thus, it should be appreciated that the operation of sensors, and reading and/or logging and/or transmitting of data from the environmental sensors 1520 and operational sensors 1530, is not limited to any particular manner or time, but rather that various suitable schemes are contemplated. Also, it should be appreciated that in those embodiments in which a locate receiver comprises multiple sensors, the sensors need not operate in the same manner as each other. For example, one or more of the sensors may operate periodically while one or more may only provide their data output in response to actuation of the locate receiver actuation system. In one embodiment, a plurality of the sensors may provide their data outputs periodically, but at different rates. As an example, the accelerometers and yaw rate sensor of the locate receiver may output their data at relatively high frequencies, such as in the kHz range, MHz range, or higher. The temperature sensors, humidity sensor, and light sensor may output their data at relatively lower frequencies, such as approximately 1 Hz, for example because those quantities may not change as rapidly as the quantities measured by the accelerometers and the yaw rate sensor. Other operating schemes are also possible.

According to one embodiment, the output data from the sensors is only read and stored upon actuation of the actuation system 120, even though the sensors may update their outputs at the above-indicated frequencies or any other suitable frequencies. Upon such actuation, data from any one or more of the sensors may be read out and stored in memory. The stored data may therefore represent the values present at the sensors at the time of actuation. In this manner, data values output by the sensors when the trigger is not actuated may not be stored in some instances, but rather may be updated by the subsequent data value from the sensor. In this manner, only the most recent data from the sensors may be stored upon actuation. Other operating schemes are also possible.

As mentioned previously, environmental information and/or operational information output by any one or more environmental sensors and operational sensors of the locate receiver (e.g., of the environmental sensors 1520 and/or operational sensors 1530) may be used for one or more of various purposes, some of which have been previously described. Examples of such purposes include assessing whether a locate operation was or is being performed within environmental and/or operational tolerances, interacting with the technician and/or controlling/altering operation of the locate receiver, and augmenting data records/files.

To this end, the various environmental information and/or operational information provided by various sensors may be organized and handled as data in various formats, and in some implementations may be organized in terms of events and corresponding event entries formatted according to a particular protocol, for example as discussed above in connection with Tables 2 through 5. Event entries similar to these and including various environmental and/or operational information may be generated by the locate receiver at some point once information has been read/acquired from environmental and/or operational sensors, the event entries themselves (or any information contained therein) may be logged in a file for an electronic record, and/or the event entries themselves (or any information contained therein) may be transmitted by the locate receiver (e.g., to remote computer 150).

In some implementations, environmental information and/or operational information may be contained within one or more event entries corresponding to an actuation of the locate receiver, such that the environmental information and/or the operational information is part of an actuation data set. Table 12 below illustrates a modification of an event entry originally depicted in Table 3 above, in which environmental information and operational information is included as part of the data formatted in an actuation event entry, according to one example. The information for acceleration may include three values for each axis of each accelerometer. One value for a particular axis may be a raw value, the second value for a particular axis may be a high-pass filtered value, and the third value may be a low-pass filtered value. Data values are only shown for one of the two accelerometers listed. Locate information from one or more input devices/other components of the locate receiver is recorded with these events to provide information about the job in progress.

TABLE 12

| | |
|---|---|
| Format | INFO+ LCTR: (DATE) (TIME) (GPS data) (FACILITY TYPE) (GROUND TYPE) (MAGNETIC FIELD STRENGTH AS % OF FULL SCALE info) (DETECTED SIGNAL FREQUENCY) (GAIN) (AMB TEMP info) (SURF TEMP info) (HUM info) (LIGHT info) (ALTITUDE info) (IMAGE info) (AUDIO info) (OP TEMP info) (COMPASS info) (INCL info) (ACC1 info) (ACC2 info) (YAW info) (PROX info) (DH1 info) (DH2 info) <CR><LF> |
| Examples | INFO+LCTR: DATE(2009-04-15) TIME(12:04:44)<br>GPS($GPGGA, 120443, 4807.038, N, 01131.000, E, 1, 08, 0.9, 545.4, M, 46.9, M,, *47)<br>FACILITY TYPE (YELLOW) GROUND TYPE (PAVEMENT) STRENGTH(80)<br>FREQUENCY(512) GAIN (10) AMB TEMP(73F) SURF TEMP(78F) HUM(32)<br>LIGHT(1500) ALT(200) IMAGE(Y) AUDIO(Y) OP TEMP(97F) COMPASS(243)<br>INCL(−20) ACC1_x_raw(.287) ACC1_x_high(.283) ACC1_x_low(.275)<br>ACC1_y_raw(.385) ACC1_y_high(.382) ACC1_y_low(.381) ACC1_z_raw(.153)<br>ACC1_z_high(.150) ACC1_z_low(.145) (ACC2(!) YAW(!) PROX(15) DH1(67) DH2(!)<br><CR><LF><br>INFO+LCTR: DATE(2009-04-15) TIME(12:04:45)<br>GPS($GPGGA, 120445, 4807.038, N, 01131.000, E, 1, 08, 0.9, 545.4, M, 46.9, M,, *47)<br>FACILITY TYPE (YELLOW) GROUND TYPE (GRASS) STRENGTH(81)<br>FREQUENCY (512) GAIN (10) AMB TEMP(73F) SURF TEMP(78F) HUM(31)<br>LIGHT(1500) ALT(200) IMAGE(Y) AUDIO(Y) OP TEMP(97F) COMPASS(243)<br>INCL(−20) ACC1_x_raw(.285) ACC1_x_high(.280) ACC1_x_low(.275)<br>ACC1_y_raw(.385) ACC1_y_high(.385) ACC1_y_low(.380) ACC1_z_raw(.156)<br>ACC1_z_high(.150) ACC1_z_low(.145) ACC2(!) YAW(!) PROX(14) DH1(67) DH2(!)<br><CR><LF><br>INFO+LCTR: DATE(2009-04-15) TIME(12:04:46)<br>GPS($GPGGA, 120446, 4807.038, N, 01131.000, E, 1, 08, 0.9, 545.4, M, 46.9, M,, *47)<br>FACILITY TYPE (YELLOW) GROUND TYPE (DIRT) STRENGTH(80)<br>FREQUENCY(512) GAIN (11) AMB TEMP(73F) SURF TEMP(78F) HUM(31)<br>LIGHT(1500) ALT(200) IMAGE(Y) AUDIO(Y) OP TEMP(97F) COMPASS(243)<br>INCL(−20) ACC1_x_raw(.285) ACC1_x_high(.380) ACC1_x_low(.275)<br>ACC1_y_raw(.385) ACC1_y_high(.382) ACC1_y_low(.390) ACC1_z_raw(.155)<br>ACC1_z_high(.150) ACC1_z_low(.147) ACC2(!) YAW(!) PROX(15) DH1(67) DH2(!)<br><CR><LF> |

The contents of an information field for a particular piece of environmental information and/or operational information in an event entry may have any of a number of forms; for example, the content may be strictly numeric (e.g., according to some predetermined scale/units of measure for the numeric information), alphanumeric (e.g., 78 F), text (e.g., YES), symbolic (e.g., Y or N to indicate "yes" or "no," or some other symbol to provide an indication, such as ! to indicate sensor failure or no sensor information available), or referential in nature (e.g., a filename, pointer or other link to provide an indication of where relevant information relating to the particular environmental and/or operational condition may be found).

In other implementations, one or both of environmental information and/or operational information may be formatted in one or more particular event entries generated specifically to provide such information, in a manner that is not necessarily related to actuation of the locate receiver. For example, such "sensor read events" may be generated as the result of the processor reading one or more environmental and/or operational sensors one or more times while a job is in progress (e.g., on a periodic basis pursuant to processor polls). Table 13 below provides an example of such a sensor read event entry.

TABLE 13

| | |
|---|---|
| Format | INFO+SENSOR: (DATE) (TIME) (AMB TEMP info) (SURF TEMP info) (HUM info) (LIGHT info) (IMAGE info) (AUDIO info) (OP TEMP info) (COMPASS info) (INCL info) (ACC1 info) (ACC2 info) (YAW info) (PROX info) (PRESSURE info) (DH1 info) (DH2 info) <CR><LF> |
| Examples | INFO+SENSOR: DATE(2009-04-15) TIME(12:04:45) AMB TEMP(73F) SURF TEMP(78F) HUM(31) LIGHT(1500) IMAGE(Y) AUDIO(Y) OP TEMP(97F) |

TABLE 13-continued

COMPASS(243) INCL(−40) ACC1(.285)
ACC2(!) YAW(!) PROX(15) PRESSURE (54)
DH1(67) DH2(!)<CR><LF>

With respect to file formats for electronic records including event entries or information derived therefrom, as discussed above any number of file formats may be employed (e.g., ASCII, XML).

Figure 18:
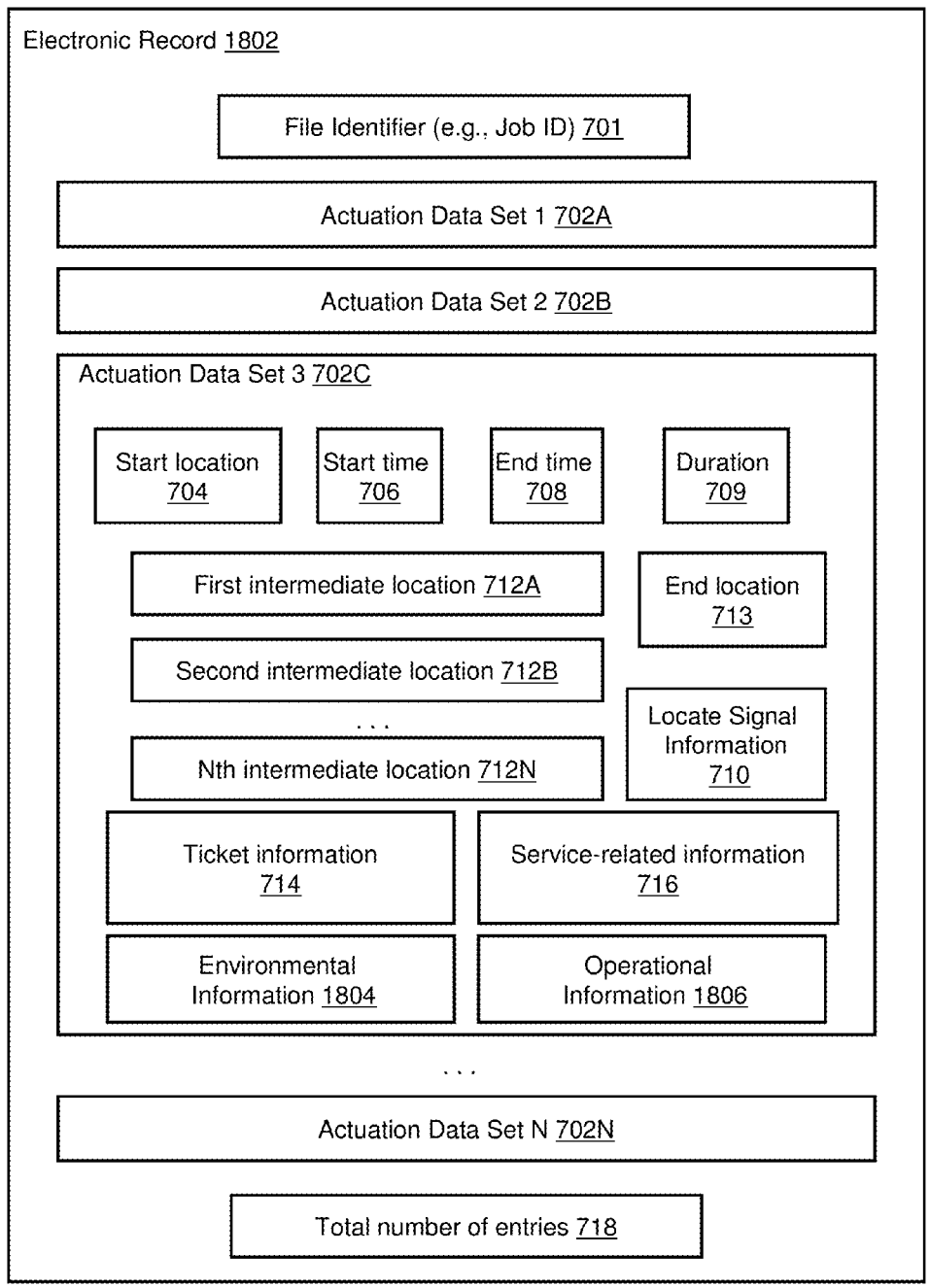
FIG. 18 is a block diagram of an exemplary data structure of an electronic record of a locate operation including information received from environmental sensors and operational sensors of the locate receiver, according to one embodiment of the present invention.

FIG. 18 illustrates an electronic record 1802, similar to the electronic record 135 previously described in connection with FIGS. 7 and 9, which may be generated by a locate receiver 1510, stored in local memory 122 of the locate receiver, and/or transmitted in whole or part by the locate receiver, according to one embodiment. Some or all of the information provided in the electronic record 1802 may be derived from an event entry generated by the locate receiver (e.g., an event entry is generated and then parsed to provide information in various fields of an electronic record), or the information contained in the electronic record 1802 may be provided in another manner pursuant to the concepts disclosed herein (e.g., sensor information may be acquired directly from one or more sensors, and acquired information may be stored in the electronic record without necessarily generating an event entry). In addition to the information elements shown previously in FIGS. 7 and 9, the electronic record 1802 may further include one or both of environmental information 1804 and operational information 1806. While both types of information are shown for simplicity in FIG. 18, it should be appreciated that an electronic record according to various embodiments need not include both environmental information and operational information.

The exemplary electronic record 1802 shown in FIG. 18 may be used to evaluate performance of a locate operation, for example, by reviewing information in the actuation data set 702C, the ticket information 714, service-related information 716, the environmental information 1804 and/or the operational information 1806. It should be appreciated that the electronic record 1802 includes some information that assumes that the locate receiver 1510 includes the timing system 128 and the location tracking system 130, such as the timing and location information shown in the electronic record.

Table 14 provides an example of a data record that may be generated by locate receiver 1510 upon actuation of the actuation system. Each shown "act" corresponds to a separate actuation. As shown, the data record may include information about the service provider identification, the user (technician) identification, the locate receiver identification, the receiver mode, a timestamp (for example, provided by a timing system such as timing system 128), geo-location data, signal strength data, gain of the locate receiver, signal frequency data, facility depth data, facility type data, ground type data, locate request data, and information relating to the environmental sensors 1520. This example is provided for purposes of illustration, and is not limiting, as many different forms of data records may be generated based on the operation of the locate receiver 1510.

TABLE 14

Example record of data acquired by locate receiver 1510 upon actuation

| | | |
|---|---|---|
| Record # act-1 | Service provider ID | 0482 |
| | User ID | 4815 |
| | Receiver ID | 7362 |
| | Receiver Mode | Mode = Peak |
| | Receiver Mode | ACTIVE |
| | Timestamp data | 12-Jul-2008; 09:35:15.2 |
| | Geo-location data | 2650.9348, N, 08003.5057, W |
| | Signal strength (% of maximum) | 85 |
| | Gain | 45 |
| | Signal frequency (kHz) | 1 |
| | Facility depth (meters) | 3.4 |
| | Facility type | Gas (yellow) |
| | Ground type | Pavement |
| | Locate request data | Requestor: XYZ Construction Company, Requested service address: 222 Main St, Orlando, FL |
| | Ambient temperature (° F.) | 75 |
| | Surface temperature (° F.) | 80 |
| | Humidity (%) | 85 |
| | Illuminance (lux) | 15000 |
| | Altitude (meters) | 200 |
| | Image captured (Y/N) | Y |
| | Audio captured (Y/N) | N |
| Record # act-2 | Service provider ID | 0482 |
| | User ID | 4815 |
| | Receiver ID | 7362 |
| | Receiver Mode | Mode = Peak |
| | Receiver Mode | ACTIVE |
| | Timestamp data | 12-Jul-2008; 09:35:17.5 |
| | Geo-location data | 2650.9448, N, 08203.5057, W |
| | Signal strength (% of maximum) | 83 |
| | Gain | 45 |
| | Signal frequency (kHz) | 1 |
| | Facility depth (meters) | 3.3 |
| | Facility type | Gas (yellow) |
| | Ground type | Pavement |
| | Locate request data | Requestor: XYZ Construction Company, Requested service address: 222 Main St, Orlando, FL |
| | Ambient temperature (° F.) | 75 |
| | Surface temperature (° F.) | 80 |

TABLE 14-continued

Example record of data acquired by locate receiver 1510 upon actuation

| | | |
|---|---|---|
| | Humidity (%) | 84 |
| | Illuminance (lux) | 15500 |
| | Altitude (meters) | 200 |
| | Image captured (Y/N) | Y |
| | Audio captured (Y/N) | N |
| Record # act-3 | Service provider ID | 0482 |
| | User ID | 4815 |
| | Receiver ID | 7362 |
| | Receiver Mode | Mode = Peak |
| | Receiver Mode | ACTIVE |
| | Timestamp data | 12-Jul-2008; 09:35:18.7 |
| | Geo-location data | 2650.9358, N, 08003.5067, W |
| | Signal strength (% of maximum) | 86 |
| | Gain | 45 |
| | Signal frequency (kHz) | 1 |
| | Facility depth (meters) | 3.4 |
| | Facility type | Gas (yellow) |
| | Ground type | Pavement |
| | Locate request data | Requestor: XYZ Construction Company, Requested service address: 222 Main St, Orlando, FL |
| | Ambient temperature (° F.) | 74 |
| | Surface temperature (° F.) | 81 |
| | Humidity (%) | 85 |
| | Illuminance (lux) | 15200 |
| | Altitude (meters) | 200 |
| | Image captured (Y/N) | Y |
| | Audio captured (Y/N) | N |

In a manner similar to Table 14, Table 15A provides another example of a data record that may be generated by locate receiver 1510 upon actuation of the actuation system. Each shown "act" corresponds to a separate actuation. As shown, the data record may include information about the service provider identification, the user (technician) identification, the locate receiver identification, the receiver mode, a timestamp (for example, provided by a timing system such as timing system 128), geo-location data, signal strength data, gain of the locate receiver, signal frequency data, facility depth data, facility type data, ground type data, locate request data, and information relating to the operational sensors 1530. The location tracking system 130 provides the geo-location data. The temperature sensor(s) 1702 provides the temperature data. The compass 1704 provides the heading. The inclinometer 1706 provides the inclination. The accelerometer(s) 1708 provides the acceleration, and in this embodiment is a 3-axis accelerometer. The yaw rate sensor 1710 provides the yaw rate. The proximity sensor 1712 provides the distance, which may represent the distance from the tip of the locate receiver to the ground, in one non-limiting embodiment. The pressure sensor 1714 provides the pressure measurement. This example is provided for purposes of illustration, and is not limiting, as many different forms of data records may be generated based on the operation of the locate receiver 1510.

TABLE 15A

Example record of data acquired by locate receiver 1510 upon actuation

| | | |
|---|---|---|
| Record # act-1 | Service provider ID | 0482 |
| | User ID | 4815 |
| | Receiver ID | 7362 |
| | Receiver Mode | Mode = Peak |
| | Receiver Mode | ACTIVE |
| | Timestamp data | 12-Jul-2008; 09:35:15.2 |

TABLE 15A-continued

Example record of data acquired by locate receiver 1510 upon actuation

| | | |
|---|---|---|
| | Geo-location data | 2650.9256, N, 08003.5234, W |
| | Signal strength (% of maximum) | 86 |
| | Gain | 45 |
| | Signal frequency (kHz) | 1 |
| | Facility depth (meters) | 3.4 |
| | Facility type | Gas (yellow) |
| | Ground type | Pavement |
| | Locate request data | Requestor: XYZ Construction Company, Requested service address: 222 Main St, Orlando, FL |
| | Temperature (° F.) | 75 |
| | Heading (degrees) | 243 |
| | Inclination (degrees) | 25 |
| | Acceleration (g) (x-axis) | 0.75 |
| | Acceleration (g) (y-axis) | 1.20 |
| | Acceleration (g) (z-axis) | 0.90 |
| | Yaw rate (degrees/sec) | 10 |
| | Distance (cm) | 15 |
| | Pressure (pounds/in$^2$) | 45 |
| | Image captured (Y/N) | Y |
| | Audio captured (Y/N) | N |
| Record # act-2 | Service provider ID | 0482 |
| | User ID | 4815 |
| | Receiver ID | 7362 |
| | Receiver Mode | Mode = Peak |
| | Receiver Mode | ACTIVE |
| | Timestamp data | 12-Jul-2008; 09:35:17.5 |
| | Geo-location data | 2650.9256, N, 09003.5234, W |
| | Signal strength (% of maximum) | 86 |
| | Gain | 45 |
| | Signal frequency (kHz) | 1 |
| | Facility depth (meters) | 3.4 |
| | Facility type | Gas (yellow) |
| | Ground type | Pavement |
| | Locate request data | Requestor: XYZ Construction Company, Requested service address: 222 Main St, Orlando, FL |
| | Temperature (° F.) | 75 |
| | Heading (degrees) | 243 |
| | Inclination (degrees) | 25 |
| | Acceleration (g) (x-axis) | 0.80 |
| | Acceleration (g) (y-axis) | 1.50 |
| | Acceleration (g) (z-axis) | 0.70 |
| | Yaw rate (degrees/sec) | 9 |
| | Distance (cm) | 14 |
| | Pressure (pounds/in$^2$) | 48 |
| | Image captured (Y/N) | Y |
| | Audio captured (Y/N) | N |
| Record # act-3 | Service provider ID | 0482 |
| | User ID | 4815 |
| | Receiver ID | 7362 |
| | Receiver Mode | Mode = Peak |
| | Receiver Mode | ACTIVE |
| | Timestamp data | 12-Jul-2008; 09:35:18.7 |
| | Geo-location data | 2650.9256, N, 08003.5234, W |
| | Signal strength (% of maximum) | 86 |
| | Gain | 45 |
| | Signal frequency (kHz) | 1 |
| | Facility depth (meters) | 3.5 |
| | Facility type | Gas (yellow) |
| | Ground type | Pavement |
| | Locate request data | Requestor: XYZ Construction Company, Requested service address: 222 Main St, Orlando, FL |
| | Temperature (° F.) | 75 |
| | Heading (degrees) | 245 |
| | Inclination (degrees) | 27 |
| | Acceleration (g) (x-axis) | 0.50 |
| | Acceleration (g) (y-axis) | 1.00 |
| | Acceleration (g) (z-axis) | 1.00 |
| | Yaw rate (degrees/sec) | 11 |
| | Distance (cm) | 14 |
| | Pressure (pounds/in$^2$) | 50 |
| | Image captured (Y/N) | Y |
| | Audio captured (Y/N) | N |

While Tables 14 and 15A respectively indicate the collection of environmental information and operational information separately, and as part of an actuation data set, it should be appreciated that various embodiments of the present invention are not limited in this respect. In particular, both environmental information and operational information may be collected together as part of a given actuation data set. Furthermore, the inclusion of one or both of environmental information and operational information in an electronic record such as the electronic record 1802 need not be limited to one or more particular actuation data sets; rather, in some exemplary implementations, one or both of environmental information and operational information may be included as a unique component of an electronic record apart from any particular actuation data set (e.g., one or both of environmental and operational information may be common to, or "shared by," one or more actuation data sets).

Figure 26:
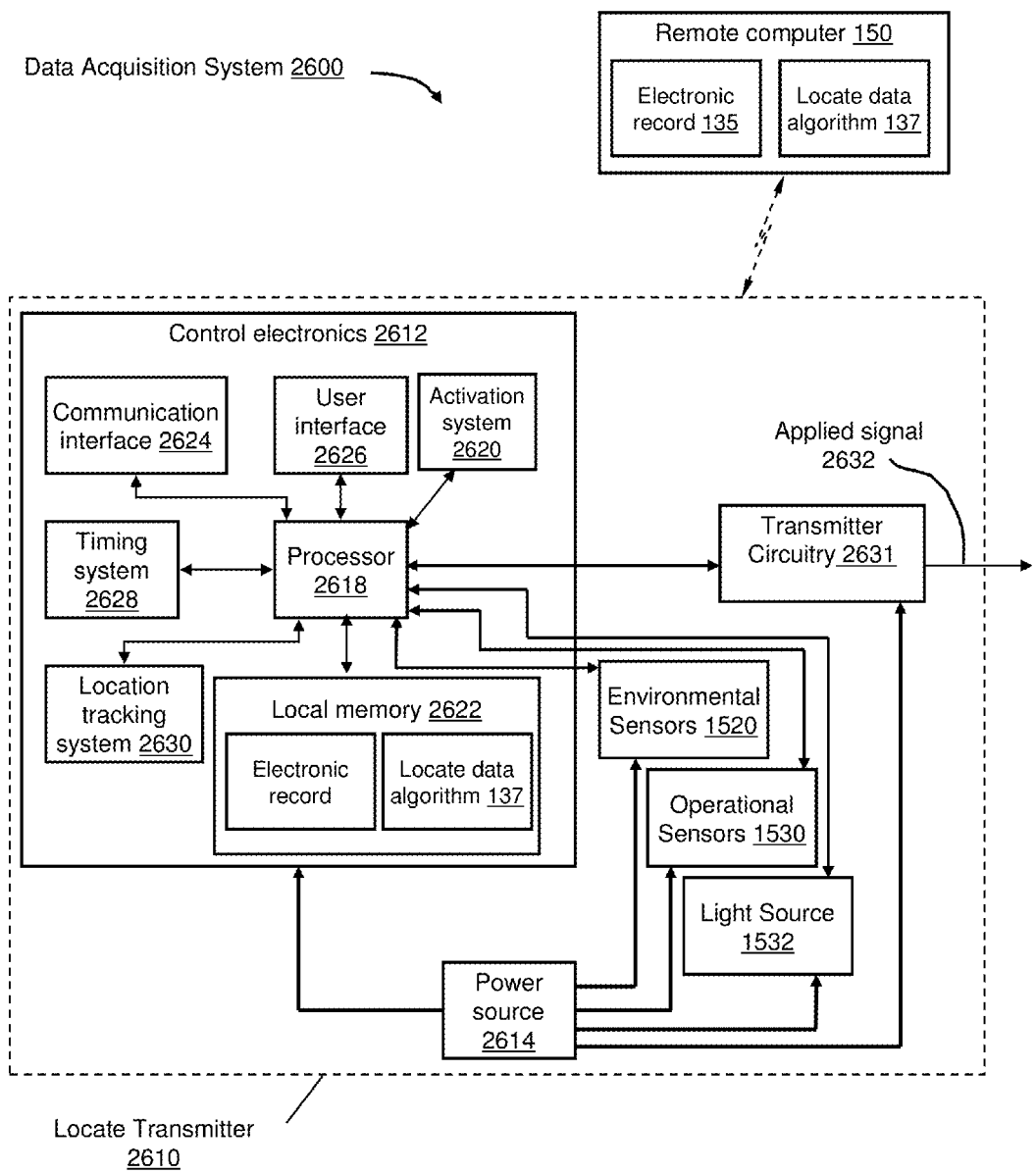
FIG. 26 is a functional block diagram of a data acquisition system including a locate transmitter with both environmental sensors and operational sensors, according to one embodiment of the present invention.

As mentioned previously, locate transmitters may also include environmental and/or operational sensors to sense environmental and/or operating conditions. Such information may be useful in assessing the general environmental conditions of a locate operation and the operating conditions of the locate transmitter, among other things. FIG. 26 illustrates a non-limiting example of a locate transmitter including environmental and operational sensors.

As shown, the data acquisition system 2600 includes a locate transmitter 2610 and the remote computer 150. The locate transmitter 2610 includes control electronics 2612, including a processor 2618, local memory 2622, a communication interface 2624, a user interface 2626, a timing system 2628, and a location tracking system 2630. Those components may be substantially the same as the previously described components of control electronics 112, and therefore are not described in detail now. The control electronics also includes an activation system 2620, which may provide a technician with the capability to generate an applied signal using the locate transmitter 2610. The activation system may comprise a mechanical and/or electrical mechanism. For example, the activation system 2620 may be a switch, button, knob, dial, or other activation device, and may provide the capability for setting the frequency and amplitude of the applied signal 2632. Furthermore, the activation system 2620 may be used to prompt the capture and/or storage of certain locate information generated and/or received by locate transmitter (e.g., applied signal frequency, applied signal amplitude, status of the locate transmitter, environmental and/or operational information, or any other types of locate information described herein), in a manner similar to that described above in connection with the actuation systems of the described locate receivers. Alternatively, the locate information may be collected and/or stored according to any of the previously described schemes for locate receivers (e.g., continuously, periodically, in response to an event, etc.).

In response to activating the activation system, the transmitter circuitry 2631 may generate and transmit the applied signal 2632. The transmitter circuitry 2631 may be any transmitter circuitry capable of generating a suitable applied signal. According to one embodiment, the transmitter circuitry 2631 is configured to provide an applied signal of variable frequency and amplitude. For example, the frequency of applied signal 2632 may be adjustable in increments from about 50 Hz to about 200 kHz, as a non-limiting example.

As shown, the locate transmitter 2610 also includes a power source 2614, which may be substantially the same as previously described power source 114, and which is therefore not described in detail now.

Moreover, the locate transmitter includes the environmental sensors 1520, operational sensors 1530, and light source 1532. These components may be positioned at any suitable location(s) of the locate transmitter, and may operate as previously described.

Information collected by the locate transmitter 2610 may be used to form an event entry and/or an electronic record. For example, event entries similar to those shown in Tables 12 and 13 may be generated in the context of the locate transmitter 2610. Similarly, an electronic record similar those of Tables 14 and 15A may be generated. As a non-limiting example, Table 15B illustrates an electronic record which may be generated by the locate transmitter 2610, for example in response to activation of the activation system 2620.

TABLE 15B

Example record of data acquired by locate transmitter 2610 upon activation

| | | |
|---|---|---|
| Record # act-1 | Service provider ID | 0482 |
| | User ID | 4815 |
| | Transmitter ID | 7362 |
| | Transmitter Mode | Inductive |
| | Timestamp data | 12-Jul-2008; 09:35:15.2 |
| | Geo-location data | 2650.9256, N, 08003.5234, W |
| | Applied signal amplitude (Volts) | 115 |
| | Applied signal frequency (Hz) | 60 |
| | Facility type | Gas (yellow) |
| | Ground type | Pavement |
| | Locate request data | Requestor: XYZ Construction Company, Requested service address: 222 Main St, Orlando, FL |
| | Temperature (° F.) | 75 |
| | Humidity (%) | 31 |
| | Illuminance (lux) | 15200 |
| | Altitude (meters) | 210 |
| | Acceleration (g) (x-axis) | 0.05 |
| | Acceleration (g) (y-axis) | 0.05 |
| | Acceleration (g) (z-axis) | 0.00 |
| | Yaw rate (degrees/sec) | 10 |
| | Image captured (Y/N) | Y |
| | Audio captured (Y/N) | N |

It should be appreciated that Table 15B illustrates a non-limiting example of an electronic record that may be generated in accordance with operation of the locate transmitter 2610, and that other forms of electronic records including other types of information may also or alternatively be generated.

In addition, it should be appreciated that in some embodiments a locate transmitter and locate receiver may communicate with each other and/or a remote computer, such as remote computer 150. For example, in one embodiment each of a locate transmitter and locate receiver forming a locate set may communicate directly with a remote computer, for example to provide the types of information identified in Tables 14, 15A, and 15B. According to another embodiment, one of the locate receiver and locate transmitter may send its information (e.g., the information illustrated in Tables 14, 15A, and 15B) to the other of the two. The device receiving such information may then send the information to the remote computer (or other type of remote device). Other schemes for communication between a locate receiver and locate transmitter are also possible.

VII. Assessing Operation and/or Use of a Locate Device

Environmental information and/or operational information, as well as any of the other constituent components of locate information and landmark information discussed herein, may be used to assess whether a locate device (e.g., locate receiver) is being used and/or a locate operation was or is being performed in accordance with recommended practices or within recommended environmental or operational conditions. For simplicity, the following discussion focuses on locate receivers, although the concepts described also apply to locate transmitters, such as previously described locate transmitter 2610.

As an illustrative example, there may be certain preferred environmental conditions in which a locate receiver may be used and/or a locate operation may be performed.

Additionally, there may be certain preferred process tolerances with respect to performing locate operations. For example, there may be a minimum ambient light specification, a certain angle specification with respect to the locate receiver relative to a target surface, a certain distance specification (i.e., distance from target surface), a certain motion specification with respect to sweeping the locate receiver, and the like. Violations of these process tolerances may result in poorly performed locate operations, which may result in poor customer satisfaction and an increased risk of damage to facilities.

Other environmental and operational tolerances may also be applicable to locate operations, and it should be appreciated that those listed above are non-limiting examples provided for purposes of illustration.

In view of the foregoing, according to another aspect of the present invention, a locate receiver, or a locate operations system comprising a locate receiver, may include an operations monitoring application that operates in combination with the locate receiver or that is installed fully or in part on the locate receiver. In exemplary implementations discussed below, an operations monitoring application may provide for detecting and monitoring the use of locating equipment such as the locate receivers described herein for out-of-tolerance environmental or operational conditions. For example, the operations monitoring application of the present disclosure may provide for detecting and monitoring the use of the locate receiver within the limits of its product specifications with respect to, for example, the ambient temperature and humidity. Additionally or alternatively, monitoring may be based on certain standard operating procedures (e.g., as established by a facility owner, a locate contractor, a regulatory body, etc.). Other bases for monitoring the operation of a locate receiver may also be used.

According to one aspect of this embodiment, once an out-of-tolerance condition is detected, either environmental or operational, an out-of-tolerance alert or notification may be provided to the user (technician) of the locate receiver. In some exemplary implementations, the out-of-tolerance alert may be generated by the control electronics of the locate receiver, although not all implementations are limited in this respect. Additionally or alternatively, a record of such out-of-tolerance alerts may be stored, such as a record of alert acknowledgments that may be stored or transmitted by the locate receiver in response to technician acknowledgement of the alert.

An example of an operations monitoring application is now described. For purposes of illustration, the operations monitoring application is described in connection with locate receiver 1510 discussed above in connection with FIG. 15. However, it should be appreciated that the operations monitoring application may be used in connection with other locate receivers described herein, as well as with locate transmitters (e.g., locate transmitters equipped with environmental and/or operational sensors).

Figure 19:
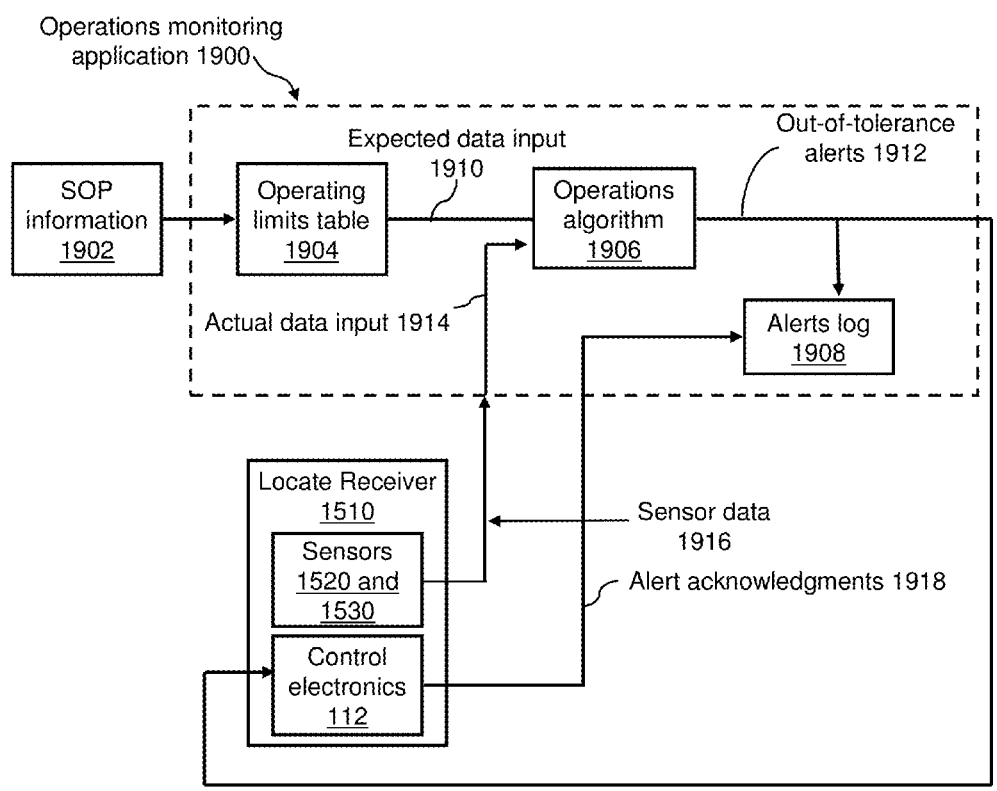
FIG. 19 illustrates a functional block diagram of an example of an operations monitoring application for monitoring the use of locating equipment such as a locate receiver, according to one embodiment of the present invention.

Referring to FIG. 19, a functional block diagram of an example of an operations monitoring application 1900 for detecting and monitoring the use of a locate receiver (e.g., locate receiver 1510 in this non-limiting example) for out-of-tolerance conditions is presented. Operations monitoring application 1900 may include an operations algorithm 1906, which is a software algorithm for determining whether out-of-tolerance environmental and/or operational conditions are present during locate operations and/or whether violations of certain process tolerances occur.

To make determinations of out-of-tolerance conditions/occurrences, operations algorithm 1906 may compare information supplied at an expected data input 1910 to information supplied at an actual data input 1914. For example, an operating limits table 1904 may provide the source of information feeding expected data input 1910. An example of the contents of operating limits table 1904 is shown in Table 16 below. It should be appreciated that such a table may include entries for any one or more conditions sensed by a sensor of the locate receiver, and that those entries shown are non-limiting examples. Also, operating limits table 1904 may include information applicable to locate transmitters in those embodiments in which a locate transmitter is being used.

TABLE 16

Example contents of operating limits table 1904

| Quantity | Value |
| --- | --- |
| Maximum ambient temperature | 100 degrees F. |
| Minimum ambient temperature | 0 degrees F. |
| Maximum surface temperature | 150 degrees F. |
| Minimum surface temperature | 40 degrees F. |
| Maximum ambient humidity | 90% |
| Minimum ambient light level | 2.0 volts |
| Maximum altitude | 2000 meters |
| Minimum angle | −30 degrees |
| Maximum angle | 30 degrees |
| Minimum locate distance | 1 inch |
| Maximum locate distance | 10 inches |
| Maximum motion rate (e.g., sweeping rate) | 1.5 g |
| Maximum yaw rate | 30 degrees/second |
| Maximum pressure | 150 psi |
| Minimum battery strength | 15% |
| Difference between actual vs. expected geo-location | 0.2 miles from location on ticket |
| Locate receiver frequency | =locate transmitter frequency |
| Minimum received signal strength | 50% |

The contents of operating limits table 1904 may be informed by standard operating procedures (SOP) information 1902. In this respect, the contents of operating limits table 1904 may have a dynamic component. That is, in the event that the content of SOP information 1902 is modified and/or that the content of SOP information 1902 varies, for example from one geographic location to another or from one job/work site to another, the content of operating limits table 1904 may automatically vary accordingly. SOP information 1902 may include information, such as, but not limited to, state, local, and/or regional regulations with respect to underground facility locate and marking operations; locate service provider policy information; contractual information; and the like. Further, SOP information 1902 may include information about the current industry-accepted best practices and/or procedures with respect to underground facility locate and marking operations.

One source of information that may be included in SOP information 1902 may be, for example, the information of the Best Practices Version 6.0 document, published in February 2009 by the Common Ground Alliance (CGA) of Alexandria, Va. (www.commongroundalliance.com), which document is hereby incorporated herein by reference in its entirety (this document is a compilation of current recommended practices designed to prevent damage to underground facilities). Other sources of information for SOP information 1902 are also possible.

Generally, the contents of operating limits table 1904 may be variable and dynamic based on one or more factors, such as, but not limited to, dynamic information that may be included in SOP information 1902, best practices that may vary with time of year, best practices that may vary with time of day, best practices that may vary with weather conditions, best practices that may vary with the skill level of the locate technician, and the like.

According to one embodiment, the information supplied to actual data input 1914 is generated and/or collected in real time during locate operations that are performed in the field. For example, the source of information feeding actual data input 1914 may be the locate receiver 1510, although locate receiver 1510 is only a non-limiting example, as any of the locate receivers described herein may be used. The actual data input 1914 may be fed with the data from one or more of the sensors 1520 and 1530, which data is indicated generally in FIG. 19 as sensor data 1916.

Referring again to Table 16, the values that are contained in operating limits table 1904 may be expressed in terms that correspond to the data format that is returned from sensors 1520 and 1530. For example, in one embodiment the light sensor 1608 output may be a voltage, and thus the ambient light level may be expressed in volts in operating limits table 1904. However, the values in table 1904 are not limited to being in any particular format.

Operations algorithm 1906 may compare the information of operating limits table 1904 that is present at expected data input 1910 to the information of sensor data 1916 that is present at actual data input 1914 to determine whether out-of-tolerance environmental and/or operational conditions and/or violations of certain process tolerances are present during locate operations. In one example, operations algorithm 1906 may determine whether locate operations are being performed when the ambient temperature is too hot or too cold, or when the ambient humidity is too high. In another example, operations algorithm 1906 may determine whether the locate receiver angle or distance detected during locate operations exceed acceptable parameters. In yet another example, operations algorithm 1906 may determine whether locate operations are being performed when it is too dark, based on a comparison of a sensed light level to a light level specification.

When out-of-tolerance environmental and/or operational conditions and/or violations of certain process specifications are detected, operations algorithm 1906 may generate out-of-tolerance alerts 1912, the contents of which may reflect the nature of the out-of-tolerance condition. The alerts may take any suitable form, such as an audible alert (a chime, a ring tone, a verbal message or command (e.g., synthesized speech provided by a text-to-speech synthesizer of the locate receiver), etc., for example presented via a speaker of the locate receiver), a visual alert (e.g., a text display presented via display 146 or any other suitable display, an indicator light, etc.), a tactile alert (e.g., vibration of a tactile indicator, as described below in connection with FIG. 24), any combination of those options, or any other suitable type of notification.

Any out-of-tolerance alerts 1912 that are generated may be logged in an alerts log 1908 of operations monitoring application 1900. Further, in those embodiments in which the operations monitoring application 1900 is not loaded and running on the locate receiver itself, any out-of-tolerance alerts 1912 that are generated may be transmitted to the locate receiver 1510, in which the control electronics 112 may process the out-of-tolerance alerts 1912. For example, control electronics 112 may receive out-of-tolerance alerts 1912 and present the contents thereof to the user of locate receiver 1510 (e.g., visually and/or audibly via the display 146 and/or a speaker, via a tactile indicator, etc.).

Additionally, control electronics 112 may generate alert acknowledgments 1918 that correspond to out-of-tolerance alerts 1912. Alert acknowledgments 1918 may be returned to operations monitoring application 1900 and logged in alerts log 1908. Alert acknowledgments 1918 provide evidence that out-of-tolerance alerts 1912 have been received and processed at locate receiver 1510. The contents of alerts log 1908 may be useful to various business applications with respect to locate operations. For example, the contents of alerts log 1908 may be useful to business applications for assessing the quality of locate operations that are performed in the field, assessing the skill and/or competency levels of technicians, and the like. In a specific example, out-of-tolerance alerts 1912 in alerts log 1908 may be monitored in real time by, for example, management personnel of locate companies (e.g., locate contractors, facility owners) regulatory authorities, or other agencies, wherein certain actions in response to out-of-tolerance alerts 1912 may be initiated in real time by the management personnel.

In one implementation, operations monitoring application 1900 may be installed and executing on a computing device (not shown) that is separate from locate receiver 1510, but in communication with the locate receiver 1510, such as remote computer 150. In another implementation, operations monitoring application 1900 may be installed (in memory) and executing (via one or more processors) on a locate receiver itself, such the locate receiver 1510. In yet another implementation, certain functionality and/or components of operations monitoring application 1900 may be installed and executing fully or in part on the combination of a separate computing device and a locate receiver (e.g., locate receiver 1510).

To facilitate operation of a locate receiver (e.g., locate receiver 1510) with operations monitoring application 1900 of FIG. 19 when the application 1900 is executed partly or entirely on a separate computing device (e.g., remote computer 150), the locate receiver may have loaded thereon an operations monitoring client, which may be a counterpart to operations monitoring application 1900. For example, the operations monitoring client may be executed by the processor 118 and may process information of operations monitoring application 1900. Alternatively, the operations monitoring client may comprise a combination of hardware and software and/or firmware, which may be coupled to the locate receiver to communicate with the processor 118. In such an embodiment, the software and/or firmware may process information of operations monitoring application 1900. Alternatively, as note above, the control electronics 112 of the locate receiver may include fully or in part operations monitoring application 1900 itself. According to one embodiment, the operations monitoring client is programmed to enable and disable detection electronics 131 of the locate receiver 1510.

Table 17 shows an example of sensor data 1916 that may be returned from environmental sensors 1520 and operational sensors 1530. Further, sensor data 1916 may include timestamp information, for example from the timing system 128.

TABLE 17

Example sensor data 1916 that may be returned from locate receiver

| Quantity | Data returned |
| --- | --- |
| Timestamp | 12-Jul-2008; 09:35:15.2 |
| Ambient temperature | 73 degrees F. |
| Surface temperature | 78 degrees F. |
| Humidity | 31% |
| Illuminance | 1500 lux |
| Altitude | 105 meters |
| Heading (from compass) | 243 degrees |
| Inclination | −20 degrees |
| Acceleration (x-axis) | 0.285 g |
| Yaw rate | 12 degrees/second |
| Proximity | 15 cm |
| Pressure | 65 psi |
| Device health sensor battery strength | 67% |
| Geo-location | N35°43.57518, W078°49.78314 |
| Image captured (Y/N) | Y |
| Audio captured (Y/N) | N |

Non-limiting examples of how the data provided by the environmental sensors 1520 and operational sensors 1530 may be used by the operations monitoring application 1900 are now given. It should be appreciated that numerous other conditions may be detected and acted upon.

i. Readings from ambient temperature sensor 1602 may be used by operations monitoring application 1900 to determine whether a locate receiver is being used while in an out-of-tolerance condition with respect to ambient temperature. If an out-of-tolerance condition with respect to ambient temperature is present, an example of the corresponding out-of-tolerance alert 1912 may be "It is too cold (or too hot) to be locating. Please acknowledge."

ii. Readings from surface temperature sensor 1604 may be used by operations monitoring application 1900 to determine whether a locate receiver is being used above a surface whose temperature is in an out-of-tolerance condition. If an out-of-tolerance condition with respect to surface temperature is present, an example of the corresponding out-of-tolerance alert 1912 may be "The surface is too cold (or too hot) to be locating. Please acknowledge."

iii. Readings from humidity sensor 1606 may be used by operations monitoring application 1900 to determine whether a locate receiver is being used in an out-of-tolerance condition with respect to humidity. If an out-of-tolerance condition with respect to humidity is present, an example of the corresponding out-of-tolerance alert 1912 may be "The humidity is too high to be locating. Please acknowledge."

iv. Readings from light sensor 1608 may be used by operations monitoring application 1900 to determine whether locate operations are being performed while in an out-of-tolerance condition with respect to lighting. If an out-of-tolerance condition with respect to lighting is present, an example of the corresponding out-of-tolerance alert 1912 may be "There is insufficient light to be performing locating operations effectively and/or safely. Please acknowledge."

v. Readings from location tracking system 130 may be used by operations monitoring application 1900 to determine whether locate operations are being performed in an out-of-tolerance condition with respect to geo-location (e.g., at the wrong location). If an out-of-tolerance condition with respect to the geo-location is present, an example of the corresponding out-of-tolerance alert 1912 may be "It appears that you are at the wrong location. Please suspend operations and check the location information on the locate request ticket. Please acknowledge."

vi. Readings from one or more operational temperature sensors 1702 may be used by operations monitoring application 1900 to determine whether a component of the locate receiver is overheating. An example of the corresponding out-of-tolerance alert 1912 may be "Warning. The locate receiver is overheating. Please turn off the device and allow it to cool. Please acknowledge."

vii. Readings from compass 1704 may be used by operations monitoring application 1900 to determine whether the heading of the locate receiver is out-of-tolerance. If an out-of-tolerance condition with respect to heading is present, an example of the corresponding out-of-tolerance alert 1912 may be "You appear to be heading in the wrong direction. Please adjust course. Please acknowledge."

viii. Readings from inclinometer 1706 may be used by operations monitoring application 1900 to determine whether the locate receiver is being used in an out-of-tolerance condition with respect to angle. If an out-of-tolerance condition with respect to angle is present, an example of the corresponding out-of-tolerance alert 1912 may be "The locate receiver angle is too shallow (or too steep). Please adjust the angle to be about perpendicular to target surface. Please acknowledge."

ix. Readings from accelerometer 1708 may be used by operations monitoring application 1900 to determine whether the locate receiver is being used in an out-of-tolerance condition with respect to the rate of movement and/or motion of the locate receiver during the locate operation. If an out-of-tolerance condition with respect to the motion is present, an example of the corresponding out-of-tolerance alert 1912 may be "You are sweeping the locate receiver too rapidly to pick up a signal reliably. Please slow down the sweeping motion. Please acknowledge."

x. Readings from yaw rate sensor 1710 may be used by operations monitoring application 1900 to determine whether the locate receiver is being used in an out-of-tolerance condition with respect to yaw rate. If an out-of-tolerance condition with respect to yaw rate of the locate receiver is present, an example of the corresponding out-of-tolerance alert 1912 may be "You are twisting the locate receiver too quickly. Please acknowledge."

xi. Readings from proximity sensor 1712 may be used by operations monitoring application 1900 to determine whether the locate receiver is being used in an out-of-tolerance condition with respect to the distance from the surface under which a facility is located. If an out-of-tolerance condition with respect to distance is present, an example of the corresponding out-of-tolerance alert 1912 may be "The tip of the locate receiver is too close (or too far) from the target surface. Please adjust to between 3 and 6 inches from surface. Please acknowledge."

xii. Readings from the pressure sensor 1714 may be used by operations monitoring application 1900 to determine whether the actuation system of the locate receiver is being properly actuated. In an out-of-tolerance condition with respect to pressure is present, an example of the corresponding out-of-tolerance alert 1912 may be "You are not pressing the trigger firmly enough. Please acknowledge."

xiii. In one embodiment the device health sensor 1716 may monitor a battery level of the locate receiver. If an out-of-tolerance condition with respect to the battery level is detected by operations monitoring application 1900, an example of the corresponding out-of-tolerance alert 1912 may be "The battery of the locate receiver is too weak to perform locate operations reliably. Please replace or recharge the battery as soon as possible. Please acknowledge."

xiv. Readings from the detection electronics 131 may be used by operations monitoring application 1900 to determine whether the locate receiver is being used in an out-of-tolerance condition with respect to the frequency. If an out-of-tolerance condition with respect to the frequency is present, an example of the corresponding out-of-tolerance alert 1912 may be "The frequency settings of the locate receiver and locate transmitter do not match. Please check the frequency settings of your locating equipment. Please acknowledge."

xv. Signal strength readings from the detection electronics 131 may be used by operations monitoring application 1900 to determine whether the locate receiver is being used in an out-of-tolerance condition with respect to signal strength. If an out-of-tolerance condition with respect to signal strength is present, an example of the corresponding out-of-tolerance alert 1912 may be "The signal strength of the locate receiver is too weak to be reliable. Please adjust the gain and/or frequency settings of your locating equipment in an attempt to detect a more reliable signal. Please acknowledge."

Other conditions and events that may arise with the operations monitoring application 1900 and which may trigger an alert or notification to the technician include, but are not limited to, the following:

(a) User Input Errors—Action taken by the user, or suggested by usage pattern is invalid for the current device configuration;

(b) System Malfunction Errors—locate receiver encountered a problem while processing valid data, and was unsuccessful in automatically correcting this problem;

(c) Storage Errors—Standard data cache of the locate receiver or extended storage experiences some error in storing the current data, such as insufficient storage space or some other storage error;

(d) Power Errors—locate receiver has either exhausted the battery supply (e.g., power source 114), or an unrecoverable battery/power error was encountered;

(e) Network Errors—The network component (e.g., communication interface 124) has experienced an unrecoverable error;

(f) Geographic Location Errors—The GPS component (e.g., location tracking system 130) has experienced an unrecoverable error;

(g) Actuator Errors—The actuator component (e.g., actuation system 120) has experienced an unrecoverable error;

(h) Synchronization Errors—locate receiver encountered a problem while synchronizing with the host server (e.g., computer 150) and was unsuccessful in automatically correcting this problem;

(i) Data Accessibility Errors—The requested data cannot be retrieved due to data corruption, cache locking, or missing medium;

(j) User Input Required—Operator response is required prior to continuing;

(k) Network Connectivity—The network component (e.g., communication interface 124) has detected a change in coverage (coverage loss, overage gain, etc);

(l) Geographic Position Accuracy—The GPS component (e.g., location tracking system 130) has detected a change in overall accuracy (gain or loss of satellite, WAAS support, etc).

In the examples above, alert acknowledgments 1918 in response to out-of-tolerance alerts 1912 may take various forms. In one example, the technician may acknowledge using the user interface 126, for example by pushing a button, flipping a switch, or selecting a menu option, depending on the type of user interface. Different user inputs (buttons, toggles, menu selections, etc.) may have different meanings with respect to providing alert acknowledgments 1918. Table 18 below shows an example of alert acknowledgments 1918, wherein, as a non-limiting example, certain keys of a user interface of the locate receiver have certain meanings.

TABLE 18

Example alert acknowledgments 1918

| Key | Meaning |
| --- | --- |
| # | Indicates an acknowledgement that the alert is received |
| * | Indicates an acknowledgement that the alert is received and that corrective action is being or has been taken |
| @ | Indicates an acknowledgement that the alert is received and that locate operations are continuing regardless |
| $ | Indicates an acknowledgement that the alert is received and that locate operations are (temporarily) suspended |

In another example, a dropdown menu and/or a set of icons that include the various types of alert acknowledgments 1918, such as shown in Table 18, may be presented on the display of the locate receiver. The user may then select the desired type of alert acknowledgment 1918 from the dropdown menu and/or icons.

Also, as mentioned above, out-of-tolerance conditions and other conditions detected by the environmental and/or operational sensors may be logged, for example into alerts log 1908, irrespective of whether an alert is provided to the technician. Thus, for any of the above-described examples in which an alert may be generated, a log of the detected condition may also or alternatively be made. Also, other conditions than those described above may be logged.

Figure 20:
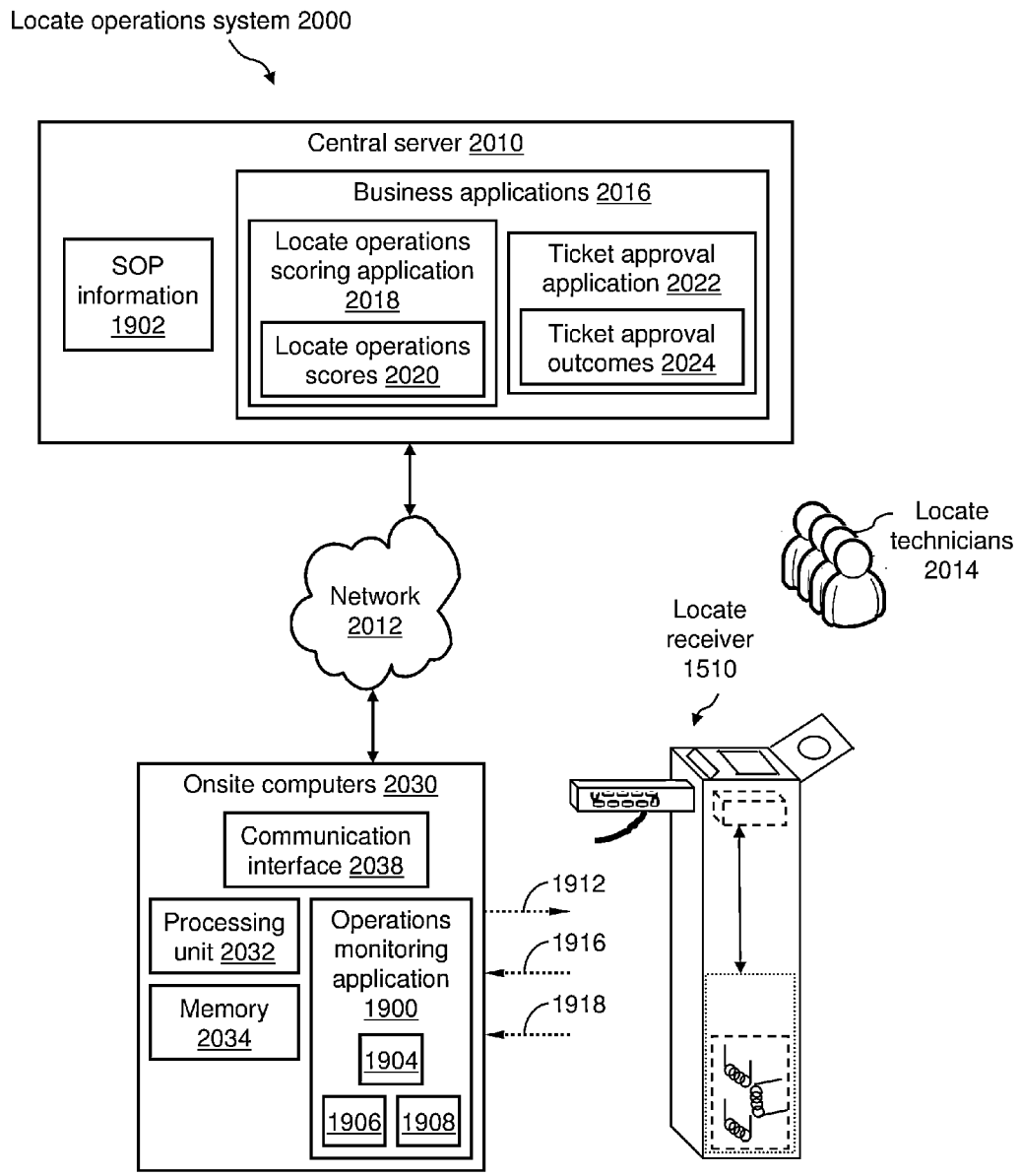
FIG. 20 illustrates a functional block diagram of an example of a locate operations system including the operations monitoring application of FIG. 19, according to one embodiment of the present invention.

FIG. 20 is a functional block diagram of an example of a locate operations system 2000 that includes operations monitoring application 1900 of FIG. 19 and the locate receiver 1510 of FIG. 15. Again, other locate receivers or locate transmitters as described herein may be used, and locate receiver 1510 is described only for purposes of illustration. Locate operations system 2000 may include a central server 2010, which is maintained and operated by, for example, a locate company, a facilities owner, a regulatory authority, or other agency (not shown). Central server 2010 may be any local or centralized computing device that is capable of hosting and facilitating execution of one or more applications. In implementation, central server 2010 may be a networked application server and/or web server that is connected to a network 2012. Examples of personnel that may be associated with central server 2010 include locate technicians 2014.

Residing on central server 2010 may be business applications 2016, which may be any business applications that may be useful with respect to locate operations. In one example, business applications 2016 may include a locate operations scoring application 2018 that processes information about locate operations and generates locate operations scores 2020 that may indicate the degree of quality of individual locate operations. Additionally, SOP information 1902 may reside at central server 2010 and may be accessed by operations monitoring application 1900 and/or any entity of locate operations system 2000 via network 2012.

For example, locate operations scoring application 2018 may be based on various embodiments of a quality assessment application, as well as any one or more of the scoring criteria and/or exemplary metrics disclosed in connection with such quality assessment applications, as set forth in U.S. Non-provisional application Ser. No. 12/493,109, filed Jun. 26, 2009, entitled "METHODS AND APPARATUS FOR QUALITY ASSESSMENT OF A FIELD SERVICE OPERATION," and published as U.S. Patent Publication 2009-0327024-A1, which application is incorporated by reference herein. In particular, a quality assessment application may be configured to receive a variety of information germane to locate and marking operations, and compare such information to expected values or benchmarks (metrics) based on various criteria. A scoring algorithm implemented as part of some implementations of a quality assessment application may compare various input information (e.g., "field information," as obtained from one or more pieces of locating equipment such as a locate receiver) to the expected values or benchmarks to generate a quality assessment score in an automated fashion.

In another example, business applications 2016 may include a ticket approval application 2022 that processes information about locate and marking operations and generates ticket approval outcomes 2024 that again may indicate the degree of quality of individual locate and marking operations. For example, ticket approval application 2022 may be based on the ticket approval system that is described in U.S. Non-provisional application Ser. No. 12/204,454, filed Sep. 4, 2008, entitled "TICKET APPROVAL SYSTEM FOR AND METHOD OF PERFORMING QUALITY CONTROL IN FIELD SERVICE APPLICATIONS," and published as U.S. Patent Publication 2009-0204466-A1, which application is hereby incorporated herein by reference. This application describes a ticket approval system for and method of performing quality control (QC) in field service applications. The ticket approval system may include a work management server. The work management server may include a ticket approval software application and a database for storing digital ticket information, such as field service site identification information, manifest information, and digital images of field service activities. A method of performing QC may include, but is not limited to, the field technician completing the ticket and providing data/images, an approver viewing and selecting a certain field technician and ticket for quality control review, the approver reviewing data/images of the selected ticket, the approver approving the ticket, the approver tagging the ticket for QC, a QC approver processing QC referrals, the QC approver routing the ticket to a QC technician, the QC technician completing the QC tasks and updating the data/images of the selected ticket, the approver tagging the ticket for coaching, the approver processing coaching referrals, and the approver performing coaching tasks.

Network 2012 may be, for example, any local area network (LAN) and/or wide area network (WAN) for connecting to the Internet. In one non-limiting embodiment, network 2012 provides the communication link between any and/or all entities of locate operations system 2000. For example, network 2012 provides the communication network by which information may be exchanged between central server 2010, one or more onsite computers 2030, and/or locating equipment (e.g., locate receiver 1510) that are used by locate technicians 2014 in the field.

Onsite computers 2030 may be any computing devices that are capable of processing and executing program instructions. Onsite computers 2030 may be used by locate technicians 2014 that are performing locate and marking operations in the field. For example, each onsite computer 2030 may be a portable computer, a personal computer, a tablet device, a personal digital assistant (PDA), a cellular radiotelephone, a mobile computing device, a touch-screen device, a touchpad device, or generally any device including, or connected to, a processor and a user interface. Preferably, each onsite computer 2030 is a portable computing device, such as laptop computer or tablet device. Onsite computers 2030 may be used by locate technicians 2014 to process locate request tickets (not shown) and to perform locate and marking operations accordingly.

Additionally, operations monitoring application 1900 may be installed on onsite computers 2030. For example, operations monitoring application 1900 may be used to process information received from or transmitted to locate receiver 1510. Each onsite computer 2030 may include a processing unit 2032, which may be any standard controller or microprocessor device that is capable of executing program instructions, such as those from operations monitoring application 1900. Each onsite computer 2030 may also include a quantity of memory 2034, which may be any data storage mechanism for storing any information that is processed locally at onsite computer 2030. Processing unit 2032 and memory 2034 may be used for managing the overall operations of onsite computer 2030.

Further, each onsite computer 2030 may include a communication interface 2038 for connecting to network 2012 and/or for communication with locating equipment. For example, communication interface 2038 may be any wired and/or wireless communication interface by which information may be exchanged between any entities of locate operations system 2000.

Operations monitoring application 1900 is used in locate operations system 2000 for detecting and monitoring the use of locating equipment (e.g., locate receiver 1510) in out-of-tolerance conditions, as described above. For example, operations algorithm 1906 of operations monitoring application 1900 determines whether out-of-tolerance environmental and/or operational conditions are present during locate operations and/or whether violations of certain process tolerances are present during locate operations. Optionally, operations monitoring application 1900 may be used to automatically enable and disable (either electrically, mechanically, or both) locating equipment in the field based on certain out-of-tolerance conditions being present.

Further, locate operations system 2000 is not limited to the types and numbers of entities that are shown in FIG. 20. Any types and numbers of entities that may be useful in underground facilities locate applications may be included in locate operations system 2000. More details of a method of detecting and monitoring the use of locating equipment for out-of-tolerance conditions by use of locate operations system 2000 are described with reference to FIG. 21.

Figure 21:
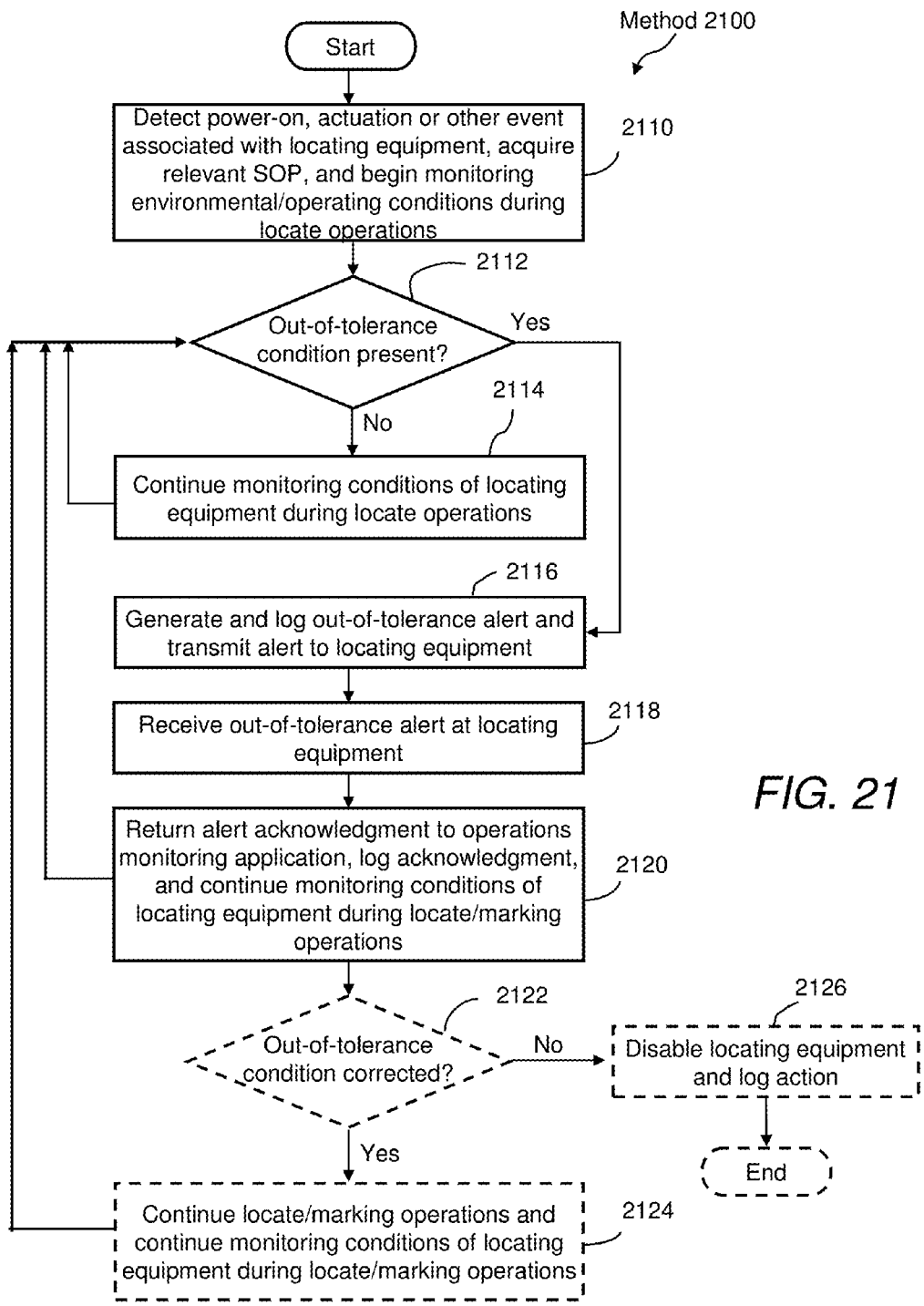
FIG. 21 illustrates a method of operation of a locate operations system including an operations monitoring application, according to one embodiment of the present invention.

FIG. 21 illustrates a flow diagram of an example of a method 2100 of detecting and monitoring the use of locating equipment, such as the various locate receivers and transmitters described herein, for out-of-tolerance conditions utilizing, for example, locate operations system 2000 of FIG. 20. As noted above, the method may be implemented on any suitable combination of hardware, such as those items shown in FIG. 20, or entirely on the locate receiver itself. Method 2100 may include, but is not limited to, the following steps, which may be implemented in any order.

At step 2110, onsite computer 2030 or the locate receiver itself may detect powering up (e.g., a power on state), and/or one more specific events (e.g., docking/de-docking of a locate receiver, one or more actuations, error conditions, technician interaction with a user interface, etc.) associated with a locate receiver, such as locate receiver 1510. Additionally, the relevant SOP information is acquired. For example, using location tracking system 130 of locate receiver 1510, the geo-location of the job/work site may be determined. Based on this geo-location information, operations monitoring application 1900 automatically queries SOP information 1902 at central server 2010 for the SOP information of the regulatory body that corresponds to the location of the work site, which is used to inform operating limits table 1904 of operations monitoring application 1900.

Subsequently, operations monitoring application 1900 at onsite computer 2030 may begin monitoring the environmental and/or operating conditions associated with use of the locate receiver. For example, operations algorithm 1906 of operations monitoring application 1900 begins monitoring sensor data 1916 that is returned from locate receiver 1510 and compares the contents of sensor data 1916 to information in operating limits table 1904.

At decision step 2112, operations algorithm 1906 of operations monitoring application 1900 determines whether any out-of-tolerance conditions are present. For example, if any one of the following out-of-tolerance conditions is present, method 2100 may proceed to step 2116. However, if none of the following out-of-tolerance conditions are present, method 2100 may proceed to step 2114. The following out-of-tolerance conditions are exemplary only and not meant to be limiting.

1. Readings from ambient temperature sensor 1602 may indicate an out-of-tolerance condition with respect to ambient temperature when compared against, for example, the maximum ambient temperature and/or minimum ambient temperature specifications of operating limits table 1904 (see, for example, Table 16).
2. Readings from surface temperature sensor 1604 may indicate an out-of-tolerance condition with respect to surface temperature when compared against, for example, the maximum surface temperature and/or minimum surface temperature specifications of operating limits table 1904 (see, for example, Table 16).
3. Readings from humidity sensor 1606 may indicate an out-of-tolerance condition with respect to humidity when compared against, for example, the maximum ambient humidity specification of operating limits table 1904 (see, for example, Table 16).
4. Readings from light sensor 1608 may indicate an out-of-tolerance condition with respect to lighting when compared against, for example, the minimum ambient light level specification of operating limits table 1904 (see, for example, Table 16).
5. Readings from compass 1704 may indicate an out-of-tolerance condition with respect to heading when compared against, for example, an expected value.
6. Readings from inclinometer 1706 may indicate an out-of-tolerance condition with respect to locate receiver angle when compared against, for example, the minimum angle and/or maximum angle specifications of operating limits table 1904 (see, for example, Table 16).

7. Readings from accelerometer 1708 may indicate an out-of-tolerance condition with respect to the rate of movement and/or motion of the locate receiver when compared against, for example, the maximum motion rate specification of operating limits table 1904 (see, for example, Table 16).

8. Readings from yaw rate sensor 1710 may indicate an out-of-tolerance condition with respect to yaw rate when compared against, for example, the maximum yaw rate specification of operating limits table 1904 (see, for example, Table 16).

9. Readings from proximity sensor 1712 may indicate an out-of-tolerance condition with respect to locate receiver distance from a target surface when compared against, for example, the minimum distance and/or maximum distance specifications of operating limits table 1904 (see, for example, Table 16).

10. Readings from pressure sensor 1714 may indicate an out-of-tolerance condition with respect to the pressure exerted on an actuation system of the locate receiver when compared against, for example, the maximum pressure specifications of operating limits table 1904 (see, for example, Table 16).

11. Information from the device health sensor 1716 that is monitoring the battery of the locate receiver may indicate an out-of-tolerance condition with respect to battery strength when compared against, for example, the minimum battery strength specification of operating limits table 1904 (see, for example, Table 16).

12. Information from the detection electronics 131 may indicate an out-of-tolerance condition with respect to frequency, for example when compared against the locate receiver frequency specification of operating limits table 1904 (see, for example, table 16).

13. Information from the detection electronics 131 may provide signal strength readings which may indicate an out-of-tolerance condition with respect to signal strength when compared to, for example, the signal strength specifications of operating limits table 1904 (see, for example, table 16).

At step 2114, operations monitoring application 1900 continues to monitor the conditions (e.g., environmental and/or operating) of the locate receiver during locate operations. For example, operations monitoring application 1900 at onsite computer 2030 continues to monitor the conditions of the locate receiver 1510 during locate operations by comparing the contents of sensor data 1916 to information in operating limits table 1904. At the conclusion of this step, method 2100 may, for example, return to step 2112.

At step 2116, operations monitoring application 1900 generates the corresponding out-of-tolerance alert 1912, logs the out-of-tolerance alert 1912 in alerts log 1908, and transmits the out-of-tolerance alert 1912 to the locating equipment, such as to locate receiver 1510, in those embodiments in which the method is not entirely implemented on the locate receiver itself. By way of example, the following out-of-tolerance alerts 1912 correspond respectively to the example out-of-tolerance conditions of step 2112. The following out-of-tolerance alerts 1912 are exemplary only and not meant to be limiting. Also, the below-indicated alerts with respect to surface temperature and humidity may be applicable to scenarios in which a locate technician is both locating and marking a facility.

1. "It is too cold (or too hot) to be locating. Please acknowledge."

2. "The surface temperature is too cold (or too hot) to dispense marking material. Please acknowledge."

3. "The humidity it too high to be locating and/or dispensing marking material. Please acknowledge."

4. "There is insufficient light to be performing locate operations effectively and/or safely. Please acknowledge."

5. "You appear to be heading in the wrong direction. Please acknowledge."

6. "Receiver angle is too shallow (or too steep). Please adjust the angle to be about perpendicular to target surface. Please acknowledge."

7. "Locating (sweeping) motion is too rapid or too erratic to pick up a signal reliably. Please slow down or smooth out the motion. Please acknowledge."

8. "Locate receiver is being twisted too quickly. Please acknowledge."

9. "The tip of the locate receiver is too close (or too far) from the target surface. Please adjust to between 3 and 6 inches from surface. Please acknowledge."

10. "You are applying too much pressure to the actuator. Please acknowledge."

11. "The battery of the locate receiver is too weak to perform locate operations reliably. Please replace or recharge the battery as soon as possible. Please acknowledge."

12. "The frequency settings of the locate receiver and the locate transmitter do not match. Please check the frequency settings of your locating equipment. Please acknowledge."

13. "The signal strength of the locate receiver is too weak to be reliable. Please adjust the gain and/or frequency settings of your locating equipment in an attempt to detect a more reliable signal. Please acknowledge."

At step 2118, one or more out-of-tolerance alerts 1912 are received at the locating equipment, such as locate receiver 1510, in those embodiments in which alerts are not generated on the locate receiver itself. The out-of-tolerance alerts 1912 may be presented to the user in, for example, text form via a display of the locate receiver, audible form (e.g., synthesized speech provided by a text-to-speech synthesizer of the locate receiver) via a speaker of the locate receiver, or in any other suitable manner.

At step 2120, a certain alert acknowledgment 1918 may be returned to operations monitoring application 1900. For example, the user, such as a certain locate technician 2014 may press a certain key of the user interface of the locate receiver and initiate the desired alert acknowledgment 1918, such as those shown above in Table 18. Once the alert acknowledgment 1918 is received at operations monitoring application 1900, it may be associated with its originating out-of-tolerance alert 1912 and logged in alerts log 1908. Subsequently, operations monitoring application 1900 continues to monitor the conditions of the locating equipment, such as locate receiver 1510. At the conclusion of this step, method 2100 may, for example, return to step 2112 and may optionally proceed to step 2122.

Optionally, method 2100 may include steps to disable locating equipment (e.g., by disabling the actuation system, the detection electronics, or any other component of the locating equipment) until or unless a certain out-of-tolerance condition is corrected. For example, method 2100 may optionally include the following steps.

At optional decision step 2122, certain out-of-tolerance conditions may carry such importance that the suspension of locate operations is mandated (e.g., disable actuations so as to impede the technician from continuing). One such out-of-tolerance condition may be the out-of-tolerance condition with respect to temperature. Another such out-of-tolerance condition may be the out-of-tolerance condition with respect to humidity. Yet another such out-of-tolerance condition may be the out-of-tolerance condition with respect to lighting. Still another such out-of-tolerance condition may be the out-of-tolerance condition with respect to acceleration or velocity. Other out-of-tolerance conditions may also be sufficiently important to mandate suspending locate operations, and those examples listed are non-limiting. In these examples, operations monitoring application 1900 may wait a certain amount of time (e.g., 1 minute) from the initial detection of the out-of-tolerance conditions and again acquire sensor data 1916 to determine whether the out-of-tolerance condition is still present or has been corrected. If the out-of-tolerance condition has been corrected, method 2100 may proceed to step 2124. However, if the out-of-tolerance condition has not been corrected, method 2100 may proceed to step 2126.

At optional step 2124, the locate technician 2014 continues to perform locate operations and operations monitoring application 1900 continues to monitor the conditions of the locate receiver. At the conclusion of this step, method 2100 may, for example, return to step 2112.

At optional step 2126, the locate receiver may be disabled. For example, actuation system 120 of locate receiver 1510 may be disabled to impede user acuations and/or detection electronics 131 may be disabled. The action to disable may be logged in alerts log 1908.

At any time during the steps of method 2100, the contents of alerts log 1908 may be processed by business applications 2016. In one example, alerts log 1908 may be processed by locate operations scoring application 2018 and/or ticket approval application 2022 for assessing the quality of locate and marking operations that are performed in the field, assessing the skill and/or competency levels of locate technicians, and the like.

While FIGS. 19-21 illustrate some non-limiting examples of manners in which data provided by environmental sensors and/or operational sensors of a locate receiver may be used, other uses are also possible. For example, the data from environmental sensors 1520 and/or operational sensors 1530 may be used to trigger alerts or notifications to a technician irrespective of whether the sensed condition is outside tolerances. For example, in some instances there may not be a specific tolerance for a given environmental or operational condition, and yet an alert to the technician may be generated for the purpose of making the technician aware of whatever value the sensed condition has taken. Thus, the generation of alerts/notifications/warnings based on sensed environmental and operational conditions is not limited to those instances in which the sensed condition takes any particular value(s). Furthermore, alerts may be generated based on conditions relating to dispensing of a marking material, which may be applicable to scenarios in which a technician is both locating and marking a facility. For example, sensed conditions with respect to ambient temperature, surface temperature, and/or humidity, among others, may impact dispensing of a marking material, and thus alerts/notifications may be presented to the technician to indicate whether conditions are appropriate for or adverse to dispensing of a marking material. Also, as previously explained, the alert/notification signal(s) described herein may take any suitable form(s), such as an audible alert (a chime, a ring tone, a verbal message or command (e.g., synthesized speech provided by a text-to-speech synthesizer of the locate receiver), etc.), a visual alert (e.g., a text display (for example, in those embodiments in which the locate receiver includes a display), an indicator light, etc.), a tactile indication, any combination of those options, or any other suitable type of notification.

Also, it should be appreciated that information from one or more of the environmental sensors 1520 and/or operational sensors 1530 may be used more generally to control or alter operation of the locate receiver. For example, one or more components of the locate receiver 1510 may be activated, enabled, or disabled, or the functionality thereof controlled or altered in some manner, in response to one or more of the environmental sensors 1520 and/or operational sensors 1530 providing environmental information and/or operational information indicative that such control should be exhibited. Such activation, enablement, and/or disablement may be electrical in nature (e.g., providing power or an enable signal, triggering operation of a sensor, etc.), mechanical in nature (e.g., causing a locking mechanism to be engaged on the actuation system) or both. For example, if the sensed inclination of the locate receiver as sensed by inclinometer 1706 is unsuitable for locating, the actuation system 120 and/or detection electronics 131 may be disabled. Similarly, if the acceleration as sensed by accelerometer 1708 is out-of-tolerance with accepted practices, the actuation system 120 and/or detection electronics 131 may be disabled. If a sensed condition is out-of-tolerance, the operation of one of the environmental and/or operational sensors may be altered, for example by altering the sampling rate to collect more or less data. According to one embodiment, the sampling rate of a location tracking system of the locate receiver may be increased in response to an out-of-tolerance heading detected by the compass of the locate receiver. According to another embodiment, the sampling rate of the location tracking system may be increased in response to the location tracking system detecting an out-of-tolerance location. Other control actions are also possible, and the aspects described herein relating to controlling the locate receiver in response to sensing environmental and/or operational conditions are not limited in the types of actions that may be taken or the sensed conditions which may trigger action/alteration.

Furthermore, the determination of whether a condition or multiple conditions are out-of-tolerance, whether to generate an alert or notification to a technician, or whether to control/alter some functionality of the locate receiver based at least in part on environmental and/or operational information, may be made in any suitable manner. For instance, as illustrated in some of the foregoing examples, such a determination may be made by comparison of a single value from a sensor to an expected or target value. Alternatively, outputs from the environmental sensors and/or operational sensors may be monitored for changes (e.g., any change, or by some predetermined amount), rather than for a particular single value. For example, a change in temperature, or a change in light, may initiate generation of an alert, rather than a single temperature or light value.

In addition, information provided by one or more of the environmental sensors and/or operational sensors may be monitored and analyzed to detect patterns. For example, information provided by the operational sensors may be used to formulate and assess patterns of operation of a particular technician, which may be thought of as technician "signatures." As an example, a particular technician may have a characteristic motion when performing a locate operation, such as when sweeping over a buried facility, or may perform the operation at a characteristic speed. Assessing information provided by the one or more accelerometers 1708, for example, may allow for determination of the unique characteristic. Once determined, information from the operational sensors on future jobs may allow for identification of the technician based on the unique characteristic, and may also be used to assess whether the technician is operating in his/her normal manner or whether he/she is deviating from his/her usual operation, which may suggest that the technician was doing something out of the ordinary, and which accordingly may cause generation of an alert/notification and/or alteration of the locate receiver. Such information, therefore, may be used for quality control and/or for training purposes of technicians. Similarly, such operating information from multiple technicians may be used to develop standard operating guidelines or protocols.

It should be appreciated from the foregoing discussion that information provided by two or more of the environmental sensors may be used in combination, for example to assess the environmental conditions, to interact with the technician (e.g., generate an alert), and/or to control/alter operation of the locate receiver (e.g., disable or enable actuation of the locate receiver). As a non-limiting example, the sensed ambient temperature in combination with the sensed humidity may provide information about whether a particular form of precipitation is present (e.g., snow, rain, etc.), in response to which an alert may be generated and/or one or more components of the locate receiver may be enabled or disabled (e.g., the actuation system may be disabled). Non-limiting examples of useful combinations of environmentally sensed conditions include: ambient temperature+humidity; surface temperature+humidity; ambient temperature+surface temperature; ambient temperature+light sensor; light+image capture; light+audio capture; and ambient temperature+humidity+light. However, it should be appreciated that other combinations are also possible.

It should also be appreciated from the foregoing discussion that information provided by two or more of the operational sensors may be used in combination, for example to assess the operational conditions of a locate receiver, to interact with the technician, to assess, determine and/or analyze technician "signatures" associated with device use/manipulation, and/or to control or alter operation of the locate receiver (e.g., to disable actuation of the locate receiver, enable actuation of the locate receiver, etc.). Non-limiting examples of useful combinations of sensed operational conditions which may be used for any of the purposes described above include: acceleration of locate receiver+proximity of locate receiver to surface; proximity of locate receiver to surface+inclination of locate receiver; acceleration+heading; geo-location+heading+acceleration; and geo-location+acceleration+inclination. However, it should be appreciated that other combinations are also possible.

Furthermore, according to one embodiment, information provided by one or more environmental sensors may be used in combination with information provided by one or more operational sensors, for example to assess the quality of the locate operation, to interact with the technician, to assess, determine and/or analyze technician "signatures" associated with device use/manipulation, and/or to control or alter operation of the locate receiver (e.g., disable or enable actuation of the locate receiver). For example, information about ambient light level sensed by a light sensor may be used in combination with acceleration data from an accelerometer, as, for example, it may be preferable in some embodiments for a technician to move more slowly in low light conditions. Other combinations of sensor information may also be useful depending on a particular application.

VIII. Group Mode and Solo Mode

As previously explained, the locate receivers described herein may be used in different modes, examples of which include locate mode and landmark mode. In addition, locate receivers according to one aspect of the present invention may be operated in a so-called "solo mode" or a so-called "group mode."

For some locate operations, a single technician may be present at the jobsite and may complete the locate operation. Thus, any locate data collected relating to the job may be solely from the technician's locate receiver and may not need to be combined with locate data from any other locate receivers. In such situations, the locate receiver may be operated as an individual, independent locate receiver in solo mode. As described above, data collected by the locate receiver may be stored locally and/or transmitted to a host server, such as remote computer 150.

For certain types of underground facility locate operations, multiple locate technicians may be working on a same locate ticket simultaneously. When this occurs, it may be advantageous for some or all of the locate receivers that are used during performance of the ticketed job to consolidate data, such as by providing data to a host server. This may be accomplished through the use of a group mode of operation of the locate receivers. In group mode, a locate receiver may act as a "worker" device, and may not be capable of transmitting its collected locate data to a remote computer. For example, the wireless transmission capability of the locate receiver may be disabled in group mode. Rather, the locate data may be cached in local memory 122 of the locate receiver, or may be transmitted to another locate receiver, which may act as a "leader" device, receiving the collected locate data from the other locate receivers used for the locate operation. The leader locate receiver may then transmit the collected locate information to a remote computer, or may handle the collected information in any suitable manner.

Selection of solo mode and group mode may be accomplished in any suitable manner. For example, selection between these two modes may be facilitated by any suitable combination of hardware and/or software on the locate receiver. For example, the locate receiver may include mode controller software for selecting the operating mode of the locate receiver. According to one embodiment, the user interface of the locate receiver may include a toggle switch for toggling between solo mode and group mode. Alternatively, the locate receiver may present the technician with a menu on a graphical display of user interface 122, from which the technician may choose the desired mode. Other schemes for allowing selection of solo mode and group mode are also possible.

IX. Enhancements to Determination of Location of Locate Receiver

According to some embodiments, it may be desirable to know the location of the tip of the locate receiver, as for example, the tip may be the portion of the locate receiver located in close proximity to the ground when a locate technician sweeps the locate receiver over the ground to detect a buried facility. Thus, for example, determining the motion of the tip of the locate receiver may allow for assessment of technician manipulation of the locate receiver, which may be used for quality control, training purposes, and standard setting, among other things. Thus, according to another aspect of the present invention, methods and apparatus are provided for determining the location of the tip of a locate receiver. However, it should be appreciated that the tip of the locate receiver is a non-limiting example of a specific point of interest of a locate receiver for which it may be desirable to know the location, as, for example, other portions of the locate receiver may be of interest in other embodiments. The methods and apparatus described herein may be applied equally well to the determination of any point of interest on the locate receiver.

One approach for determining the location of the tip of the locate receiver (e.g., tip 148 shown in FIG. 5), or any other point of interest on the locate receiver, is to place a location tracking system at that point. Thus, according to one embodiment, a locate receiver, such as any of the locate receivers described previously herein, or any other locate receiver, may include a location tracking system 130 as discussed in other embodiments (e.g., a GPS receiver), wherein the location tracking system is disposed at or sufficiently near the tip of the locate receiver, allowing for determination of the location of the tip of the locate receiver. Thus, the location tracking system 130 may provide the geo-location of the tip of the locate receiver, which, as mentioned, may be useful for a variety of reasons. For example, the geo-location information provided by the location tracking system may be used to record the motion of the tip of the locate receiver, which may be used for detection of out-of-tolerance operation of the locate receiver, determination of operating patterns of technicians, or for various other purposes.

While the above-described embodiment provides a location tracking system positioned at the point of interest on the locate receiver, such positioning of a location tracking system may not always be possible or advantageous. For example, as explained previously herein, in some embodiments the operation of the location tracking system may be facilitated by positioning the location tracking system toward the top of the locate receiver, for example if the location tracking system is a GPS receiver. However, as mentioned, it may be desirable in some embodiments to determine the location of the tip of the locate receiver, or any other point of interest of the locate receiver, which in some situations will not correspond to the top of the locate receiver. Thus, according to one embodiment, methods and apparatus are provided for determining the location of a point of interest of a locate receiver when a location tracking system is located at a different point on the locate receiver. For simplicity of explanation, the following examples will be discussed assuming that a location tracking system is located near the top of the locate receiver and that the point of interest of the locate receiver is the tip of the locate receiver. It should be appreciated that the described apparatus and techniques may apply equally well to other positions of the location tracking system and points of interest on the locate receiver.

Figure 22:
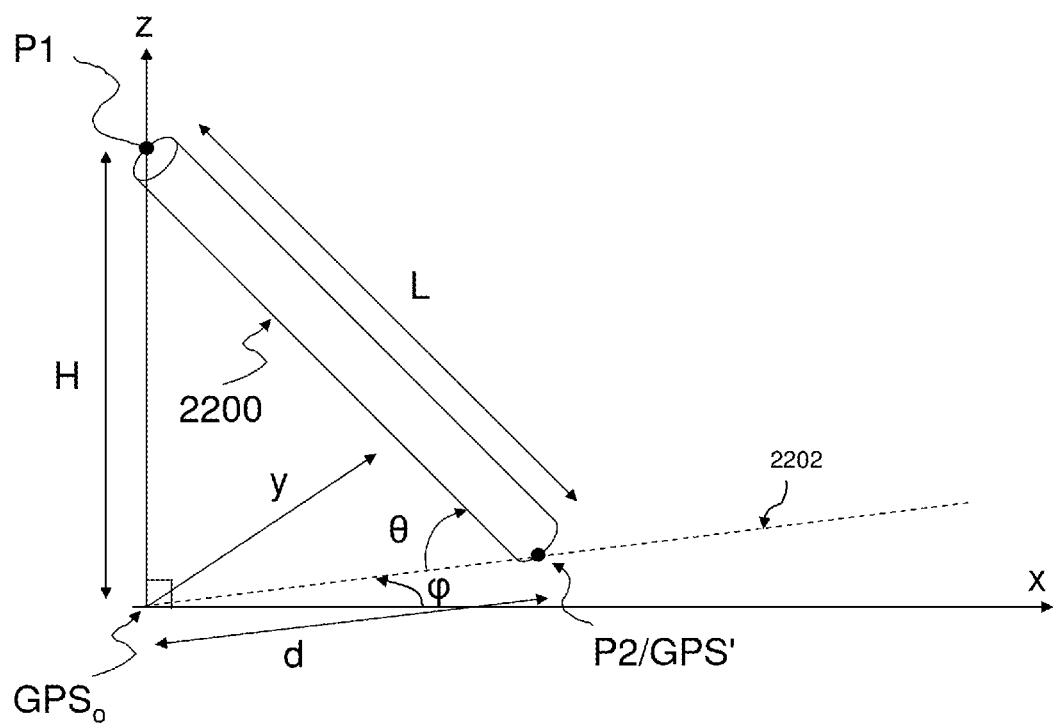
FIG. 22 is a schematic diagram illustrating a configuration for determining the difference in location between two points of a locate receiver.

To facilitate the following discussion, it is useful to first consider the physical configuration at issue for determining the location of the tip of the locate receiver when the location tracking system is located at or near the top of the locate receiver. For this purpose, the locate receiver may be represented in simplified form as an elongated rod or stick. FIG. 22 illustrates a perspective view of such a simplified representation of a locate receiver, shown as locate receiver 2200.

In FIG. 22, the x-y plane represents the ground and the z-direction represents the vertical direction perpendicular to the ground. The point P1 may be the location of a location tracking system (e.g., a GPS receiver), and in some embodiments may correspond generally to the top of the locate receiver, for example near where the technician may hold the locate receiver if it is a handheld device. The point P2 represents the point of interest of the locate receiver, and in this non-limiting example corresponds generally to the tip of the locate receiver. The point P2 may be assumed to be at ground level, i.e., in the x-y plane (z=0) for purposes of simplicity, except as described below in those embodiments in which the distance of P2 from the x-y plane may be measured. The shortest distance between P1 and P2 is given by L, which in some embodiments may correspond to the length of the locate receiver, although not all embodiments are limited in this respect. For example, if the locate receiver has a non-linear shape, the distance L may not correspond to the length of the locate receiver. The locate receiver 2200 may be projected onto the x-y plane (z=0) along the dashed line 2202, which therefore lies in the x-y plane. The distance between the points P1 and P2 in the x-y plane (i.e., along the dashed line 2202) is represented by d. The distance between the point P1 and ground is given by H (i.e., z=H). At any given time, the locate receiver may make an angle θ with respect to the x-y plane, i.e., with respect to ground in this non-limiting example. The projection of the locate receiver on the x-y plane, i.e., along the line 2202, may be at an angle φ in the x-y plane with respect to the x axis. In some embodiments, the x-axis may be defined to align with true North, although all embodiments are not limited in this respect.

According to one embodiment, a locate receiver, such as locate receiver 2200 may comprise a location tracking system at the point P1. The location tracking system may provide the geo-location of the point P1 with respect to the x-y plane, represented as $GPS_o$. The geo-location of P2 in the x-y plane may be represented by GPS'. As will be explained, GPS' may be determined based on a value of $GPS_o$ given by a location tracking system and determination of suitable combinations of L, d, H, θ, and φ. The value of L may be known before the locate operation begins, for example since it may be set after manufacture of the locate receiver. The values of d, H, θ, and φ may be directly sensed during operation of the locate receiver or may be calculated using suitable ones of the operational sensors 1530, as will be described below.

According to one embodiment, the geo-location of the tip of a locate receiver, such as locate receiver 2200, may be determined using the value of $GPS_o$ given by the location tracking system at P1 and accelerometer data from an accelerometer positioned at or sufficiently near the tip of the locate receiver (i.e., at point P2 in FIG. 22). In this embodiment, it is assumed that the value of L is known or determined in any suitable manner. The accelerometer in this non-limiting embodiment is a 3-axis accelerometer. By suitable analysis of the acceleration values for each axis, using known algorithms, the angle θ that the locate receiver 2200 makes with the ground may be determined (see, e.g., the previous discussion of how to use an accelerometer as an inclinometer, as described by Shanghai Vigor Technology Development Co.). Based on the known distance L and the determined angle θ, the distance d between $GPS_o$ and GPS' in the x-y plane may be calculated (using the fact that the cosine of θ is equal to d/L).

Once the distance d is known, the value of GPS' may be derived from $GPS_o$ if the angle φ is known, since φ may provide the direction from $GPS_o$ to GPS' (again, in some embodiments the x-axis may be aligned with, or taken as, true North, such that φ may represent an angle with respect to true North). The value of φ may be determined in one of several manners. One manner for determining φ is from the readout of a compass of the locate receiver, such as previously described compass 1704. If the location tracking system providing $GPS_o$ is a GPS receiver, then the value of φ may alternatively be taken from the heading information provided as part of the NMEA data stream provided by the GPS receiver. A third alternative for determining φ is to calculate a direction of motion based on multiple GPS points taken from the location tracking system. According to this third alternative, multiple GPS points taken at different times may be used to calculate a direction of motion by, for example, determining the direction indicated by a straight line connecting the multiple GPS points. Other methods for determining φ are also possible, as these are non-limiting examples. Once ϕ is known, the value of GPS' may then be determined from $GPS_o$, d and ϕ. Once GPS' is determined, it may be used instead of $GPS_o$ (or in addition to $GPS_o$) as more accurate geo-location data, which may be included, for example, in one or more event entries and/or electronic records as discussed above.

According to an alternative embodiment, the value of GPS' may be determined from a measured value of $GPS_o$ using an inclinometer on the locate receiver, such as inclinometer 1706, previously described. The inclinometer may provide the value of θ. In this embodiment, it is assumed that the value of L is known or determined in any suitable manner. Thus, the value of d may be determined using L and θ, as explained above. The value of ϕ may be determined in any suitable manner, for example using any of the techniques described above. The value of GPS' may then be determined from $GPS_o$, d, and ϕ, as noted above.

According to another embodiment, the value of GPS' may be determined from a measured value of $GPS_o$ using a proximity sensor, such as previously described proximity sensor 1712. In this embodiment, it is assumed that the value of L is known or determined in any suitable manner. The proximity sensor may be positioned at P1 and configured to measure the value of H. Assuming that the point P2 is at or very near the ground (i.e., having a vertical height of approximately zero), the value of H and the known distance L of the locate receiver may be used to determine d, for example using the Pythagorean theorem. The value of ϕ may be determined in any suitable manner, for example using any of the techniques described above. The value of GPS' may then be determined using $GPS_o$, d, and ϕ.

As explained, the above-described example, in which a single proximity sensor is used to determine the value of H, may provide suitable results when it is assumed that the point P2 has zero vertical height. In one embodiment, that assumption may be avoided by also including a proximity sensor at the point P2 and configured to measure the distance between P2 and the ground. Then, the difference in height between P1 and P2 (rather than the value of H) may be used in connection with the known distance L to determine the distance d (e.g., using the Pythagorean Theorem). The value of ϕ may be determined in any suitable manner, for example using any of the techniques described above. The value of GPS' may then be determined using $GPS_o$, d, and ϕ.

According to a further alternative embodiment, the value of GPS' may be determined from a measured value of $GPS_o$ using two 3-axis accelerometers on the locate receiver. One accelerometer may be located at the point P1 on the locate receiver, while the second may be located at the point P2. Using the techniques described in U.S. Patent Application Publication 2008/0255795, which is incorporated herein by reference in its entirety, the location of P2 relative to P1 may be determined.

As mentioned, in some instances it may be desirable to track the motion of a specific portion of a locate receiver, such as the tip of the locate receiver, for any one of the reasons previously described. In those embodiments in which the locate receiver includes a location tracking system providing a value of $GPS_o$ for a different point on the locate receiver than the point of interest, the tracking of the point of interest may be performed by determining GPS' (the location of the point of interest) for each value of $GPS_o$ as the locate receiver is moved using any of the above-described techniques.

However, in some instances, the value of $GPS_o$ provided by the location tracking system may not have sufficient accuracy to allow for a desired level of accuracy in tracking the motion at the desired point on the locate receiver (e.g., the point P2).

For example, when performing a locate operation, a technician may move the locate receiver by distances that are relatively small compared to the resolution of the location tracking system. For example, when sweeping the locate receiver over the ground, the sweeping pattern may include segments smaller than the resolution of the location tracking system (e.g., smaller than approximately 30 inches in some embodiments). In such instances, using the above-described techniques for determining GPS' as the point P2 moves may not sufficiently capture the movement with a desired resolution. Thus, the techniques described below may be used.

According to one embodiment, the motion of the point P2 may be tracked by using any of the above-described techniques to get an initial value of GPS' and then using data from an accelerometer at the point P2 to determine the distance traveled in the x and y directions. This technique is commonly referred to in the relevant arts as "dead reckoning." In this embodiment, the accelerometer may provide acceleration data for the x and y axes. That data may be integrated twice to determine the total distance traveled in the x and y directions, thus giving the position of P2 at any point in time relative to any initial GPS' value. Alternatively, the accelerometer may output velocity data for each axis, which may be integrated to determine the total distance traveled in the x and y directions. A specific example is now described with respect to FIG. 23.

Figure 23:
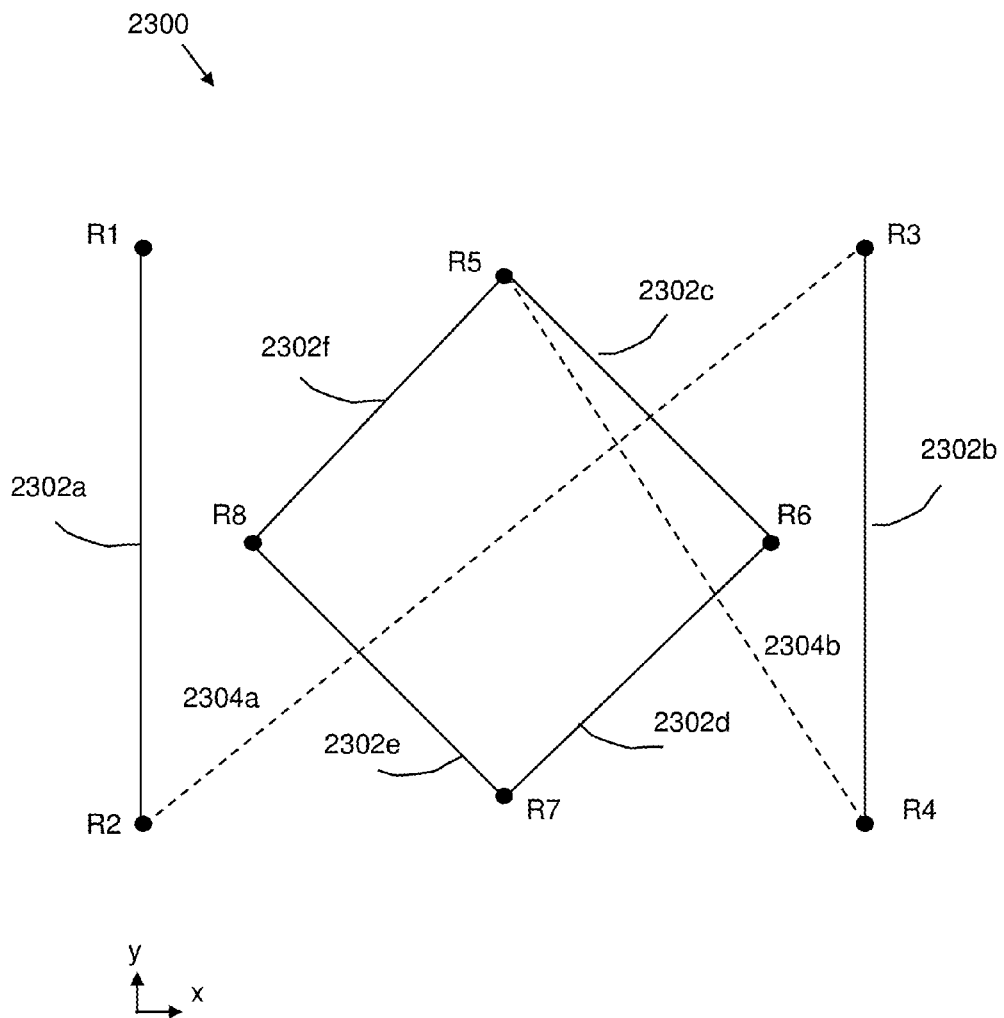
FIG. 23 illustrates a pattern of motion of a locate receiver, according to various of the embodiments described herein.

FIG. 23 illustrates a top view of a non-limiting example of a pattern of motion 2300 that may be made by a technician using one of the locate receivers described herein. The illustrated pattern is shown for purposes of illustration only, as it should be appreciated that various patterns and sweeping motions may be made by a technician using a locate receiver.

The pattern of motion 2300 comprises lines 2302a-2302f. The solid lines in FIG. 23 correspond to when the actuation system of the locate receiver (e.g., actuation system 120) is activated. Lines 2304a and 2304b, described below, are shown as dashed lines because the actuation system is not actuated as the locate receiver traversed the paths indicated by those lines.

The making of the pattern of motion 2300 by a locate receiver may be determined as follows. First, the technician may begin the pattern at the point R1, at which time the technician actuates the actuation system (e.g., to record magnetic field data). The location of point R1 may correspond to the initial location of the tip of the locate receiver and therefore may be determined from a value of $GPS_o$ of the top of the locate receiver and any of the above-described techniques for determining the location of the tip relative to the location of the top of the locate receiver.

The technician may then begin to move the locate receiver along the path indicated by line 2302a, ending at the point R2. The motion of the tip of the locate receiver along line 2302a may be determined from the output of an accelerometer at the tip of the locate receiver, providing an output signal for both the x and y directions. According to one embodiment, the output of the accelerometer is velocity data for both the x and y axes, and is output periodically, for example twice per second, although higher and lower data output rates are possible. The velocity values for each of the x and y axes may be multiplied by the time duration between samples of the accelerometer (e.g., one-half of a second in this non-limiting example) to get the distance traveled in the x and y directions from the initial point R1. Alternatively, the total velocity of the locate receiver may be multiplied by the time duration between samples of the accelerometer, and the direction of motion may be determined by comparing the velocity values for the x and y axes to each other, e.g., by taking the ratio of the velocity along the x-axis to the velocity along the y-axis. Either way, the distance travelled in the x and y directions may be determined.

In the non-limiting example of FIG. 23, the first line, i.e., line 2302a, may serve as a base line or reference line, from which the angle of subsequent motions may be referenced. Thus, in FIG. 23, the angle of the second motion of the technician, from points R2 to R3 along the path indicated by line 2304a may be determined by reference to the direction of line 2302a since the accelerometer output will indicate a change from the motion along the path of line 2302a. The distance and direction of the line 2304a may be determined as described above for line 2302a. Again, the line 2304a is shown as a dashed line, as the actuation system of the locate receiver is not activated while the locate receiver traverses the illustrated path.

The locate receiver is subsequently moved along line 2302b (from point R3 to R4), then along line 2304b (from point R4 to R5), then along line 2302c (from point R5 to R6), along line 2302d (from point R6 to R7), along line 2302e (from point R7 to R8), and finally along line 2302f (from point R8 back to point R5). The length and relative direction of each of the indicated lines may be determined as described above for line 2302a.

Thus, it should be appreciated that according to this non-limiting embodiment, a value of $GPS_o$ provided by a location tracking system is used only to determine the initial location of R1, after which the locations of point R2-R8 are determined using dead reckoning.

Also, it should be appreciated that while the relative orientation of each of the indicated lines is determined from the dead reckoning techniques described, the absolute, or actual, orientation is not determined from the accelerometer data since the actual orientation of line 2302a is not determined from the accelerometer data. Thus, according to one embodiment an additional step of determining an actual orientation of the line 2302a may be performed. According to one non-limiting embodiment, the actual orientation of line 2302a may be given by a heading provided by a compass of the locate receiver while the line 2302a is made. Other techniques may alternatively be used to determine the actual direction of the first motion of the pattern of motion.

According to the above-described embodiment, the location of the tip of a locate receiver may be determined by determining an initial location using a location tracking system and subsequently using the dead reckoning techniques described. Because the error associated with dead reckoning may increase as the distance traversed increases, it may be desirable in some embodiments to "reset" the dead reckoning by determining a new initial location value using a location tracking system. For example, referring to the pattern of motion 2300, in one embodiment the location of R1 may be determined from a value of $GPS_o$ given by a location tracking system and any of the techniques described for determining a value of GPS' for the given $GPS_o$. Subsequently, dead reckoning may be used to determine the paths of lines 2302a, 2304a, 2302b, and 2304b. According to one embodiment, the location of point R5 is not determined from dead reckoning, but rather may be determined by getting a value of $GPS_o$ at the point R5 and calculating a corresponding value of GPS'. Then, dead reckoning may be used to determine the locations of lines 2302c-2302f. In this manner, location errors that accumulate using dead reckoning may be minimized or eliminated.

Accordingly, it should be understood that a new initial location point serving as a starting point for the use of dead reckoning may be set at any suitable intervals during a locate operation. Suitable criteria for determining when to set a new initial location point for the use of dead reckoning include setting a new initial point for the beginning of each new motion of a pattern that a technician makes (e.g., each new sweeping segment of a sweeping pattern), for each new pattern, for each new locate job, or every time the dead reckoning data indicates a threshold total distance has been traveled (e.g., 5 meters, 10 meters, 50 meters, or any other threshold value). This list is not exhaustive, as other criteria may also be used to determine when to set a new initial location point for the use of dead reckoning.

X. Enhanced User Interface

According to one aspect of the present invention, a locate receiver may include an enhanced user interface with tactile functionality. As will be described, the tactile functionality may be provided in one or more of various locations on the locate receiver, and may be used for various purposes.

Figure 24:
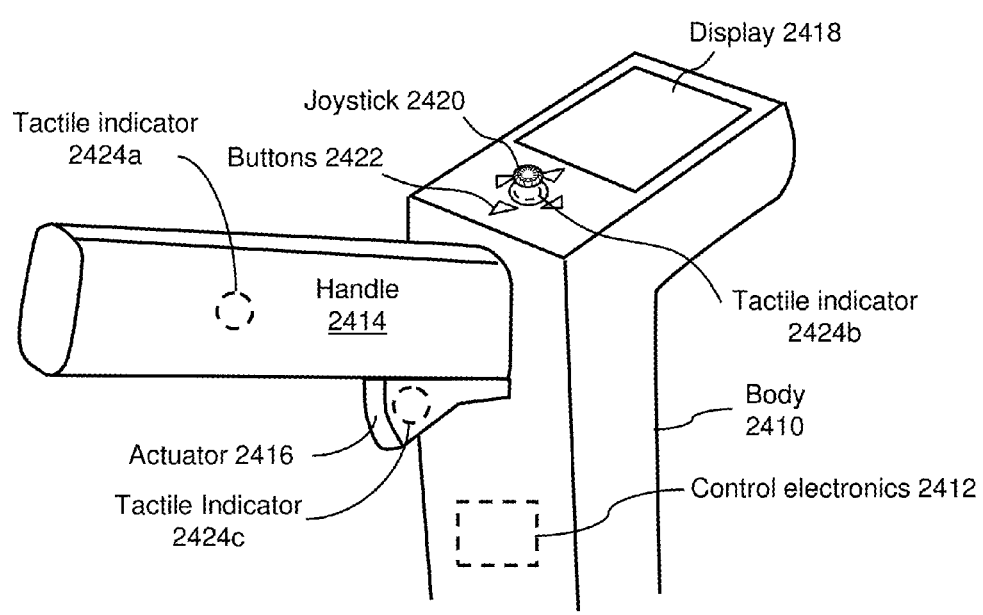
FIG. 24 illustrates a portion of a locate receiver including tactile indicators, according to one embodiment of the present invention.

FIG. 24 illustrates an example of a portion of a locate receiver 2400 including multiple tactile indicators for providing a tactile indication to a technician using the locate receiver. The locate receiver 2400 may be a locate receiver according to any of the embodiments previously described herein. The locate receiver 2400 includes a body 2410, control electronics 2412, a handle 2414 and an actuator 2416. In addition, the locate receiver 2400 includes a user interface including a display 2418, a joystick 2420, and arrow selection buttons 2422. As compared to the user interfaces of the locate receivers previously described, the user interface of the locate receiver 2400 also includes three tactile indicators, 2424a-2424c, which may alternatively be referred to as vibrating devices or vibrators.

The tactile indicator 2424a is disposed within or on the handle 2414 of the locate receiver 2400, or otherwise mechanically coupled to the handle 2414. The tactile indicator 2424b is disposed within or on the joystick 2420, or is otherwise mechanically coupled to the joystick 2420. The tactile indicator 2424c is disposed within or on the actuator 2416, or otherwise mechanically coupled to the actuator 2416. It should be appreciated that locate receivers including tactile indicators according to the embodiments described herein are not limited to having any particular number of tactile indicators (i.e., one or more) and are not limited in the locations at which the tactile indicators are placed.

The tactile indicators may be of any suitable type. One example of a suitable type of tactile indicator is that used in cellular telephones to provide the "vibrate" functionality. According to one embodiment, one or more of the tactile indicators is formed by a flywheel that has a weight configured to unbalance the flywheel, so that when the flywheel spins it wobbles. According to one embodiment, all three of the tactile indicators are the same type, although not all embodiments are limited in this respect.

The tactile indicators 2424a-2424c may provide any suitable type of tactile indication to a technician, in terms of duration, frequency, intensity, pattern, and any combinations thereof. Also, the tactile indicators 2424a-2424c need not provide the same type of tactile indication. For example, tactile indicator 2424a may provide a relatively strong, continuous vibration of long duration, whereas tactile indicator 2424b may provide a series of low intensity, short vibrations. Furthermore, one or more of the tactile indicators may be configurable to provide multiple different types of tactile indications. For example, in some instances the tactile indicator 2424a may provide a long, continuous vibration, whereas in other instances the tactile indicator 2424a may provide a short vibration. Thus, the type(s) of tactile indication presented by the tactile indicators is not limiting.

According to one embodiment, the tactile indications provided to a user may have different meanings. According to one embodiment, the meaning may differ depending on the tactile indicator providing the tactile indication. For example, vibration of the tactile indicator 2424a may indicate the locate receiver power supply is low, while vibration of the tactile indicator 2424b may indicate the technician has tried to select an invalid entry for a menu displayed on display 2418, and vibration of the tactile indicator 2424c may indicate that the actuator 2416 is not functioning. According to one embodiment, different meanings may be conveyed by a single tactile indicator. For example, a short vibration of tactile indicator 2424a may indicate the locate receiver power supply is low, while a longer duration vibration of tactile indicator 2424a may indicate, for example, that the locate receiver is not at the correct job location, for example as may be determined by a location tracking system of the locate receiver. Thus, it should be appreciated that the tactile indicators may be used to convey various messages to the technician.

According to one aspect of the present invention, one or more of the tactile indicators 2424a-2424c may operate in response to information collected by an environmental sensor and/or operational sensor of the locate receiver. For example, as described above (e.g., in connection with FIG. 19), some embodiments of the present invention provide an alert or notification to the locate receiver technician if an out-of-tolerance condition is detected based on a condition sensed by an environmental or operational sensor. As explained, the alerts may take any suitable form including visual and/or audible. In addition, or alternatively, the alerts may be presented via one or more of the tactile indicators. For example, the tactile indicator 2424c may vibrate if an out-of-tolerance condition is detected that would be adverse to performance of the locate operation.

According to one embodiment, the nature of operation of each of the tactile indicators in FIG. 24, in terms of what triggers vibration of the tactile indicator, the type of vibration (intensity, duration, frequency, pattern, etc.), and the meaning may be controlled by the control electronics 2412. For example, the nature of operation of each of the tactile indicators may be programmed into a processor of the control electronics (e.g., similar to processor 118, previously described).

In one example, the tactile sensations programmed for tactile indicator 2424a may be associated with the general operation of locate receiver 2400 and/or aspects of the locate operations. In other words, conditions associated with the general operation of locate receiver 2400 and/or aspects of the locate operations are communicated to the user via tactile sensations at handle 2414. In this example, tactile sensations provided at handle 2414 may be used to indicate any events that may occur on and/or any conditions of the locate receiver. Examples of tactile sensations that are provided at handle 2414 by tactile indicator 2424a may include, but are not limited to, the following:

1. when powering on the locate receiver, a certain tactile sensation may indicate the start of the boot cycle, followed by a "ready" tactile sensation;
2. a certain tactile sensation may indicate the status of certain calibration processes and/or testing processes of components of the locate receiver. This status may be indicated during or just following the boot cycle. Additionally, this status may be indicated at any time during the operation of the locate receiver that any component falls out of calibration;
3. a certain tactile sensation may indicate a change in connectivity of the locate receiver to a network (e.g., dropped or gained WiFi connectivity);
4. a certain tactile sensation may indicate a change in GPS connectivity (e.g., dropped or gained);
5. certain tactile sensations may indicate that the battery power (e.g., power supply 114) is below certain capacities (e.g., 75%, 50%, 25% capacity);
6. a certain tactile sensation may indicate that the locate receiver is not oriented correctly (e.g., at the wrong angle);
7. a certain tactile sensation may indicate that the sweeping motion of the locate receiver is not at the correct rate (e.g., outside of tolerances because it is either too fast or too slow);
8. a certain tactile sensation may indicate that the signal strength indicated by detection electronics 131 is acceptable, too low, or too high;
9. a certain tactile sensation may indicate a change in the depth of the source of the detected electromagnetic field; and
10. any combinations thereof.

In one embodiment, the tactile sensations programmed for tactile indicator 2424b at the joystick 2420 may be associated with user interface functions. In other words, when the user is using the joystick or buttons to navigate through menus on display 2418, tactile feedback to the user at the joystick 2420 may be used to communicate, for example, a validation of certain selections or user interface functions. Examples of tactile sensations that may be provided at joystick 2420 via tactile indicator 2424b may include, but are not limited to, the following:

1. a certain tactile sensation may be provided when moving from option to option of a menu of the display 2418;
2. certain tactile sensations may indicate the selection of different options of a menu of the display 2418. For example:
   a. a certain tactile sensation may indicate a job started selection and/or job stopped selection;
   b. a certain tactile sensation may indicate that landmark mode was selected as well as a certain type of landmark selected;
   c. a certain tactile sensation may indicate that Bluetooth® communication is enabled and/or disabled;
   d. a certain tactile sensation may indicate that an invalid option has been selected. For example, the user has selected a gas landmark, but no gas facility is indicated on the current locate operation work order;
   e. a certain tactile sensation may indicate that a certain signal frequency range is selected;
   f. a certain tactile sensation may indicate that certain signal amplitude range is selected; and
3. any combinations thereof.

In one embodiment, the tactile sensations programmed for tactile indicator 2424c at the actuator 2416 may be associated with operation of the actuator 2416. Examples of tactile sensations that may be provided via tactile indicator 2424c include, but are not limited to, the following:

1. a certain tactile sensation may be provided to indicate the technician should press the actuator 2416;
2. a certain tactile sensation may be provided to indicate the technician is not applying sufficient force to fully engage the actuator 2416;
3. a certain tactile sensation may be provided to indicate the technician is applying too great a force to the actuator 2416; and 4. a certain tactile sensation may be provided to indicate the actuator 2416 has been disabled or enabled.

Tactile sensations may also be generated based on information received from one or more sources external to the locate receiver, such as, but not limited to, external systems, external networks, external computing devices, external business applications, and external instrumentation, among others. For example, the locate receiver (e.g., locate receiver 2400) may be in communication with one or more external devices, such as remote computer 150, via a network. The network may be, for example, a local area network (LAN) and/or a wide area network (WAN). The control electronics 2412 may be programmed to generate tactile sensations via one or more of tactile indicators 2424a-2424c based on information received from the remote computer 150.

Thus, further examples of scenarios which may trigger generation of a tactile sensation via any one or more of the tactile indicators 2424a-2424c may include, but are not limited to, the following:

1. the locate receiver may receive workflow information and/or a checklist with respect to performing locate operations according, for example, to U.S. patent application Ser. No. 12/703,809, entitled "Marking Apparatus Equipped with Ticket Processing Software for Facilitating Marking Operations, and Associated Methods," filed Feb. 11, 2010, which application is hereby incorporated by reference. A certain tactile sensation may be generated to indicate compliance and/or non-compliance with the workflow and/or checklist;
2. the locate receiver may receive standard operating procedure (SOP) information with respect to performing locate operations according to, for example, the Best Practices Version 6.0 document, published in February 2009 by the Common Ground Alliance (CGA) of Alexandria, Va. (www.commongroundalliance.com) and/or the Recommended Marking Guidelines For Underground Utilities as endorsed by the National Utility Locating Contractors Association (NULCA) of North Kansas City, Mo. A certain tactile sensation may be generated to indicate compliance and/or non-compliance with the SOP information;
3. the locate receiver may receive wage and hour information with respect to performing locate operations according to, for example, the wage and hour guidelines of one or more regulatory bodies, such as federal, regional, state, and/or local wage and hour guidelines. For example, a certain tactile sensation may be generated to indicate compliance and/or non-compliance with the wage and hour guidelines. Also, a certain tactile sensation may be generated to indicate, for example, that it is time for a required break, it is time for lunch, it is the end of the day, the employee is now in overtime mode for the week, etc.;
4. the locate receiver may receive quality assessment information with respect to performing locate operations according to, for example, a quality assessment application of the locate company. A certain tactile sensation may be generated to indicate that the locate operation has passed and/or failed the locate company's quality assessment process;
5. the locate receiver may receive VWL information with respect to the current locate operation according to, for example, the VWL application that is described in U.S. Patent Application Publication No. 20090238417, entitled "Virtual white lines for indicating planned excavation sites on electronic images;" which is incorporated by reference herein in its entirety. A certain tactile sensation may be generated to indicate that the locate operation is being performed inside and/or outside of the boundaries of the associated VWL;
6. the locate receiver may receive facilities maps information with respect to the current locate operation work order. A certain tactile sensation may be generated to indicate that the locate operation is approaching the location of a certain facility that is indicated on the facilities maps associated with the current locate operation work order. Also, a tactile sensation may be generated to indicate that certain types of facilities being located do not match the types of facilities indicated on the facilities maps;
7. the locate receiver may receive information about prior locate operations (e.g., historical work order information) with respect to the location of the current locate operation. A certain tactile sensation may be generated to indicate that the locate operation is approaching the location of a certain facility that is indicated in the historical information that is associated with the current locate operation work order. Also, a tactile sensation may be generated to indicate that certain types of facilities being located do not match the types of facilities indicated by the historical locate information.

It should be appreciated that information about the generation of a tactile signal may be included in an electronic record, a message, or any other source of information including the other locate information described herein. For example, information about whether a tactile signal was generated, which tactile indicator generated the signal, the type of signal (e.g., duration, frequency, intensity, etc.), the cause of the signal, the time of the signal (e.g., from a timestamp), and/or the geo-location at which the signal was issued, may be recorded, among other things.

Table 19 illustrates an example of an event entry that may be made in response to actuation of an actuation system of a locate receiver, in which the locate receiver includes a tactile indicator. The illustrated event entry is similar to that of Table 12, shown and described previously, with the addition of an indication of whether a tactile signal was generated (e.g., a "yes" or "no" indication being represented by "Y" and "N" for "TCTL"). Information from one or more input devices/other components of the locate receiver is recorded with these events to provide information about the job in progress.

TABLE 19

| | |
|---|---|
| Format | INFO+ LCTR: (DATE) (TIME) (GPS data) (FACILITY TYPE) (GROUND TYPE) (MAGNETIC FIELD STRENGTH AS % OF FULL SCALE info) (DETECTED SIGNAL FREQUENCY) (GAIN) AMB TEMP info) (SURF TEMP info) (HUM info) (LIGHT info) (IMAGE info) (AUDIO info) (OP TEMP info) (COMPASS info) (INCL info) (ACC1 info) (ACC2 info) (YAW info) (PROX info) (DH1 info) (DH2 info) (TACTILE INDICATION info)<CR><LF> |
| Examples | INFO+LCTR: DATE(2009-04-15) TIME(12:04:44) GPS($GPGGA, 120443, 4807.038, N, 01131.000, E, 1, 08, 0.9, 545.4, M, 46.9, M,, *47) FACILITY TYPE (YELLOW) GROUND TYPE (PAVEMENT) STRENGTH(80) |

TABLE 19-continued

FREQUENCY(512) GAIN (10) AMB TEMP(73F) SURF TEMP(78F) HUM(31)
LIGHT(1500) IMAGE(Y) AUDIO(Y) OP TEMP(97F) COMPASS(243) INCL(−40)
ACC1_x_raw(.285) ACC1_x_high(.280) ACC1_x_low(.275) ACC1_y_raw(.385)
ACC1_y_high(.382) ACC1_y_low(.380) ACC1_z_raw(.155) ACC1_z_high(.150)
ACC1_z_low(.145) (ACC2(!) YAW(!) PROX(15) DH1(67) DH2(!) TCTL(Y)<CR><LF>
INFO+LCTR: DATE(2009-04-15) TIME(12:04:45)
GPS($GPGGA, 120445, 4807.038, N, 01131.000, E, 1, 08, 0.9, 545.4, M, 46.9, M,, *47)
FACILITY TYPE (YELLOW) GROUND TYPE (GRASS) STRENGTH(81)
FREQUENCY (512) GAIN (10) AMB TEMP(73F) SURF TEMP(78F) HUM(31)
LIGHT(1500) IMAGE(Y) AUDIO(Y) OP TEMP(97F) COMPASS(243) INCL(−40)
ACC1_x_raw(.285) ACC1_x_high(.280) ACC1_x_low(.275) ACC1_y_raw(.385)
ACC1_y_high(.382) ACC1_y_low(.380) ACC1_z_raw(.155) ACC1_z_high(.150)
ACC1_z_low(.145) ACC2(!) YAW(!) PROX(15) DH1(67) DH2(!) TCTL(Y)<CR><LF>
INFO+LCTR: DATE(2009-04-15) TIME(12:04:46)
GPS($GPGGA, 120446, 4807.038, N, 01131.000, E, 1, 08, 0.9, 545.4, M, 46.9, M,, *47)
FACILITY TYPE (YELLOW) GROUND TYPE (DIRT) STRENGTH(80)
FREQUENCY(512) GAIN (11) AMB TEMP(73F) SURF TEMP(78F) HUM(31)
LIGHT(1500) IMAGE(Y) AUDIO(Y) OP TEMP(97F) COMPASS(243) INCL(−40)
ACC1_x_raw(.285) ACC1_x_high(.280) ACC1_x_low(.275) ACC1_y_raw(.385)
ACC1_y_high(.382) ACC1_y_low(.380) ACC1_z_raw(.155) ACC1_z_high(.150)
ACC1_z_low(.145) ACC2(!) YAW(!) PROX(15) DH1(67) DH2(!) TCTL(N)<CR><LF>

Table 20 illustrates an example of a data record that may be generated by a locate receiver including a tactile indicator, as well as various environmental and operational sensors. As shown, the data record may include a "yes/no" indication of whether a tactile signal was generated, as well as information about the type of signal. It should be appreciated that other forms for the data are possible and that other information regarding the tactile indicator may be included, such as any of the types of information described above.

TABLE 20

Example record of data acquired by locate receiver 2400 upon actuation

| Record # act-1 | Service provider ID | 0482 |
|---|---|---|
| | User ID | 4815 |
| | Receiver ID | 7362 |
| | Receiver Mode | Mode = Peak |
| | Timestamp data | 12-Jul-2008; 09:35:15.2 |
| | Geo-location data | 2650.9256, N, 08003.5234, W |
| | Signal strength (% of maximum) | 86 |
| | Gain | 45 |
| | Signal frequency (kHz) | 1 |
| | Facility depth (meters) | 3.4 |
| | Facility type | Gas (yellow) |
| | Ground type | Pavement |
| | Locate request data | Requestor: XYZ Construction Company, Requested service address: 222 Main St, Orlando, FL |
| | Temperature (° F.) | 75 |
| | Heading (degrees) | 243 |
| | Inclination (degrees) | 25 |
| | Acceleration (g) (x-axis) | 0.75 |
| | Acceleration (g) (y-axis) | 1.20 |
| | Acceleration (g) (z-axis) | 0.90 |
| | Yaw rate (degrees/sec) | 10 |
| | Distance (cm) | 15 |
| | Pressure (pounds/in$^2$) | 45 |
| | Image captured (Y/N) | Y |
| | Audio captured (Y/N) | N |
| | Tactile Signal (Y/N) | Y |
| | Type of Tactile Signal | Repeating vibration; duration 3 seconds |

In those embodiments in which a locate receiver includes both a tactile indicator and at least one accelerometer, data from the accelerometer(s) may be used to verify whether a tactile indication was generated, as the accelerometer data may reflect any physical movement of the locate receiver, including the physical vibrations caused by a tactile indicator. Thus, referring again to Table 20, for example, the acceleration data may provide verification that the indicated tactile signal was in fact generated.

Figure 25:
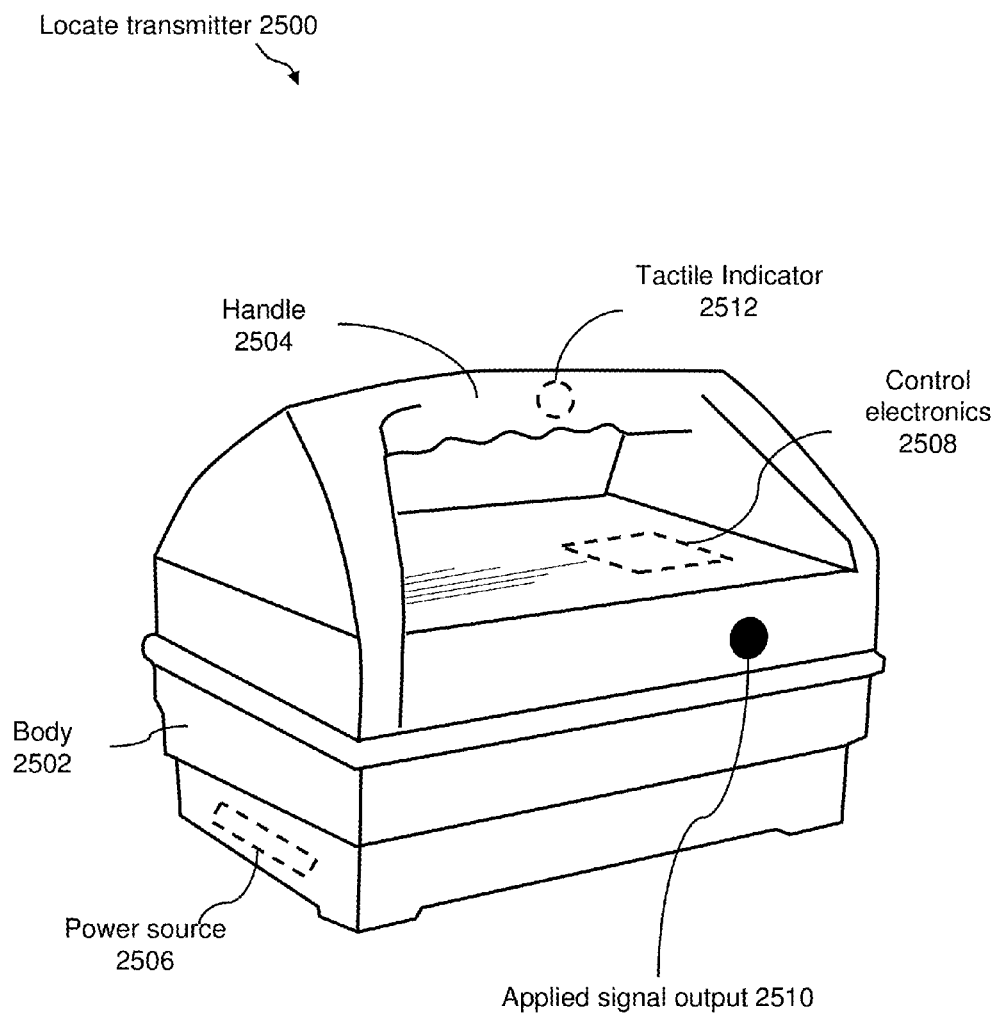
FIG. 25 illustrates a locate transmitter including a tactile indicator, according to one embodiment of the present invention.

FIG. 25 illustrates a locate transmitter that includes a tactile indicator, according to one embodiment of the present invention. The foregoing discussion with respect to tactile indicators on a locate receiver is applicable in the context of locate transmitters, such that much of the discussion is not now repeated, as it should be understood that the concepts described above are applicable to the locate transmitter of FIG. 25.

As shown, the locate transmitter 2500 includes a body 2502 having a handle 2504. The locate transmitter includes a power source 2506, which may be and function substantially the same as previously described power source 114. Also, the locate transmitter 2500 includes control electronics 2508, which may be similar to or substantially the same as previously described control electronics 112. For example, the control electronics 2508 may include a processor, a local memory, a timing system, a location tracking system, a user interface, and a communication interface, one or more of which may be substantially the same as the corresponding components of control electronics 112. The locate transmitter 2500 also includes an applied signal output 2510 for providing an applied signal along a facility.

Furthermore, the locate transmitter includes a tactile indicator 2512 in, on, or otherwise mechanically coupled to the handle 2504. The tactile indicator 2512 may be substantially the same as any of the tactile indicators 2424a-2424c described in connection with FIG. 24. Thus, the tactile indicator 2512 may vibrate or otherwise provide a tactile indication to a technician. The tactile indication may be of any suitable type in terms of pattern, intensity, and duration. Moreover, the tactile indicator 2512 may be configured to provide multiple different types of tactile indications, for example with the different types having different meanings. The type and meaning of a tactile indication provided by tactile indicator 2512 may be, in one embodiment, programmed or otherwise controlled by a processor of the control electronics 2508, in the same manner as that described above with respect to tactile indicators 2424a-2424c being controlled at least in part by the processor 118.

The tactile indicator 2512 may be triggered in response to one of various conditions, such as those previously described with respect to tactile indicators 2424a-2424c that are applicable in the context of locate transmitters. For example, outof-tolerance environmental and/or operational conditions may trigger the tactile indicator 2512. Events relating to the general operation of the locate transmitter 2500 may trigger a tactile indication, such as but not limited to:

- when powering on the locate transmitter, a certain tactile sensation may indicate the start of the boot cycle, followed by a "ready" tactile sensation;
- a certain tactile sensation may indicate the status of certain calibration processes and/or testing processes of components of the locate transmitter. This status may be indicated during or just following the boot cycle. Additionally, this status may be indicated at any time during the operation of the locate transmitter that any component falls out of calibration;
- a certain tactile sensation may indicate a change in WiFi connectivity (dropped or gained);
- a certain tactile sensation may indicate a change in GPS connectivity (dropped or gained);
- certain tactile sensations may indicate that the battery power (e.g., power source 2506) is below certain capacities (e.g., 75%, 50%, 35% capacity);
- a certain tactile sensation may indicate that the locate transmitter is well connected (i.e., a good electrical connection) or poorly connected (i.e., a poor electrical connection) to the target underground facility;
- a certain tactile sensation may indicate that the locate transmitter is not electrically grounded, or poorly electrically grounded;
- a certain tactile sensation may indicate that Bluetooth® communication is enabled and/or disabled;
- a certain tactile sensation may indicate that a certain applied signal frequency range is selected;
- a certain tactile sensation may indicate that a certain applied signal amplitude range is selected; and
- any combinations thereof.

Information received from external sources (e.g., a remote device, such as a remote computer) may trigger the tactile indicator 2512. For example, any of the above-described types of information possibly received by locate receiver 2400 may similarly be received by locate transmitter 2500 and may trigger a tactile sensation (e.g., checklist information, SOP information, wage and hour information, quality assessment information, VWL information, facilities maps information, and/or information about prior locate operations, among others). Thus, any of the following types of alerts may be generated via tactile indicator 2512:

- an alert to indicate non-compliance with a checklist;
- an alert to indicate non-compliance with an SOP;
- an alert based on wage and hour guidelines (e.g., an alert to indicate that it is time for a required break, it is time for lunch, it is the end of the day, the locate technician is now in overtime mode for the week, etc.);
- an alert from the home office to indicate to the locate technician to move from his/her present location to another location to perform an emergency locate operation;
- an alert to indicate that the locate operation has failed the locate company's quality assessment process;
- an alert to indicate that the locate operation is being performed outside of the boundaries of the associated VWL;
- an alert to indicate that the selected frequency range and/or amplitude range of a locate receiver does not match the selected frequency range and/or amplitude range of the locate transmitter;
- an alert to indicate that the signal connection and/or ground connection of the locate transmitter is poorly connected to the target underground facility; and
- an alert to indicate that a component of the locate transmitter has fallen out of calibration.

It should be appreciated that the examples described above with respect to the types of tactile indications which may generated by tactile indicator 2512, their causes, and their meanings, are not limiting, but rather are provided for purposes of illustration. Other causes of tactile indications are possible, as are other types of tactile indications. Furthermore, while FIG. 25 illustrates a single tactile indicator 2512, not all embodiments of a locate transmitter having a tactile indicator are limited in this manner. For example, a locate transmitter may have one or more tactile indicators according to various embodiments described herein.

Furthermore, electronic records and event entries may be generated based on operation of the locate transmitter 2500, which records and entries may include an indication of whether a tactile signal was generated, and if so, what kind, at what time, at what location, and whether it was acknowledged, among other things. Thus, entries and records such as those of Tables 19 and 20 may be generated in the context of the locate transmitter 2500.

It should be appreciated that many of the aspects of the present invention described above also apply to a combination locate and marking device. As explained, a locate receiver is a device typically used to locate an underground facility, after which the location may be marked using a marking device. According to one embodiment, a single device may perform the function of a locate receiver and a marking device, and thus may be a combination locate and marking device, as described in U.S. patent application Ser. No. 12/569,192, filed on Sep. 29, 2009 and titled "Methods, Apparatus, and Systems For Generating Electronic Records Of Locate And Marking Operations, And Combined Locate And Marking Apparatus For Same," which is hereby incorporated herein by reference in its entirety. The various aspects described herein relating to locate receivers may also apply to such combination locate and marking devices as those described in U.S. patent application Ser. No. 12/569,192.

XI. Locate Transmitter with Enhanced Ground Probe

Figure 27:
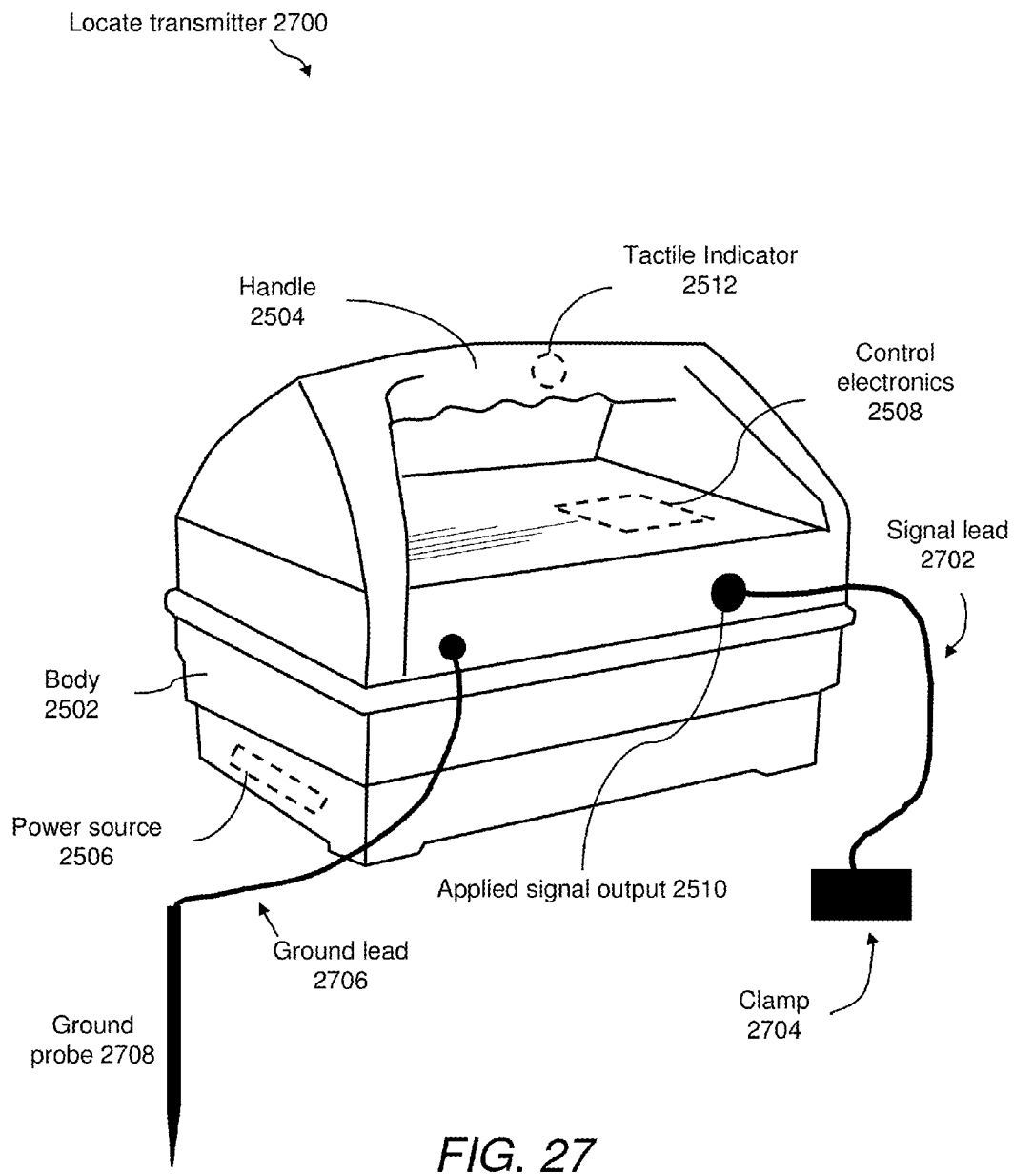
FIG. 27 illustrates a locate transmitter including a ground probe for detecting one or more characteristics of a material into which it is inserted.

According to one embodiment of the present invention, a locate transmitter includes an enhanced ground probe for determining one or more characteristics of the ground (or other material) into which it is inserted. When using a locate transmitter in a conductive mode of operation, the transmitter may be suitably electrically grounded by connecting to a ground stake, for example a metal rod inserted into the ground. The quality of the electrical grounding may depend on characteristics of the ground into which the stake is inserted, such as the moisture content, iron content, soil type (e.g., sandy, clay, etc.) and pH, among others. Accordingly, one embodiment of the present invention provides one or more ground probes for grounding a locate transmitter that also measures one or more of moisture content, pH, or other characteristics of interest of the ground. FIG. 27 illustrates a non-limiting example.

The locate transmitter 2700 of FIG. 27 may be substantially similar to previously described locate transmitter 2500, and thus includes some of the same reference numbers. In addition, locate transmitter 2700 includes a signal lead 2702 (e.g., a wire) terminating with a clamp 2704 for clamping to a connection point of a target facility. The signal lead 2702, which is connected to the applied signal output 2510, provides the applied signal to the target facility. The locate transmitter 2700 also includes a ground lead 2706 terminating with one or more ground probe 2708. The ground probe 2708 may be configured to be inserted into the physical ground to establish an electrical ground connection for the locate transmitter 2700.

The one or more ground probes 2708 may each be configured to sense one or more of moisture content, iron content, soil type and pH of the ground into which it is inserted, using techniques known to those of skill in the art. The sensed information may be provided to control electronics 2508 (e.g., a processor or memory of the control electronics) for storage in an electronic record, processing, transmission to an external device (e.g., remote computer 150) or any of the other uses of information described herein. According to one embodiment, an alert may be generated to a technician using the locate transmitter 2700 if the sensed moisture and/or pH indicate an out-of-tolerance condition, e.g., a condition not suitable for making a good electrical ground. According to one embodiment, the locate transmitter may be disabled (e.g., any applied signal may be inhibited) in response to detecting such a condition. Other actions may also be taken in response to detecting such a condition, according to the various aspects described herein.

It should be appreciated that locate transmitters including a ground probe of the type illustrated in FIG. 27 need not include tactile indicators or the other features of the locate transmitter 2700. Rather, the locate transmitter 2700 represents a non-limiting example only.

XII. Determination of Distances Between Locate Transmitter and Connection Points According to another embodiment, it may desirable to know a distance between the body of a locate transmitter, the connection point (e.g., clamp) for connecting to a facility, and the connection point to electrical ground (e.g., to a ground stake). For example, there may be recommended distances between the ground connection point (e.g., the location of a ground stake or ground probe), the body of the transmitter, and the point at which the transmitter connects to the target facility. Referring to FIG. 27 as a non-limiting example, there may be preferred distances between the body 2502, the clamp 2704 (when clamped), and the ground probe 2708 (when inserted into the ground or other material). Deviation from such preferred distances may result in electrical interference, compromising the quality of an applied signal, or otherwise degrading performance of the locate transmitter. Thus, according to one embodiment of the present invention, apparatus and methods are provided for determining the distances between such components.

According to a first embodiment, the distances between a locate transmitter body, a connection point of the locate transmitter to a target facility, and a ground connection point (e.g., the location of a ground stake) may be determined by providing a location tracking system (e.g., a GPS receiver, as previously described) for each of the points of interest. For example, referring to FIG. 27, each of the body 2502, clamp 2704, and ground probe 2708 may include a GPS receiver. Thus, the distances between the components may be determined from the GPS data provided by the GPS receivers.

According to another embodiment, the distances between the components may be determined using a landmark mode of the locate transmitter or of a locate receiver. For example, as previously explained, landmark mode functionality may allow for recording of geo-location information of landmarks of interest. According to one embodiment, a locate receiver with landmark mode functionality may be used to record the geo-location of each of the body 2502, clamp 2704, and ground 2708, from which the distances between the components may be determined. Alternatively, the locate transmitter itself may have landmark mode functionality and may be used to determined the geo-location of the components of interest.

According to a further embodiment, a locate transmitter may include one or more proximity sensors which may be used to determine the distances between components. For example, the locate transmitter 2700 may include a proximity sensor which may be implemented to measure a distance between the body 2502 and the ground probe 2708. Similarly, the distance between the body 2502 and the clamp 2704 may be determined with the proximity sensor.

Other manners of determining the distances between a locate transmitter, a connection point to a target facility, and an electrical ground connection point are also possible, as the above-described examples are non-limiting. Furthermore, while the foregoing description references the locate transmitter 2700 as an example, it should be appreciated that the techniques may be applied to various types of locate transmitters and that, for example, the locate transmitter need not include a probe like ground problem 2708 for measuring characteristics of the ground.

Information about the distances between the locate transmitter body, the electrical ground connection point, and the connection point to the target facility may be used in any of the manners previously described for other types of locate-related information. According to one embodiment, the information may be recorded in an electronic record. According to another embodiment, an alert may be generated and provided to a technician using the locate transmitter if the determined distances do not satisfactorily compare to pre-determined or accepted values. For example, if the distances are too short (e.g., indicating the possibility of electrical interference), an alert may be generated. Moreover, according to one embodiment the locate transmitter may be disabled (e.g., generation of the applied signal may be inhibited) if the measured distances do not satisfactorily compare to pre-determined or accepted values. Other types of responses are also possible, as those listed are non-limiting examples.

XIII. Conclusion

As discussed herein, a wide variety of information/data may be acquired and analyzed in connection with locate operations, for a variety of purposes. The data of interest that may be acquired and analyzed may include, but is not limited to, timestamp data, geo-location information of detected facilities, geo-location information of environmental landmarks, direction information, any information included in the standard data stream of the locate tracking system (e.g., GPS system), color/type of detected facilities, ID information (e.g., individual, vehicle, wage and/or hour compliance), battery status of the locate device, wired/wireless connection status, Bluetooth® signal strength, storage capacity of the local memory, temperature, humidity, light level, movement of the locate device, mode of operation of the locate device, charging state of the locate device (e.g., charging/not charging), alerts against expectations in performance, and any combination thereof.

The information, such as shown in various tables herein, that may be acquired by use of the data acquisition system and methods described herein, may be used for any purpose. In an embodiment, the information of the data acquisition system may be analyzed against expected locate operations in order to gain benefits in, for example, operating efficiency, personnel management, inventory management, quality control, training operations, safety, customer satisfaction, and the like.

Additionally, the information that is acquired by use of the data acquisition system and the methods of the present disclosure may be correlated to other aspects of locate and marking operations. For example, the locate device data streams (e.g., respective event entries or one or more electronic records transmitted by the locate device) may be correlated to other data streams of multiple locate devices or any other devices in order to aggregate, assess, evaluate, draw insights from, take action on this information, and any combination thereof. Correlating disparate data streams may be useful in order to better interpret and/or gain new interpretations that are useful. For example, by analyzing the aggregated data, field service providers may gain visibility into the distributed workforce, may take corrective and/or any other constructive action to improve process management, may improve and/or develop best practices, and any combination thereof. In an embodiment, certain trends may be identified by correlating historical records of the amount of time that is spent performing locate and marking operations to other information, such as, but not limited to, the time of day, time of year, address of the locate site, experience of the locate technician, weather conditions, heavy or light traffic times, and the like.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A device for use in a locate operation to detect a presence or absence of an underground facility, the device comprising:
   at least one of:
   transmitter circuitry to generate an applied signal to be applied along the underground facility; and
   a receiver antenna configured to detect a magnetic field from the underground facility;
   a memory to store processor-executable instructions;
   at least one communication interface; and
   at least one processor communicatively coupled to the memory, the at least one communication interface, and the at least one of the transmitter circuitry and the receiver antenna, wherein upon execution of the processor-executable instructions, the processor:
   controls the at least one communication interface to receive environmental information regarding at least one environmental condition of an environment in which the device is located; and
   stores at least some of the received environmental information in the memory,
   wherein the device further comprises a location tracking system configured to provide to the processor an indication of a location of the environment in which the device is located, and wherein upon execution of the processor-executable instructions, the processor:
   controls the at least one communication interface to receive the environmental information regarding the at least one environmental condition of the environment based on the indication of the location provided by the location tracking system.

2. The device of claim 1, wherein the device is a locate transmitter comprising the transmitter circuitry.

3. The device of claim 1, wherein the device is a locate receiver comprising the receiver antenna.

4. The device of claim 1, wherein the at least one environmental condition is ambient temperature.

5. The device of claim 1, wherein the at least one environmental condition is ambient humidity.

6. The device of claim 1, wherein the at least one environmental condition is an altitude of a location at which the device is located.

7. The device of claim 1, wherein the at least one communication interface communicatively couples the device to a network, and wherein the environmental information is received over the network.

8. The device of claim 7, wherein the network is the Internet.

9. The device of claim 1, wherein the at least one communication interface is a wireless communication interface.

10. The device of claim 9, wherein the at least one communication interface is configured to wirelessly couple the device to a network.

11. The device of claim 1, wherein the at least one environmental condition is at least one first environmental condition, and wherein the device further comprises at least one input device communicatively coupled to the at least one processor and configured to sense at least one second environmental condition of the environment in which the device is located and provide an output signal to the at least one processor indicative of the at least one second environmental condition.

12. The device of claim 11, wherein upon execution of the processor-executable instructions, the processor processes in combination the output signal of the at least one input device and the environmental information received by the at least one communication interface.

13. The device of claim 11, wherein the at least one first environmental condition differs from the at least one second environmental condition.

14. The device of claim 1, wherein, upon execution of the processor-executable instructions, the processor: controls the at least one communication interface to receive the environmental information periodically.

15. A method for performing a locate operation to detect a presence or an absence of at least one underground facility using a locate device, the method comprising:
   A) doing at least one of:
      i) transmitting an applied signal to the at least one underground facility; and
      ii) detecting a magnetic field emitted from the at least one underground facility;

B) receiving, via at least one communication interface of the locate device, environmental information regarding at least one environmental condition of an environment in which the locate device is located;

C) controlling the at least one communication interface to receive the environmental information based on an indication of a location provided by a location tracking system;

D) logging into local memory of the locate device locate information relating at least in part to A) and B); and E) receiving, from the location tracking system, the indication of the location of the environment in which the locate device is located, and wherein B) comprises receiving the environmental information based on the received indication of the location of the environment.

16. The method of claim 15, wherein the locate device is a locate transmitter and wherein A) comprises transmitting an applied signal to the at least one underground facility.

17. The method of claim 15, wherein the locate device is a locate receiver, and wherein A) comprises detecting a magnetic field emitted from the at least one underground facility.

18. The method of claim 15, wherein B) comprises receiving an ambient temperature of the environment in which the locate device is located.

19. The method of claim 15, wherein B) comprises receiving a humidity of the environment in which the locate device is located.

20. The method of claim 15, wherein B) comprises receiving an altitude of a location at which the locate device is located.

21. The method of claim 15, wherein the at least one communication interface communicatively couples the locate device to a network, and wherein B) comprises receiving the environmental information over the network.

22. The method of claim 21, wherein the network is the Internet.

23. The method of claim 21, wherein the network is a local area network.

24. The method of claim 15, wherein the at least one communication interface is a wireless communication interface and wherein B) comprises wirelessly receiving the environmental information.

25. The method of claim 24, wherein the at least one communication interface is configured to wirelessly couple the locate device to a network, and wherein B) comprises wirelessly receiving the environmental information over the network.

26. The method of claim 15, wherein the at least one environmental condition is at least one first environmental condition, and wherein the method further comprises:

F) detecting, via at least one input device of the locate device, at least one second environmental condition of the environment in which the locate device is located, and wherein D) comprises logging into local memory of the locate device locate information relating at least in part to A), B) and E).

27. The method of claim 26, further comprising:

G) processing in combination the locate information relating to B) and E).

28. The method of claim 26, wherein the at least one first environmental condition differs from the at least one second environmental condition.

29. The method of claim 15, wherein B) comprises receiving the environmental information periodically.

30. The method of claim 15, wherein B) is performed in response to A).

31. At least one non-transitory computer readable storage medium product having stored processor-executable instructions, which when executed by at least one processor, perform a method for facilitating a locate operation to detect a presence or an absence of at least one underground facility using a locate device, wherein, during the locate operation, an applied signal is transmitted to the at least one underground facility by transmitter circuitry of the locate device, or a magnetic field emitted from the at least one underground facility is detected by a receiver antenna of the locate device, the method comprising A) receiving, via at least one communication interface of the locate device, environmental information regarding at least one environmental condition of an environment in which the locate device is located;

B) logging into local memory of the locate device at least some of the environmental information received in A); and C) receiving, from a location tracking system, an indication of a location of the environment in which the locate device is located, and wherein A) comprises receiving the environmental information based on the received indication of the location of the environment.

* * * * *

UNITED STATES PATENT AND TRADEMARK OFFICE
CERTIFICATE OF CORRECTION

| | | |
|---|---|---|
| PATENT NO. | : 8,766,638 B2 | Page 1 of 1 |
| APPLICATION NO. | : 12/818199 | |
| DATED | : July 1, 2014 | |
| INVENTOR(S) | : Nielsen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 456 days.

Signed and Sealed this
Eighth Day of September, 2015

Michelle K. Lee
*Director of the United States Patent and Trademark Office*